(12) United States Patent
Sugio et al.

(10) Patent No.: US 12,033,363 B2
(45) Date of Patent: Jul. 9, 2024

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Toshiyasu Sugio, Osaka (JP); Noritaka Iguchi, Osaka (JP); Chi Wang, Singapore (SG); Pongsak Lasang, Singapore (SG); Chung Dean Han, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/233,059

(22) Filed: Aug. 11, 2023

(65) Prior Publication Data
US 2023/0386092 A1 Nov. 30, 2023

Related U.S. Application Data

(63) Continuation of application No. 17/228,042, filed on Apr. 12, 2021, now Pat. No. 11,776,165, which is a
(Continued)

(51) Int. Cl.
*G06T 9/40* (2006.01)
(52) U.S. Cl.
CPC ...................... *G06T 9/40* (2013.01)

(58) Field of Classification Search
None
See application file for complete search history.

(56) References Cited

U.S. PATENT DOCUMENTS 9,224,235 B2 * 12/2015 Sevastiyanov ............ G06T 9/40
9,798,674 B2 * 10/2017 Steiss .................... G06F 12/109
(Continued)

FOREIGN PATENT DOCUMENTS

| JP | 2013-77165 | 4/2013 |
|----|------------|--------|
| JP | 2018-101404 | 6/2018 |
| WO | 2014/020663 | 2/2014 |

OTHER PUBLICATIONS

International Search Report (ISR) dated Dec. 10, 2019 in International (PCT) Application No. PCT/JP2019/040330.
(Continued)

*Primary Examiner* — Anand P Bhatnagar
(74) *Attorney, Agent, or Firm* — Wenderoth, Lind & Ponack, L.L.P.

(57) ABSTRACT

A three-dimensional data encoding method includes: encoding first information of a first current node or second information of a second current node, the first current node being included in an N-ary tree structure of first three-dimensional points included in a first three-dimensional point cloud, N being 2 or 4, the second current node being included in an octree structure of second three-dimensional points included in a second three-dimensional point cloud The encoding of the first information or the second information includes encoding the first information using a first encoding pattern including a pattern common to a second encoding pattern used in encoding the second information.

16 Claims, 90 Drawing Sheets

Related U.S. Application Data continuation of application No. PCT/JP2019/040330, filed on Oct. 11, 2019.

(60) Provisional application No. 62/744,973, filed on Oct. 12, 2018.

(56) References Cited

U.S. PATENT DOCUMENTS

| | | | |
|---|---|---|---|
| 10,891,786 B2* | 1/2021 | Zeng | G05B 19/408 |
| 11,197,027 B2* | 12/2021 | Han | H04N 19/184 |
| 11,443,459 B2* | 9/2022 | Sugio | G06T 9/40 |
| 11,625,865 B2* | 4/2023 | Wang | G06T 15/00 |
| | | | 382/238 |
| 2014/0375638 A1 | 12/2014 | Tomaru et al. | |
| 2016/0170896 A1* | 6/2016 | Steiss | G06F 12/109 |
| | | | 711/154 |
| 2018/0075622 A1 | 3/2018 | Tuffreau et al. | |
| 2019/0362543 A1* | 11/2019 | Zeng | G06F 30/00 |
| 2021/0021869 A1* | 1/2021 | Wang | H04N 19/91 |
| 2022/0272390 A1* | 8/2022 | Lee | H04N 19/122 |
| 2023/0121882 A1* | 4/2023 | Sugio | G06T 9/40 |
| | | | 382/232 |
| 2023/0125048 A1* | 4/2023 | Iguchi | G06T 9/40 |
| | | | 382/232 |

OTHER PUBLICATIONS

George P. Gerdan, et al., "Transforming Cartesian coordinates X,Y,Z to Geographical coordinates $\varphi$, $\lambda$, h", The Australian Surveyor, vol. 44, No. 1, Jun. 1999.

* cited by examiner

GOS INDEX NUMBER (ENCODING ORDER)

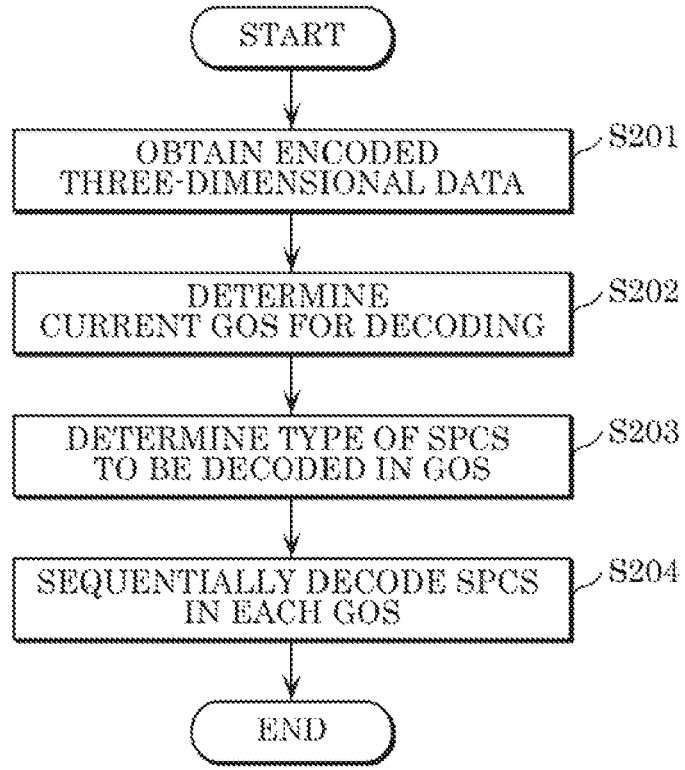

SURROUNDING CONDITION
DETECTION RESULT    POINT CLOUD DATA

SURROUNDING CONDITION
DETECTION RESULT    POINT CLOUD DATA

FIG. 58

A  BIT SEQUENCE WHEN SCANNING NODES AND LEAVES BREADTH-FIRST : 10010000 10000001 00000010 leaf1 leaf2 leaf3

B  BIT SEQUENCE WHEN SCANNING NODES AND LEAVES DEPTH-FIRST : 10010000 10000001 leaf1 leaf2 00000010 leaf3

FIG. 63

```
space_header() {
    ...
    for (i=0; i<MaxRefSpc_10;i++) {
        RT_flag_10[i]
        if (RT_flag_10[i]) {
            R_10[i]
            T_10[i]
        }
        ...
    }
    for (i=0; i<MaxRefSpc_11;i++) {
        RT_flag_11[i]
        if (RT_flag_11[i]) {
            R_11[i]
            T_11[i]
        }
        ...
    }
}
```

FIG. 77

TABLE INDEX 0

| OCCUPANCY CODE | CONTEXT MODEL | CONTEXT MODEL TYPE |
|---|---|---|
| 00000000 | MODEL 0-0 | TYPE A |
| 00000001 | | |
| ...... | ...... | ...... |
| 11111111 | MODEL 0-X | TYPE X |

FIG. 78

TABLE INDEX 1

| OCCUPANCY CODE | CONTEXT MODEL | CONTEXT MODEL TYPE |
|---|---|---|
| 00000000 | MODEL 1-0 | TYPE A |
| 00000001 | MODEL 1-1 | TYPE B |
| ...... | ...... | ...... |
| 11111111 | MODEL 1-Y | TYPE Y |

TABLE INDEX 0

| BIT NUMBER OF OCCUPANCY CODE | CONTEXT MODEL | CONTEXT MODEL TYPE |
|---|---|---|
| 1 | MODEL 0-0 | TYPE A |
| 2 | MODEL 0-1 | |
| ...... | ...... | ...... |
| 8 | MODEL 0-7 | TYPE B |

TABLE INDEX 1

| BIT NUMBER OF OCCUPANCY CODE | CONTEXT MODEL | CONTEXT MODEL TYPE |
|---|---|---|
| 1 | MODEL 1-0 | TYPE A |
| 2 | | TYPE A |
| ...... | ...... | ...... |
| 8 | MODEL 1-Y | TYPE B |

FIG. 97
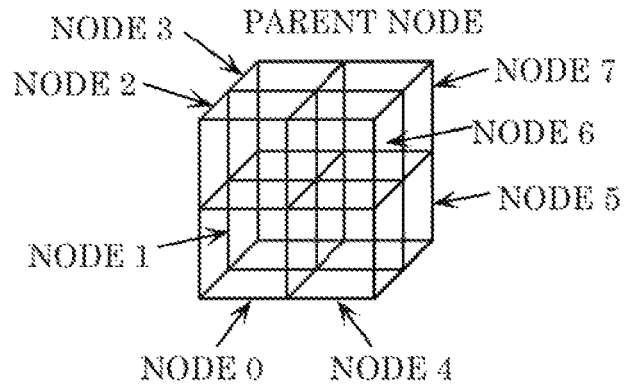
FIG. 98
EXAMPLE OF OCCUPANCY CODE
OF PARENT NODE:
0 0 1 0 1 0 1 1
OCCUPANCY INFORMATION OF NODE 7    OCCUPANCY INFORMATION OF NODE 0
FIG. 99
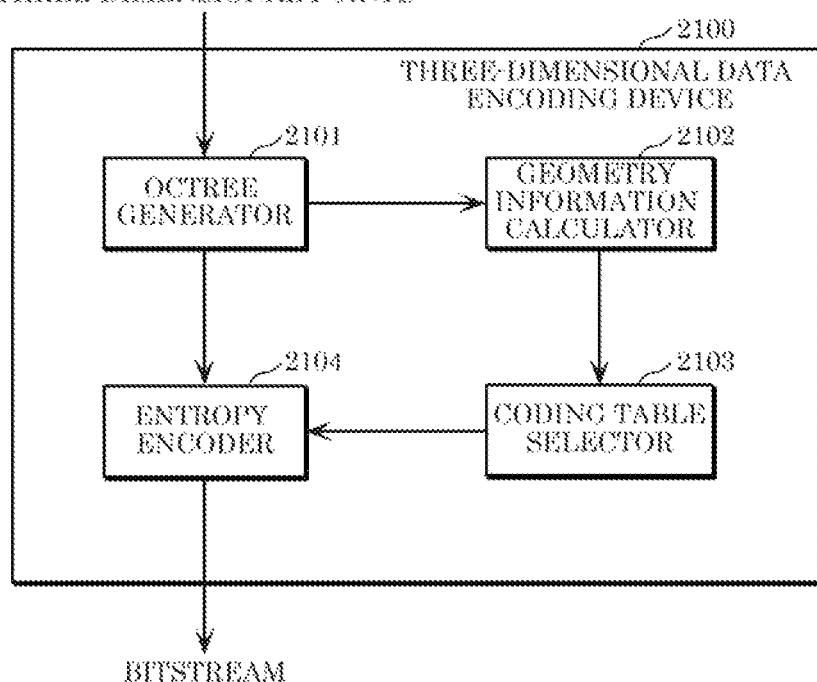

```
pc_header () {
...
octree_scan_order
...
}
```

```
pc_header () {
...
limit_refer_flag
...
}
```

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a continuation of U.S. application Ser. No. 17/228,042, filed Apr. 12, 2021, which is a U.S. continuation application of PCT International Patent Application Number PCT/JP2019/040330 filed on Oct. 11, 2019, claiming the benefit of priority of U.S. Provisional Patent Application No. 62/744,973 filed on Oct. 12, 2018, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point group in a three-dimensional space. In the point cloud scheme, the positions and colors of a point group are stored. While point cloud is expected to be a mainstream method of representing three-dimensional data, a massive amount of data of a point group necessitates compression of the amount of three-dimensional data by encoding for accumulation and transmission, as in the case of a two-dimensional moving picture (examples include MPEG-4 AVC and HEVC standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle is known (for example, see International Publication WO 2014/020663 (Patent Literature (PTL) 1)).

SUMMARY

There has been a demand for improving coding efficiency in a three-dimensional data encoding process.

The present disclosure has an object to provide a three-dimensional data encoding method, a three-dimensional data decoding method, a three-dimensional data encoding device, or a three-dimensional data decoding device that is capable of improving coding efficiency.

A three-dimensional data encoding method according to one aspect of the present disclosure includes: encoding first information of a first current node or second information of a second current node, the first current node being included in an N-ary tree structure of first three-dimensional points included in a first three-dimensional point cloud, N being 2 or 4, the second current node being included in an octree structure of second three-dimensional points included in a second three-dimensional point cloud. The encoding of the first information or the second information includes encoding the first information using a first encoding pattern including a pattern common to a second encoding pattern used in encoding the second information.

A three-dimensional data decoding method according to one aspect of the present disclosure includes: decoding first information of a first current node or second information of a second current node, the first current node being included in an N-ary tree structure of first three-dimensional points included in a first three-dimensional point cloud, N being 2 or 4, the second current node being included in an octree structure of second three-dimensional points included in a second three-dimensional point cloud. The decoding of the first information or the second information includes decoding the first information using a first decoding pattern including a pattern common to a second decoding pattern used in decoding the second information.

The present disclosure provides a three-dimensional data encoding method, a three-dimensional data decoding method, a three-dimensional data encoding device, or a three-dimensional data decoding device that is capable of improving coding efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 9 is a flowchart of decoding processes according to Embodiment 1;

FIG. 10 is a diagram showing an example of meta information according to Embodiment 1;

FIG. 58 is a diagram showing an example of bit sequences of the volume according to Embodiment 8;

FIG. 63 is a diagram showing an example syntax of an RT flag and RT information according to Embodiment 8;

FIG. 77 is a diagram illustrating an example of a coding table according to Embodiment 9;

FIG. 78 is a diagram illustrating an example of a coding table according to Embodiment 9;

FIG. 97 is a diagram illustrating a relationship between a parent node and nodes according to Embodiment 10;

FIG. 98 is a diagram illustrating an example of an occupancy code of the parent node according to Embodiment 10;

FIG. 99 is a block diagram of a three-dimensional data encoding device according to Embodiment 10;

FIG. 119 is a diagram showing a relationship between neighboring three-dimensional points of a three-dimensional point cloud located in a three-dimensional space according to Embodiment 11;

FIG. 120 is a block diagram showing a configuration of a three-dimensional data encoding device according to Embodiment 11;

FIG. 121 is a block diagram showing a detailed configuration of a quadtree encoder that uses the first method according to Embodiment 11;

FIG. 122 is a block diagram showing a detailed configuration of a quadtree encoder that uses the second method according to Embodiment 11;

FIG. 123 is a block diagram showing a configuration of a three-dimensional data decoding device according to Embodiment 11;

FIG. 124 is a block diagram showing a detailed configuration of a quadtree decoder that uses the first method according to Embodiment 11;

FIG. 125 is a block diagram showing a detailed configuration of a quadtree decoder that uses the second method according to Embodiment 11;

FIG. 126 is a flowchart of a three-dimensional data encoding method according to Embodiment 11;

FIG. 127 is a flowchart of a three-dimensional data decoding method according to Embodiment 11;

FIG. 128 is a flowchart of a quadtree encoding process according to Embodiment 11;

FIG. 129 is a flowchart of an octree encoding process according to Embodiment 11;

FIG. 130 is a flowchart of a quadtree decoding process according to Embodiment 11; and FIG. 131 is a flowchart of an octree decoding process according to Embodiment 11.

DETAILED DESCRIPTION OF THE EMBODIMENTS

Figure 1:
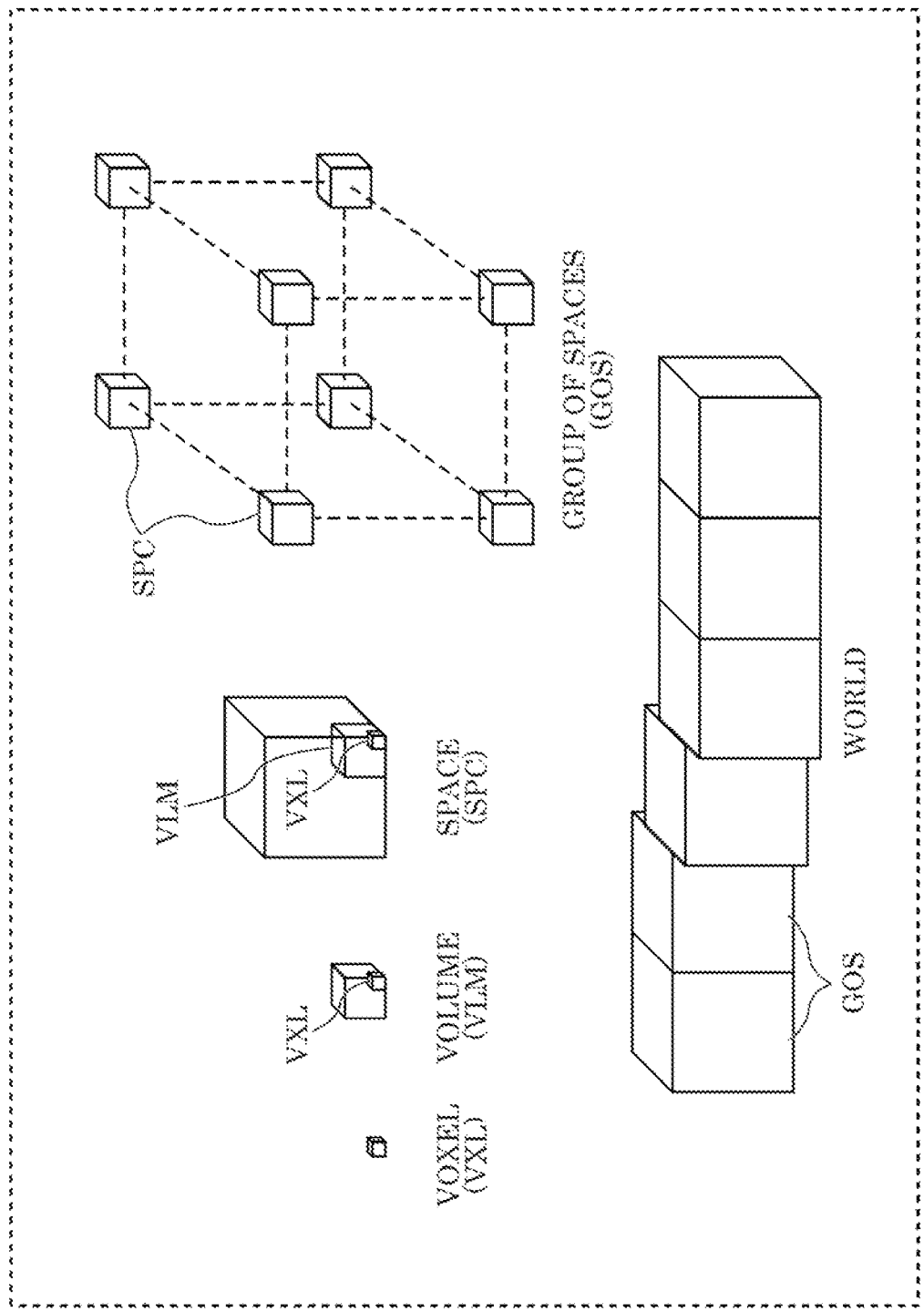
FIG. 1 is a diagram showing the structure of encoded three-dimensional data according to Embodiment 1.

A three-dimensional data encoding method according to one aspect of the present disclosure includes: encoding first information of a first current node or second information of a second current node, the first current node being included in an N-ary tree structure of first three-dimensional points included in a first three-dimensional point cloud, N being 2 or 4, the second current node being included in an octree structure of second three-dimensional points included in a second three-dimensional point cloud. The encoding of the first information or the second information includes encoding the first information using a first encoding pattern including a pattern common to a second encoding pattern used in encoding the second information.

According to this three-dimensional data encoding method, information on an N-ary tree structure is encoded using an encoding pattern including a pattern common to the encoding pattern used in the encoding of information on an octree structure, and therefore, the processing load can be reduced.

For example, the first encoding pattern may be for selecting a coding table to be used in encoding the first information, the second encoding pattern may be for selecting a coding table to be used in encoding the second information, and the encoding of the first information or the second information may include: generating the first encoding pattern from first neighbor information of first neighbor nodes neighboring the first current node spatially in directions; and generating the second encoding pattern from second neighbor information of second neighbor nodes neighboring the second current node spatially in the directions.

For example, the generating of the first encoding pattern may include generating the first encoding pattern including a third bit pattern of 6 bits that includes a first bit pattern and a second bit pattern, the first bit pattern being a bit pattern of one or more bits indicating that one or more first neighbor nodes neighbor the first current node spatially in a predetermined direction among directions and that each of the one or more first neighbor nodes is not occupied by a point cloud, the second bit pattern being a bit pattern of bits indicating that second neighbor nodes neighbor the first current node spatially in a direction other than the predetermined directions among the directions, and the generating of the second encoding pattern may include generating the second encoding pattern including a fourth bit pattern of 6 bits that include bits indicating that third neighbor nodes neighbor the second current node spatially in the directions.

For example, the encoding of the first information or the second information may include: selecting a first coding table based on the first encoding pattern, and entropy encoding the first information using the first coding table selected; and selecting a second coding table based on the second encoding pattern, and entropy encoding the second information using the second coding table selected.

For example, the encoding of the first information or the second information may include generating a bitstream including a third bit sequence of 8 bits that includes a first bit sequence of N bits that corresponds to the first information and a second bit sequence of (8−N) bits that is invalid, by encoding the first information indicating whether each of N first subspaces obtained by dividing the first current node by N includes the first three-dimensional points. For example, the three-dimensional data encoding method may further include generating a bitstream including identification information indicating whether the first information or the second information is to be encoded.

For example, the first three-dimensional point cloud may be disposed on a plane, and the second three-dimensional point cloud may be disposed in a periphery of the plane.

A three-dimensional data decoding method according to one aspect of the present disclosure includes: decoding first information of a first current node or second information of a second current node, the first current node being included in an N-ary tree structure of first three-dimensional points included in a first three-dimensional point cloud, N being 2 or 4, the second current node being included in an octree structure of second three-dimensional points included in a second three-dimensional point cloud. The decoding of the first information or the second information includes decoding the first information using a first decoding pattern including a pattern common to a second decoding pattern used in decoding the second information.

According to this three-dimensional data decoding method, information on an N-ary tree structure is decoded using a decoding pattern including a pattern common to the decoding pattern used in the decoding of information on an octree structure, and therefore, the processing load can be reduced.

For example, the first decoding pattern may be for selecting a decoding table to be used in decoding the first information, the second decoding pattern may be for selecting a decoding table to be used in decoding the second information, and the decoding of the first information or the second information may include: generating the first decoding pattern from first neighbor information of first neighbor nodes neighboring the first current node spatially in directions; and generating the second decoding pattern from second neighbor information of second neighbor nodes neighboring the second current node spatially in the directions.

For example, the generating of the first decoding pattern may include generating the first decoding pattern including a third bit pattern of 6 bits that includes a first bit pattern and a second bit pattern, the first bit pattern being a bit pattern of one or more bits indicating that one or more first neighbor nodes neighbor the first current node spatially in a predetermined direction among directions and that each of the one or more first neighbor nodes is not occupied by a point cloud, the second bit pattern being a bit pattern of bits indicating that second neighbor nodes neighbor the first current node spatially in a direction other than the predetermined directions among the directions, and the generating of the second decoding pattern may include generating the second decoding pattern including a fourth bit pattern of 6 bits that include bits indicating that third neighbor nodes neighbor the second current node spatially in the directions.

For example, the decoding of the first information or the second information may include: selecting a first decoding table based on the first decoding pattern, and entropy decoding the first information using the first decoding table selected; and selecting a second decoding table based on the second decoding pattern, and entropy decoding the second information using the second decoding table selected.

For example, the decoding of the first information or the second information may include: selecting a first decoding table based on the first decoding pattern, and entropy decoding the first information using the first decoding table selected; and selecting a second decoding table based on the second decoding pattern, and entropy decoding the second information using the second decoding table selected.

For example, the bitstream may include identification information indicating whether the first information or the second information is to be encoded, and the decoding of the first information or the second information may include decoding the first bit sequence of the bitstream when the identification information indicates that the first information is to be encoded.

For example, the first three-dimensional point cloud may be disposed on a plane, and the second three-dimensional point cloud may be disposed in a periphery of the plane.

A three-dimensional data encoding device according to one aspect of the present disclosure includes a processor and memory. Using the memory, the processor encodes first information of a first current node or second information of a second current node, the first current node being included in an N-ary tree structure of first three-dimensional points included in a first three-dimensional point cloud, N being 2 or 4, the second current node being included in an octree structure of second three-dimensional points included in a second three-dimensional point cloud. In the encoding of the first information or the second information, the first information is encoded using a first encoding pattern including a pattern common to a second encoding pattern used in encoding the second information.

With this configuration, the three-dimensional data encoding device can reduce the processing load by encoding information on an N-ary tree structure using an encoding pattern including a pattern common to the encoding pattern used in the encoding of information on an octree structure.

With this configuration, the three-dimensional data encoding device can reduce the processing load by encoding information on an N-ary tree structure using an encoding pattern including a pattern common to the encoding pattern used in the encoding of information on an octree structure.

With this configuration, the three-dimensional data decoding device can reduce the processing load by decoding information on an N-ary tree structure using a decoding pattern including a pattern common to the decoding pattern used in the decoding of information on an octree structure.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that the following embodiments show exemplary embodiments of the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims that indicate the broadest concepts will be described as optional structural components.

Embodiment 1

First, the data structure of encoded three-dimensional data (hereinafter also referred to as encoded data) according to the present embodiment will be described. FIG. 1 is a diagram showing the structure of encoded three-dimensional data according to the present embodiment.

In the present embodiment, a three-dimensional space is divided into spaces (SPCs), which correspond to pictures in moving picture encoding, and the three-dimensional data is encoded on a SPC-by-SPC basis. Each SPC is further divided into volumes (VLMs), which correspond to macroblocks, etc. in moving picture encoding, and predictions and transforms are performed on a VLM-by-VLM basis. Each volume includes a plurality of voxels (VXLs), each being a minimum unit in which position coordinates are associated. Note that prediction is a process of generating predictive three-dimensional data analogous to a current processing unit by referring to another processing unit, and encoding a differential between the predictive three-dimensional data and the current processing unit, as in the case of predictions performed on two-dimensional images. Such prediction includes not only spatial prediction in which another prediction unit corresponding to the same time is referred to, but also temporal prediction in which a prediction unit corresponding to a different time is referred to.

When encoding a three-dimensional space represented by point group data such as a point cloud, for example, the three-dimensional data encoding device (hereinafter also referred to as the encoding device) encodes the points in the point group or points included in the respective voxels in a collective manner, in accordance with a voxel size. Finer voxels enable a highly-precise representation of the three-dimensional shape of a point group, while larger voxels enable a rough representation of the three-dimensional shape of a point group.

Note that the following describes the case where three-dimensional data is a point cloud, but three-dimensional data is not limited to a point cloud, and thus three-dimensional data of any format may be employed.

Also note that voxels with a hierarchical structure may be used. In such a case, when the hierarchy includes n levels, whether a sampling point is included in the n−1th level or its lower levels (the lower levels of the n-th level) may be sequentially indicated. For example, when only the n-th level is decoded, and the n−1th level or its lower levels include a sampling point, the n-th level can be decoded on the assumption that a sampling point is included at the center of a voxel in the n-th level.

Also, the encoding device obtains point group data, using, for example, a distance sensor, a stereo camera, a monocular camera, a gyroscope sensor, or an inertial sensor.

As in the case of moving picture encoding, each SPC is classified into one of at least the three prediction structures that include: intra SPC (I-SPC), which is individually decodable; predictive SPC (P-SPC) capable of only a unidirectional reference; and bidirectional SPC (B-SPC) capable of bidirectional references. Each SPC includes two types of time information: decoding time and display time.

Furthermore, as shown in FIG. 1, a processing unit that includes a plurality of SPCs is a group of spaces (GOS), which is a random access unit. Also, a processing unit that includes a plurality of GOSs is a world (WLD).

The spatial region occupied by each world is associated with an absolute position on earth, by use of, for example, GPS, or latitude and longitude information. Such position information is stored as meta-information. Note that meta-information may be included in encoded data, or may be transmitted separately from the encoded data.

Also, inside a GOS, all SPCs may be three-dimensionally adjacent to one another, or there may be a SPC that is not three-dimensionally adjacent to another SPC.

Note that the following also describes processes such as encoding, decoding, and reference to be performed on three-dimensional data included in processing units such as GOS, SPC, and VLM, simply as performing encoding/to encode, decoding/to decode, referring to, etc. on a processing unit. Also note that three-dimensional data included in a processing unit includes, for example, at least one pair of a spatial position such as three-dimensional coordinates and an attribute value such as color information.

Next, the prediction structures among SPCs in a GOS will be described. A plurality of SPCs in the same GOS or a plurality of VLMs in the same SPC occupy mutually different spaces, while having the same time information (the decoding time and the display time).

A SPC in a GOS that comes first in the decoding order is an I-SPC. GOSs come in two types: closed GOS and open GOS. A closed GOS is a GOS in which all SPCs in the GOS are decodable when decoding starts from the first I-SPC. Meanwhile, an open GOS is a GOS in which a different GOS is referred to in one or more SPCs preceding the first I-SPC in the GOS in the display time, and thus cannot be singly decoded.

Note that in the case of encoded data of map information, for example, a WLD is sometimes decoded in the backward direction, which is opposite to the encoding order, and thus backward reproduction is difficult when GOSs are interdependent. In such a case, a closed GOS is basically used.

Each GOS has a layer structure in height direction, and SPCs are sequentially encoded or decoded from SPCs in the bottom layer.

Figure 2:
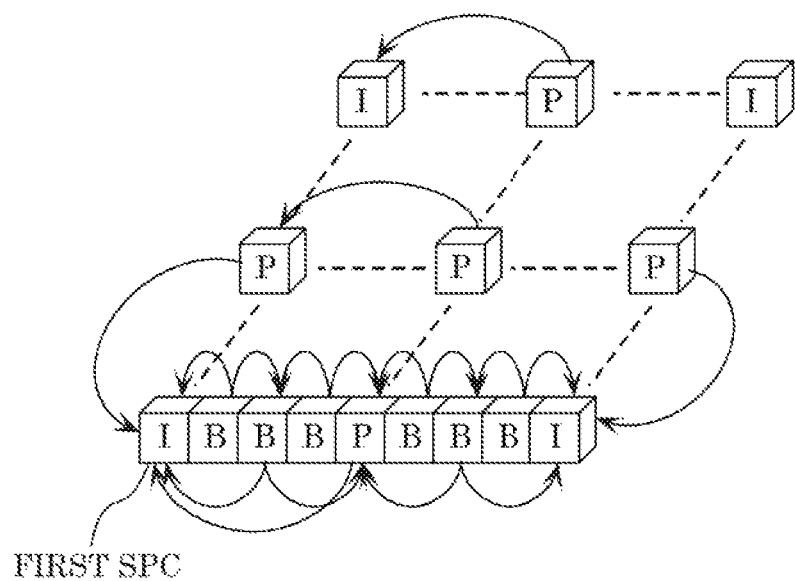
FIG. 2 is a diagram showing an example of prediction structures among SPCs that belong to the lowermost layer in a GOS according to Embodiment 1.
Figure 3:
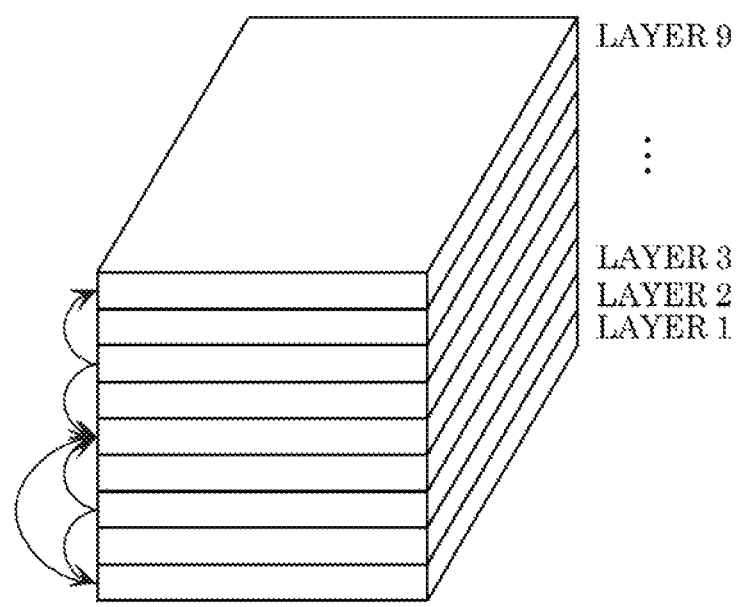
FIG. 3 is a diagram showing an example of prediction structures among layers according to Embodiment 1.

FIG. 2 is a diagram showing an example of prediction structures among SPCs that belong to the lowermost layer in a GOS. FIG. 3 is a diagram showing an example of prediction structures among layers.

A GOS includes at least one I-SPC. Of the objects in a three-dimensional space, such as a person, an animal, a car, a bicycle, a signal, and a building serving as a landmark, a small-sized object is especially effective when encoded as an I-SPC. When decoding a GOS at a low throughput or at a high speed, for example, the three-dimensional data decoding device (hereinafter also referred to as the decoding device) decodes only I-SPC(s) in the GOS.

The encoding device may also change the encoding interval or the appearance frequency of I-SPCs, depending on the degree of sparseness and denseness of the objects in a WLD.

In the structure shown in FIG. 3, the encoding device or the decoding device encodes or decodes a plurality of layers sequentially from the bottom layer (layer 1). This increases the priority of data on the ground and its vicinity, which involve a larger amount of information, when, for example, a self-driving car is concerned.

Regarding encoded data used for a drone, for example, encoding or decoding may be performed sequentially from SPCs in the top layer in a GOS in height direction.

The encoding device or the decoding device may also encode or decode a plurality of layers in a manner that the decoding device can have a rough grasp of a GOS first, and then the resolution is gradually increased. The encoding device or the decoding device may perform encoding or decoding in the order of layers 3, 8, 1, 9 . . . , for example.

Next, the handling of static objects and dynamic objects will be described.

A three-dimensional space includes scenes or still objects such as a building and a road (hereinafter collectively referred to as static objects), and objects with motion such as a car and a person (hereinafter collectively referred to as dynamic objects). Object detection is separately performed by, for example, extracting keypoints from point cloud data, or from video of a camera such as a stereo camera. In this description, an example method of encoding a dynamic object will be described.

A first method is a method in which a static object and a dynamic object are encoded without distinction. A second method is a method in which a distinction is made between a static object and a dynamic object on the basis of identification information.

For example, a GOS is used as an identification unit. In such a case, a distinction is made between a GOS that includes SPCs constituting a static object and a GOS that includes SPCs constituting a dynamic object, on the basis of identification information stored in the encoded data or stored separately from the encoded data.

Alternatively, a SPC may be used as an identification unit. In such a case, a distinction is made between a SPC that includes VLMs constituting a static object and a SPC that includes VLMs constituting a dynamic object, on the basis of the identification information thus described.

Alternatively, a VLM or a VXL may be used as an identification unit. In such a case, a distinction is made between a VLM or a VXL that includes a static object and a VLM or a VXL that includes a dynamic object, on the basis of the identification information thus described.

The encoding device may also encode a dynamic object as at least one VLM or SPC, and may encode a VLM or a SPC including a static object and a SPC including a dynamic object as mutually different GOSs. When the GOS size is variable depending on the size of a dynamic object, the encoding device separately stores the GOS size as meta-information.

The encoding device may also encode a static object and a dynamic object separately from each other, and may superimpose the dynamic object onto a world constituted by static objects. In such a case, the dynamic object is constituted by at least one SPC, and each SPC is associated with at least one SPC constituting the static object onto which the each SPC is to be superimposed. Note that a dynamic object may be represented not by SPC(s) but by at least one VLM or VXL.

The encoding device may also encode a static object and a dynamic object as mutually different streams.

The encoding device may also generate a GOS that includes at least one SPC constituting a dynamic object. The encoding device may further set the size of a GOS including a dynamic object (GOS_M) and the size of a GOS including a static object corresponding to the spatial region of GOS_M at the same size (such that the same spatial region is occupied). This enables superimposition to be performed on a GOS-by-GOS basis.

SPC(s) included in another encoded GOS may be referred to in a P-SPC or a B-SPC constituting a dynamic object. In the case where the position of a dynamic object temporally changes, and the same dynamic object is encoded as an object in a GOS corresponding to a different time, referring to SPC(s) across GOSs is effective in terms of compression rate.

The first method and the second method may be selected in accordance with the intended use of encoded data. When encoded three-dimensional data is used as a map, for example, a dynamic object is desired to be separated, and thus the encoding device uses the second method. Meanwhile, the encoding device uses the first method when the separation of a dynamic object is not required such as in the case where three-dimensional data of an event such as a concert and a sports event is encoded.

The decoding time and the display time of a GOS or a SPC are storable in encoded data or as meta-information. All static objects may have the same time information. In such a case, the decoding device may determine the actual decoding time and display time. Alternatively, a different value may be assigned to each GOS or SPC as the decoding time, and the same value may be assigned as the display time. Furthermore, as in the case of the decoder model in moving picture encoding such as Hypothetical Reference Decoder (HRD) compliant with HEVC, a model may be employed that ensures that a decoder can perform decoding without fail by having a buffer of a predetermined size and by reading a bitstream at a predetermined bit rate in accordance with the decoding times.

Figure 4:
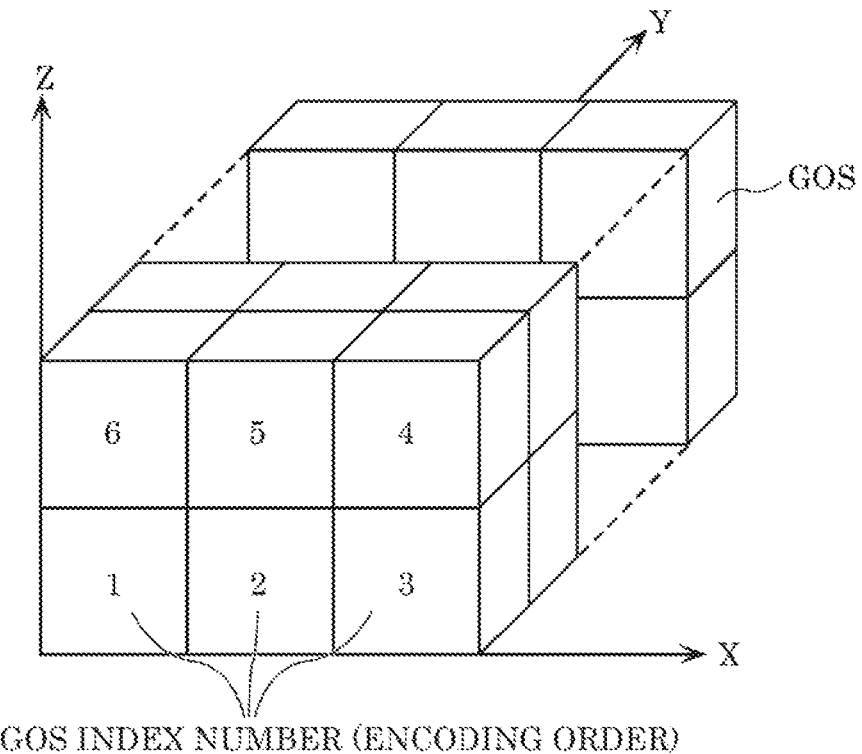
FIG. 4 is a diagram showing an example order of encoding GOSs according to Embodiment 1.

Next, the topology of GOSs in a world will be described. The coordinates of the three-dimensional space in a world are represented by the three coordinate axes (x axis, y axis, and z axis) that are orthogonal to one another. A predetermined rule set for the encoding order of GOSs enables encoding to be performed such that spatially adjacent GOSs are contiguous in the encoded data. In an example shown in FIG. 4, for example, GOSs in the x and z planes are successively encoded. After the completion of encoding all GOSs in certain x and z planes, the value of the y axis is updated. Stated differently, the world expands in the y axis direction as the encoding progresses. The GOS index numbers are set in accordance with the encoding order.

Here, the three-dimensional spaces in the respective worlds are previously associated one-to-one with absolute geographical coordinates such as GPS coordinates or latitude/longitude coordinates. Alternatively, each three-dimensional space may be represented as a position relative to a previously set reference position. The directions of the x axis, the y axis, and the z axis in the three-dimensional space are represented by directional vectors that are determined on the basis of the latitudes and the longitudes, etc. Such directional vectors are stored together with the encoded data as meta-information.

GOSs have a fixed size, and the encoding device stores such size as meta-information. The GOS size may be changed depending on, for example, whether it is an urban area or not, or whether it is inside or outside of a room. Stated differently, the GOS size may be changed in accordance with the amount or the attributes of objects with information values. Alternatively, in the same world, the encoding device may adaptively change the GOS size or the interval between I-SPCs in GOSs in accordance with the object density, etc. For example, the encoding device sets the GOS size to smaller and the interval between I-SPCs in GOSs to shorter, as the object density is higher.

Figure 5:
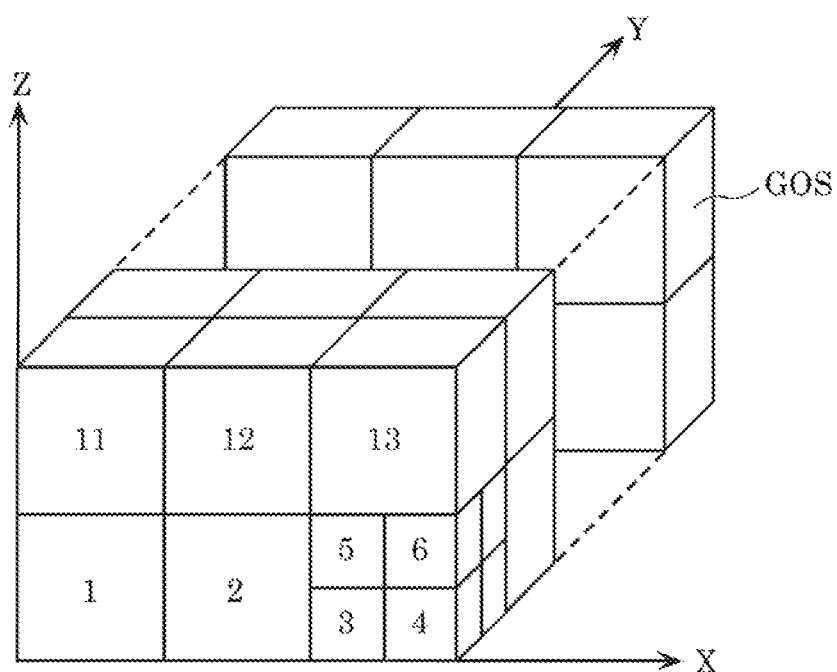
FIG. 5 is a diagram showing an example order of encoding GOSs according to Embodiment 1.

In an example shown in FIG. 5, to enable random access with a finer granularity, a GOS with a high object density is partitioned into the regions of the third to tenth GOSs. Note that the seventh to tenth GOSs are located behind the third to sixth GOSs.

Figure 6:
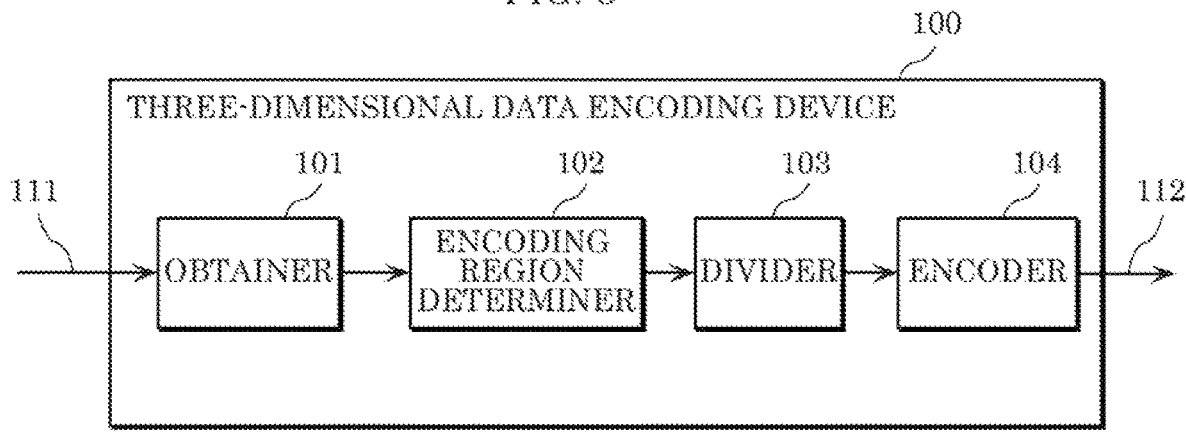
FIG. 6 is a block diagram of a three-dimensional data encoding device according to Embodiment 1.
Figure 7:
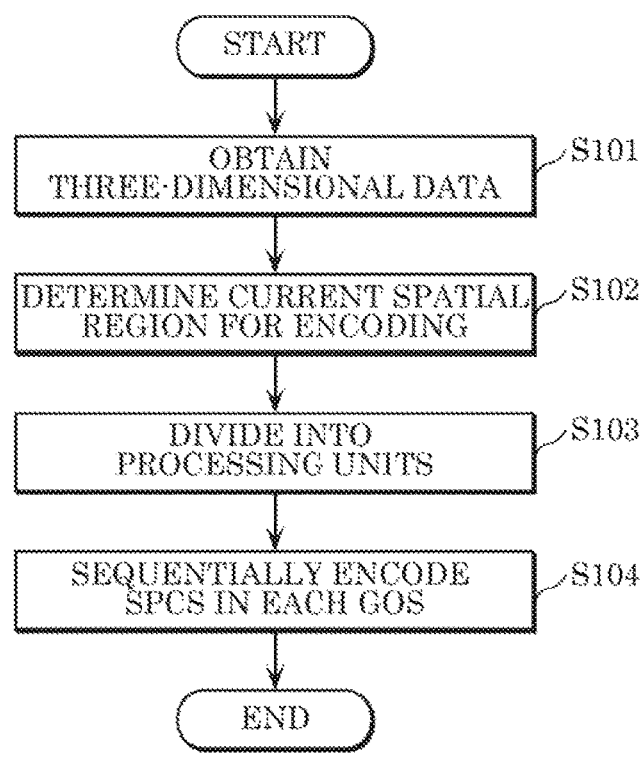
FIG. 7 is a flowchart of encoding processes according to Embodiment 1.

Next, the structure and the operation flow of the three-dimensional data encoding device according to the present embodiment will be described. FIG. 6 is a block diagram of three-dimensional data encoding device 100 according to the present embodiment. FIG. 7 is a flowchart of an example operation performed by three-dimensional data encoding device 100.

Three-dimensional data encoding device 100 shown in FIG. 6 encodes three-dimensional data 111, thereby generating encoded three-dimensional data 112. Such three-dimensional data encoding device 100 includes obtainer 101, encoding region determiner 102, divider 103, and encoder 104.

As shown in FIG. 7, first, obtainer 101 obtains three-dimensional data 111, which is point group data (S101).

Next, encoding region determiner 102 determines a current region for encoding from among spatial regions corresponding to the obtained point group data (S102). For example, in accordance with the position of a user or a vehicle, encoding region determiner 102 determines, as the current region, a spatial region around such position.

Next, divider 103 divides the point group data included in the current region into processing units. The processing units here means units such as GOSs and SPCs described above. The current region here corresponds to, for example, a world described above. More specifically, divider 103 divides the point group data into processing units on the basis of a predetermined GOS size, or the presence/absence/size of a dynamic object (S103). Divider 103 further determines the starting position of the SPC that comes first in the encoding order in each GOS.

Next, encoder 104 sequentially encodes a plurality of SPCs in each GOS, thereby generating encoded three-dimensional data 112 (S104).

Note that although an example is described here in which the current region is divided into GOSs and SPCs, after which each GOS is encoded, the processing steps are not limited to this order. For example, steps may be employed in which the structure of a single GOS is determined, which is followed by the encoding of such GOS, and then the structure of the subsequent GOS is determined.

As thus described, three-dimensional data encoding device 100 encodes three-dimensional data 111, thereby generating encoded three-dimensional data 112. More specifically, three-dimensional data encoding device 100 divides three-dimensional data into first processing units (GOSs), each being a random access unit and being associated with three-dimensional coordinates, divides each of the first processing units (GOSs) into second processing units (SPCs), and divides each of the second processing units (SPCs) into third processing units (VLMs). Each of the third processing units (VLMs) includes at least one voxel (VXL), which is the minimum unit in which position information is associated.

Next, three-dimensional data encoding device 100 encodes each of the first processing units (GOSs), thereby generating encoded three-dimensional data 112. More specifically, three-dimensional data encoding device 100 encodes each of the second processing units (SPCs) in each of the first processing units (GOSs). Three-dimensional data encoding device 100 further encodes each of the third processing units (VLMs) in each of the second processing units (SPCs).

When a current first processing unit (GOS) is a closed GOS, for example, three-dimensional data encoding device 100 encodes a current second processing unit (SPC) included in such current first processing unit (GOS) by referring to another second processing unit (SPC) included in the current first processing unit (GOS). Stated differently, three-dimensional data encoding device 100 refers to no second processing unit (SPC) included in a first processing unit (GOS) that is different from the current first processing unit (GOS).

Meanwhile, when a current first processing unit (GOS) is an open GOS, three-dimensional data encoding device 100 encodes a current second processing unit (SPC) included in such current first processing unit (GOS) by referring to another second processing unit (SPC) included in the current first processing unit (GOS) or a second processing unit (SPC) included in a first processing unit (GOS) that is different from the current first processing unit (GOS).

Also, three-dimensional data encoding device 100 selects, as the type of a current second processing unit (SPC), one of the following: a first type (I-SPC) in which another second processing unit (SPC) is not referred to; a second type (P-SPC) in which another single second processing unit (SPC) is referred to; and a third type in which other two second processing units (SPC) are referred to. Three-dimensional data encoding device 100 encodes the current second processing unit (SPC) in accordance with the selected type.

Figure 8:
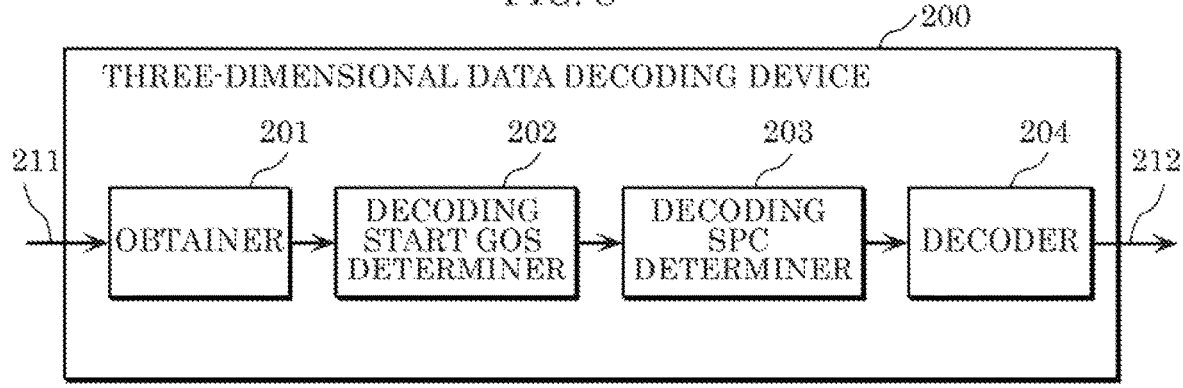
FIG. 8 is a block diagram of a three-dimensional data decoding device according to Embodiment 1.

Next, the structure and the operation flow of the three-dimensional data decoding device according to the present embodiment will be described. FIG. 8 is a block diagram of three-dimensional data decoding device 200 according to the present embodiment. FIG. 9 is a flowchart of an example operation performed by three-dimensional data decoding device 200.

Three-dimensional data decoding device 200 shown in FIG. 8 decodes encoded three-dimensional data 211, thereby generating decoded three-dimensional data 212. Encoded three-dimensional data 211 here is, for example, encoded three-dimensional data 112 generated by three-dimensional data encoding device 100. Such three-dimensional data decoding device 200 includes obtainer 201, decoding start GOS determiner 202, decoding SPC determiner 203, and decoder 204.

First, obtainer 201 obtains encoded three-dimensional data 211 (S201). Next, decoding start GOS determiner 202 determines a current GOS for decoding (S202). More specifically, decoding start GOS determiner 202 refers to meta-information stored in encoded three-dimensional data 211 or stored separately from the encoded three-dimensional data to determine, as the current GOS, a GOS that includes a SPC corresponding to the spatial position, the object, or the time from which decoding is to start.

Next, decoding SPC determiner 203 determines the type (s) (I, P, and/or B) of SPCs to be decoded in the GOS (S203). For example, decoding SPC determiner 203 determines whether to (1) decode only I-SPC(s), (2) to decode I-SPC(s) and P-SPCs, or (3) to decode SPCs of all types. Note that the present step may not be performed, when the type(s) of SPCs to be decoded are previously determined such as when all SPCs are previously determined to be decoded.

Next, decoder 204 obtains an address location within encoded three-dimensional data 211 from which a SPC that comes first in the GOS in the decoding order (the same as the encoding order) starts. Decoder 204 obtains the encoded data of the first SPC from the address location, and sequentially decodes the SPCs from such first SPC (S204). Note that the address location is stored in the meta-information, etc.

Three-dimensional data decoding device 200 decodes decoded three-dimensional data 212 as thus described. More specifically, three-dimensional data decoding device 200 decodes each encoded three-dimensional data 211 of the first processing units (GOSs), each being a random access unit and being associated with three-dimensional coordinates, thereby generating decoded three-dimensional data 212 of the first processing units (GOSs). Even more specifically, three-dimensional data decoding device 200 decodes each of the second processing units (SPCs) in each of the first processing units (GOSs). Three-dimensional data decoding device 200 further decodes each of the third processing units (VLMs) in each of the second processing units (SPCs).

The following describes meta-information for random access. Such meta-information is generated by three-dimensional data encoding device 100, and included in encoded three-dimensional data 112 (211).

In the conventional random access for a two-dimensional moving picture, decoding starts from the first frame in a random access unit that is close to a specified time. Meanwhile, in addition to times, random access to spaces (coordinates, objects, etc.) is assumed to be performed in a world.

To enable random access to at least three elements of coordinates, objects, and times, tables are prepared that associate the respective elements with the GOS index numbers. Furthermore, the GOS index numbers are associated with the addresses of the respective first I-SPCs in the GOSs. FIG. 10 is a diagram showing example tables included in the meta-information. Note that not all the tables shown in FIG. 10 are required to be used, and thus at least one of the tables is used.

The following describes an example in which random access is performed from coordinates as a starting point. To access the coordinates (x2, y2, and z2), the coordinates-GOS table is first referred to, which indicates that the point corresponding to the coordinates (x2, y2, and z2) is included in the second GOS. Next, the GOS-address table is referred to, which indicates that the address of the first I-SPC in the second GOS is addr(2). As such, decoder 204 obtains data from this address to start decoding.

Note that the addresses may either be logical addresses or physical addresses of an HDD or a memory. Alternatively, information that identifies file segments may be used instead of addresses. File segments are, for example, units obtained by segmenting at least one GOS, etc.

When an object spans across a plurality of GOSs, the object-GOS table may show a plurality of GOSs to which such object belongs. When such plurality of GOSs are closed GOSs, the encoding device and the decoding device can perform encoding or decoding in parallel. Meanwhile, when such plurality of GOSs are open GOSs, a higher compression efficiency is achieved by the plurality of GOSs referring to each other.

Example objects include a person, an animal, a car, a bicycle, a signal, and a building serving as a landmark. For example, three-dimensional data encoding device 100 extracts keypoints specific to an object from a three-dimensional point cloud, etc., when encoding a world, and detects the object on the basis of such keypoints to set the detected object as a random access point.

As thus described, three-dimensional data encoding device 100 generates first information indicating a plurality of first processing units (GOSs) and the three-dimensional coordinates associated with the respective first processing units (GOSs). Encoded three-dimensional data 112 (211) includes such first information. The first information further indicates at least one of objects, times, and data storage locations that are associated with the respective first processing units (GOSs).

Three-dimensional data decoding device 200 obtains the first information from encoded three-dimensional data 211. Using such first information, three-dimensional data decoding device 200 identifies encoded three-dimensional data 211 of the first processing unit that corresponds to the specified three-dimensional coordinates, object, or time, and decodes encoded three-dimensional data 211.

The following describes an example of other meta-information. In addition to the meta-information for random access, three-dimensional data encoding device 100 may also generate and store meta-information as described below, and three-dimensional data decoding device 200 may use such meta-information at the time of decoding.

When three-dimensional data is used as map information, for example, a profile is defined in accordance with the intended use, and information indicating such profile may be included in meta-information. For example, a profile is defined for an urban or a suburban area, or for a flying object, and the maximum or minimum size, etc. of a world, a SPC or a VLM, etc. is defined in each profile. For example, more detailed information is required for an urban area than for a suburban area, and thus the minimum VLM size is set to small.

The meta-information may include tag values indicating object types. Each of such tag values is associated with VLMs, SPCs, or GOSs that constitute an object. For example, a tag value may be set for each object type in a manner, for example, that the tag value "0" indicates "person," the tag value "1" indicates "car," and the tag value "2" indicates "signal." Alternatively, when an object type is hard to judge, or such judgment is not required, a tag value may be used that indicates the size or the attribute indicating, for example, whether an object is a dynamic object or a static object.

The meta-information may also include information indicating a range of the spatial region occupied by a world.

The meta-information may also store the SPC or VXL size as header information common to the whole stream of the encoded data or to a plurality of SPCs, such as SPCs in a GOS.

The meta-information may also include identification information on a distance sensor or a camera that has been used to generate a point cloud, or information indicating the positional accuracy of a point group in the point cloud.

The meta-information may also include information indicating whether a world is made only of static objects or includes a dynamic object.

The following describes variations of the present embodiment.

The encoding device or the decoding device may encode or decode two or more mutually different SPCs or GOSs in parallel. GOSs to be encoded or decoded in parallel can be determined on the basis of meta-information, etc. indicating the spatial positions of the GOSs.

When three-dimensional data is used as a spatial map for use by a car or a flying object, etc. in traveling, or for creation of such a spatial map, for example, the encoding device or the decoding device may encode or decode GOSs or SPCs included in a space that is identified on the basis of GPS information, the route information, the zoom magnification, etc.

The decoding device may also start decoding sequentially from a space that is close to the self-location or the traveling route. The encoding device or the decoding device may give a lower priority to a space distant from the self-location or the traveling route than the priority of a nearby space to encode or decode such distant place. To "give a lower priority" means here, for example, to lower the priority in the processing sequence, to decrease the resolution (to apply decimation in the processing), or to lower the image quality (to increase the encoding efficiency by, for example, setting the quantization step to larger).

When decoding encoded data that is hierarchically encoded in a space, the decoding device may decode only the bottom level in the hierarchy.

The decoding device may also start decoding preferentially from the bottom level of the hierarchy in accordance with the zoom magnification or the intended use of the map.

For self-location estimation or object recognition, etc. involved in the self-driving of a car or a robot, the encoding device or the decoding device may encode or decode regions at a lower resolution, except for a region that is lower than or at a specified height from the ground (the region to be recognized).

The encoding device may also encode point clouds representing the spatial shapes of a room interior and a room exterior separately. For example, the separation of a GOS representing a room interior (interior GOS) and a GOS representing a room exterior (exterior GOS) enables the decoding device to select a GOS to be decoded in accordance with a viewpoint location, when using the encoded data.

The encoding device may also encode an interior GOS and an exterior GOS having close coordinates so that such GOSs come adjacent to each other in an encoded stream. For example, the encoding device associates the identifiers of such GOSs with each other, and stores information indicating the associated identifiers into the meta-information that is stored in the encoded stream or stored separately. This enables the decoding device to refer to the information in the meta-information to identify an interior GOS and an exterior GOS having close coordinates The encoding device may also change the GOS size or the SPC size depending on whether a GOS is an interior GOS or an exterior GOS. For example, the encoding device sets the size of an interior GOS to smaller than the size of an exterior GOS. The encoding device may also change the accuracy of extracting keypoints from a point cloud, or the accuracy of detecting objects, for example, depending on whether a GOS is an interior GOS or an exterior GOS.

The encoding device may also add, to encoded data, information by which the decoding device displays objects with a distinction between a dynamic object and a static object. This enables the decoding device to display a dynamic object together with, for example, a red box or letters for explanation. Note that the decoding device may display only a red box or letters for explanation, instead of a dynamic object. The decoding device may also display more particular object types. For example, a red box may be used for a car, and a yellow box may be used for a person.

The encoding device or the decoding device may also determine whether to encode or decode a dynamic object and a static object as a different SPC or GOS, in accordance with, for example, the appearance frequency of dynamic objects or a ratio between static objects and dynamic objects. For example, when the appearance frequency or the ratio of dynamic objects exceeds a threshold, a SPC or a GOS including a mixture of a dynamic object and a static object is accepted, while when the appearance frequency or the ratio of dynamic objects is below a threshold, a SPC or GOS including a mixture of a dynamic object and a static object is unaccepted.

When detecting a dynamic object not from a point cloud but from two-dimensional image information of a camera, the encoding device may separately obtain information for identifying a detection result (box or letters) and the object position, and encode these items of information as part of the encoded three-dimensional data. In such a case, the decoding device superimposes auxiliary information (box or letters) indicating the dynamic object onto a resultant of decoding a static object to display it.

The encoding device may also change the sparseness and denseness of VXLs or VLMs in a SPC in accordance with the degree of complexity of the shape of a static object. For example, the encoding device sets VXLs or VLMs at a higher density as the shape of a static object is more complex. The encoding device may further determine a quantization step, etc. for quantizing spatial positions or color information in accordance with the sparseness and denseness of VXLs or VLMs. For example, the encoding device sets the quantization step to smaller as the density of VXLs or VLMs is higher.

As described above, the encoding device or the decoding device according to the present embodiment encodes or decodes a space on a SPC-by-SPC basis that includes coordinate information.

Furthermore, the encoding device and the decoding device perform encoding or decoding on a volume-by-volume basis in a SPC. Each volume includes a voxel, which is the minimum unit in which position information is associated.

Also, using a table that associates the respective elements of spatial information including coordinates, objects, and times with GOSs or using a table that associates these elements with each other, the encoding device and the decoding device associate any ones of the elements with each other to perform encoding or decoding. The decoding device uses the values of the selected elements to determine the coordinates, and identifies a volume, a voxel, or a SPC from such coordinates to decode a SPC including such volume or voxel, or the identified SPC.

Furthermore, the encoding device determines a volume, a voxel, or a SPC that is selectable in accordance with the elements, through extraction of keypoints and object recognition, and encodes the determined volume, voxel, or SPC, as a volume, a voxel, or a SPC to which random access is possible.

SPCs are classified into three types: I-SPC that is singly encodable or decodable; P-SPC that is encoded or decoded by referring to any one of the processed SPCs; and B-SPC that is encoded or decoded by referring to any two of the processed SPCs.

At least one volume corresponds to a static object or a dynamic object. A SPC including a static object and a SPC including a dynamic object are encoded or decoded as mutually different GOSs. Stated differently, a SPC including a static object and a SPC including a dynamic object are assigned to different GOSs.

Dynamic objects are encoded or decoded on an object-by-object basis, and are associated with at least one SPC including a static object. Stated differently, a plurality of dynamic objects are individually encoded, and the obtained encoded data of the dynamic objects is associated with a SPC including a static object.

The encoding device and the decoding device give an increased priority to I-SPC(s) in a GOS to perform encoding or decoding. For example, the encoding device performs encoding in a manner that prevents the degradation of I-SPCs (in a manner that enables the original three-dimensional data to be reproduced with a higher fidelity after decoded). The decoding device decodes, for example, only I-SPCs.

The encoding device may change the frequency of using I-SPCs depending on the sparseness and denseness or the number (amount) of the objects in a world to perform encoding. Stated differently, the encoding device changes the frequency of selecting I-SPCs depending on the number or the sparseness and denseness of the objects included in the three-dimensional data. For example, the encoding device uses I-SPCs at a higher frequency as the density of the objects in a world is higher.

The encoding device also sets random access points on a GOS-by-GOS basis, and stores information indicating the spatial regions corresponding to the GOSs into the header information.

The encoding devices uses, for example, a default value as the spatial size of a GOS. Note that the encoding device may change the GOS size depending on the number (amount) or the sparseness and denseness of objects or dynamic objects. For example, the encoding device sets the spatial size of a GOS to smaller as the density of objects or dynamic objects is higher or the number of objects or dynamic objects is greater.

Also, each SPC or volume includes a keypoint group that is derived by use of information obtained by a sensor such as a depth sensor, a gyroscope sensor, or a camera sensor. The coordinates of the keypoints are set at the central positions of the respective voxels. Furthermore, finer voxels enable highly accurate position information.

The keypoint group is derived by use of a plurality of pictures. A plurality of pictures include at least two types of time information: the actual time information and the same time information common to a plurality of pictures that are associated with SPCs (for example, the encoding time used for rate control, etc.).

Also, encoding or decoding is performed on a GOS-by-GOS basis that includes at least one SPC.

The encoding device and the decoding device predict P-SPCs or B-SPCs in a current GOS by referring to SPCs in a processed GOS.

Alternatively, the encoding device and the decoding device predict P-SPCs or B-SPCs in a current GOS, using the processed SPCs in the current GOS, without referring to a different GOS.

Furthermore, the encoding device and the decoding device transmit or receive an encoded stream on a world-by-world basis that includes at least one GOS.

Also, a GOS has a layer structure in one direction at least in a world, and the encoding device and the decoding device start encoding or decoding from the bottom layer. For example, a random accessible GOS belongs to the lowermost layer. A GOS that belongs to the same layer or a lower layer is referred to in a GOS that belongs to an upper layer. Stated differently, a GOS is spatially divided in a predetermined direction in advance to have a plurality of layers, each including at least one SPC. The encoding device and the decoding device encode or decode each SPC by referring to a SPC included in the same layer as the each SPC or a SPC included in a layer lower than that of the each SPC.

Also, the encoding device and the decoding device successively encode or decode GOSs on a world-by-world basis that includes such GOSs. In so doing, the encoding device and the decoding device write or read out information indicating the order (direction) of encoding or decoding as metadata. Stated differently, the encoded data includes information indicating the order of encoding a plurality of GOSs.

The encoding device and the decoding device also encode or decode mutually different two or more SPCs or GOSs in parallel.

Furthermore, the encoding device and the decoding device encode or decode the spatial information (coordinates, size, etc.) on a SPC or a GOS.

The encoding device and the decoding device encode or decode SPCs or GOSs included in an identified space that is identified on the basis of external information on the self-location or/and region size, such as GPS information, route information, or magnification.

The encoding device or the decoding device gives a lower priority to a space distant from the self-location than the priority of a nearby space to perform encoding or decoding.

The encoding device sets a direction at one of the directions in a world, in accordance with the magnification or the intended use, to encode a GOS having a layer structure in such direction. Also, the decoding device decodes a GOS having a layer structure in one of the directions in a world that has been set in accordance with the magnification or the intended use, preferentially from the bottom layer.

The encoding device changes the accuracy of extracting keypoints, the accuracy of recognizing objects, or the size of spatial regions, etc. included in a SPC, depending on whether an object is an interior object or an exterior object. Note that the encoding device and the decoding device encode or decode an interior GOS and an exterior GOS having close coordinates in a manner that these GOSs come adjacent to each other in a world, and associates their identifiers with each other for encoding and decoding.

Embodiment 2

When using encoded data of a point cloud in an actual device or service, it is desirable that necessary information be transmitted/received in accordance with the intended use to reduce the network bandwidth. However, there has been no such functionality in the structure of encoding three-dimensional data, nor an encoding method therefor.

The present embodiment describes a three-dimensional data encoding method and a three-dimensional data encoding device for providing the functionality of transmitting/receiving only necessary information in encoded data of a three-dimensional point cloud in accordance with the intended use, as well as a three-dimensional data decoding method and a three-dimensional data decoding device for decoding such encoded data.

Figure 11:
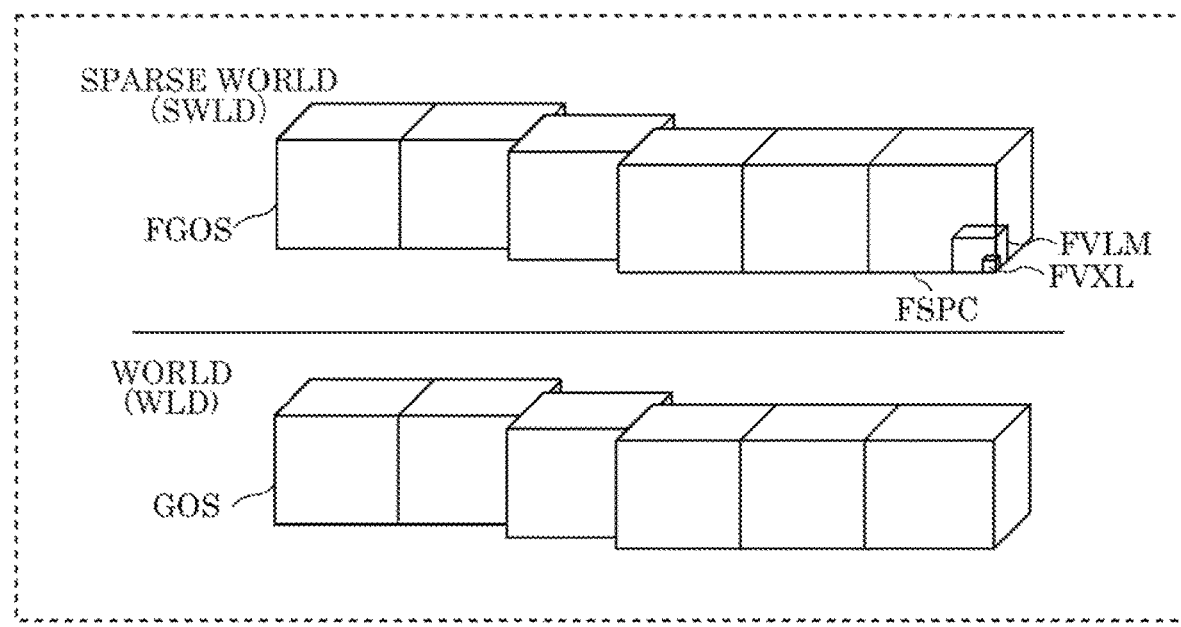
FIG. 11 is a diagram showing an example structure of a SWLD according to Embodiment 2.

A voxel (VXL) with a feature greater than or equal to a given amount is defined as a feature voxel (FVXL), and a world (WLD) constituted by FVXLs is defined as a sparse world (SWLD). FIG. 11 is a diagram showing example structures of a sparse world and a world. A SWLD includes: FGOSs, each being a GOS constituted by FVXLs; FSPCs, each being a SPC constituted by FVXLs; and FVLMs, each being a VLM constituted by FVXLs. The data structure and prediction structure of a FGOS, a FSPC, and a FVLM may be the same as those of a GOS, a SPC, and a VLM.

A feature represents the three-dimensional position information on a VXL or the visible-light information on the position of a VXL. A large number of features are detected especially at a corner, an edge, etc. of a three-dimensional object. More specifically, such a feature is a three-dimensional feature or a visible-light feature as described below, but may be any feature that represents the position, luminance, or color information, etc. on a VXL.

Used as three-dimensional features are signature of histograms of orientations (SHOT) features, point feature histograms (PFH) features, or point pair feature (PPF) features.

SHOT features are obtained by dividing the periphery of a VXL, and calculating an inner product of the reference point and the normal vector of each divided region to represent the calculation result as a histogram. SHOT features are characterized by a large number of dimensions and high-level feature representation.

PFH features are obtained by selecting a large number of two point pairs in the vicinity of a VXL, and calculating the normal vector, etc. from each two point pair to represent the calculation result as a histogram. PFH features are histogram features, and thus are characterized by robustness against a certain extent of disturbance and also high-level feature representation.

PPF features are obtained by using a normal vector, etc. for each two points of VXLs. PPF features, for which all VXLs are used, has robustness against occlusion.

Used as visible-light features are scale-invariant feature transform (SIFT), speeded up robust features (SURF), or histogram of oriented gradients (HOG), etc. that use information on an image such as luminance gradient information.

A SWLD is generated by calculating the above-described features of the respective VXLs in a WLD to extract FVXLs. Here, the SWLD may be updated every time the WLD is updated, or may be regularly updated after the elapse of a certain period of time, regardless of the timing at which the WLD is updated.

A SWLD may be generated for each type of features. For example, different SWLDs may be generated for the respective types of features, such as SWLD1 based on SHOT features and SWLD2 based on SIFT features so that SWLDs are selectively used in accordance with the intended use. Also, the calculated feature of each FVXL may be held in each FVXL as feature information.

Next, the usage of a sparse world (SWLD) will be described. A SWLD includes only feature voxels (FVXLs), and thus its data size is smaller in general than that of a WLD that includes all VXLs.

In an application that utilizes features for a certain purpose, the use of information on a SWLD instead of a WLD reduces the time required to read data from a hard disk, as well as the bandwidth and the time required for data transfer over a network. For example, a WLD and a SWLD are held in a server as map information so that map information to be sent is selected between the WLD and the SWLD in accordance with a request from a client. This reduces the network bandwidth and the time required for data transfer. More specific examples will be described below.

Figure 12:
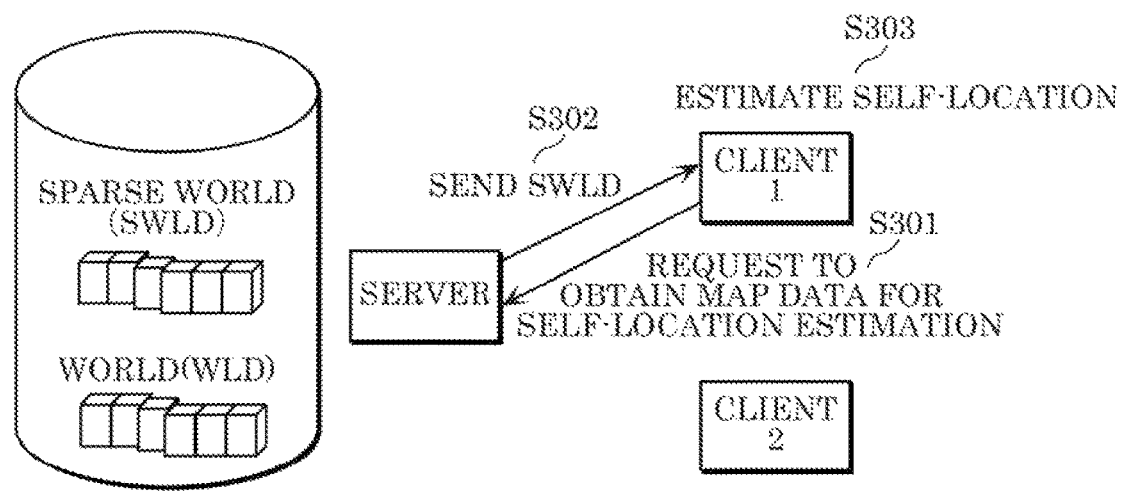
FIG. 12 is a diagram showing example operations performed by a server and a client according to Embodiment 2.
Figure 13:
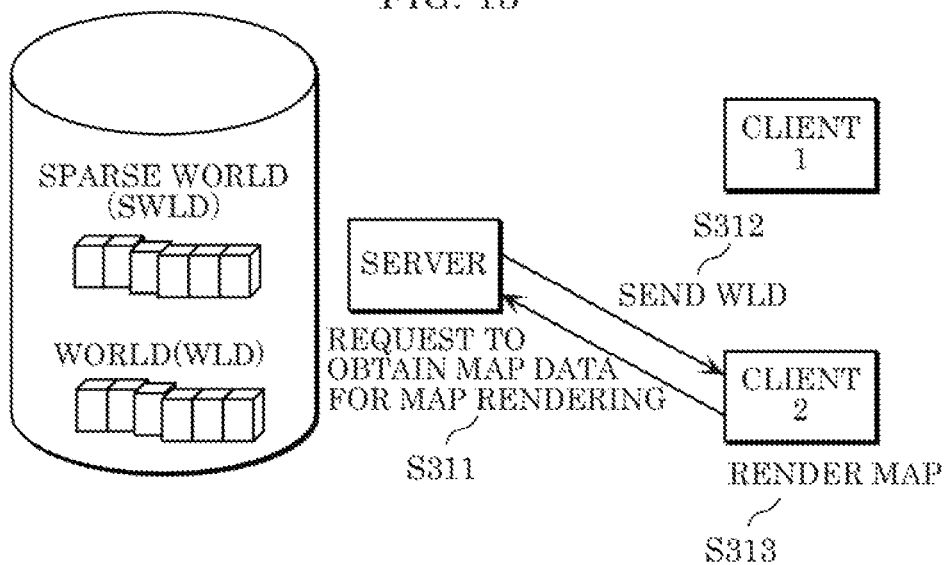
FIG. 13 is a diagram showing example operations performed by the server and a client according to Embodiment 2.

FIG. 12 and FIG. 13 are diagrams showing usage examples of a SWLD and a WLD. As FIG. 12 shows, when client 1, which is a vehicle-mounted device, requires map information to use it for self-location determination, client 1 sends to a server a request for obtaining map data for self-location estimation (S301). The server sends to client 1 the SWLD in response to the obtainment request (S302). Client 1 uses the received SWLD to determine the self-location (S303). In so doing, client 1 obtains VXL information on the periphery of client 1 through various means including a distance sensor such as a rangefinder, as well as a stereo camera and a combination of a plurality of monocular cameras. Client 1 then estimates the self-location information from the obtained VXL information and the SWLD. Here, the self-location information includes three-dimensional position information, orientation, etc. of client 1.

As FIG. 13 shows, when client 2, which is a vehicle-mounted device, requires map information to use it for rendering a map such as a three-dimensional map, client 2 sends to the server a request for obtaining map data for map rendering (S311). The server sends to client 2 the WLD in response to the obtainment request (S312). Client 2 uses the received WLD to render a map (S313). In so doing, client 2 uses, for example, an image client 2 has captured by a visible-light camera, etc. and the WLD obtained from the server to create a rendering image, and renders such created image onto a screen of a car navigation system, etc.

As described above, the server sends to a client a SWLD when the features of the respective VXLs are mainly required such as in the case of self-location estimation, and sends to a client a WLD when detailed VXL information is required such as in the case of map rendering. This allows for an efficient sending/receiving of map data.

Note that a client may self-judge which one of a SWLD and a WLD is necessary, and request the server to send a SWLD or a WLD. Also, the server may judge which one of a SWLD and a WLD to send in accordance with the status of the client or a network.

Next, a method will be described of switching the sending/receiving between a sparse world (SWLD) and a world (WLD).

Figure 14:
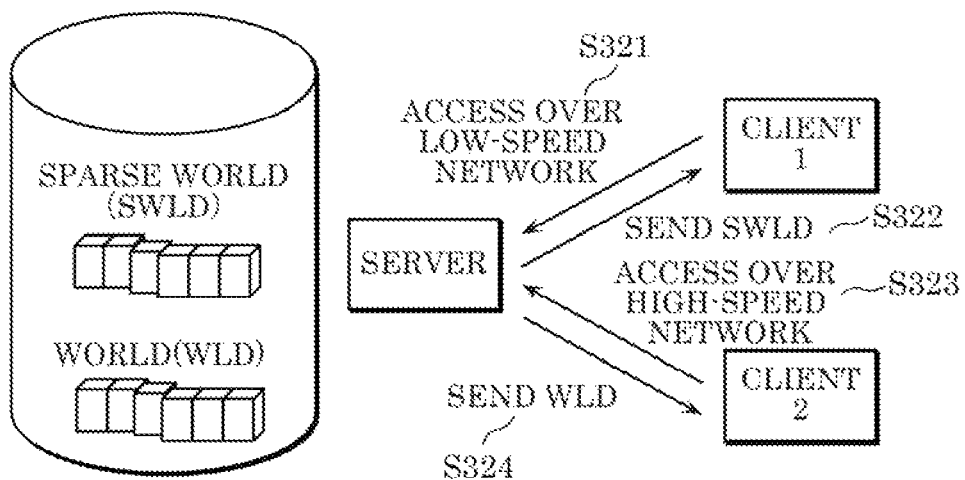
FIG. 14 is a diagram showing example operations performed by the server and the clients according to Embodiment 2.

Whether to receive a WLD or a SWLD may be switched in accordance with the network bandwidth. FIG. 14 is a diagram showing an example operation in such case. For example, when a low-speed network is used that limits the usable network bandwidth, such as in a Long-Term Evolution (LTE) environment, a client accesses the server over a low-speed network (S321), and obtains the SWLD from the server as map information (S322). Meanwhile, when a high-speed network is used that has an adequately broad network bandwidth, such as in a WiFi environment, a client accesses the server over a high-speed network (S323), and obtains the WLD from the server (S324). This enables the client to obtain appropriate map information in accordance with the network bandwidth such client is using.

More specifically, a client receives the SWLD over an LTE network when in outdoors, and obtains the WLD over a WiFi network when in indoors such as in a facility. This enables the client to obtain more detailed map information on indoor environment.

As described above, a client may request for a WLD or a SWLD in accordance with the bandwidth of a network such client is using. Alternatively, the client may send to the server information indicating the bandwidth of a network such client is using, and the server may send to the client data (the WLD or the SWLD) suitable for such client in accordance with the information. Alternatively, the server may identify the network bandwidth the client is using, and send to the client data (the WLD or the SWLD) suitable for such client.

Figure 15:
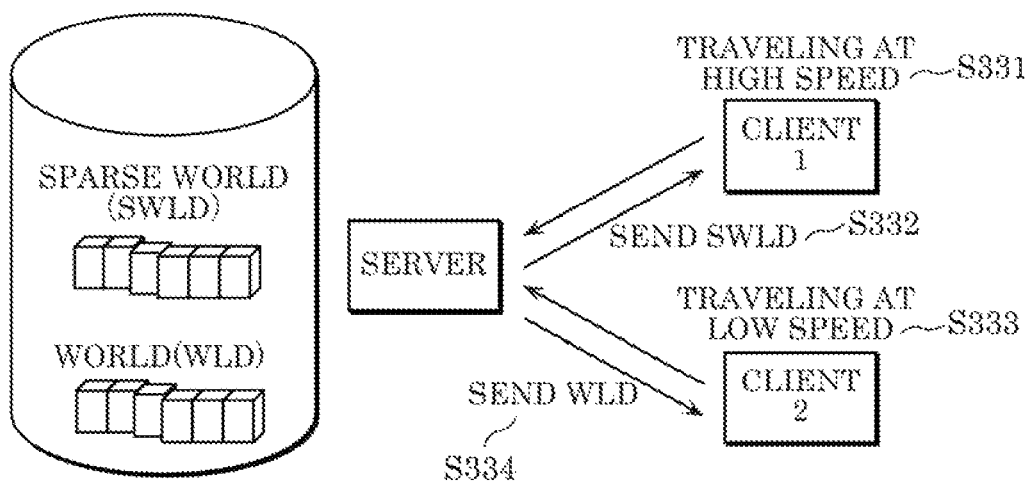
FIG. 15 is a diagram showing example operations performed by the server and the clients according to Embodiment 2.

Also, whether to receive a WLD or a SWLD may be switched in accordance with the speed of traveling. FIG. 15 is a diagram showing an example operation in such case. For example, when traveling at a high speed (S331), a client receives the SWLD from the server (S332). Meanwhile, when traveling at a low speed (S333), the client receives the WLD from the server (S334). This enables the client to obtain map information suitable to the speed, while reducing the network bandwidth. More specifically, when traveling on an expressway, the client receives the SWLD with a small data amount, which enables the update of rough map information at an appropriate speed. Meanwhile, when traveling on a general road, the client receives the WLD, which enables the obtainment of more detailed map information.

As described above, the client may request the server for a WLD or a SWLD in accordance with the traveling speed of such client. Alternatively, the client may send to the server information indicating the traveling speed of such client, and the server may send to the client data (the WLD or the SWLD) suitable to such client in accordance with the information. Alternatively, the server may identify the traveling speed of the client to send data (the WLD or the SWLD) suitable to such client.

Also, the client may obtain, from the server, a SWLD first, from which the client may obtain a WLD of an important region. For example, when obtaining map information, the client first obtains a SWLD for rough map information, from which the client narrows to a region in which features such as buildings, signals, or persons appear at high frequency so that the client can later obtain a WLD of such narrowed region. This enables the client to obtain detailed information on a necessary region, while reducing the amount of data received from the server.

The server may also create from a WLD different SWLDs for the respective objects, and the client may receive SWLDs in accordance with the intended use. This reduces the network bandwidth. For example, the server recognizes persons or cars in a WLD in advance, and creates a SWLD of persons and a SWLD of cars. The client, when wishing to obtain information on persons around the client, receives the SWLD of persons, and when wising to obtain information on cars, receives the SWLD of cars. Such types of SWLDs may be distinguished by information (flag, or type, etc.) added to the header, etc.

Figure 16:
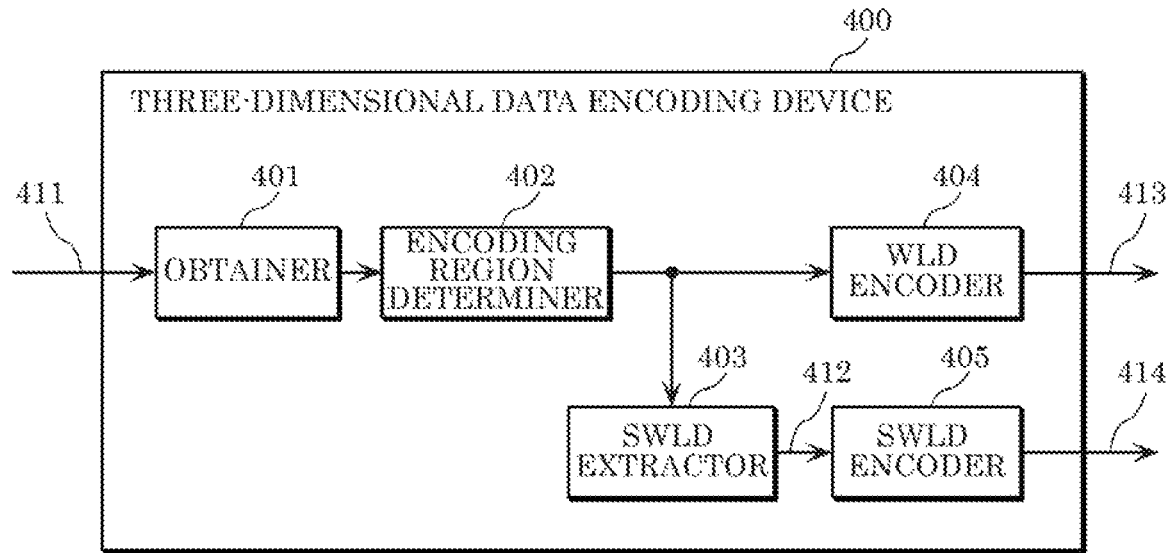
FIG. 16 is a block diagram of a three-dimensional data encoding device according to Embodiment 2.
Figure 17:
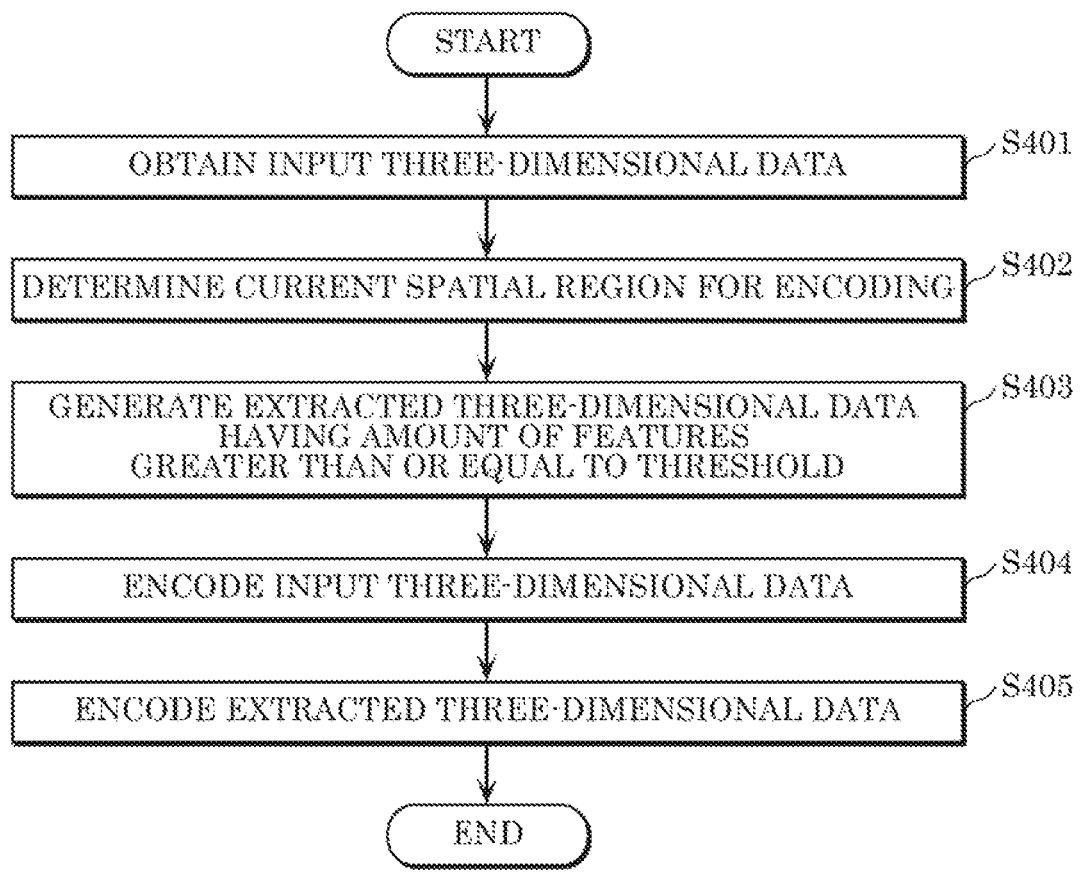
FIG. 17 is a flowchart of encoding processes according to Embodiment 2.

Next, the structure and the operation flow of the three-dimensional data encoding device (e.g., a server) according to the present embodiment will be described. FIG. 16 is a block diagram of three-dimensional data encoding device 400 according to the present embodiment. FIG. 17 is a flowchart of three-dimensional data encoding processes performed by three-dimensional data encoding device 400.

Three-dimensional data encoding device 400 shown in FIG. 16 encodes input three-dimensional data 411, thereby generating encoded three-dimensional data 413 and encoded three-dimensional data 414, each being an encoded stream. Here, encoded three-dimensional data 413 is encoded three-dimensional data corresponding to a WLD, and encoded three-dimensional data 414 is encoded three-dimensional data corresponding to a SWLD. Such three-dimensional data encoding device 400 includes, obtainer 401, encoding region determiner 402, SWLD extractor 403, WLD encoder 404, and SWLD encoder 405.

First, as FIG. 17 shows, obtainer 401 obtains input three-dimensional data 411, which is point group data in a three-dimensional space (S401).

Next, encoding region determiner 402 determines a current spatial region for encoding on the basis of a spatial region in which the point cloud data is present (S402).

Next, SWLD extractor 403 defines the current spatial region as a WLD, and calculates the feature from each VXL included in the WLD. Then, SWLD extractor 403 extracts VXLs having an amount of features greater than or equal to a predetermined threshold, defines the extracted VXLs as FVXLs, and adds such FVXLs to a SWLD, thereby generating extracted three-dimensional data 412 (S403). Stated differently, extracted three-dimensional data 412 having an amount of features greater than or equal to the threshold is extracted from input three-dimensional data 411.

Next, WLD encoder 404 encodes input three-dimensional data 411 corresponding to the WLD, thereby generating encoded three-dimensional data 413 corresponding to the WLD (S404). In so doing, WLD encoder 404 adds to the header of encoded three-dimensional data 413 information that distinguishes that such encoded three-dimensional data 413 is a stream including a WLD.

SWLD encoder 405 encodes extracted three-dimensional data 412 corresponding to the SWLD, thereby generating encoded three-dimensional data 414 corresponding to the SWLD (S405). In so doing, SWLD encoder 405 adds to the header of encoded three-dimensional data 414 information that distinguishes that such encoded three-dimensional data 414 is a stream including a SWLD.

Note that the process of generating encoded three-dimensional data 413 and the process of generating encoded three-dimensional data 414 may be performed in the reverse order. Also note that a part or all of these processes may be performed in parallel.

A parameter "world_type" is defined, for example, as information added to each header of encoded three-dimensional data 413 and encoded three-dimensional data 414. world_type=0 indicates that a stream includes a WLD, and world_type=1 indicates that a stream includes a SWLD. An increased number of values may be further assigned to define a larger number of types, e.g., world_type=2. Also, one of encoded three-dimensional data 413 and encoded three-dimensional data 414 may include a specified flag. For example, encoded three-dimensional data 414 may be assigned with a flag indicating that such stream includes a SWLD. In such a case, the decoding device can distinguish whether such stream is a stream including a WLD or a stream including a SWLD in accordance with the presence/absence of the flag.

Also, an encoding method used by WLD encoder 404 to encode a WLD may be different from an encoding method used by SWLD encoder 405 to encode a SWLD.

For example, data of a SWLD is decimated, and thus can have a lower correlation with the neighboring data than that of a WLD. For this reason, of intra prediction and inter prediction, inter prediction may be more preferentially performed in an encoding method used for a SWLD than in an encoding method used for a WLD.

Also, an encoding method used for a SWLD and an encoding method used for a WLD may represent three-dimensional positions differently. For example, three-dimensional coordinates may be used to represent the three-dimensional positions of FVXLs in a SWLD and an octree described below may be used to represent three-dimensional positions in a WLD, and vice versa.

Also, SWLD encoder 405 performs encoding in a manner that encoded three-dimensional data 414 of a SWLD has a smaller data size than the data size of encoded three-dimensional data 413 of a WLD. A SWLD can have a lower inter-data correlation, for example, than that of a WLD as described above. This can lead to a decreased encoding efficiency, and thus to encoded three-dimensional data 414 having a larger data size than the data size of encoded three-dimensional data 413 of a WLD. When the data size of the resulting encoded three-dimensional data 414 is larger than the data size of encoded three-dimensional data 413 of a WLD, SWLD encoder 405 performs encoding again to re-generate encoded three-dimensional data 414 having a reduced data size.

For example, SWLD extractor 403 re-generates extracted three-dimensional data 412 having a reduced number of keypoints to be extracted, and SWLD encoder 405 encodes such extracted three-dimensional data 412. Alternatively, SWLD encoder 405 may perform more coarse quantization. More coarse quantization is achieved, for example, by rounding the data in the lowermost level in an octree structure described below.

When failing to decrease the data size of encoded three-dimensional data 414 of the SWLD to smaller than the data size of encoded three-dimensional data 413 of the WLD, SWLD encoder 405 may not generate encoded three-dimensional data 414 of the SWLD. Alternatively, encoded three-dimensional data 413 of the WLD may be copied as encoded three-dimensional data 414 of the SWLD. Stated differently, encoded three-dimensional data 413 of the WLD may be used as it is as encoded three-dimensional data 414 of the SWLD.

Figure 18:
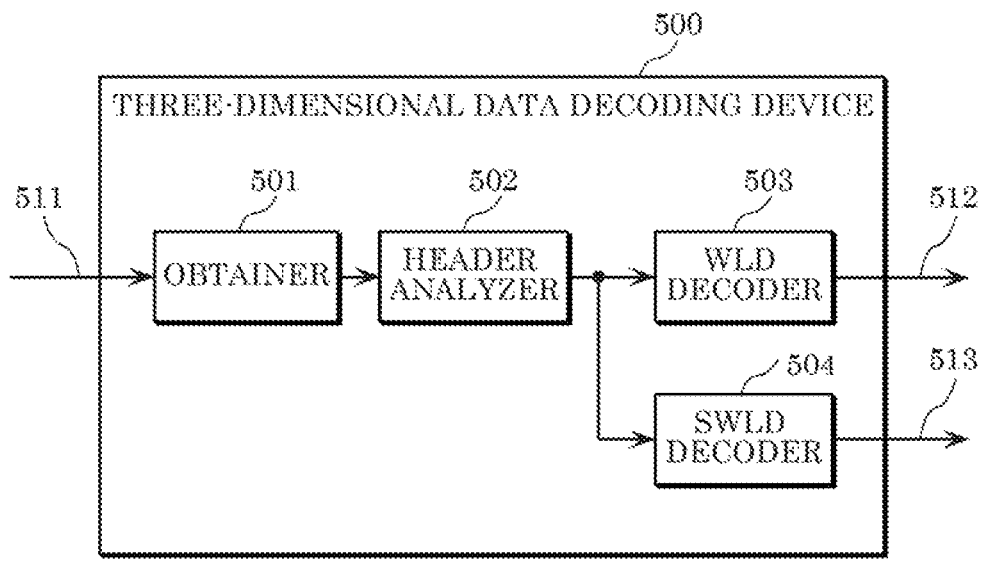
FIG. 18 is a block diagram of a three-dimensional data decoding device according to Embodiment 2.
Figure 19:
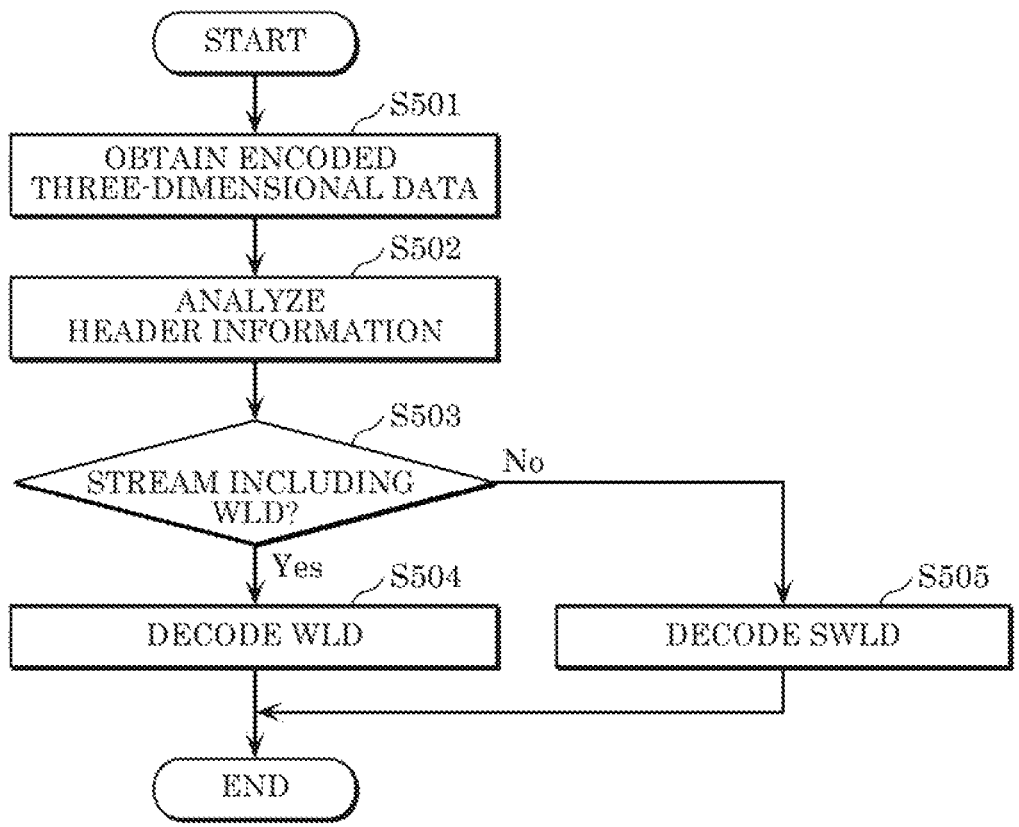
FIG. 19 is a flowchart of decoding processes according to Embodiment 2.

Next, the structure and the operation flow of the three-dimensional data decoding device (e.g., a client) according to the present embodiment will be described. FIG. 18 is a block diagram of three-dimensional data decoding device 500 according to the present embodiment. FIG. 19 is a flowchart of three-dimensional data decoding processes performed by three-dimensional data decoding device 500.

Three-dimensional data decoding device 500 shown in FIG. 18 decodes encoded three-dimensional data 511, thereby generating decoded three-dimensional data 512 or decoded three-dimensional data 513. Encoded three-dimensional data 511 here is, for example, encoded three-dimensional data 413 or encoded three-dimensional data 414 generated by three-dimensional data encoding device 400.

Such three-dimensional data decoding device 500 includes obtainer 501, header analyzer 502, WLD decoder 503, and SWLD decoder 504.

First, as FIG. 19 shows, obtainer 501 obtains encoded three-dimensional data 511 (S501). Next, header analyzer 502 analyzes the header of encoded three-dimensional data 511 to identify whether encoded three-dimensional data 511 is a stream including a WLD or a stream including a SWLD (S502). For example, the above-described parameter world_type is referred to in making such identification.

When encoded three-dimensional data 511 is a stream including a WLD (Yes in S503), WLD decoder 503 decodes encoded three-dimensional data 511, thereby generating decoded three-dimensional data 512 of the WLD (S504). Meanwhile, when encoded three-dimensional data 511 is a stream including a SWLD (No in S503), SWLD decoder 504 decodes encoded three-dimensional data 511, thereby generating decoded three-dimensional data 513 of the SWLD (S505).

Also, as in the case of the encoding device, a decoding method used by WLD decoder 503 to decode a WLD may be different from a decoding method used by SWLD decoder 504 to decode a SWLD. For example, of intra prediction and inter prediction, inter prediction may be more preferentially performed in a decoding method used for a SWLD than in a decoding method used for a WLD.

Also, a decoding method used for a SWLD and a decoding method used for a WLD may represent three-dimensional positions differently. For example, three-dimensional coordinates may be used to represent the three-dimensional positions of FVXLs in a SWLD and an octree described below may be used to represent three-dimensional positions in a WLD, and vice versa.

Figure 20:
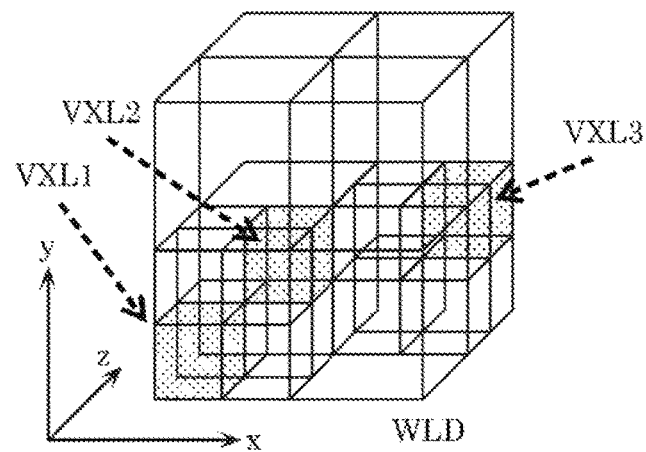
FIG. 20 is a diagram showing an example structure of a WLD according to Embodiment 2.
Figure 21:
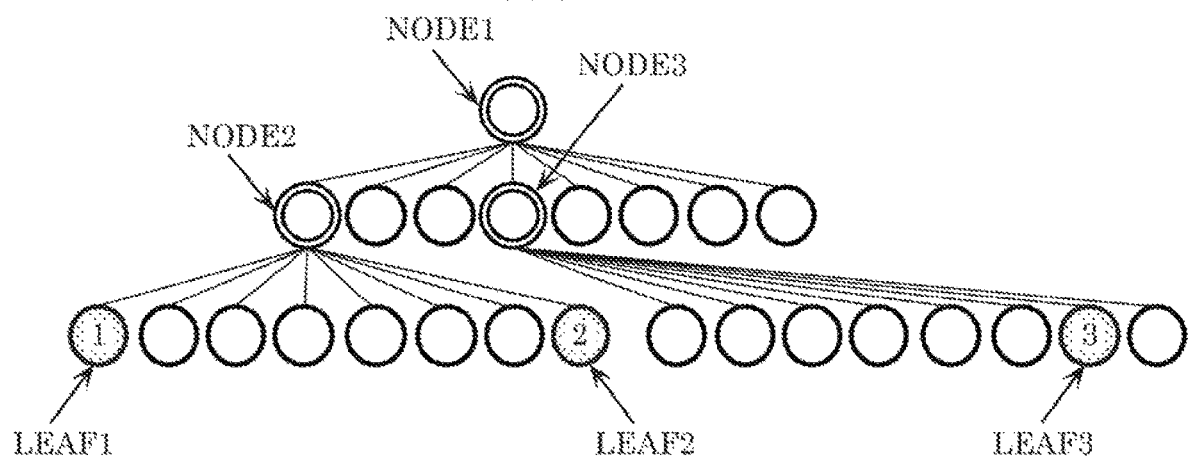
FIG. 21 is a diagram showing an example octree structure of the WLD according to Embodiment 2.

Next, an octree representation will be described, which is a method of representing three-dimensional positions. VXL data included in three-dimensional data is converted into an octree structure before encoded. FIG. 20 is a diagram showing example VXLs in a WLD. FIG. 21 is a diagram showing an octree structure of the WLD shown in FIG. 20. An example shown in FIG. 20 illustrates three VXLs 1 to 3 that include point groups (hereinafter referred to as effective VXLs). As FIG. 21 shows, the octree structure is made of nodes and leaves. Each node has a maximum of eight nodes or leaves. Each leaf has VXL information. Here, of the leaves shown in FIG. 21, leaf 1, leaf 2, and leaf 3 represent VXL1, VXL2, and VXL3 shown in FIG. 20, respectively.

More specifically, each node and each leaf correspond to a three-dimensional position. Node 1 corresponds to the entire block shown in FIG. 20. The block that corresponds to node 1 is divided into eight blocks. Of these eight blocks, blocks including effective VXLs are set as nodes, while the other blocks are set as leaves. Each block that corresponds to a node is further divided into eight nodes or leaves. These processes are repeated by the number of times that is equal to the number of levels in the octree structure. All blocks in the lowermost level are set as leaves.

Figure 22:
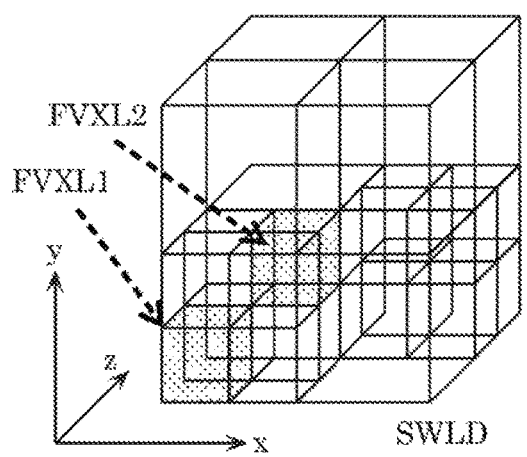
FIG. 22 is a diagram showing an example structure of a SWLD according to Embodiment 2.
Figure 23:
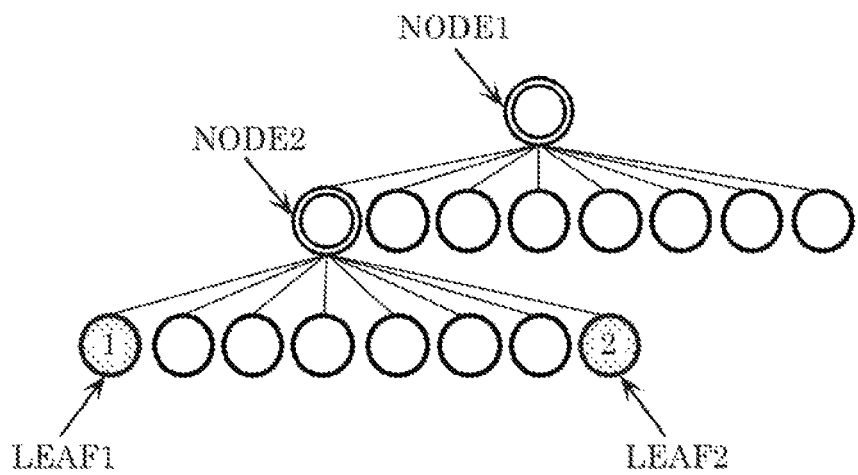
FIG. 23 is a diagram showing an example octree structure of the SWLD according to Embodiment 2.

FIG. 22 is a diagram showing an example SWLD generated from the WLD shown in FIG. 20. VXL1 and VXL2 shown in FIG. 20 are judged as FVXL1 and FVXL2 as a result of feature extraction, and thus are added to the SWLD. Meanwhile, VXL3 is not judged as a FVXL, and thus is not added to the SWLD. FIG. 23 is a diagram showing an octree structure of the SWLD shown in FIG. 22. In the octree structure shown in FIG. 23, leaf 3 corresponding to VXL3 shown in FIG. 21 is deleted. Consequently, node 3 shown in FIG. 21 has lost an effective VXL, and has changed to a leaf. As described above, a SWLD has a smaller number of leaves in general than a WLD does, and thus the encoded three-dimensional data of the SWLD is smaller than the encoded three-dimensional data of the WLD.

The following describes variations of the present embodiment.

For self-location estimation, for example, a client, being a vehicle-mounted device, etc., may receive a SWLD from the server to use such SWLD to estimate the self-location. Meanwhile, for obstacle detection, the client may detect obstacles by use of three-dimensional information on the periphery obtained by such client through various means including a distance sensor such as a rangefinder, as well as a stereo camera and a combination of a plurality of monocular cameras.

In general, a SWLD is less likely to include VXL data on a flat region. As such, the server may hold a subsample world (subWLD) obtained by subsampling a WLD for detection of static obstacles, and send to the client the SWLD and the subWLD. This enables the client to perform self-location estimation and obstacle detection on the client's part, while reducing the network bandwidth.

When the client renders three-dimensional map data at a high speed, map information having a mesh structure is more useful in some cases. As such, the server may generate a mesh from a WLD to hold it beforehand as a mesh world (MWLD). For example, when wishing to perform coarse three-dimensional rendering, the client receives a MWLD, and when wishing to perform detailed three-dimensional rendering, the client receives a WLD. This reduces the network bandwidth.

In the above description, the server sets, as FVXLs, VXLs having an amount of features greater than or equal to the threshold, but the server may calculate FVXLs by a different method. For example, the server may judge that a VXL, a VLM, a SPC, or a GOS that constitutes a signal, or an intersection, etc. as necessary for self-location estimation, driving assist, or self-driving, etc., and incorporate such VXL, VLM, SPC, or GOS into a SWLD as a FVXL, a FVLM, a FSPC, or a FGOS. Such judgment may be made manually. Also, FVXLs, etc. that have been set on the basis of an amount of features may be added to FVXLs, etc. obtained by the above method. Stated differently, SWLD extractor 403 may further extract, from input three-dimensional data 411, data corresponding to an object having a predetermined attribute as extracted three-dimensional data 412.

Also, that a VXL, a VLM, a SPC, or a GOS is necessary for such intended usage may be labeled separately from the features. The server may separately hold, as an upper layer of a SWLD (e.g., a lane world), FVXLs of a signal or an intersection, etc. necessary for self-location estimation, driving assist, or self-driving, etc.

The server may also add an attribute to VXLs in a WLD on a random access basis or on a predetermined unit basis. An attribute, for example, includes information indicating whether VXLs are necessary for self-location estimation, or information indicating whether VXLs are important as traffic information such as a signal, or an intersection, etc. An attribute may also include a correspondence between VXLs and features (intersection, or road, etc.) in lane information (geographic data files (GDF), etc.).

A method as described below may be used to update a WLD or a SWLD.

Update information indicating changes, etc. in a person, a roadwork, or a tree line (for trucks) is uploaded to the server as point groups or meta data. The server updates a WLD on the basis of such uploaded information, and then updates a SWLD by use of the updated WLD.

The client, when detecting a mismatch between the three-dimensional information such client has generated at the time of self-location estimation and the three-dimensional information received from the server, may send to the server the three-dimensional information such client has generated, together with an update notification. In such a case, the server updates the SWLD by use of the WLD. When the SWLD is not to be updated, the server judges that the WLD itself is old.

In the above description, information that distinguishes whether an encoded stream is that of a WLD or a SWLD is added as header information of the encoded stream. However, when there are many types of worlds such as a mesh world and a lane world, information that distinguishes these types of the worlds may be added to header information. Also, when there are many SWLDs with different amounts of features, information that distinguishes the respective SWLDs may be added to header information.

In the above description, a SWLD is constituted by FVXLs, but a SWLD may include VXLs that have not been judged as FVXLs. For example, a SWLD may include an adjacent VXL used to calculate the feature of a FVXL. This enables the client to calculate the feature of a FVXL when receiving a SWLD, even in the case where feature information is not added to each FVXL of the SWLD. In such a case, the SWLD may include information that distinguishes whether each VXL is a FVXL or a VXL.

As described above, three-dimensional data encoding device 400 extracts, from input three-dimensional data 411 (first three-dimensional data), extracted three-dimensional data 412 (second three-dimensional data) having an amount of a feature greater than or equal to a threshold, and encodes extracted three-dimensional data 412 to generate encoded three-dimensional data 414 (first encoded three-dimensional data).

This three-dimensional data encoding device 400 generates encoded three-dimensional data 414 that is obtained by encoding data having an amount of a feature greater than or equal to the threshold. This reduces the amount of data compared to the case where input three-dimensional data 411 is encoded as it is. Three-dimensional data encoding device 400 is thus capable of reducing the amount of data to be transmitted.

Three-dimensional data encoding device 400 further encodes input three-dimensional data 411 to generate encoded three-dimensional data 413 (second encoded three-dimensional data).

This three-dimensional data encoding device 400 enables selective transmission of encoded three-dimensional data 413 and encoded three-dimensional data 414, in accordance, for example, with the intended use, etc.

Also, extracted three-dimensional data 412 is encoded by a first encoding method, and input three-dimensional data 411 is encoded by a second encoding method different from the first encoding method.

This three-dimensional data encoding device 400 enables the use of an encoding method suitable for each of input three-dimensional data 411 and extracted three-dimensional data 412.

Also, of intra prediction and inter prediction, the inter prediction is more preferentially performed in the first encoding method than in the second encoding method.

This three-dimensional data encoding device 400 enables inter prediction to be more preferentially performed on extracted three-dimensional data 412 in which adjacent data items are likely to have low correlation.

Also, the first encoding method and the second encoding method represent three-dimensional positions differently. For example, the second encoding method represents three-dimensional positions by octree, and the first encoding method represents three-dimensional positions by three-dimensional coordinates.

This three-dimensional data encoding device 400 enables the use of a more suitable method to represent the three-dimensional positions of three-dimensional data in consideration of the difference in the number of data items (the number of VXLs or FVXLs) included.

Also, at least one of encoded three-dimensional data 413 and encoded three-dimensional data 414 includes an identifier indicating whether the encoded three-dimensional data is encoded three-dimensional data obtained by encoding input three-dimensional data 411 or encoded three-dimensional data obtained by encoding part of input three-dimensional data 411. Stated differently, such identifier indicates whether the encoded three-dimensional data is encoded three-dimensional data 413 of a WLD or encoded three-dimensional data 414 of a SWLD.

This enables the decoding device to readily judge whether the obtained encoded three-dimensional data is encoded three-dimensional data 413 or encoded three-dimensional data 414.

Also, three-dimensional data encoding device 400 encodes extracted three-dimensional data 412 in a manner that encoded three-dimensional data 414 has a smaller data amount than a data amount of encoded three-dimensional data 413.

This three-dimensional data encoding device 400 enables encoded three-dimensional data 414 to have a smaller data amount than the data amount of encoded three-dimensional data 413.

Also, three-dimensional data encoding device 400 further extracts data corresponding to an object having a predetermined attribute from input three-dimensional data 411 as extracted three-dimensional data 412. The object having a predetermined attribute is, for example, an object necessary for self-location estimation, driving assist, or self-driving, etc., or more specifically, a signal, an intersection, etc.

This three-dimensional data encoding device 400 is capable of generating encoded three-dimensional data 414 that includes data required by the decoding device.

Also, three-dimensional data encoding device 400 (server) further sends, to a client, one of encoded three-dimensional data 413 and encoded three-dimensional data 414 in accordance with a status of the client.

This three-dimensional data encoding device 400 is capable of sending appropriate data in accordance with the status of the client.

Also, the status of the client includes one of a communication condition (e.g., network bandwidth) of the client and a traveling speed of the client.

Also, three-dimensional data encoding device 400 further sends, to a client, one of encoded three-dimensional data 413 and encoded three-dimensional data 414 in accordance with a request from the client.

This three-dimensional data encoding device 400 is capable of sending appropriate data in accordance with the request from the client.

Also, three-dimensional data decoding device 500 according to the present embodiment decodes encoded three-dimensional data 413 or encoded three-dimensional data 414 generated by three-dimensional data encoding device 400 described above.

Stated differently, three-dimensional data decoding device 500 decodes, by a first decoding method, encoded three-dimensional data 414 obtained by encoding extracted three-dimensional data 412 having an amount of a feature greater than or equal to a threshold, extracted three-dimensional data 412 having been extracted from input three-dimensional data 411. Three-dimensional data decoding device 500 also decodes, by a second decoding method, encoded three-dimensional data 413 obtained by encoding input three-dimensional data 411, the second decoding method being different from the first decoding method.

This three-dimensional data decoding device 500 enables selective reception of encoded three-dimensional data 414 obtained by encoding data having an amount of a feature greater than or equal to the threshold and encoded three-dimensional data 413, in accordance, for example, with the intended use, etc. Three-dimensional data decoding device 500 is thus capable of reducing the amount of data to be transmitted. Such three-dimensional data decoding device 500 further enables the use of a decoding method suitable for each of input three-dimensional data 411 and extracted three-dimensional data 412.

Also, of intra prediction and inter prediction, the inter prediction is more preferentially performed in the first decoding method than in the second decoding method.

This three-dimensional data decoding device 500 enables inter prediction to be more preferentially performed on the extracted three-dimensional data in which adjacent data items are likely to have low correlation.

Also, the first decoding method and the second decoding method represent three-dimensional positions differently.

For example, the second decoding method represents three-dimensional positions by octree, and the first decoding method represents three-dimensional positions by three-dimensional coordinates.

This three-dimensional data decoding device 500 enables the use of a more suitable method to represent the three-dimensional positions of three-dimensional data in consideration of the difference in the number of data items (the number of VXLs or FVXLs) included.

Also, at least one of encoded three-dimensional data 413 and encoded three-dimensional data 414 includes an identifier indicating whether the encoded three-dimensional data is encoded three-dimensional data obtained by encoding input three-dimensional data 411 or encoded three-dimensional data obtained by encoding part of input three-dimensional data 411. Three-dimensional data decoding device 500 refers to such identifier in identifying between encoded three-dimensional data 413 and encoded three-dimensional data 414.

This three-dimensional data decoding device 500 is capable of readily judging whether the obtained encoded three-dimensional data is encoded three-dimensional data 413 or encoded three-dimensional data 414.

Three-dimensional data decoding device 500 further notifies a server of a status of the client (three-dimensional data decoding device 500). Three-dimensional data decoding device 500 receives one of encoded three-dimensional data 413 and encoded three-dimensional data 414 from the server, in accordance with the status of the client.

This three-dimensional data decoding device 500 is capable of receiving appropriate data in accordance with the status of the client.

Also, the status of the client includes one of a communication condition (e.g., network bandwidth) of the client and a traveling speed of the client.

Three-dimensional data decoding device 500 further makes a request of the server for one of encoded three-dimensional data 413 and encoded three-dimensional data 414, and receives one of encoded three-dimensional data 413 and encoded three-dimensional data 414 from the server, in accordance with the request.

This three-dimensional data decoding device 500 is capable of receiving appropriate data in accordance with the intended use.

Embodiment 3

The present embodiment will describe a method of transmitting/receiving three-dimensional data between vehicles.

Figure 24:
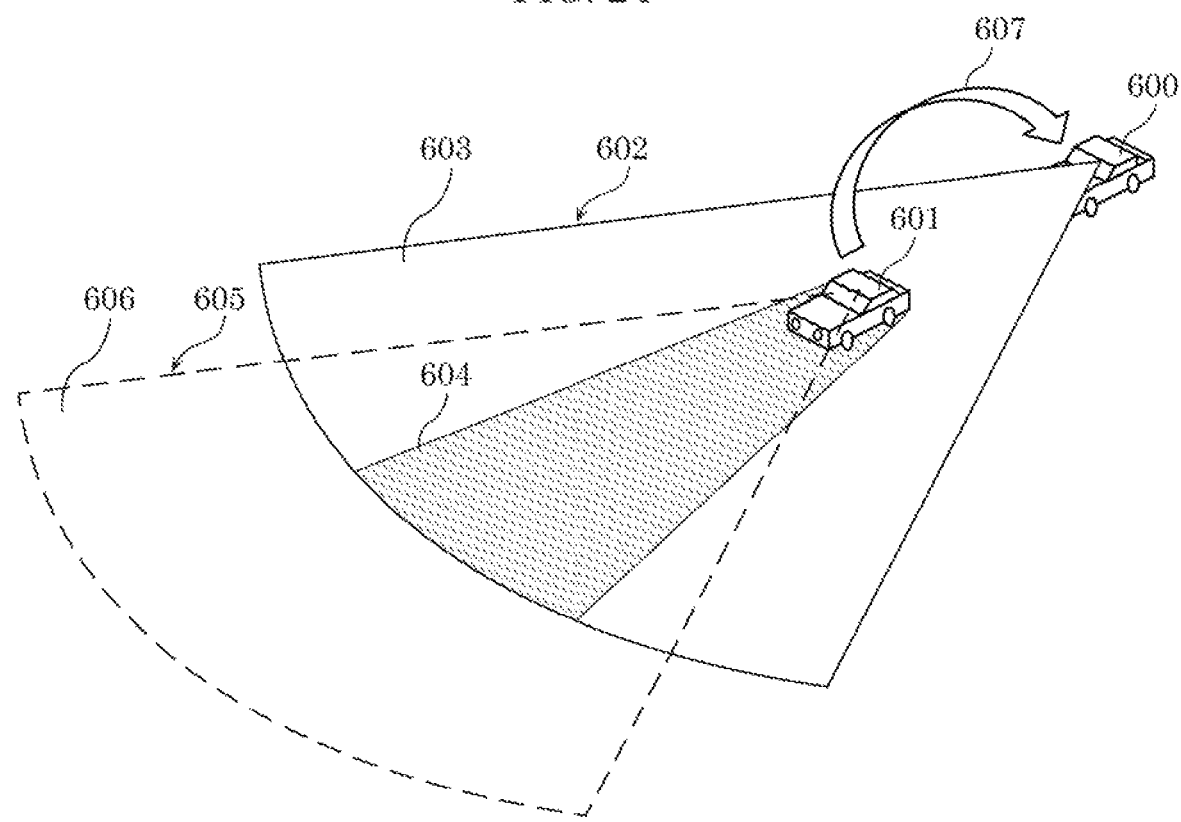
FIG. 24 is a schematic diagram showing three-dimensional data being transmitted/received between vehicles according to Embodiment 3.

FIG. 24 is a schematic diagram showing three-dimensional data 607 being transmitted/received between own vehicle 600 and nearby vehicle 601.

In three-dimensional data that is obtained by a sensor mounted on own vehicle 600 (e.g., a distance sensor such as a rangefinder, as well as a stereo camera and a combination of a plurality of monocular cameras), there appears a region, three-dimensional data of which cannot be created, due to an obstacle such as nearby vehicle 601, despite that such region is included in sensor detection range 602 of own vehicle 600 (such region is hereinafter referred to as occlusion region 604). Also, while the obtainment of three-dimensional data of a larger space enables a higher accuracy of autonomous operations, a range of sensor detection only by own vehicle 600 is limited.

Sensor detection range 602 of own vehicle 600 includes region 603, three-dimensional data of which is obtainable, and occlusion region 604. A range, three-dimensional data of which own vehicle 600 wishes to obtain, includes sensor detection range 602 of own vehicle 600 and other regions. Sensor detection range 605 of nearby vehicle 601 includes occlusion region 604 and region 606 that is not included in sensor detection range 602 of own vehicle 600.

Nearby vehicle 601 transmits information detected by nearby vehicle 601 to own vehicle 600. Own vehicle 600 obtains the information detected by nearby vehicle 601, such as a preceding vehicle, thereby obtaining three-dimensional data 607 of occlusion region 604 and region 606 outside of sensor detection range 602 of own vehicle 600. Own vehicle 600 uses the information obtained by nearby vehicle 601 to complement the three-dimensional data of occlusion region 604 and region 606 outside of the sensor detection range.

The usage of three-dimensional data in autonomous operations of a vehicle or a robot includes self-location estimation, detection of surrounding conditions, or both. For example, for self-location estimation, three-dimensional data is used that is generated by own vehicle 600 on the basis of sensor information of own vehicle 600. For detection of surrounding conditions, three-dimensional data obtained from nearby vehicle 601 is also used in addition to the three-dimensional data generated by own vehicle 600.

Nearby vehicle 601 that transmits three-dimensional data 607 to own vehicle 600 may be determined in accordance with the state of own vehicle 600. For example, the current nearby vehicle 601 is a preceding vehicle when own vehicle 600 is running straight ahead, an oncoming vehicle when own vehicle 600 is turning right, and a following vehicle when own vehicle 600 is rolling backward. Alternatively, the driver of own vehicle 600 may directly specify nearby vehicle 601 that transmits three-dimensional data 607 to own vehicle 600.

Alternatively, own vehicle 600 may search for nearby vehicle 601 having three-dimensional data of a region that is included in a space, three-dimensional data of which own vehicle 600 wishes to obtain, and that own vehicle 600 cannot obtain. The region own vehicle 600 cannot obtain is occlusion region 604, or region 606 outside of sensor detection range 602, etc.

Own vehicle 600 may identify occlusion region 604 on the basis of the sensor information of own vehicle 600. For example, own vehicle 600 identifies, as occlusion region 604, a region which is included in sensor detection range 602 of own vehicle 600, and three-dimensional data of which cannot be created.

Figure 25:
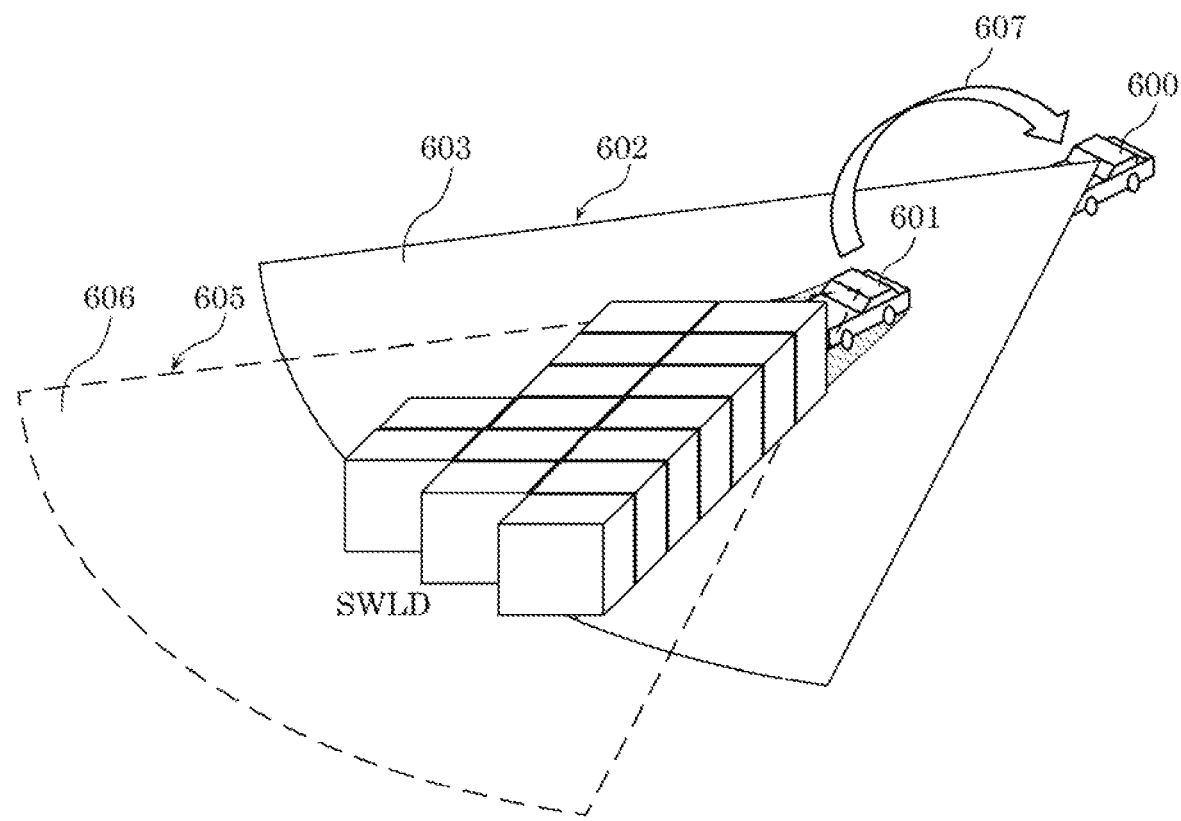
FIG. 25 is a diagram showing an example of three-dimensional data transmitted between vehicles according to Embodiment 3.

The following describes example operations to be performed when a vehicle that transmits three-dimensional data 607 is a preceding vehicle. FIG. 25 is a diagram showing an example of three-dimensional data to be transmitted in such case.

As FIG. 25 shows, three-dimensional data 607 transmitted from the preceding vehicle is, for example, a sparse world (SWLD) of a point cloud. Stated differently, the preceding vehicle creates three-dimensional data (point cloud) of a WLD from information detected by a sensor of such preceding vehicle, and extracts data having an amount of features greater than or equal to the threshold from such three-dimensional data of the WLD, thereby creating three-dimensional data (point cloud) of the SWLD. Subsequently, the preceding vehicle transmits the created three-dimensional data of the SWLD to own vehicle 600.

Own vehicle 600 receives the SWLD, and merges the received SWLD with the point cloud created by own vehicle 600.

The SWLD to be transmitted includes information on the absolute coordinates (the position of the SWLD in the coordinates system of a three-dimensional map). The merge is achieved by own vehicle 600 overwriting the point cloud generated by own vehicle 600 on the basis of such absolute coordinates.

The SWLD transmitted from nearby vehicle 601 may be: a SWLD of region 606 that is outside of sensor detection range 602 of own vehicle 600 and within sensor detection range 605 of nearby vehicle 601; or a SWLD of occlusion region 604 of own vehicle 600; or the SWLDs of the both. Of these SWLDs, a SWLD to be transmitted may also be a SWLD of a region used by nearby vehicle 601 to detect the surrounding conditions.

Nearby vehicle 601 may change the density of a point cloud to transmit, in accordance with the communication available time, during which own vehicle 600 and nearby vehicle 601 can communicate, and which is based on the speed difference between these vehicles. For example, when the speed difference is large and the communication available time is short, nearby vehicle 601 may extract three-dimensional points having a large amount of features from the SWLD to decrease the density (data amount) of the point cloud.

The detection of the surrounding conditions refers to judging the presence/absence of persons, vehicles, equipment for roadworks, etc., identifying their types, and detecting their positions, travelling directions, traveling speeds, etc.

Own vehicle 600 may obtain braking information of nearby vehicle 601 instead of or in addition to three-dimensional data 607 generated by nearby vehicle 601. Here, the braking information of nearby vehicle 601 is, for example, information indicating that the accelerator or the brake of nearby vehicle 601 has been pressed, or the degree of such pressing.

In the point clouds generated by the vehicles, the three-dimensional spaces are segmented on a random access unit, in consideration of low-latency communication between the vehicles. Meanwhile, in a three-dimensional map, etc., which is map data downloaded from the server, a three-dimensional space is segmented in a larger random access unit than in the case of inter-vehicle communication.

Data on a region that is likely to be an occlusion region, such as a region in front of the preceding vehicle and a region behind the following vehicle, is segmented on a finer random access unit as low-latency data.

Data on a region in front of a vehicle has an increased importance when on an expressway, and thus each vehicle creates a SWLD of a range with a narrowed viewing angle on a finer random access unit when running on an expressway.

When the SWLD created by the preceding vehicle for transmission includes a region, the point cloud of which own vehicle 600 can obtain, the preceding vehicle may remove the point cloud of such region to reduce the amount of data to transmit.

Next, the structure and operations of three-dimensional data creation device 620 will be described, which is the three-dimensional data reception device according to the present embodiment.

Figure 26:
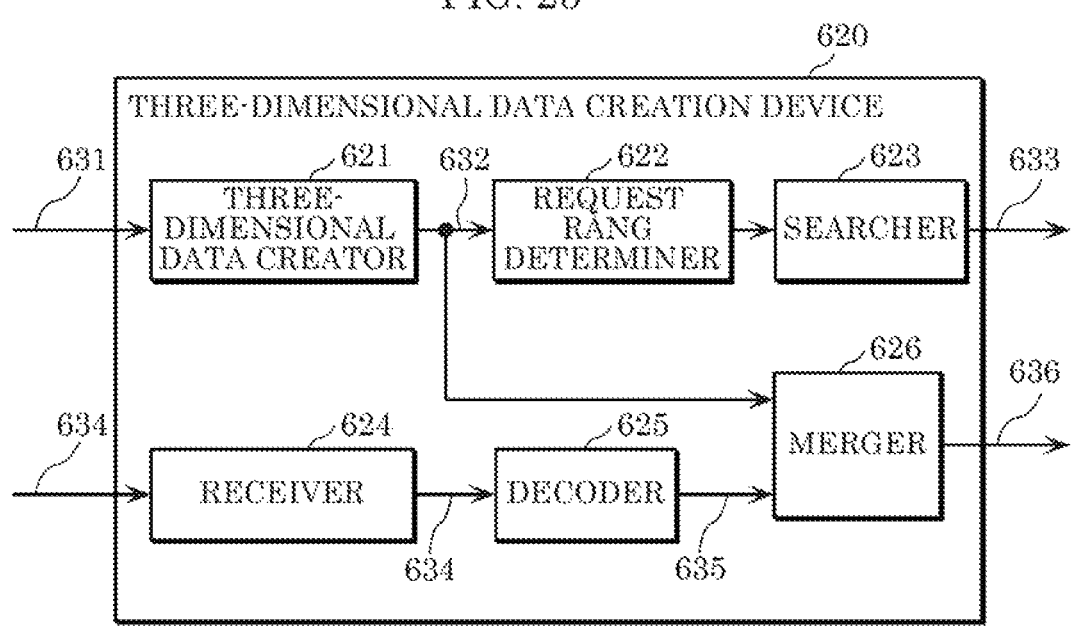
FIG. 26 is a block diagram of a three-dimensional data creation device according to Embodiment 3.

FIG. 26 is a block diagram of three-dimensional data creation device 620 according to the present embodiment. Such three-dimensional data creation device 620, which is included, for example, in the above-described own vehicle 600, mergers first three-dimensional data 632 created by three-dimensional data creation device 620 with the received second three-dimensional data 635, thereby creating third three-dimensional data 636 having a higher density.

Figure 27:
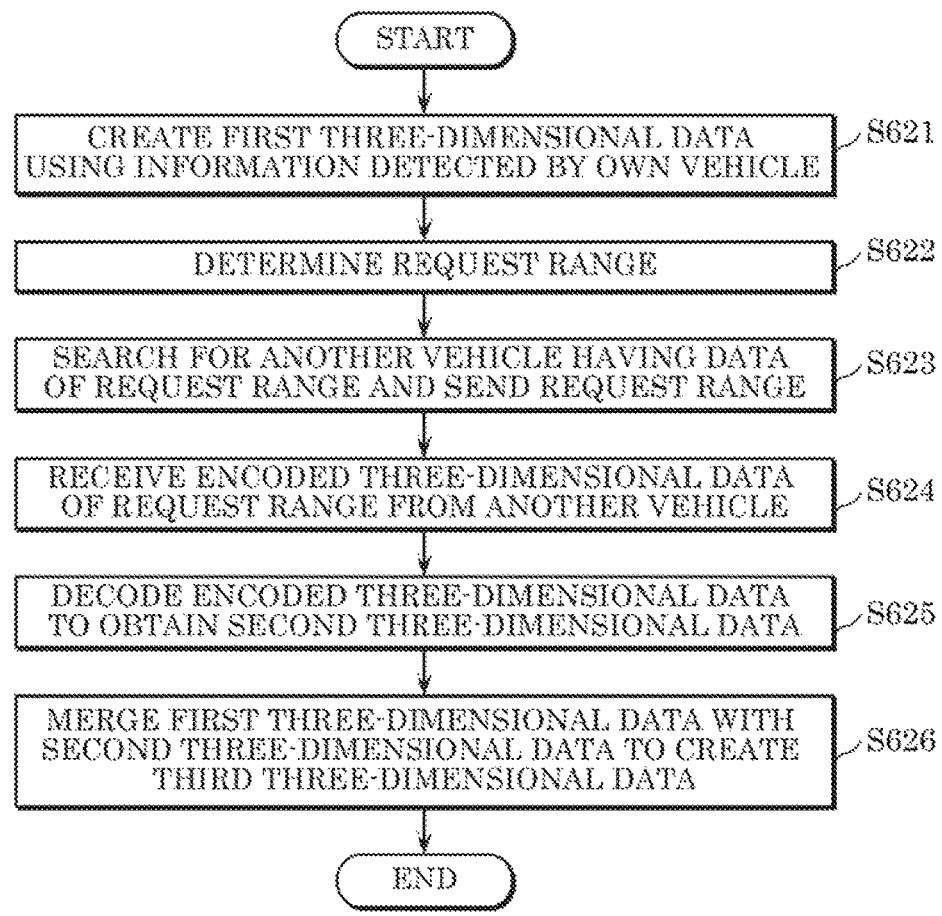
FIG. 27 is a flowchart of the processes of creating three-dimensional data according to Embodiment 3.

Such three-dimensional data creation device 620 includes three-dimensional data creator 621, request range determiner 622, searcher 623, receiver 624, decoder 625, and merger 626. FIG. 27 is a flowchart of operations performed by three-dimensional data creation device 620.

First, three-dimensional data creator 621 creates first three-dimensional data 632 by use of sensor information 631 detected by the sensor included in own vehicle 600 (S621). Next, request range determiner 622 determines a request range, which is the range of a three-dimensional space, the data on which is insufficient in the created first three-dimensional data 632 (S622).

Next, searcher 623 searches for nearby vehicle 601 having the three-dimensional data of the request range, and sends request range information 633 indicating the request range to nearby vehicle 601 having been searched out (S623). Next, receiver 624 receives encoded three-dimensional data 634, which is an encoded stream of the request range, from nearby vehicle 601 (S624). Note that searcher 623 may indiscriminately send requests to all vehicles included in a specified range to receive encoded three-dimensional data 634 from a vehicle that has responded to the request. Searcher 623 may send a request not only to vehicles but also to an object such as a signal and a sign, and receive encoded three-dimensional data 634 from the object.

Next, decoder 625 decodes the received encoded three-dimensional data 634, thereby obtaining second three-dimensional data 635 (S625). Next, merger 626 merges first three-dimensional data 632 with second three-dimensional data 635, thereby creating three-dimensional data 636 having a higher density (S626).

Figure 28:
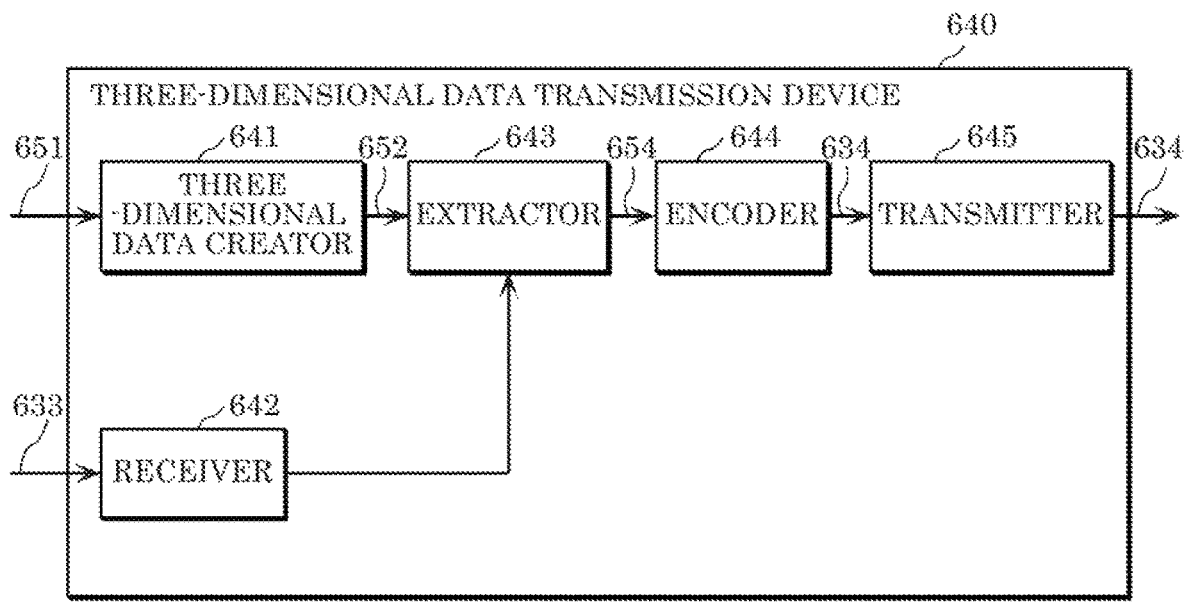
FIG. 28 is a block diagram of a three-dimensional data transmission device according to Embodiment 3.

Next, the structure and operations of three-dimensional data transmission device 640 according to the present embodiment will be described. FIG. 28 is a block diagram of three-dimensional data transmission device 640.

Three-dimensional data transmission device 640 is included, for example, in the above-described nearby vehicle 601. Three-dimensional data transmission device 640 processes fifth three-dimensional data 652 created by nearby vehicle 601 into sixth three-dimensional data 654 requested by own vehicle 600, encodes sixth three-dimensional data 654 to generate encoded three-dimensional data 634, and sends encoded three-dimensional data 634 to own vehicle 600.

Figure 29:
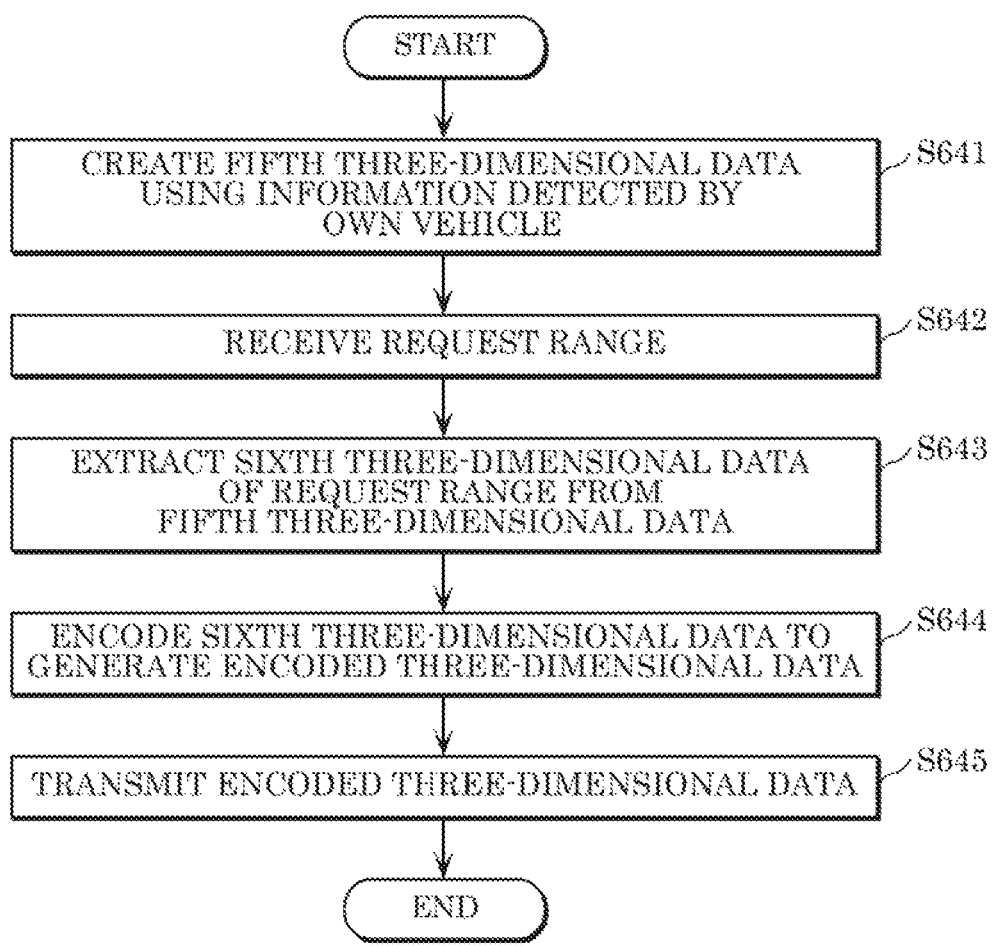
FIG. 29 is a flowchart of the processes of transmitting three-dimensional data according to Embodiment 3.

Three-dimensional data transmission device 640 includes three-dimensional data creator 641, receiver 642, extractor 643, encoder 644, and transmitter 645. FIG. 29 is a flowchart of operations performed by three-dimensional data transmission device 640.

First, three-dimensional data creator 641 creates fifth three-dimensional data 652 by use of sensor information 651 detected by the sensor included in nearby vehicle 601 (S641). Next, receiver 642 receives request range information 633 from own vehicle 600 (S642).

Next, extractor 643 extracts from fifth three-dimensional data 652 the three-dimensional data of the request range indicated by request range information 633, thereby processing fifth three-dimensional data 652 into sixth three-dimensional data 654 (S643). Next, encoder 644 encodes sixth three-dimensional data 654 to generate encoded three-dimensional data 643, which is an encoded stream (S644). Then, transmitter 645 sends encoded three-dimensional data 634 to own vehicle 600 (S645).

Note that although an example case is described here in which own vehicle 600 includes three-dimensional data creation device 620 and nearby vehicle 601 includes three-dimensional data transmission device 640, each of the vehicles may include the functionality of both three-dimensional data creation device 620 and three-dimensional data transmission device 640.

Figure 30:
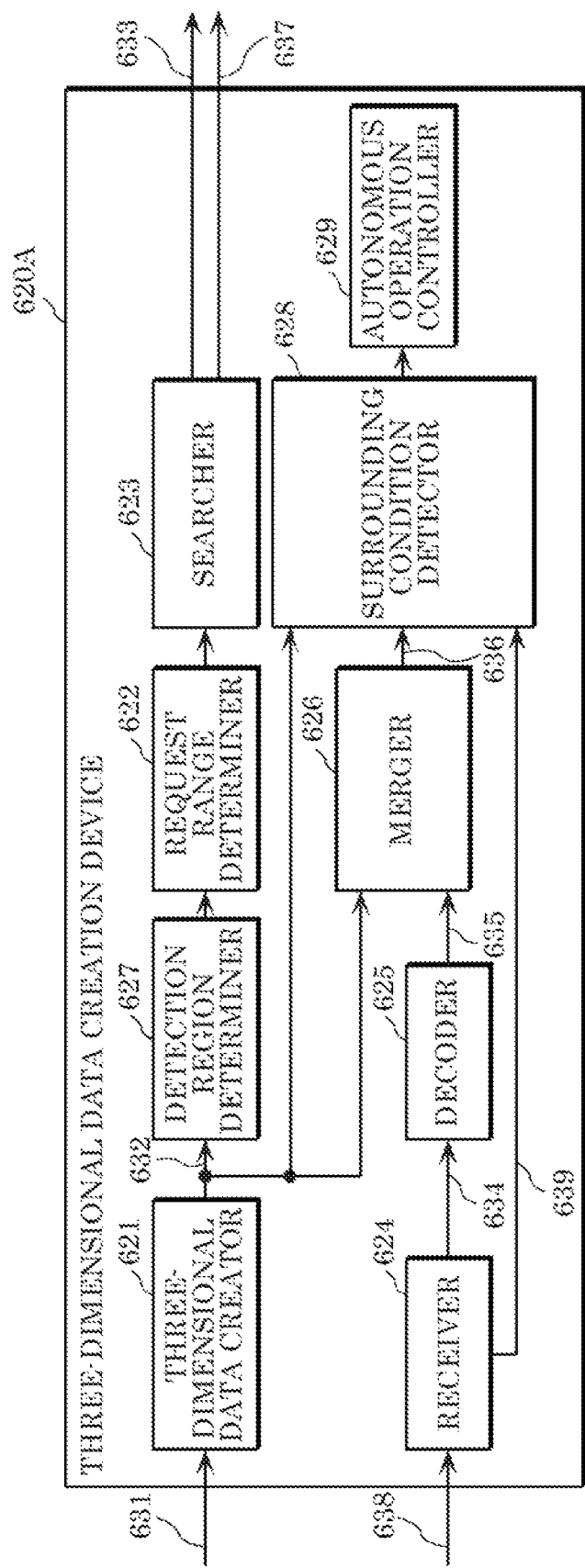
FIG. 30 is a block diagram of a three-dimensional data creation device according to Embodiment 3.

The following describes the structure and operations of three-dimensional data creation device 620 when three-dimensional data creation device 620 is a surrounding condition detection device that enables the detection of the surrounding conditions of own vehicle 600. FIG. 30 is a block diagram of the structure of three-dimensional data creation device 620A in such case. Three-dimensional data creation device 620A shown in FIG. 30 further includes detection region determiner 627, surrounding condition detector 628, and autonomous operation controller 629, in addition to the components of three-dimensional data creation device 620 shown in FIG. 26. Three-dimensional data creation device 620A is included in own vehicle 600.

Figure 31:
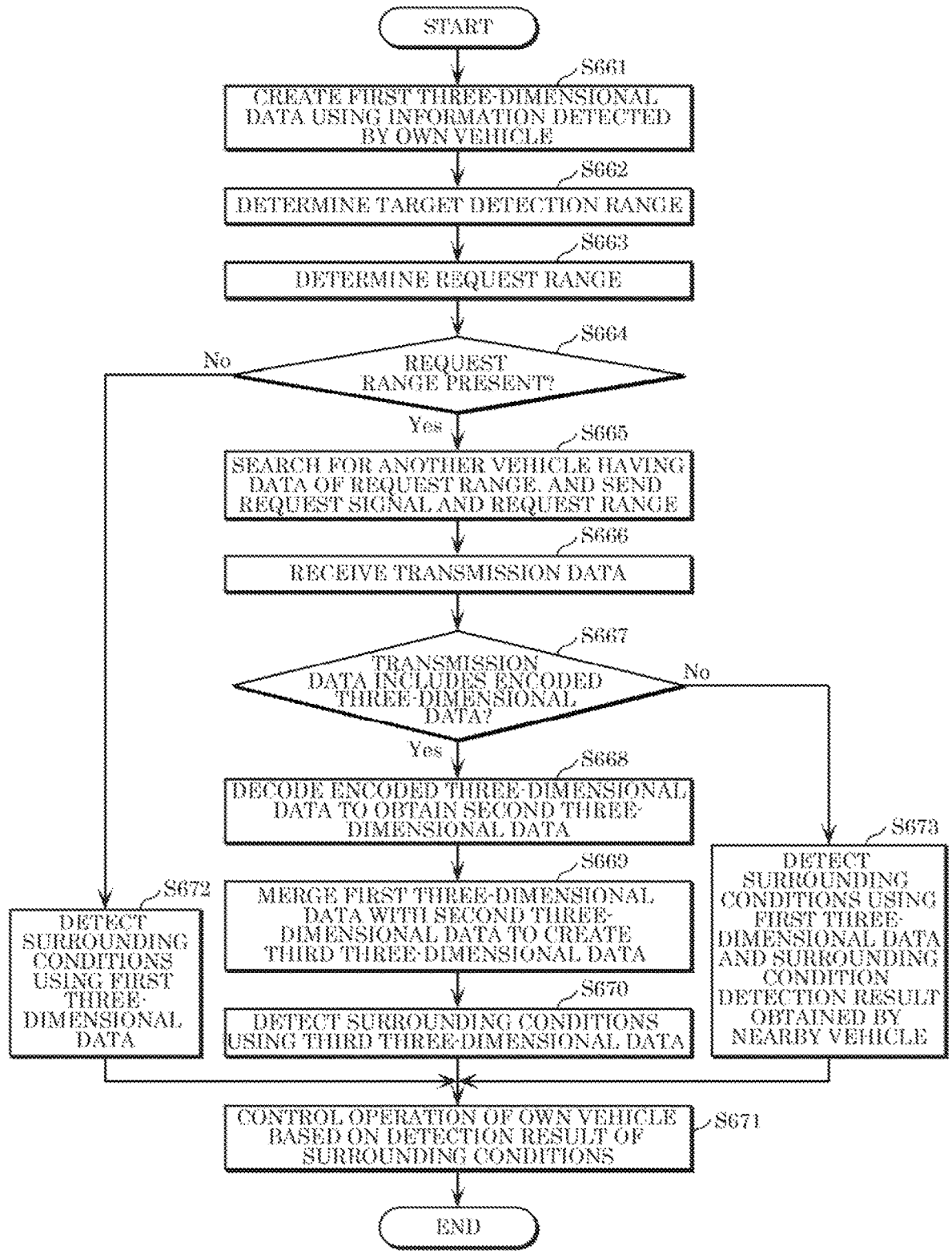
FIG. 31 is a flowchart of the processes of creating three-dimensional data according to Embodiment 3.

FIG. 31 is a flowchart of processes, performed by three-dimensional data creation device 620A, of detecting the surrounding conditions of own vehicle 600.

First, three-dimensional data creator 621 creates first three-dimensional data 632, which is a point cloud, by use of sensor information 631 on the detection range of own vehicle 600 detected by the sensor of own vehicle 600 (S661). Note that three-dimensional data creation device 620A may further estimate the self-location by use of sensor information 631.

Next, detection region determiner 627 determines a target detection range, which is a spatial region, the surrounding conditions of which are wished to be detected (S662). For example, detection region determiner 627 calculates a region that is necessary for the detection of the surrounding conditions, which is an operation required for safe autonomous operations (self-driving), in accordance with the conditions of autonomous operations, such as the direction and speed of traveling of own vehicle 600, and determines such region as the target detection range.

Next, request range determiner 622 determines, as a request range, occlusion region 604 and a spatial region that is outside of the detection range of the sensor of own vehicle 600 but that is necessary for the detection of the surrounding conditions (S663).

When the request range determined in step S663 is present (Yes in S664), searcher 623 searches for a nearby vehicle having information on the request range. For example, searcher 623 may inquire about whether a nearby vehicle has information on the request range, or may judge whether a nearby vehicle has information on the request range, on the basis of the positions of the request range and such nearby vehicle. Next, searcher 623 sends, to nearby vehicle 601 having been searched out, request signal 637 that requests for the transmission of three-dimensional data. Searcher 623 then receives an acceptance signal from nearby vehicle 601 indicating that the request of request signal 637 has been accepted, after which searcher 623 sends request range information 633 indicating the request range to nearby vehicle 601 (S665).

Next, receiver 624 detects a notice that transmission data 638 has been transmitted, which is the information on the request range, and receives such transmission data 638 (S666).

Note that three-dimensional data creation device 620A may indiscriminately send requests to all vehicles in a specified range and receive transmission data 638 from a vehicle that has sent a response indicating that such vehicle has the information on the request range, without searching for a vehicle to send a request to. Searcher 623 may send a request not only to vehicles but also to an object such as a signal and a sign, and receive transmission data 638 from such object.

Transmission data 638 includes at least one of the following generated by nearby vehicle 601: encoded three-dimensional data 634, which is encoded three-dimensional data of the request range; and surrounding condition detection result 639 of the request range. Surrounding condition detection result 639 indicates the positions, traveling directions and traveling speeds, etc., of persons and vehicles detected by nearby vehicle 601. Transmission data 638 may also include information indicating the position, motion, etc., of nearby vehicle 601. For example, transmission data 638 may include braking information of nearby vehicle 601.

When the received transmission data 638 includes encoded three-dimensional data 634 (Yes in 667), decoder 625 decodes encoded three-dimensional data 634 to obtain second three-dimensional data 635 of the SWLD (S668). Stated differently, second three-dimensional data 635 is three-dimensional data (SWLD) that has been generated by extracting data having an amount of features greater than or equal to the threshold from fourth three-dimensional data (WLD).

Next, merger 626 merges first three-dimensional data 632 with second three-dimensional data 635, thereby generating third three-dimensional data 636 (S669).

Next, surrounding condition detector 628 detects the surrounding conditions of own vehicle 600 by use of third three-dimensional data 636, which is a point cloud of a spatial region necessary to detect the surrounding conditions (S670). Note that when the received transmission data 638 includes surrounding condition detection result 639, surrounding condition detector 628 detects the surrounding conditions of own vehicle 600 by use of surrounding condition detection result 639, in addition to third three-dimensional data 636. When the received transmission data 638 includes the braking information of nearby vehicle 601, surrounding condition detector 628 detects the surrounding conditions of own vehicle 600 by use of such braking information, in addition to third three-dimensional data 636.

Next, autonomous operation controller 629 controls the autonomous operations (self-driving) of own vehicle 600 on the basis of the surrounding condition detection result obtained by surrounding condition detector 628 (S671). Note that the surrounding condition detection result may be presented to the driver via a user interface (UI), etc.

Meanwhile, when the request range is not present in step S663 (No in S664), or stated differently, when information on all spatial regions necessary to detect the surrounding conditions has been created on the basis of sensor information 631, surrounding condition detector 628 detects the surrounding conditions of own vehicle 600 by use of first three-dimensional data 632, which is the point cloud of the spatial region necessary to detect the surrounding conditions (S672). Then, autonomous operation controller 629 controls the autonomous operations (self-driving) of own vehicle 600 on the basis of the surrounding condition detection result obtained by surrounding condition detector 628 (S671).

Meanwhile, when the received transmission data 638 does not include encoded three-dimensional data 634 (No in S667), or stated differently, when transmission data 638 includes only surrounding condition detection result 639 or the braking information of nearby vehicle 601, surrounding condition detector 628 detects the surrounding conditions of own vehicle 600 by use of first three-dimensional data 632, and surrounding condition detection result 639 or the braking information (S673). Then, autonomous operation controller 629 controls the autonomous operations (self-driving) of own vehicle 600 on the basis of the surrounding condition detection result obtained by surrounding condition detector 628 (S671).

Figure 32:
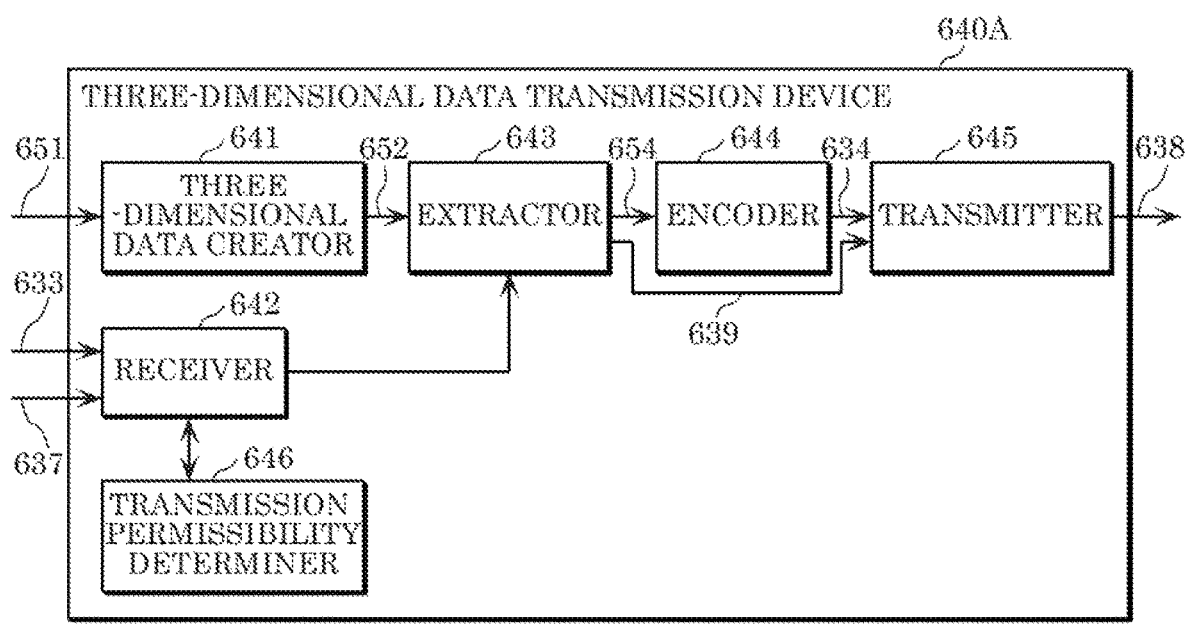
FIG. 32 is a block diagram of a three-dimensional data transmission device according to Embodiment 3.

Next, three-dimensional data transmission device 640A will be described that transmits transmission data 638 to the above-described three-dimensional data creation device 620A. FIG. 32 is a block diagram of such three-dimensional data transmission device 640A.

Three-dimensional data transmission device 640A shown in FIG. 32 further includes transmission permissibility judgment unit 646, in addition to the components of three-dimensional data transmission device 640 shown in FIG. 28. Three-dimensional data transmission device 640A is included in nearby vehicle 601.

Figure 33:
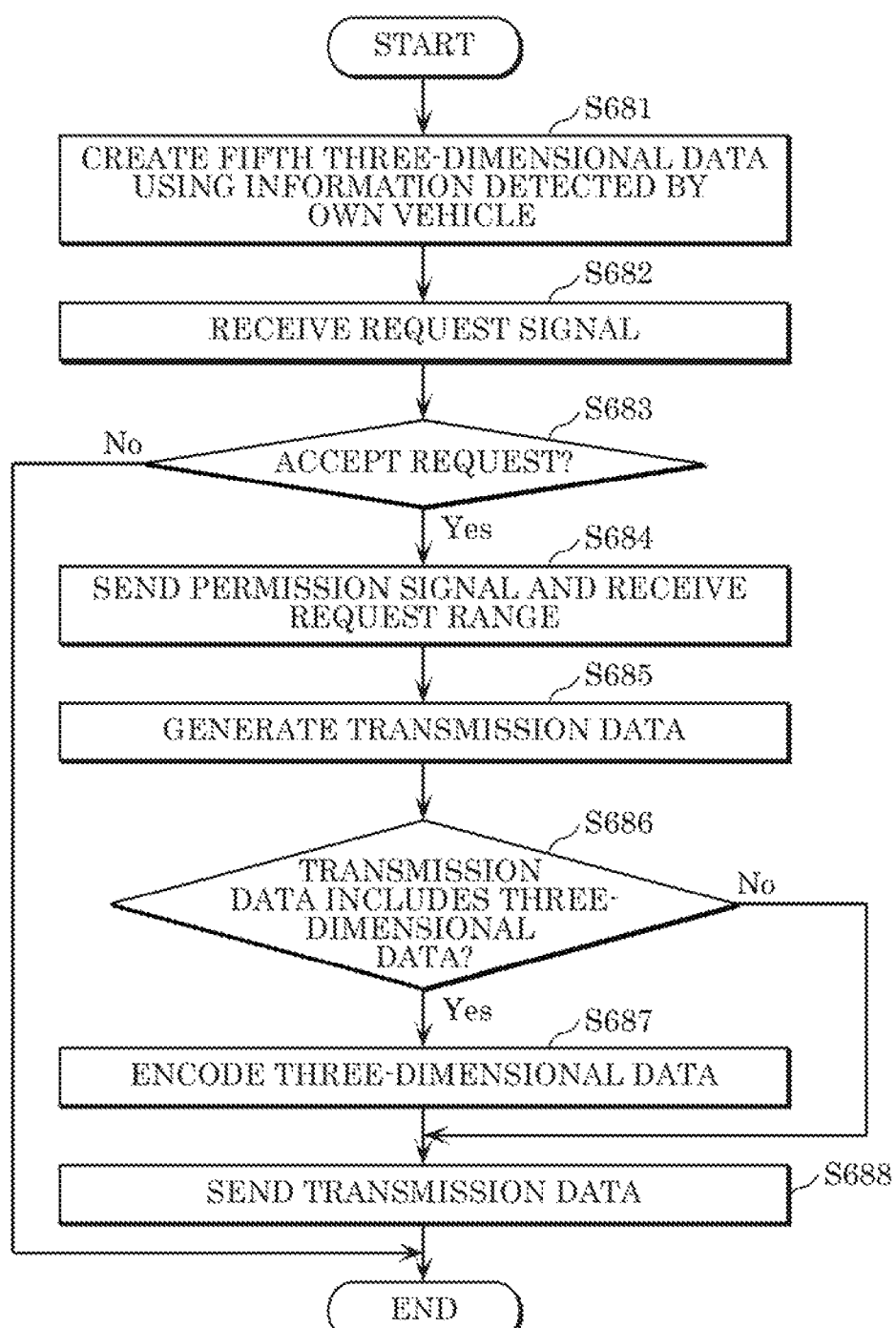
FIG. 33 is a flowchart of the processes of transmitting three-dimensional data according to Embodiment 3.

FIG. 33 is a flowchart of example operations performed by three-dimensional data transmission device 640A. First, three-dimensional data creator 641 creates fifth three-dimensional data 652 by use of sensor information 651 detected by the sensor included in nearby vehicle 601 (S681).

Next, receiver 642 receives from own vehicle 600 request signal 637 that requests for the transmission of three-dimensional data (S682). Next, transmission permissibility judgment unit 646 determines whether to accept the request indicated by request signal 637 (S683). For example, transmission permissibility judgment unit 646 determines whether to accept the request on the basis of the details previously set by the user. Note that receiver 642 may receive a request from the other end such as a request range beforehand, and transmission permissibility judgment unit 646 may determine whether to accept the request in accordance with the details of such request. For example, transmission permissibility judgment unit 646 may determine to accept the request when the three-dimensional data transmission device has the three-dimensional data of the request range, and not to accept the request when the three-dimensional data transmission device does not have the three-dimensional data of the request range.

When determining to accept the request (Yes in S683), three-dimensional data transmission device 640A sends a permission signal to own vehicle 600, and receiver 642 receives request range information 633 indicating the request range (S684). Next, extractor 643 extracts the point cloud of the request range from fifth three-dimensional data 652, which is a point cloud, and creates transmission data 638 that includes sixth three-dimensional data 654, which is the SWLD of the extracted point cloud (S685).

Stated differently, three-dimensional data transmission device 640A creates seventh three-dimensional data (WLD) from sensor information 651, and extracts data having an amount of features greater than or equal to the threshold from seventh three-dimensional data (WLD), thereby creating fifth three-dimensional data 652 (SWLD). Note that three-dimensional data creator 641 may create three-dimensional data of a SWLD beforehand, from which extractor 643 may extract three-dimensional data of a SWLD of the request range. Alternatively, extractor 643 may generate three-dimensional data of the SWLD of the request range from the three-dimensional data of the WLD of the request range.

Transmission data 638 may include surrounding condition detection result 639 of the request range obtained by nearby vehicle 601 and the braking information of nearby vehicle 601. Transmission data 638 may include only at least one of surrounding condition detection result 639 of the request range obtained by nearby vehicle 601 and the braking information of nearby vehicle 601, without including sixth three-dimensional data 654.

When transmission data 638 includes sixth three-dimensional data 654 (Yes in S686), encoder 644 encodes sixth three-dimensional data 654 to generate encoded three-dimensional data 634 (S687).

Then, transmitter 645 sends to own vehicle 600 transmission data 638 that includes encoded three-dimensional data 634 (S688).

Meanwhile, when transmission data 638 does not include sixth three-dimensional data 654 (No in S686), transmitter 645 sends to own vehicle 600 transmission data 638 that includes at least one of surrounding condition detection result 639 of the request range obtained by nearby vehicle 601 and the braking information of nearby vehicle 601 (S688).

The following describes variations of the present embodiment.

For example, information transmitted from nearby vehicle 601 may not be three-dimensional data or a surrounding condition detection result generated by the nearby vehicle, and thus may be accurate keypoint information on nearby vehicle 601 itself. Own vehicle 600 corrects keypoint information on the preceding vehicle in the point cloud obtained by own vehicle 600 by use of such keypoint information of nearby vehicle 601. This enables own vehicle 600 to increase the matching accuracy at the time of self-location estimation.

The keypoint information of the preceding vehicle is, for example, three-dimensional point information that includes color information and coordinates information. This allows for the use of the keypoint information of the preceding vehicle independently of the type of the sensor of own vehicle 600, i.e., regardless of whether the sensor is a laser sensor or a stereo camera.

Own vehicle 600 may use the point cloud of a SWLD not only at the time of transmission, but also at the time of calculating the accuracy of self-location estimation. For example, when the sensor of own vehicle 600 is an imaging device such as a stereo camera, own vehicle 600 detects two-dimensional points on an image captured by the camera of own vehicle 600, and uses such two-dimensional points to estimate the self-location. Own vehicle 600 also creates a point cloud of a nearby object at the same time of estimating the self-location. Own vehicle 600 re-projects the three-dimensional points of the SWLD included in the point cloud onto the two-dimensional image, and evaluates the accuracy of self-location estimation on the basis of an error between the detected points and the re-projected points on the two-dimensional image.

When the sensor of own vehicle 600 is a laser sensor such as a LIDAR, own vehicle 600 evaluates the accuracy of self-location estimation on the basis of an error calculated by Interactive Closest Point algorithm by use of the SWLD of the created point cloud of and the SWLD of the three-dimensional map.

When a communication state via a base station or a server is poor in, for example, a 5G environment, own vehicle 600 may obtain a three-dimensional map from nearby vehicle 601.

Also, own vehicle 600 may obtain information on a remote region that cannot be obtained from a nearby vehicle, over inter-vehicle communication. For example, own vehicle 600 may obtain information on a traffic accident, etc. that has just occurred at a few hundred meters or a few kilometers away from own vehicle 600 from an oncoming vehicle over a passing communication, or by a relay system in which information is sequentially passed to nearby vehicles. Here, the data format of the data to be transmitted is transmitted as meta-information in an upper layer of a dynamic three-dimensional map.

The result of detecting the surrounding conditions and the information detected by own vehicle 600 may be presented to the user via a UI. The presentation of such information is achieved, for example, by superimposing the information onto the screen of the car navigation system or the front window.

In the case of a vehicle not supporting self-driving but having the functionality of cruise control, the vehicle may identify a nearby vehicle traveling in the self-driving mode, and track such nearby vehicle.

Own vehicle 600 may switch the operation mode from the self-driving mode to the tracking mode to track a nearby vehicle, when failing to estimate the self-location for the reason such as failing to obtain a three-dimensional map or having too large a number of occlusion regions.

Meanwhile, a vehicle to be tracked may include a UI which warns the user of that the vehicle is being tracked and by which the user can specify whether to permit tracking. In this case, a system may be provided in which, for example, an advertisement is displayed to the vehicle that is tracking and an incentive is given to the vehicle that is being tracked.

The information to be transmitted is basically a SWLD being three-dimensional data, but may also be information that is in accordance with request settings set in own vehicle 600 or public settings set in a preceding vehicle. For example, the information to be transmitted may be a WLD being a dense point cloud, the detection result of the surrounding conditions obtained by the preceding vehicle, or the braking information of the preceding vehicle.

Own vehicle 600 may also receive a WLD, visualize the three-dimensional data of the WLD, and present such visualized three-dimensional data to the driver by use of a GUI. In so doing, own vehicle 600 may present the three-dimensional data in which information is color-coded, for example, so that the user can distinguish between the point cloud created by own vehicle 600 and the received point cloud.

When presenting the information detected by own vehicle 600 and the detection result of nearby vehicle 601 to the driver via the GUI, own vehicle 600 may present the information in which information is color-coded, for example, so that the user can distinguish between the information detected by own vehicle 600 and the received detection result.

As described above, in three-dimensional data creation device 620 according to the present embodiment, three-dimensional data creator 621 creates first three-dimensional data 632 from sensor information 631 detected by a sensor. Receiver 624 receives encoded three-dimensional data 634 that is obtained by encoding second three-dimensional data 635. Decoder 625 decodes received encoded three-dimensional data 634 to obtain second three-dimensional data 635. Merger 626 merges first three-dimensional data 632 with second three-dimensional data 635 to create third three-dimensional data 636.

Such three-dimensional data creation device 620 is capable of creating detailed third three-dimensional data 636 by use of created first three-dimensional data 632 and received second three-dimensional data 635.

Also, merger 626 merges first three-dimensional data 632 with second three-dimensional data 635 to create third three-dimensional data 636 that is denser than first three-dimensional data 632 and second three-dimensional data 635.

Second three-dimensional data 635 (e.g., SWLD) is three-dimensional data that is generated by extracting, from fourth three-dimensional data (e.g., WLD), data having an amount of a feature greater than or equal to the threshold.

Such three-dimensional data creation device 620 reduces the amount of three-dimensional data to be transmitted.

Three-dimensional data creation device 620 further includes searcher 623 that searches for a transmission device that transmits encoded three-dimensional data 634. Receiver 624 receives encoded three-dimensional data 634 from the transmission device that has been searched out.

Such three-dimensional data creation device 620 is, for example, capable of searching for a transmission device having necessary three-dimensional data.

Such three-dimensional data creation device further includes request range determiner 622 that determines a request range that is a range of a three-dimensional space, the three-dimensional of which is requested. Searcher 623 transmits request range information 633 indicating the request range to the transmission device. Second three-dimensional data 635 includes the three-dimensional data of the request range.

Such three-dimensional data creation device 620 is capable of receiving necessary three-dimensional data, while reducing the amount of three-dimensional data to be transmitted.

Also, request range determiner 622 determines, as the request range, a spatial range that includes occlusion region 604 undetectable by the sensor.

Also, in three-dimensional data transmission device 640 according to the present embodiment, three-dimensional data creator 641 creates fifth three-dimensional data 652 from sensor information 651 detected by the sensor. Extractor 643 extracts part of fifth three-dimensional data 652 to create sixth three-dimensional data 654. Encoder 644 encodes sixth three-dimensional data 654 to generate encoded three-dimensional data 634. Transmitter 645 transmits encoded three-dimensional data 634.

Such three-dimensional data transmission device 640 is capable of transmitting self-created three-dimensional data to another device, while reducing the amount of three-dimensional data to be transmitted.

Also, three-dimensional data creator 641 creates seventh three-dimensional data (e.g., WLD) from sensor information 651 detected by the sensor, and extracts, from the seventh three-dimensional data, data having an amount of a feature greater than or equal to the threshold, to create fifth three-dimensional data 652 (e.g., SWLD).

Such three-dimensional data creation device 640 reduces the amount of three-dimensional data to be transmitted.

Three-dimensional data transmission device 640 further includes receiver 642 that receives, from the reception device, request range information 633 indicating the request range that is the range of a three-dimensional space, the three-dimensional data of which is requested. Extractor 643 extracts the three-dimensional data of the request range from fifth three-dimensional data 652 to create sixth three-dimensional data 654. Transmitter 645 transmits encoded three-dimensional data 634 to the reception device.

Such three-dimensional data transmission device 640 reduces the amount of three-dimensional data to be transmitted.

Embodiment 4

The present embodiment describes operations performed in abnormal cases when self-location estimation is performed on the basis of a three-dimensional map.

A three-dimensional map is expected to find its expanded use in self-driving of a vehicle and autonomous movement, etc. of a mobile object such as a robot and a flying object (e.g., a drone). Example means for enabling such autonomous movement include a method in which a mobile object travels in accordance with a three-dimensional map, while estimating its self-location on the map (self-location estimation).

The self-location estimation is enabled by matching a three-dimensional map with three-dimensional information on the surrounding of the own vehicle (hereinafter referred to as self-detected three-dimensional data) obtained by a sensor equipped in the own vehicle, such as a rangefinder (e.g., a LiDAR) and a stereo camera to estimate the location of the own vehicle on the three-dimensional map.

As in the case of an HD map suggested by HERE Technologies, for example, a three-dimensional map may include not only a three-dimensional point cloud, but also two-dimensional map data such as information on the shapes of roads and intersections, or information that changes in real-time such as information on a traffic jam and an accident. A three-dimensional map includes a plurality of layers such as layers of three-dimensional data, two-dimensional data, and meta-data that changes in real-time, from among which the device can obtain or refer to only necessary data.

Point cloud data may be a SWLD as described above, or may include point group data that is different from keypoints. The transmission/reception of point cloud data is basically carried out in one or more random access units.

A method described below is used as a method of matching a three-dimensional map with self-detected three-dimensional data. For example, the device compares the shapes of the point groups in each other's point clouds, and determines that portions having a high degree of similarity among keypoints correspond to the same position. When the three-dimensional map is formed by a SWLD, the device also performs matching by comparing the keypoints that form the SWLD with three-dimensional keypoints extracted from the self-detected three-dimensional data.

Here, to enable highly accurate self-location estimation, the following needs to be satisfied: (A) the three-dimensional map and the self-detected three-dimensional data have been already obtained; and (B) their accuracies satisfy a predetermined requirement. However, one of (A) and (B) cannot be satisfied in abnormal cases such as ones described below.

1. A three-dimensional map is unobtainable over communication.
2. A three-dimensional map is not present, or a three-dimensional map having been obtained is corrupt.
3. A sensor of the own vehicle has trouble, or the accuracy of the generated self-detected three-dimensional data is inadequate due to bad weather.

The following describes operations to cope with such abnormal cases. The following description illustrates an example case of a vehicle, but the method described below is applicable to mobile objects on the whole that are capable of autonomous movement, such as a robot and a drone.

Figure 34:
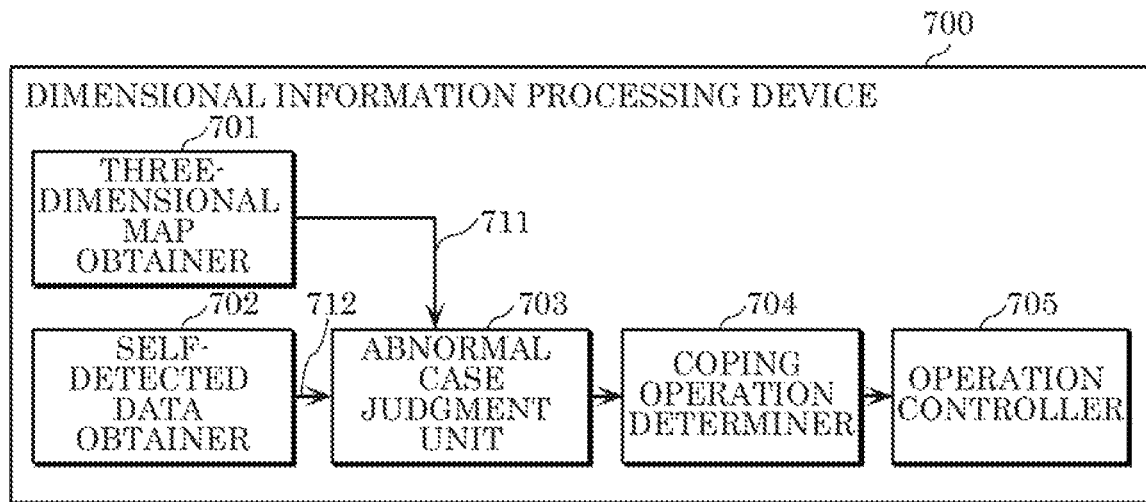
FIG. 34 is a block diagram of a three-dimensional information processing device according to Embodiment 4.
Figure 35:
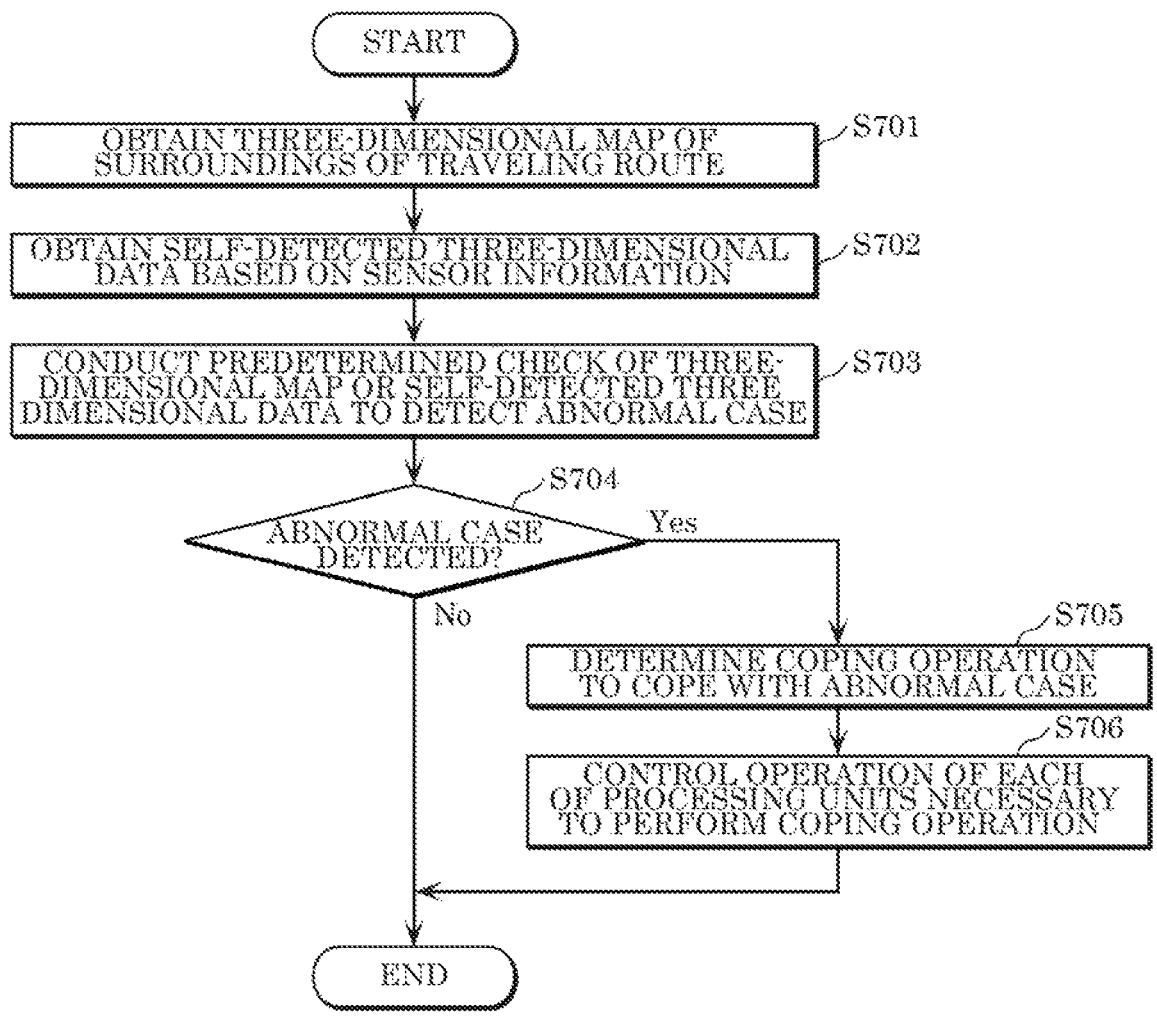
FIG. 35 is a flowchart of a three-dimensional information processing method according to Embodiment 4.

The following describes the structure of the three-dimensional information processing device and its operation according to the present embodiment capable of coping with abnormal cases regarding a three-dimensional map or self-detected three-dimensional data. FIG. 34 is a block diagram of an example structure of three-dimensional information processing device 700 according to the present embodiment. FIG. 35 is a flowchart of a three-dimensional information processing method performed by three-dimensional information processing device 700.

Three-dimensional information processing device 700 is equipped, for example, in a mobile object such as a car. As shown in FIG. 34, three-dimensional information processing device 700 includes three-dimensional map obtainer 701, self-detected data obtainer 702, abnormal case judgment unit 703, coping operation determiner 704, and operation controller 705.

Note that three-dimensional information processing device 700 may include a non-illustrated two-dimensional or one-dimensional sensor that detects a structural object or a mobile object around the own vehicle, such as a camera capable of obtaining two-dimensional images and a sensor for one-dimensional data utilizing ultrasonic or laser. Three-dimensional information processing device 700 may also include a non-illustrated communication unit that obtains a three-dimensional map over a mobile communication network, such as 4G and 5G, or via inter-vehicle communication or road-to-vehicle communication.

As shown in FIG. 35, three-dimensional map obtainer 701 obtains three-dimensional map 711 of the surroundings of the traveling route (S701). For example, three-dimensional map obtainer 701 obtains three-dimensional map 711 over a mobile communication network, or via inter-vehicle communication or road-to-vehicle communication.

Next, self-detected data obtainer 702 obtains self-detected three-dimensional data 712 on the basis of sensor information (S702). For example, self-detected data obtainer 702 generates self-detected three-dimensional data 712 on the basis of the sensor information obtained by a sensor equipped in the own vehicle.

Next, abnormal case judgment unit 703 conducts a predetermined check of at least one of obtained three-dimensional map 711 and self-detected three-dimensional data 712 to detect an abnormal case (S703). Stated differently, abnormal case judgment unit 703 judges whether at least one of obtained three-dimensional map 711 and self-detected three-dimensional data 712 is abnormal.

When the abnormal case is detected in step S703 (Yes in S704), coping operation determiner 704 determines a coping operation to cope with such abnormal case (S705). Next, operation controller 705 controls the operation of each of the processing units necessary to perform the coping operation (S706).

Meanwhile, when no abnormal case is detected in step S703 (No in S704), three-dimensional information processing device 700 terminates the process.

Also, three-dimensional information processing device 700 estimates the location of the vehicle equipped with three-dimensional information processing device 700, using three-dimensional map 711 and self-detected three-dimensional data 712. Next, three-dimensional information processing device 700 performs the automatic operation of the vehicle by use of the estimated location of the vehicle.

As described above, three-dimensional information processing device 700 obtains, via a communication channel, map data (three-dimensional map 711) that includes first three-dimensional position information. The first three-dimensional position information includes, for example, a plurality of random access units, each of which is an assembly of at least one subspace and is individually decodable, the at least one subspace having three-dimensional coordinates information and serving as a unit in which each of the plurality of random access units is encoded. The first three-dimensional position information is, for example, data (SWLD) obtained by encoding keypoints, each of which has an amount of a three-dimensional feature greater than or equal to a predetermined threshold.

Three-dimensional information processing device 700 also generates second three-dimensional position information (self-detected three-dimensional data 712) from information detected by a sensor. Three-dimensional information processing device 700 then judges whether one of the first three-dimensional position information and the second three-dimensional position information is abnormal by performing, on one of the first three-dimensional position information and the second three-dimensional position information, a process of judging whether an abnormality is present.

Three-dimensional information processing device 700 determines a coping operation to cope with the abnormality when one of the first three-dimensional position information and the second three-dimensional position information is judged to be abnormal. Three-dimensional information processing device 700 then executes a control that is required to perform the coping operation.

This structure enables three-dimensional information processing device 700 to detect an abnormality regarding one of the first three-dimensional position information and the second three-dimensional position information, and to perform a coping operation therefor.

The following describes coping operations used for the abnormal case 1 in which three-dimensional map 711 is unobtainable via communication.

Three-dimensional map 711 is necessary to perform self-location estimation, and thus the vehicle needs to obtain three-dimensional map 711 via communication when not having obtained in advance three-dimensional map 711 corresponding to the route to the destination. In some cases, however, the vehicle cannot obtain three-dimensional map 711 of the traveling route due to a reason such as a congested communication channel and a deteriorated environment of radio wave reception.

Abnormal case judgment unit 703 judges whether three-dimensional map 711 of the entire section on the route to the destination or a section within a predetermined range from the current position has already been obtained, and judges that the current condition applies to the abnormal case 1 when three-dimensional map 711 has not been obtained yet. Stated differently, abnormal case judgment unit 703 judges whether three-dimensional map 711 (the first three-dimensional position information) is obtainable via a communication channel, and judges that three-dimensional map 711 is abnormal when three-dimensional map 711 is unobtainable via a communication channel.

When the current condition is judged to be the abnormal case 1, coping operation determiner 704 selects one of the two types of coping operations: (1) continue the self-location estimation; and (2) terminate the self-location estimation.

First, a specific example of the coping operation (1) continue the self-location estimation will be described. Three-dimensional map 711 of the route to the destination is necessary to continue the self-location estimation.

For example, the vehicle identifies a place, within the range of three-dimensional map 711 having been obtained, in which the use of a communication channel is possible. The vehicle moves to such identified place, and obtains three-dimensional map 711. Here, the vehicle may obtain the whole three-dimensional map 711 to the destination, or may obtain three-dimensional map 711 on random access units within the upper limit capacity of a storage of the own vehicle, such as a memory and an HDD.

Note that the vehicle may separately obtain communication conditions on the route, and when the communication conditions on the route are predicted to be poor, the vehicle may obtain in advance three-dimensional map 711 of a section in which communication conditions are predicted to be poor, before arriving at such section, or obtain in advance three-dimensional map 711 of the maximum range obtainable. Stated differently, three-dimensional information processing device 700 predicts whether the vehicle will enter an area in which communication conditions are poor. When the vehicle is predicted to enter an area in which communication conditions are poor, three-dimensional information processing device 700 obtains three-dimensional map 711 before the vehicle enters such area.

Alternatively, the vehicle may identify a random access unit that forms the minimum three-dimensional map 711, the range of which is narrower than that of the normal times, required to estimate the location of the vehicle on the route, and receive a random access unit having been identified. Stated differently, three-dimensional information processing device 700 may obtain, via a communication channel, third three-dimensional position information having a narrower range than the range of the first three-dimensional position information, when three-dimensional map 711 (the first three-dimensional position information) is unobtainable via the communication channel.

Also, when being unable to access a server that distributes three-dimensional map 711, the vehicle may obtain three-dimensional map 711 from a mobile object that has already obtained three-dimensional map 711 of the route to the destination and that is capable of communicating with the own vehicle, such as another vehicle traveling around the own vehicle.

Next, a specific example of the coping operation to terminate the self-location estimation will be described. Three-dimensional map 711 of the route to the destination is unnecessary in this case.

For example, the vehicle notifies the driver of that the vehicle cannot maintain the functionally of automatic operation, etc. that is performed on the basis of the self-location estimation, and shifts the operation mode to a manual mode in which the driver operates the vehicle.

Automatic operation is typically carried out when self-location estimation is performed, although there may be a difference in the level of automatic operation in accordance with the degree of human involvement. Meanwhile, the estimated location of the vehicle can also be used as navigation information, etc. when the vehicle is operated by a human, and thus the estimated location of the vehicle is not necessarily used for automatic operation.

Also, when being unable to use a communication channel that the vehicle usually uses, such as a mobile communication network (e.g., 4G and 5G), the vehicle checks whether three-dimensional map 711 is obtainable via another communication channel, such as road-to-vehicle Wi-Fi (registered trademark) or millimeter-wave communication, or inter-vehicle communication, and switches to one of these communication channels via which three-dimensional map 711 is obtainable.

When being unable to obtain three-dimensional map 711, the vehicle may obtain a two-dimensional map to continue automatic operation by use of such two-dimensional map and self-detected three-dimensional data 712. Stated differently, when being unable to obtain three-dimensional map 711 via a communication channel, three-dimensional information processing device 700 may obtain, via a communication channel, map data that includes two-dimensional position information (a two-dimensional map) to estimate the location of the vehicle by use of the two-dimensional position information and self-detected three-dimensional data 712.

More specifically, the vehicle uses the two-dimensional map and self-detected three-dimensional data 712 to estimate its self-location, and uses self-detected three-dimensional data 712 to detect a vehicle, a pedestrian, an obstacle, etc. around the own vehicle.

Here, the map data such as an HD map is capable of including, together with three-dimensional map 711 formed by a three-dimensional point cloud: two-dimensional map data (a two-dimensional map); simplified map data obtained by extracting, from the two-dimensional map data, characteristic information such as a road shape and an intersection; and meta-data representing real-time information such as a traffic jam, an accident, and a roadwork. For example, the map data has a layer structure in which three-dimensional data (three-dimensional map 711), two-dimensional data (a two-dimensional map), and meta-data are disposed from the bottom layer in the stated order.

Here, the two-dimensional data is smaller in data size than the three-dimensional data. It may be thus possible for the vehicle to obtain the two-dimensional map even when communication conditions are poor. Alternatively, the self-vehicle can collectively obtain the two-dimensional map of a wide range in advance when in a section in which communication conditions are good. The vehicle thus may receive a layer including the two-dimensional map without receiving three-dimensional map 711, when communication conditions are poor and it is difficult to obtain three-dimensional map 711. Note that the meta-data is small in data size, and thus the vehicle receives the meta-data without fail, regardless, for example, of communication conditions.

Example methods of self-location estimation using the two-dimensional map and self-detected three-dimensional data 712 include two methods described below.

A first method is to perform matching of two-dimensional features. More specifically, the vehicle extracts two-dimensional features from self-detected three-dimensional data 712 to perform matching between the extracted two-dimensional features and the two-dimensional map.

For example, the vehicle projects self-detected three-dimensional data 712 onto the same plane as that of the two-dimensional map, and matches the resulting two-dimensional data with the two-dimensional map. Such matching is performed by use of features of the two-dimensional images extracted from the two-dimensional data and the two-dimensional map.

When three-dimensional map 711 includes a SWLD, two-dimensional features on the same plane as that of the two-dimensional map may be stored in three-dimensional map 711 together with three-dimensional features of keypoints in a three-dimensional space. For example, identification information is assigned to two-dimensional features. Alternatively, two-dimensional features are stored in a layer different from the layers of the three-dimensional data and the two-dimensional map, and the vehicle obtains data of the two-dimensional features together with the two-dimensional map.

When the two-dimensional map shows, on the same map, information on positions having different heights from the ground (i.e., positions that are not on the same plane), such as a white line inside a road, a guardrail, and a building, the vehicle extracts features from data on a plurality of heights in self-detected three-dimensional data 712.

Also, information indicating a correspondence between keypoints on the two-dimensional map and keypoints on three-dimensional map 711 may be stored as meta-information of the map data.

A second method is to perform matching of three-dimensional features. More specifically, the vehicle obtains three-dimensional features corresponding to keypoints on the two-dimensional map, and matches the obtained three-dimensional features with three-dimensional features in self-detected three-dimensional data 712.

More specifically, three-dimensional features corresponding to keypoints on the two-dimensional map are stored in the map data. The vehicle obtains such three-dimensional features when obtaining the two-dimensional map. Note that when three-dimensional map 711 includes a SWLD, information is provided that identifies those keypoints, among the keypoints in the SWLD, that correspond to keypoints on the two-dimensional map. Such identification information enables the vehicle to determine three-dimensional features that should be obtained together with the two-dimensional map. In this case, the representation of two-dimensional positions is only required, and thus the amount of data can be reduced compared to the case of representing three-dimensional positions.

The use of the two-dimensional map to perform self-location estimation decreases the accuracy of the self-location estimation compared to the case of using three-dimensional map 711. For this reason, the vehicle judges whether the vehicle can continue automatic operation by use of the location having decreased estimation accuracy, and may continue automatic operation only when judging that the vehicle can continue automatic operation.

Whether the vehicle can continue automatic operation is affected by an environment in which the vehicle is traveling such as whether the road on which the vehicle is traveling is a road in an urban area or a road accessed less often by another vehicle or a pedestrian, such as an expressway, and the width of a road or the degree of congestion of a road (the density of vehicles or pedestrians). It is also possible to dispose, in a premise of a business place, a town, or inside a building, markers recognized by a senor such as a camera. Since a two-dimensional sensor is capable of highly accurate recognition of such markers in the specified areas, highly accurate self-location estimation is enabled by, for example, incorporating information on the positions of the markers into the two-dimensional map.

Also, by incorporating, into the map, identification information indicating whether each area corresponds to a specified area, for example, the vehicle can judge whether such vehicle is currently in a specified area. When in a specified area, the vehicle judges that the vehicle can continue automatic operation. As described above, the vehicle may judge whether the vehicle can continue automatic operation on the basis of the accuracy of self-location estimation that uses the two-dimensional map or an environment in which the vehicle is traveling.

As described above, three-dimensional information processing device 700 judges whether to perform automatic operation that utilizes the location of the vehicle having been estimated by use of the two-dimensional map and self-detected three-dimensional data 712, on the basis of an environment in which the vehicle is traveling (a traveling environment of the mobile object).

Alternatively, the vehicle may not judge whether the vehicle can continue automatic operation, but may switch levels (modes) of automatic operation in accordance with the accuracy of self-location estimation or the traveling environment of the vehicle. Here, to switch levels (modes) of automatic operation means, for example, to limit the speed, increase the degree of driver operation (lower the automatic level of automatic operation), switch to a mode in which the vehicle obtains information on the operation of a preceding vehicle to refer to it for its own operation, switch to a mode in which the vehicle obtains information on the operation of a vehicle heading for the same destination to use it for automatic operation, etc.

The map may also include information, associated with the position information, indicating a recommendation level of automatic operation for the case where the two-dimensional map is used for self-location estimation. The recommendation level may be meta-data that dynamically changes in accordance with the volume of traffic, etc. This enables the vehicle to determine a level only by obtaining information from the map without needing to judge a level every time an environment, etc. around the vehicle changes. Also, it is possible to maintain a constant level of automatic operation of individual vehicles by such plurality of vehicles referring to the same map. Note that the recommendation level may not be "recommendation," and thus such level may be a mandatory level that should be abided by.

The vehicle may also switch the level of automatic operation in accordance with the presence or absence of the driver (whether the vehicle is manned or unmanned). For example, the vehicle lowers the level of automatic operation when the vehicle is manned, and terminates automatic operation when unmanned. The vehicle may recognize a pedestrian, a vehicle, and a traffic sign around the vehicle to determine a position where the vehicle can stop safely. Alternatively, the map may include position information indicating positions where the vehicle can stop safely, and the vehicle refers to such position information to determine a position where the vehicle can stop safely.

The following describes coping operations to cope with the abnormal case 2 in which three-dimensional map 711 is not present, or three-dimensional map 711 having been obtained is corrupt.

Abnormal case judgment unit 703 checks whether the current condition applies to one of: (1) three-dimensional map 711 of part or the entirety of the section on the route to the destination not being present in a distribution server, etc. to which the vehicle accesses, and thus unobtainable; and (2) part or the entirety of obtained three-dimensional map 711 being corrupt. When one of these cases applies, the vehicle judges that the current condition applies to the abnormal case 2. Stated differently, abnormal case judgment unit 703 judges whether the data of three-dimensional map 711 has integrity, and judges that three-dimensional map 711 is abnormal when the data of three-dimensional map 711 has no integrity.

When the current condition is judged to apply to the abnormal case 2, coping operations described below are performed. First, an example coping operation for the case where (1) three-dimensional map 711 is unobtainable will be described.

For example, the vehicle sets a route that avoids a section, three-dimensional map 711 of which is not present.

When being unable to set an alternative route for a reason that an alternative route is not present, an alternative route is present but its distance is substantially longer, or etc., the vehicle sets a route that includes a section, three-dimensional map 711 of which is not present. When in such section, the vehicle notifies the driver of the necessity to switch to another operation mode, and switches the operation mode to the manual mode.

When the current condition applies to (2) in which part or the entirety of obtained three-dimensional map 711 is corrupt, a coping operation described below is performed.

The vehicle identifies a corrupted portion of three-dimensional map 711, requests for the data of such corrupted portion via communication, obtains the data of the corrupted portion, and updates three-dimensional map 711 using the obtained data. In so doing, the vehicle may specify the corrupted portion on the basis of position information in three-dimensional map 711, such as absolute coordinates and relative coordinates, or may specify the corrupted portion by an index number, etc. assigned to a random access unit that forms the corrupted portion. In such case, the vehicle replaces the random access unit including the corrupted portion with a random access unit having been obtained.

The following describes coping operations to cope with the abnormal case 3 in which the vehicle fails to generate self-detected three-dimensional data 712 due to trouble of a sensor of the own vehicle or bad weather.

Abnormal case judgment unit 703 checks whether an error in generated self-detected three-dimensional data 712 falls within an acceptable range, and judges that the current condition applies to the abnormal case 3 when such error is beyond the acceptable range. Stated differently, abnormal case judgment unit 703 judges whether the data accuracy of generated self-detected three-dimensional data 712 is higher than or equal to the reference value, and judges that self-detected three-dimensional data 712 is abnormal when the data accuracy of generated self-detected three-dimensional data 712 is not higher than or equal to the reference value.

A method described below is used to check whether an error in generated self-detected three-dimensional data 712 is within the acceptable range.

A spatial resolution of self-detected three-dimensional data 712 when the own vehicle is in normal operation is determined in advance on the basis of the resolutions in the depth and scanning directions of a three-dimensional sensor of the own vehicle, such as a rangefinder and a stereo camera, or on the basis of the density of generatable point groups. Also, the vehicle obtains the spatial resolution of three-dimensional map 711 from meta-information, etc. included in three-dimensional map 711.

The vehicle uses the spatial resolutions of self-detected three-dimensional data 712 and three-dimensional map 711 to estimate a reference value used to specify a matching error in matching self-detected three-dimensional data 712 with three-dimensional map 711 on the basis of three-dimensional features, etc. Used as the matching error is an error in three-dimensional features of the respective keypoints, statistics such as the mean value of errors in three-dimensional features among a plurality of keypoints, or an error in spatial distances among a plurality of keypoints. The acceptable range of a deviation from the reference value is set in advance.

The vehicle judges that the current condition applies to the abnormal case 3 when the matching error between self-detected three-dimensional data 712 generated before or in the middle of traveling and three-dimensional map 711 is beyond the acceptable range.

Alternatively, the vehicle may use a test pattern having a known three-dimensional shape for accuracy check to obtain, before the start of traveling, for example, self-detected three-dimensional data 712 corresponding to such test pattern, and judge whether the current condition applies to the abnormal case 3 on the basis of whether a shape error is within the acceptable range.

For example, the vehicle makes the above judgment before every start of traveling. Alternatively, the vehicle makes the above judgment at a constant time interval while traveling, thereby obtaining time-series variations in the matching error. When the matching error shows an increasing trend, the vehicle may judge that the current condition applies to the abnormal case 3 even when the error is within the acceptable range. Also, when an abnormality can be predicted on the basis of the time-series variations, the vehicle may notify the user of that an abnormality is predicted by displaying, for example, a message that prompts the user for inspection or repair. The vehicle may discriminate between an abnormality attributable to a transient factor such as bad weather and an abnormality attributable to sensor trouble on the basis of time-series variations, and notify the user only of an abnormality attributable to sensor trouble.

When the current condition is judged to be the abnormal case 3, the vehicle performs one, or selective ones of the following three types of coping operations: (1) operate an alternative emergency sensor (rescue mode); (2) switch to another operation mode; and (3) calibrate the operation of a three-dimensional sensor.

First, the coping operation (1) operate an alternative emergency sensor will be described. The vehicle operates an alternative emergency sensor that is different from a three-dimensional sensor used for normal operation. Stated differently, when the accuracy of generated self-detected three-dimensional data 712 is not higher than or equal to the reference value, three-dimensional information processing device 700 generates self-detected three-dimensional data 712 (fourth three-dimensional position information) from information detected by the alternative sensor that is different from a usual sensor.

More specifically, when obtaining self-detected three-dimensional data 712 in a combined use of a plurality of cameras or LiDARs, the vehicle identifies a malfunctioning sensor, on the basis of a direction, etc. in which the matching error of self-detected three-dimensional data 712 is beyond the acceptable range. Subsequently, the vehicle operates an alternative sensor corresponding to such malfunctioning sensor.

The alternative sensor may be a three-dimensional sensor, a camera capable of obtaining two-dimensional images, or a one-dimensional sensor such as an ultrasonic sensor. The use of an alternative sensor other than a three-dimensional sensor can result in a decrease in the accuracy of self-location estimation or the failure to perform self-location estimation. The vehicle thus may switch automatic operation modes depending on the type of an alternative sensor.

When an alternative sensor is a three-dimensional sensor, for example, the vehicle maintains the current automatic operation mode. When an alternative sensor is a two-dimensional sensor, the vehicle switches the operation mode from the full automatic operation mode to the semi-automatic operation mode that requires human operation. When an alternative sensor is a one-dimensional sensor, the vehicle switches the operation mode to the manual mode that performs no automatic braking control.

Alternatively, the vehicle may switch automatic operation modes on the basis of a traveling environment. When an alternative sensor is a two-dimensional sensor, for example, the vehicle maintains the full automatic operation mode when traveling on an expressway, and switches the operation mode to the semi-automatic operation mode when traveling in an urban area.

Also, even when no alternative sensor is available, the vehicle may continue the self-location estimation so long as a sufficient number of keypoints are obtainable only by normally operating sensors. Since detection cannot work in a specific direction in this case, the vehicle switches the current operation mode to the semi-automatic operation mode or the manual mode.

Next, the coping operation (2) switch to another operation mode will be described. The vehicle switches the current operation mode from the automatic operation mode to the manual mode. The vehicle may continue automatic operation until arriving at the shoulder of the road, or another place where the vehicle can stop safely, and then stop there. The vehicle may switch the current operation mode to the manual mode after stopping. As described above, three-dimensional information processing device 700 switches the automatic operation mode to another mode when the accuracy of generated self-detected three-dimensional data 712 is not higher than or equal to the reference value.

Next, the coping operation (3) calibrate the operation of a three-dimensional sensor will be described. The vehicle identifies a malfunctioning three-dimensional sensor from a direction, etc. in which a matching error is occurring, and calibrates the identified sensor. More specifically, when a plurality of LiDARs or cameras are used as sensors, an overlapped portion is included in a three-dimensional space reconstructed by each of the sensors. Stated differently, data corresponding to such overlapped portion is obtained by a plurality of sensors. However, a properly operating sensor and a malfunctioning sensor obtain different three-dimensional point group data corresponding to the overlapped portion. The vehicle thus calibrates the origin point of the LiDAR or adjusts the operation for a predetermined part such as one responsible for camera exposure and focus so that the malfunctioning sensor can obtain the data of a three-dimensional point group equivalent to that obtained by a properly operating sensor.

When the matching error falls within the acceptable range as a result of such adjustment, the vehicle maintains the previous operation mode. Meanwhile, when the matching accuracy fails to fall within the acceptable range after such adjustment, the vehicle performs one of the above coping operations: (1) operate an alternative emergency sensor; and (2) switch to another operation mode.

As described above, three-dimensional information processing device 700 calibrates a sensor operation when the data accuracy of generated self-detected three-dimensional data 712 is not higher than or equal to the reference value.

The following describes a method of selecting a cooping operation. A coping operation may be selected by the user such as a driver, or may be automatically selected by the vehicle without user's involvement.

The vehicle may switch controls in accordance with whether the driver is onboard. For example, when the driver is onboard, the vehicle prioritizes the manual mode. Meanwhile, when the driver is not onboard, the vehicle prioritizes the mode to move to a safe place and stop.

Three-dimensional map 711 may include information indicating places to stop as meta-information. Alternatively, the vehicle may issue, to a service firm that manages operation information on a self-driving vehicle, a request to send a reply indicating a place to stop, thereby obtaining information on the place to stop.

Also, when the vehicle travels on a fixed route, for example, the operation mode of the vehicle may be switched to a mode in which an operator controls the operation of the vehicle via a communication channel. It is highly dangerous when there is a failure in the function of self-location estimation especially when the vehicle is traveling in the full automatic operation mode. When any abnormal case is detected or a detected abnormality cannot be fixed, the vehicle notifies, via a communication channel, the service firm that manages the operation information of the occurrence of the abnormality. Such service firm may notify vehicles, etc. traveling around such vehicle in trouble of the presence of a vehicle having an abnormality or that they should clear a nearby space for the vehicle to stop.

The vehicle may also travel at a decreased speed compared to normal times when any abnormal case has been detected.

When the vehicle is a self-driving vehicle from a vehicle dispatch service such as a taxi, and an abnormal case occurs in such vehicle, the vehicle contacts an operation control center, and then stops at a safe place. The firm of the vehicle dispatch service dispatches an alternative vehicle. The user of such vehicle dispatch service may operate the vehicle instead. In these cases, fee discount or benefit points may be provided in combination.

Figure 36:
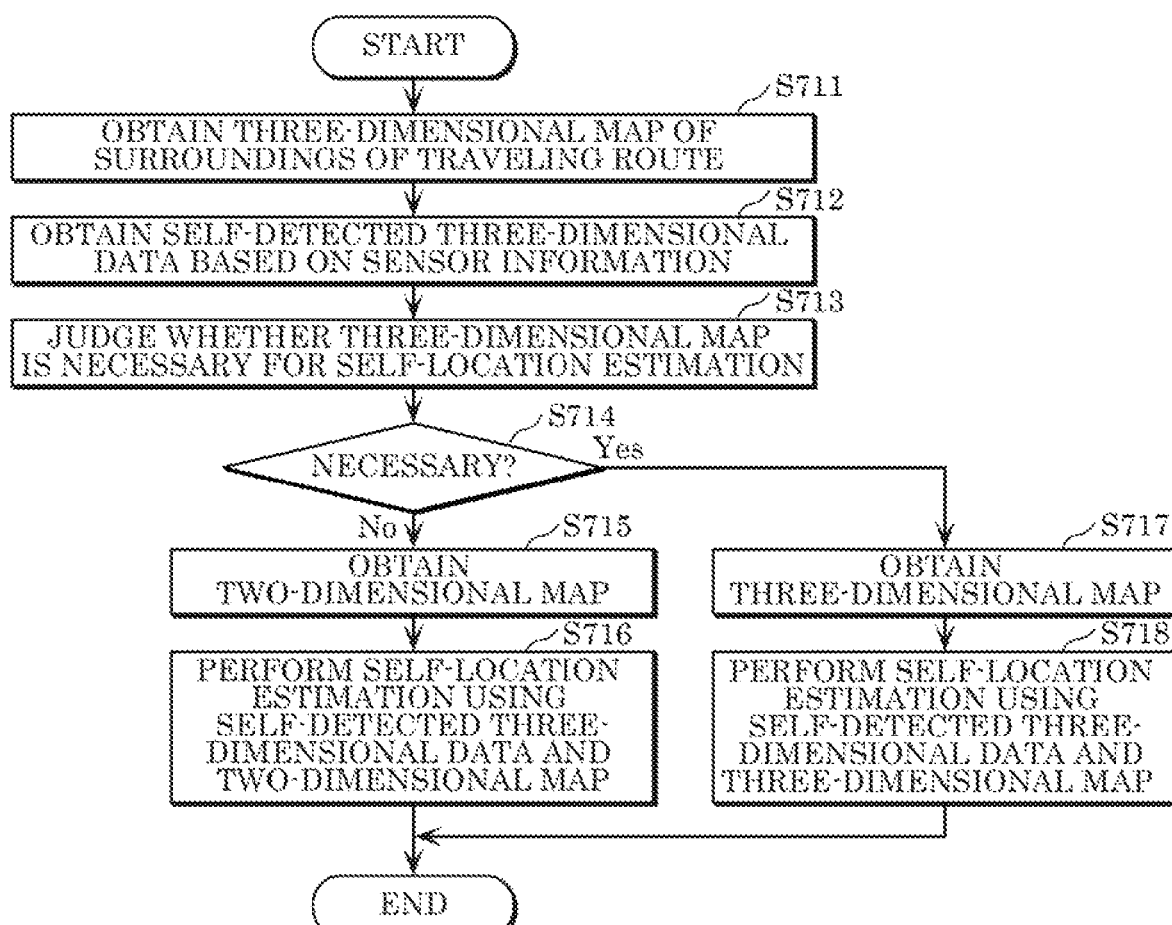
FIG. 36 is a flowchart of a three-dimensional information processing method according to Embodiment 4.

In the description of the coping operations for the abnormal case 1, self-location estimation is performed on the basis of the two-dimensional map, but self-location estimation may be performed also in normal times by use of the two-dimensional map. FIG. 36 is a flowchart of self-location estimation processes performed in such case.

First, the vehicle obtains three-dimensional map 711 of the surroundings of the traveling route (S711). The vehicle then obtains self-detected three-dimensional data 712 on the basis of sensor information (S712).

Next, the vehicle judges whether three-dimensional map 711 is necessary for self-location estimation (S713). More specifically, the vehicle judges whether three-dimensional map 711 is necessary on the basis of the accuracy of its location having been estimated by use of the two-dimensional map and the traveling environment. For example, a method similar to the above-described coping operations for the abnormal case 1 is used.

When judging that three-dimensional map 711 is not necessary (No in S714), the vehicle obtains a two-dimensional map (S715). In so doing, the vehicle may obtain additional information together that is mentioned when the coping operations for the abnormal case 1 have been described. Alternatively, the vehicle may generate a two-dimensional map from three-dimensional map 711. For example, the vehicle may generate a two-dimensional map by cutting out any plane from three-dimensional map 711.

Next, the vehicle performs self-location estimation by use of self-detected three-dimensional data 712 and the two-dimensional map (S716). Note that a method of self-location estimation by use of a two-dimensional map is similar to the above-described coping operations for the abnormal case 1.

Meanwhile, when judging that three-dimensional map 711 is necessary (Yes in S714), the vehicle obtains three-dimensional map 711 (S717). Then, the vehicle performs self-location estimation by use of self-detected three-dimensional data 712 and three-dimensional map 711 (S718).

Note that the vehicle may selectively decide on which one of the two-dimensional map and three-dimensional map 711 to basically use, in accordance with a speed supported by a communication device of the own vehicle or conditions of a communication channel. For example, a communication speed that is required to travel while receiving three-dimensional map 711 is set in advance, and the vehicle may basically use the two-dimensional map when the communication speed at the time of traveling is less than or equal to the such set value, and basically use three-dimensional map 711 when the communication speed at the time of traveling is greater than the set value. Note that the vehicle may basically use the two-dimensional map without judging which one of the two-dimensional map and the three-dimensional map to use.

Embodiment 5

Figure 37:
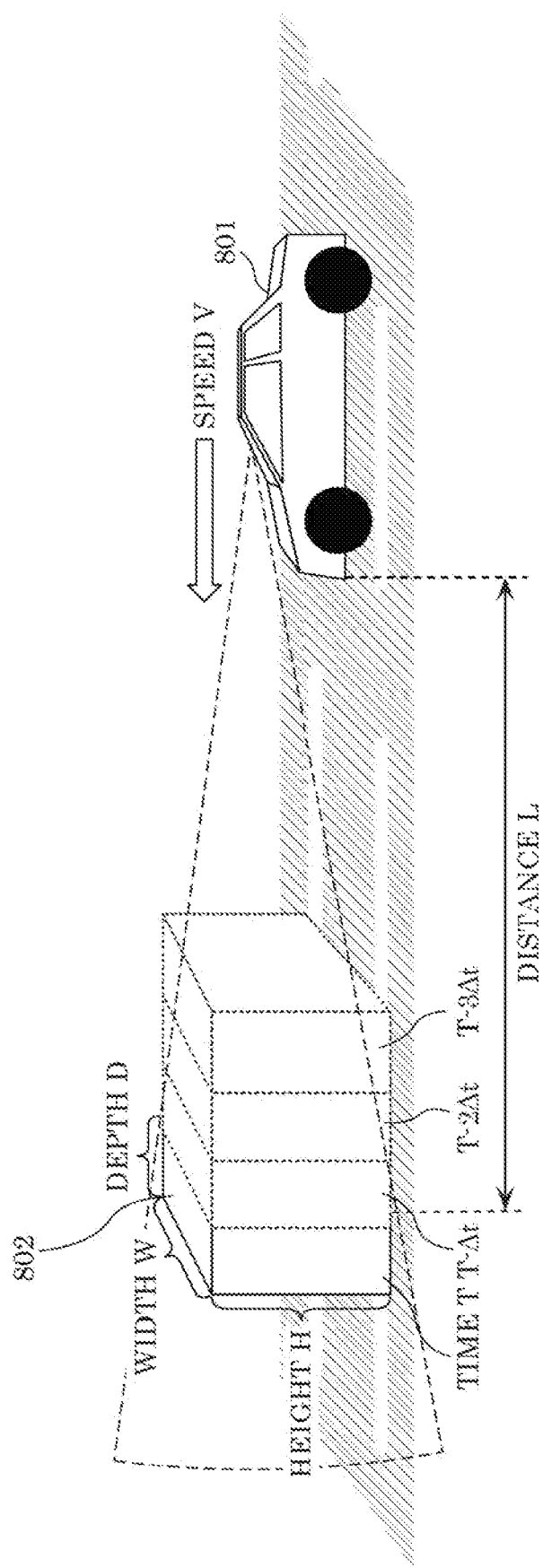
FIG. 37 is a diagram that illustrates processes of transmitting three-dimensional data according to Embodiment 5.

The present embodiment describes a method, etc. of transmitting three-dimensional data to a following vehicle. FIG. 37 is a diagram showing an exemplary space, three-dimensional data of which is to be transmitted to a following vehicle, etc.

Vehicle 801 transmits, at the time interval of $\Delta t$, three-dimensional data, such as a point cloud (a point group) included in a rectangular solid space 802, having width W, height H, and depth D, located ahead of vehicle 801 and distanced by distance L from vehicle 801, to a cloud-based traffic monitoring system that monitors road situations or a following vehicle.

When a change has occurred in the three-dimensional data of a space that is included in space 802 already transmitted in the past, due to a vehicle or a person entering space 802 from outside, for example, vehicle 801 also transmits three-dimensional data of the space in which such change has occurred.

Although FIG. 37 illustrates an example in which space 802 has a rectangular solid shape, space 802 is not necessarily a rectangular solid so long as space 802 includes a space on the forward road that is hidden from view of a following vehicle.

Distance L may be set to a distance that allows the following vehicle having received the three-dimensional data to stop safely. For example, set as distance L is the sum of; a distance traveled by the following vehicle while receiving the three-dimensional data; a distance traveled by the following vehicle until the following vehicle starts speed reduction in accordance with the received data; and a distance required by the following vehicle to stop safely after starting speed reduction. These distances vary in accordance with the speed, and thus distance L may vary in accordance with speed V of the vehicle, just like $L = a \times V + b$ (a and b are constants).

Width W is set to a value that is at least greater than the width of the lane on which vehicle 801 is traveling. Width W may also be set to a size that includes an adjacent space such as right and left lanes and a side strip.

Depth D may have a fixed value, but may vary in accordance with speed V of the vehicle, just like $D = c \times V + d$ (c and d are constants). Also, D that is set to satisfy $D > V \times \Delta t$ enables the overlap of a space to be transmitted and a space transmitted in the past. This enables vehicle 801 to transmit a space on the traveling road to the following vehicle, etc. completely and more reliably.

As described above, vehicle 801 transmits three-dimensional data of a limited space that is useful to the following vehicle, thereby effectively reducing the amount of the three-dimensional data to be transmitted and achieving low-latency, low-cost communication.

Figure 38:
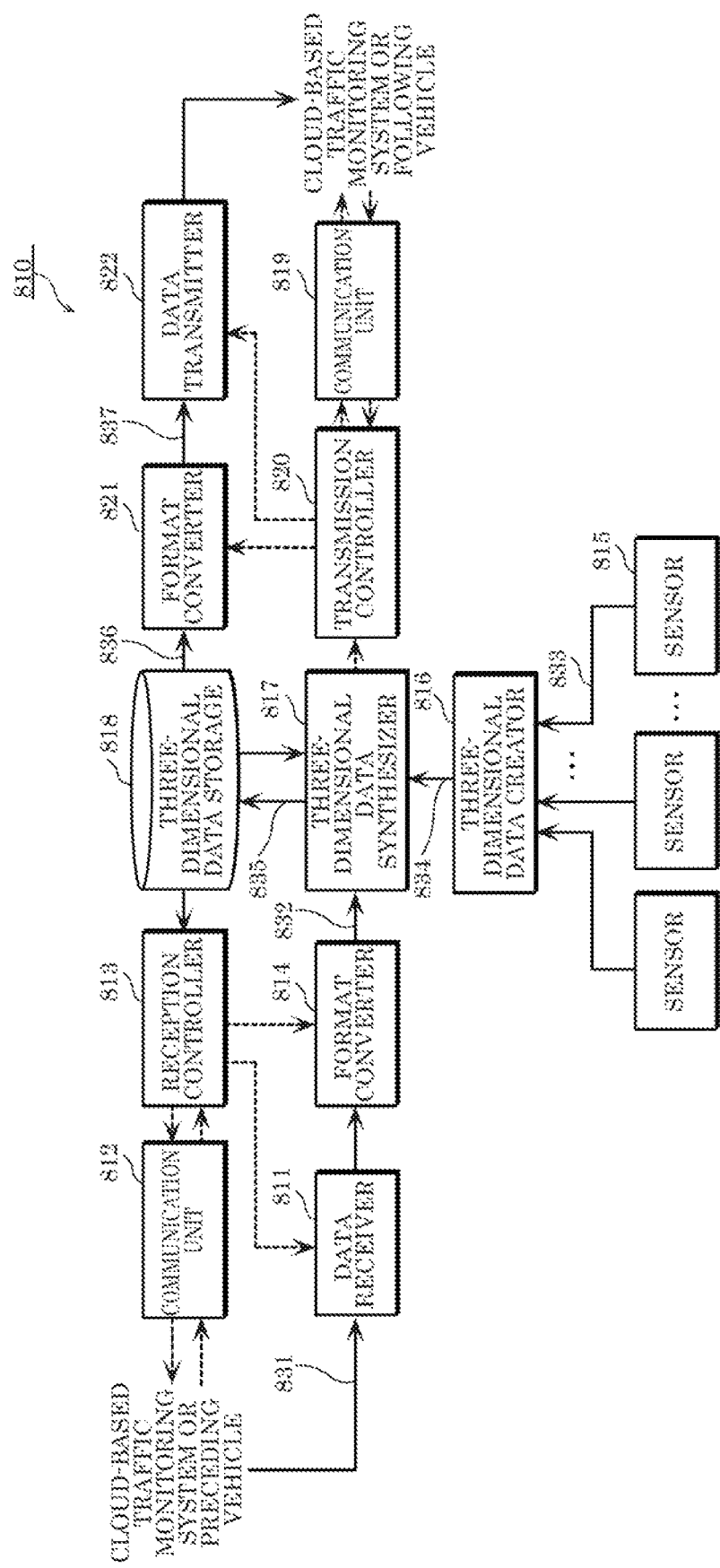
FIG. 38 is a block diagram of a three-dimensional data creation device according to Embodiment 5.

The following describes the structure of three-dimensional data creation device 810 according to the present embodiment. FIG. 38 is a block diagram of an exemplary structure of three-dimensional data creation device 810 according to the present embodiment. Such three-dimensional data creation device 810 is equipped, for example, in vehicle 801. Three-dimensional data creation device 810 transmits and receives three-dimensional data to and from an external cloud-based traffic monitoring system, a preceding vehicle, or a following vehicle, and creates and stores three-dimensional data.

Three-dimensional data creation device 810 includes data receiver 811, communication unit 812, reception controller 813, format converter 814, a plurality of sensors 815, three-dimensional data creator 816, three-dimensional data synthesizer 817, three-dimensional data storage 818, communication unit 819, transmission controller 820, format converter 821, and data transmitter 822.

Data receiver 811 receives three-dimensional data 831 from a cloud-based traffic monitoring system or a preceding vehicle. Three-dimensional data 831 includes, for example, information on a region undetectable by sensors 815 of the own vehicle, such as a point cloud, visible light video, depth information, sensor position information, and speed information.

Communication unit 812 communicates with the cloud-based traffic monitoring system or the preceding vehicle to transmit a data transmission request, etc. to the cloud-based traffic monitoring system or the preceding vehicle.

Reception controller 813 exchanges information, such as information on supported formats, with a communications partner via communication unit 812 to establish communication with the communications partner.

Format converter 814 applies format conversion, etc. on three-dimensional data 831 received by data receiver 811 to generate three-dimensional data 832. Format converter 814 also decompresses or decodes three-dimensional data 831 when three-dimensional data 831 is compressed or encoded.

A plurality of sensors 815 are a group of sensors, such as visible light cameras and infrared cameras, that obtain information on the outside of vehicle 801 and generate sensor information 833. Sensor information 833 is, for example, three-dimensional data such as a point cloud (point group data), when sensors 815 are laser sensors such as LIDARs. Note that a single sensor may serve as a plurality of sensors 815.

Three-dimensional data creator 816 generates three-dimensional data 834 from sensor information 833. Three-dimensional data 834 includes, for example, information such as a point cloud, visible light video, depth information, sensor position information, and speed information.

Three-dimensional data synthesizer 817 synthesizes three-dimensional data 834 created on the basis of sensor information 833 of the own vehicle with three-dimensional data 832 created by the cloud-based traffic monitoring system or the preceding vehicle, etc., thereby forming three-dimensional data 835 of a space that includes the space ahead of the preceding vehicle undetectable by sensors 815 of the own vehicle.

Three-dimensional data storage 818 stores generated three-dimensional data 835, etc.

Communication unit 819 communicates with the cloud-based traffic monitoring system or the following vehicle to transmit a data transmission request, etc. to the cloud-based traffic monitoring system or the following vehicle.

Transmission controller 820 exchanges information such as information on supported formats with a communications partner via communication unit 819 to establish communication with the communications partner. Transmission controller 820 also determines a transmission region, which is a space of the three-dimensional data to be transmitted, on the basis of three-dimensional data formation information on three-dimensional data 832 generated by three-dimensional data synthesizer 817 and the data transmission request from the communications partner.

More specifically, transmission controller 820 determines a transmission region that includes the space ahead of the own vehicle undetectable by a sensor of the following vehicle, in response to the data transmission request from the cloud-based traffic monitoring system or the following vehicle. Transmission controller 820 judges, for example, whether a space is transmittable or whether the already transmitted space includes an update, on the basis of the three-dimensional data formation information to determine a transmission region. For example, transmission controller 820 determines, as a transmission region, a region that is: a region specified by the data transmission request; and a region, corresponding three-dimensional data 835 of which is present. Transmission controller 820 then notifies format converter 821 of the format supported by the communications partner and the transmission region.

Of three-dimensional data 835 stored in three-dimensional data storage 818, format converter 821 converts three-dimensional data 836 of the transmission region into the format supported by the receiver end to generate three-dimensional data 837. Note that format converter 821 may compress or encode three-dimensional data 837 to reduce the data amount.

Data transmitter 822 transmits three-dimensional data 837 to the cloud-based traffic monitoring system or the following vehicle. Such three-dimensional data 837 includes, for example, information on a blind spot, which is a region hidden from view of the following vehicle, such as a point cloud ahead of the own vehicle, visible light video, depth information, and sensor position information.

Note that an example has been described in which format converter 814 and format converter 821 perform format conversion, etc., but format conversion may not be performed.

With the above structure, three-dimensional data creation device 810 obtains, from an external device, three-dimensional data 831 of a region undetectable by sensors 815 of the own vehicle, and synthesizes three-dimensional data 831 with three-dimensional data 834 that is based on sensor information 833 detected by sensors 815 of the own vehicle, thereby generating three-dimensional data 835. Three-dimensional data creation device 810 is thus capable of generating three-dimensional data of a range undetectable by sensors 815 of the own vehicle.

Three-dimensional data creation device 810 is also capable of transmitting, to the cloud-based traffic monitoring system or the following vehicle, etc., three-dimensional data of a space that includes the space ahead of the own vehicle undetectable by a sensor of the following vehicle, in response to the data transmission request from the cloud-based traffic monitoring system or the following vehicle.

Figure 39:
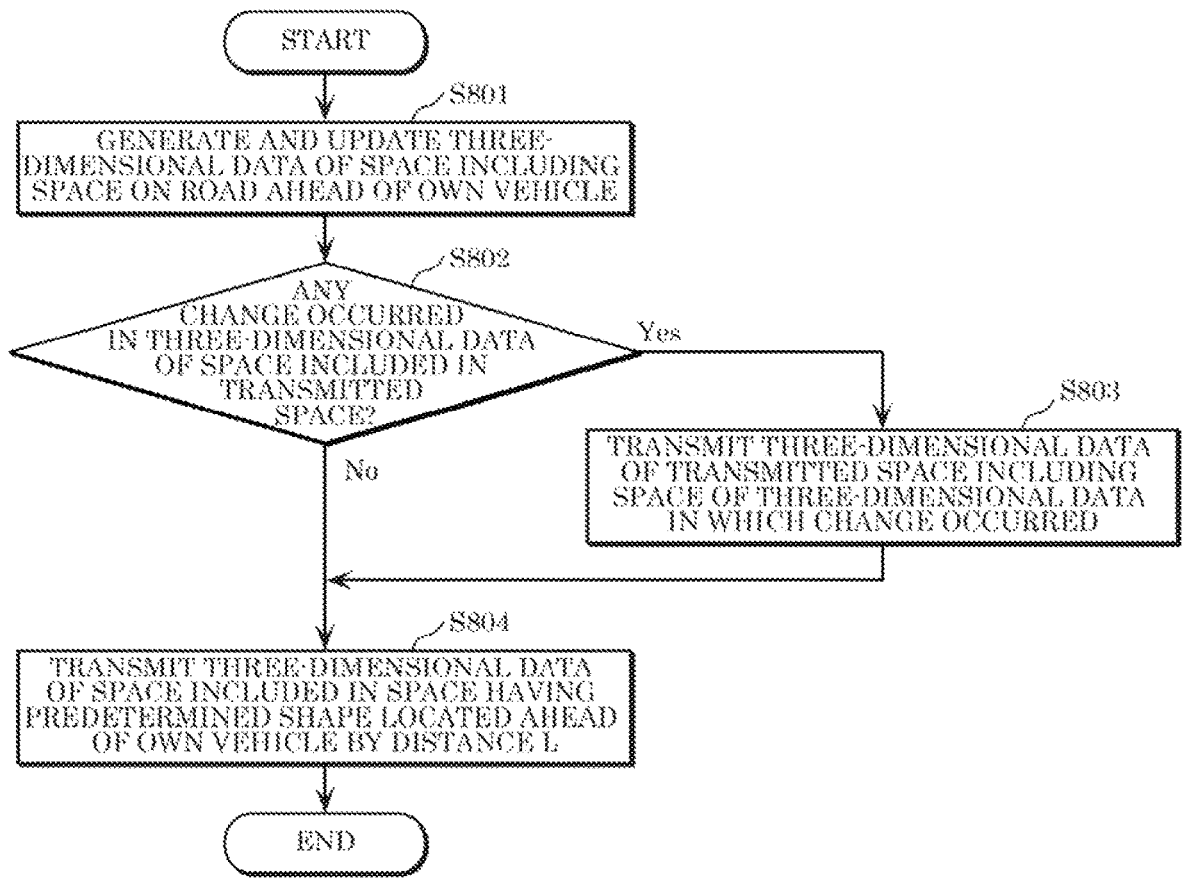
FIG. 39 is a flowchart of a three-dimensional data creation method according to Embodiment 5.

The following describes the steps performed by three-dimensional data creation device 810 of transmitting three-dimensional data to a following vehicle. FIG. 39 is a flowchart showing exemplary steps performed by three-dimensional data creation device 810 of transmitting three-dimensional data to a cloud-based traffic monitoring system or a following vehicle.

First, three-dimensional data creation device 810 generates and updates three-dimensional data 835 of a space that includes space 802 on the road ahead of own vehicle 801 (S801). More specifically, three-dimensional data creation device 810 synthesizes three-dimensional data 834 created on the basis of sensor information 833 of own vehicle 801 with three-dimensional data 831 created by the cloud-based traffic monitoring system or the preceding vehicle, etc., for example, thereby forming three-dimensional data 835 of a space that also includes the space ahead of the preceding vehicle undetectable by sensors 815 of the own vehicle.

Three-dimensional data creation device 810 then judges whether any change has occurred in three-dimensional data 835 of the space included in the space already transmitted (S802).

When a change has occurred in three-dimensional data 835 of the space included in the space already transmitted due to, for example, a vehicle or a person entering such space from outside (Yes in S802), three-dimensional data creation device 810 transmits, to the cloud-based traffic monitoring system or the following vehicle, the three-dimensional data that includes three-dimensional data 835 of the space in which the change has occurred (S803).

Three-dimensional data creation device 810 may transmit three-dimensional data in which a change has occurred, at the same timing of transmitting three-dimensional data that is transmitted at a predetermined time interval, or may transmit three-dimensional data in which a change has occurred soon after the detection of such change. Stated differently, three-dimensional data creation device 810 may prioritize the transmission of three-dimensional data of the space in which a change has occurred to the transmission of three-dimensional data that is transmitted at a predetermined time interval.

Also, three-dimensional data creation device 810 may transmit, as three-dimensional data of a space in which a change has occurred, the whole three-dimensional data of the space in which such change has occurred, or may transmit only a difference in the three-dimensional data (e.g., information on three-dimensional points that have appeared or vanished, or information on the displacement of three-dimensional points).

Three-dimensional data creation device 810 may also transmit, to the following vehicle, meta-data on a risk avoidance behavior of the own vehicle such as hard breaking warning, before transmitting three-dimensional data of the space in which a change has occurred. This enables the following vehicle to recognize at an early stage that the preceding vehicle is to perform hard braking, etc., and thus to start performing a risk avoidance behavior at an early stage such as speed reduction.

When no change has occurred in three-dimensional data 835 of the space included in the space already transmitted (No in S802), or after step S803, three-dimensional data creation device 810 transmits, to the cloud-based traffic monitoring system or the following vehicle, three-dimensional data of the space included in the space having a predetermined shape and located ahead of own vehicle 801 by distance L (S804).

The processes of step S801 through step S804 are repeated, for example at a predetermined time interval.

When three-dimensional data 835 of the current space 802 to be transmitted includes no difference from the three-dimensional map, three-dimensional data creation device 810 may not transmit three-dimensional data 837 of space 802.

Figure 40:
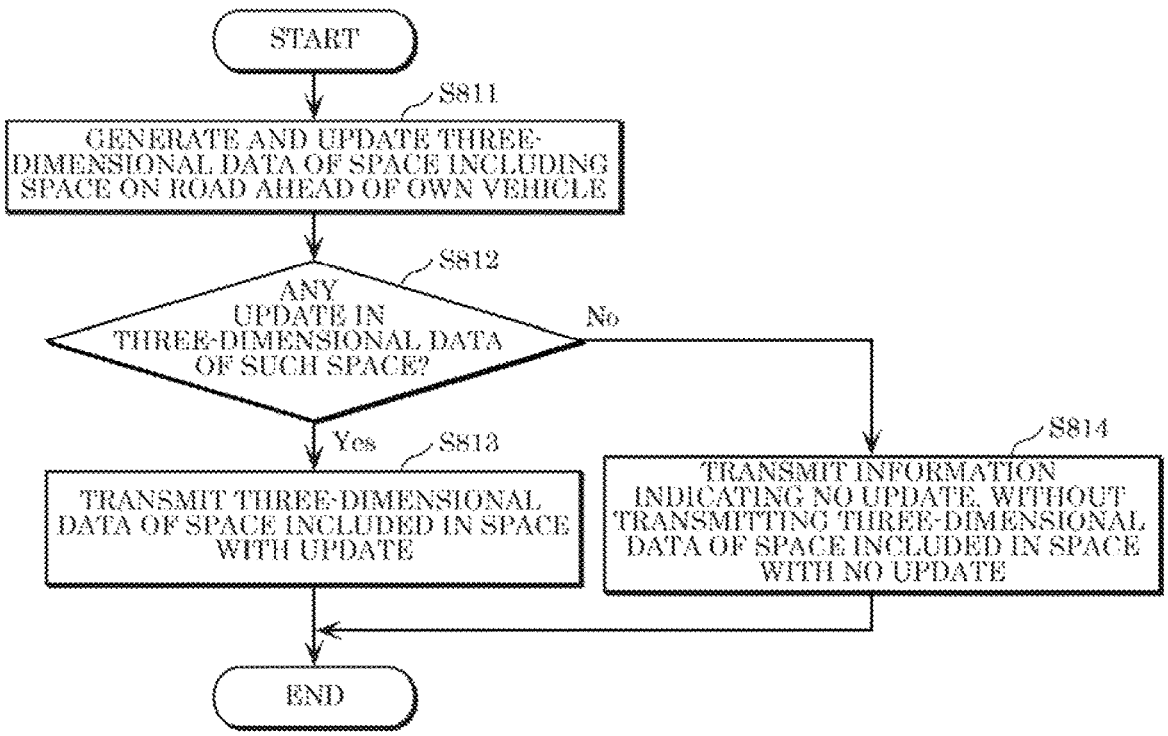
FIG. 40 is a flowchart of a three-dimensional data creation method according to Embodiment 5.

FIG. 40 is a flowchart of the operation performed by three-dimensional data creation device 810 in such case.

First, three-dimensional data creation device 810 generates and updates three-dimensional data 835 of a space that includes space 802 on the road ahead of own vehicle 801 (S811).

Three-dimensional data creation device 810 then judges whether three-dimensional data 835 of space 802 that has been generated includes an update from the three-dimensional map (S812). Stated differently, three-dimensional data creation device 810 judges whether three-dimensional data 835 of space 802 that has been generated is different from the three-dimensional map. Here, the three-dimensional map is three-dimensional map information managed by a device on the infrastructure side such as a cloud-based traffic monitoring system. Such three-dimensional map is obtained, for example, as three-dimensional data 831.

When an update is included (Yes in S812), three-dimensional data creation device 810 transmits three-dimensional data of the space included in space 802 to the cloud-based traffic monitoring system or the following vehicle just like the above case (S813).

Meanwhile, when no update is included (No in S812), three-dimensional data creation device 810 does not transmit three-dimensional data of the space included in space 802 to the cloud-based traffic monitoring system or the following vehicle (S814). Note that three-dimensional data creation device 810 may set the volume of space 802 to zero, thereby controlling the three-dimensional data of space 802 not to be transmitted. Alternatively, three-dimensional data creation device 810 may transmit information indicating that space 802 includes no update to the cloud-based traffic monitoring system or the following vehicle.

As described above, data is not transmitted when, for example, no obstacle is present on the road and thus no difference is present between three-dimensional data 835 that has been generated and the three-dimensional map of on infrastructure side. This prevents the transmission of unnecessary data.

Note that the above description illustrates a non-limited example in which three-dimensional data creation device 810 is equipped in a vehicle, and thus three-dimensional data creation device 810 may be equipped in any mobile object.

As described above, three-dimensional data creation device 810 according to the present embodiment is equipped in a mobile object that includes sensors 815 and a communication unit (data receiver 811, or data transmitter 822, etc.) that transmits and receives three-dimensional data to and from an external device. Three-dimensional data creation device 810 creates three-dimensional data 835 (second three-dimensional data) on the basis of sensor information 833 detected by sensors 815 and three-dimensional data 831 (first three-dimensional data) received by data receiver 811. Three-dimensional data creation device 810 transmits three-dimensional data 837 that is part of three-dimensional data 835 to the external device.

Such three-dimensional data creation device 810 is capable of generating three-dimensional data of a range undetectable by the own vehicle. Three-dimensional data creation device 810 is also capable of transmitting, to another vehicle, etc., three-dimensional data of a range undetectable by such another vehicle, etc.

Also, three-dimensional data creation device 810 repeats the creation of three-dimensional data 835 and the transmission of three-dimensional data 837 at a predetermined time interval. Three-dimensional data 837 is three-dimensional data of small space 802 having a predetermined size and located predetermined distance L ahead of the current position of vehicle 801 in a traveling direction of vehicle 801.

This limits a range of three-dimensional data 837 to be transmitted, and thus reduces the data amount of three-dimensional data 837 to be transmitted.

Predetermined distance L varies in accordance with traveling speed V of vehicle 801. For example, predetermined distance L is longer as traveling speed V is faster. This enables vehicle 801 to set an appropriate small space 802 in accordance with traveling speed V of vehicle 801, and thus to transmit three-dimensional data 837 of such small space 802 to a following vehicle, etc.

Also, the predetermined size varies in accordance with traveling speed V of vehicle 801. For example, the predetermined size is greater as traveling speed V is faster. For example, depth D is greater, which is the length of small space 802 in the traveling direction of the vehicle, as traveling speed V is faster. This enables vehicle 801 to set an appropriate small space 802 in accordance with traveling speed V of vehicle 801, and thus to transmit three-dimensional data 837 of such small space 802 to a following vehicle, etc.

Three-dimensional data creation device 810 judges whether a change has occurred in three-dimensional data 835 of small space 802 corresponding to three-dimensional data 837 already transmitted. When judging that a change has occurred, three-dimensional data creation device 810 transmits, to a following vehicle, etc. outside, three-dimensional data 837 (fourth three-dimensional data) that is at least part of three-dimensional data 835 in which the change has occurred.

This enables vehicle 801 to transmit, to a following vehicle, etc., three-dimensional data 837 of the space in which a change has occurred.

Also, three-dimensional data creation device 810 more preferentially transmits three-dimensional data 837 (fourth three-dimensional data) in which a change has occurred than normal three-dimensional data 837 (third three-dimensional data) that is transmitted at regular time intervals. More specifically, three-dimensional data creation device 810 transmits three-dimensional data 837 (fourth three-dimensional data) in which a change has occurred before transmitting normal three-dimensional data 837 (third three-dimensional data) that is transmitted at regular time intervals. Stated differently, three-dimensional data creation device 810 transmits three-dimensional data 837 (fourth three-dimensional data) in which a change has occurred at irregular time intervals without waiting for the transmission of normal three-dimensional data 837 that is transmitted at regular time intervals.

This enables vehicle 801 to preferentially transmit, to a following vehicle, etc., three-dimensional data 837 of the space in which a change has occurred, thereby enabling the following vehicle, etc., to promptly make a judgment that is based on the three-dimensional data.

Three-dimensional data 837 (fourth three-dimensional data) in which the change has occurred indicates a difference between three-dimensional data 835 of small space 802 corresponding to three-dimensional data 837 already transmitted and three-dimensional data 835 that has undergone the change. This reduces the data amount of three-dimensional data 837 to be transmitted.

Three-dimensional data creation device 810 does not transmit three-dimensional data 837 of small space 802, when no difference is present between three-dimensional data 837 of small space 802 and three-dimensional data 831 of small space 802. Also, three-dimensional data creation device 810 may transmit, to the external device, information indicating that no difference is present between three-dimensional data 837 of small space 802 and three-dimensional data 831 of small space 802.

This prevents the transmission of unnecessary three-dimensional data 837, thereby reducing the data amount of three-dimensional data 837 to be transmitted.

Embodiment 6

In the present embodiment, a display device and a display method which display information obtained from a three-dimensional map, etc., and a storing device and storing method for storing a three-dimensional map, etc., will be described.

A mobile object such as a car or robot makes use of a three-dimensional map obtainable by communication with a server or another vehicle and two-dimensional video or self-detected three-dimensional data obtainable from a sensor equipped in the own vehicle, for the self-driving of the car or the autonomous travelling of the robot. Among such data, it is possible that data that the user wants to watch or store is different depending on conditions. Hereinafter, a display device that switches display according to the conditions will be described.

Figure 41:
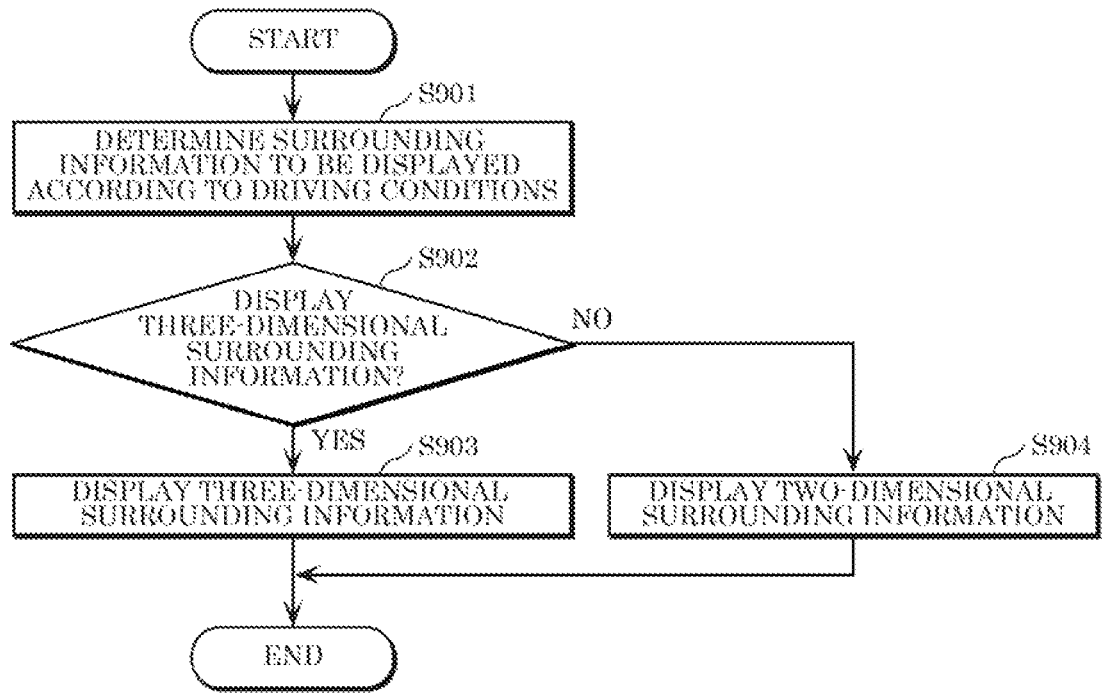
FIG. 41 is a flowchart of a display method according to Embodiment 6.

FIG. 41 is a flowchart showing an outline of a display method performed by the display device. The display device is equipped in a mobile object such as a car or a robot. Note that an example in which the mobile object is a vehicle (car) will be described below.

First, the display device determines which between two-dimensional surrounding information and three-dimensional surrounding information is to be displayed, according to the driving conditions of the vehicle (S901). Note that the two-dimensional surrounding information corresponds to the first surrounding information in the claims, and the three-dimensional surrounding information corresponds to the second surrounding information in the claims. Here, surrounding information is information indicating the surroundings of the mobile object, and is for example, video of a view in a particular direction from the vehicle or a map of the surroundings of the vehicle.

Two-dimensional surrounding information is information generated using two-dimensional data. Here, two-dimensional data is two-dimensional map information or video. For example, two-dimensional surrounding information is a map of the vehicle's surroundings obtained from a two-dimensional map or video obtained using a camera equipped in the vehicle. Furthermore, the two-dimensional surrounding information, for example, does not include three-dimensional information. Specifically, when the two-dimensional surrounding information is a map of the vehicle's surroundings, the map does not include height direction information. Furthermore, when the two-dimensional surrounding information is video obtained using a camera, the video does not include depth direction information.

Furthermore, the three-dimensional surrounding information is information generated using three-dimensional data. Here, the three-dimensional data is, for example, a three-dimensional map. Note that the three-dimensional data may be information, etc., indicating the three-dimensional position or the three-dimensional shape of a target in the vehicle's surroundings obtained from another vehicle or a server, or detected by the own vehicle. For example, the three-dimensional surrounding information is a two-dimensional or three-dimensional video or map of the vehicle's surroundings generated using a three-dimensional map. Furthermore, the three-dimensional surrounding information, for example, includes three-dimensional information. For example, when the three-dimensional surrounding information is a video of the view ahead of the vehicle, the video includes information indicating the distance up to a target in the video. Furthermore, in the video, a pedestrian, or the like, present ahead of a preceding vehicle is displayed. Furthermore, the three-dimensional surrounding information may be information in which information indicating the distance or the pedestrian, etc., is superimposed on video obtainable from a sensor equipped in the vehicle. Furthermore, the three-dimensional surrounding information may be information in which height direction information is superimposed on a two-dimensional map.

Furthermore, the three-dimensional data may be three-dimensionally displayed, or a two-dimensional video or a two-dimensional map obtained from three-dimensional data may be displayed on a two-dimensional display, or the like.

When it is determined in step S901 that three-dimensional surrounding information is to be displayed (Yes in S902), the display device displays three-dimensional surrounding information (S903). On the other hand, when it is determined in step S901 that two-dimensional surrounding information is to be displayed (No in S902), the display device displays two-dimensional surrounding information (S904). In this manner, the display device displays the three-dimensional surrounding information or the two-dimensional surrounding information that is determined to be displayed in step S901.

A specific example will be displayed below. In a first example, the display device switches the surrounding information to be displayed according to whether the vehicle is under self-driving or manual driving. Specifically, during self-driving, the driver does not need to know in detail the detailed surrounding road information, and thus the display device displays two-dimensional surrounding information (for example, a two-dimensional map). On the other hand, during manual driving, the display device displays three-dimensional surrounding information (for example, three-dimensional map) so that the driver knows the details of the road information of the surroundings for safe driving.

Furthermore, during self-driving, in order to indicate to the user the kind of information on which the driving of the own vehicle is based, the display device may display information that influenced the driving operation (for example, an SWLD used in self-location estimation, traffic lanes, road signs, surrounding condition detection results, etc.). For example, the display device may display such information in addition to a two-dimensional map.

Note that the surrounding information to be displayed during self-driving and manual driving described above is merely an example, and the display device may display three-dimensional surrounding information during self-driving and display two-dimensional surrounding information during manual driving. Furthermore, in at least one of self-driving and manual driving, the display device may display metadata or a surrounding condition search result in addition to a two-dimensional or three-dimensional map or video, or may display metadata or a surrounding condition search result in place of a two-dimensional or three-dimensional map or video. Here, metadata is information indicating the three-dimensional position or three-dimensional shape of a target obtained from a server or another vehicle. Furthermore, the surrounding condition search result is information indicating the three-dimensional position or three-dimensional shape of a target detected by the own vehicle.

In a second example, the display device switches the surrounding information to be displayed according to the operating environment. For example, the display device switches the surrounding information to be displayed according to the brightness outside. Specifically, when the surroundings of the own vehicle are bright, the display device displays two-dimensional video obtainable using a camera equipped in the own vehicle or three-dimensional surrounding information created using the two-dimensional video. On the other hand, when the surroundings of the own vehicle are dark, two-dimensional video obtainable from the camera equipped in the own vehicle is dark and hard to watch, and thus the display device displays three-dimensional surrounding information created using LiDAR or millimeter wave radar.

Furthermore, the display device switches the surrounding information to be displayed according to a driving area which is the area in which the own-vehicle is currently present. For example, in a tourist spot, a city center, or the vicinity of a target location, the display device displays three-dimensional surrounding information to be able to provide the user with information of surrounding buildings, or the like. On the other hand, since there are many cases where detailed information of the surroundings is considered unnecessary in a mountainous area or the suburbs, etc., the display device displays two-dimensional surrounding information.

Furthermore, the display device may switch the surrounding information to be displayed based on weather conditions. For example, in the case of good weather, the display device displays three-dimensional surrounding information created using the camera or LiDAR. On the other hand, in the case of rain or dense fog, the three-dimensional surrounding information obtainable from a camera or LiDAR tends to include noise, and thus the display device displays three-dimensional surrounding information created using millimeter wave radar.

Furthermore, these switching of displays may be carried out automatically by a system or may be carried out manually by the user.

Furthermore, the three-dimensional surrounding information is generated from any one or more of dense point cloud data generated based on a WLD, mesh data generated based on a MWLD, sparse data generated based on a SWLD, lane data generated based on a lane world, two-dimensional map data including three-dimensional shape information of roads and intersections, and metadata including three-dimensional position or three-dimensional shape information that changes in real time or own vehicle detection results.

Note that, as described above, a WLD is three-dimensional point cloud data, and a SWLD is data obtained by extracting a point cloud having an amount of a feature greater than or equal to a threshold. Furthermore, a MWLD is data having a mesh structure generated from a WLD. A lane world is data obtained by extracting, from a WLD, a point cloud which has an amount of a feature greater than or equal to a threshold and is required for self-location estimation, driving assist, self-driving, or the like.

Here, a MWLD and a SWLD have a smaller amount of data compared to a WLD. Therefore, by using a WLD when more detailed data is required, and otherwise using a MWLD or a SWLD, the communication data amount and the processing amount can be appropriately reduced. Furthermore, a lane world has a smaller amount of data compared to a SWLD. Therefore, by using a lane world, the communication data amount and the processing amount can be further reduced.

Furthermore, although an example of switching between two-dimensional surrounding information and three-dimensional surrounding data is described above, the display device may switch the type of data (WLD, SWLD, etc.) to be used in generating three-dimensional surrounding information, based on the above-described conditions. Specifically, in the foregoing description, the display device displays three-dimensional surrounding information generated from first data (for example, a WLD or a SWLD) having a larger amount of data in the case of displaying three-dimensional surrounding information, and may display three-dimensional surrounding information generated from second data (for example, a SWLD or a lane world) having a smaller amount of data than the first data instead of two-dimensional surrounding data in the case of displaying two-dimensional surrounding data.

Furthermore, the display data displays the two-dimensional surrounding data or the three-dimensional surrounding information on, for example, a two-dimensional display equipped in the own vehicle, a head-up display, or a head-mounted display. Furthermore, the display device may transmit and display the two-dimensional surrounding data or the three-dimensional surrounding information on a mobile terminal such as a smartphone by radio communication. Specifically, the display device is not limited to being equipped in the mobile object, as long as it is equipped in a device that operates in conjunction with the mobile object. For example, when the user carrying a display device such as a smartphone boards the mobile device or operates the mobile device, information on the mobile object such as the location of the mobile object based on self-location detection of the mobile object is displayed on the display device, or such information together with surrounding information is displayed on the display device.

Furthermore, when displaying a three-dimensional map, the display device may render the three-dimensional map and display it as two-dimensional data or may display the three-dimensional map as three-dimensional data by using a three-dimensional display or a three-dimensional hologram.

Next, a method of storing the three-dimensional map will be described. A mobile object such as a car or robot makes use of a three-dimensional map obtainable by communication with a server or another vehicle and two-dimensional video or self-detected three-dimensional data obtainable from a sensor equipped in the own vehicle, for the self-driving of the car or the autonomous travelling of the robot. Among such data, data that the user wants to watch or store is different depending on conditions. Hereinafter, a method of storing data according to conditions will be described.

The storing device is equipped in a mobile object such as a car or a robot. Note that an example in which the mobile object is a vehicle (car) will be described below. First, the storing device may be included in the above-described display device.

In a first example, the storing device determines whether to store a three-dimensional map based on the area. Here, storing the three-dimensional map in a recording medium of the own vehicle enables self-driving inside the stored space without communication with the server. However, since the memory capacity is limited, only limited data can be stored. For this reason, the storing device limits the area to be stored in the manner indicated below.

For example, the storing device preferentially stores a three-dimensional map of an area frequently passed such as a commutation path or the surroundings of the home. This eliminates the need to obtain data of a frequently used area every time, and thus the communication data amount can be effectively reduced. Note that preferentially store refers to storing data having higher priority within a predetermined memory capacity. For example, when new data cannot be stored within the memory capacity, data having lower priority than the new data is deleted.

Alternatively, the storing device preferentially stores the three-dimensional map of an area in which the communication environment is poor. Accordingly, in an area in which the communication environment is poor, the need to obtain data via communication is eliminated, thus the occurrence of cases in which a three-dimensional map cannot be obtained due to poor communication can be reduced.

Alternatively, the storing device preferentially stores the three-dimensional map of an area in which traffic volume is high. Accordingly, it is possible to preferentially store the three-dimensional map of an area in which occurrence of accidents is high. Therefore, in which in such an area, the inability to obtain a three-dimensional map due to poor communication, and the deterioration of precision of self-driving or driving assist can be reduced.

Alternatively, the storing device preferentially stores the three-dimensional map of an area in which traffic volume is low. Here, in an area in which traffic volume is low, the possibility that a self-driving mode for automatically following the preceding vehicle cannot be used becomes high. With this, there are cases where more detailed surrounding information becomes necessary. Therefore, by storing the three-dimensional map of an area in which traffic volume is low, the precision of self-driving or driving assist in such an area can be improved.

Note that the above-described storing methods may be combined. Furthermore, these areas for which a three-dimensional map is to be preferentially stored may be automatically determined by a system, or may be specified by the user.

Furthermore, the storing device may delete, or updated with new data, a three-dimensional map for which a predetermined period has elapsed after storing. Accordingly, it is possible to prevent old map data from being used. Furthermore, in updating map data, the storing device may update only an area in which there is a change by comparing an old map and a new map to detect a difference area which is a spatial area where there is a difference, and adding the data of the difference area of the new map to the old map or removing the data of the difference area from the old map.

Furthermore, in this example, the stored three-dimensional map is used for self-driving. Therefore, by using a SWLD for the three-dimensional map, the communication data amount can be reduced. Note that the three-dimensional map is not limited to a SWLD, and may be another type of data such as WLD, etc.

In a second example, the storing device stores a three-dimensional map based on an event.

For example, the storing device stores as a three-dimensional map a special event to be encountered while the vehicle is underway. With this, the user can subsequently view, etc., details of the event. Examples of events to be stored as a three-dimensional map are indicated below. Note that the storing device may store three-dimensional surrounding information generated from a three-dimensional map.

For example, the storing device stores a three-dimensional map before and after a collision accident, or when danger is sensed, etc.

Alternatively, the storing device stores a three-dimensional map of a characteristic scene such as beautiful scenery, a crowded place, or a tourist spot.

These events to be stored may be automatically determined by a system or may be specified in advance by the user. For example, as a method of judging these events, machine learning may be used.

Furthermore, in this example, the stored three-dimensional map is used for viewing. Therefore, by using a WLD for the three-dimensional map, high-definition video can be provided. Note that the three-dimensional map is not limited to a WLD, and may be another type of data such as SWLD, etc.

Hereinafter, a method in which the display device controls display according to the user will be described. When displaying the surrounding condition detection result obtained by inter-vehicle communication by superimposing it on a map, the display device represents a nearby vehicle using wireframe or represents a nearby vehicle with transparency in order to make a detected object on a far side of the nearby vehicle visible. Alternatively, the display device may display video from an overhead perspective to enable a birds-eye view of the own vehicle, the nearby vehicle, and the surrounding condition detection result.

Figure 42:
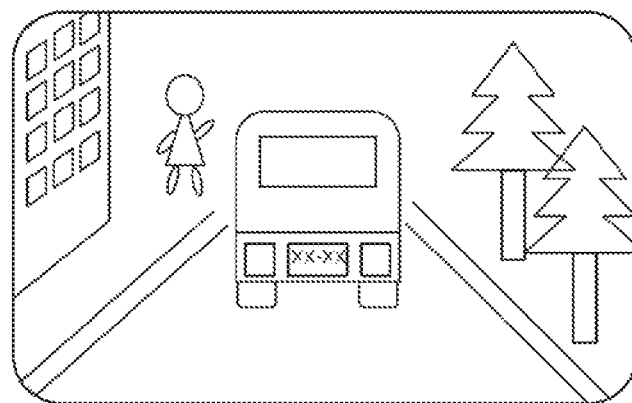
FIG. 42 is a diagram that illustrates an example of a surrounding environment visible through a windshield according to Embodiment 6.
Figure 43:
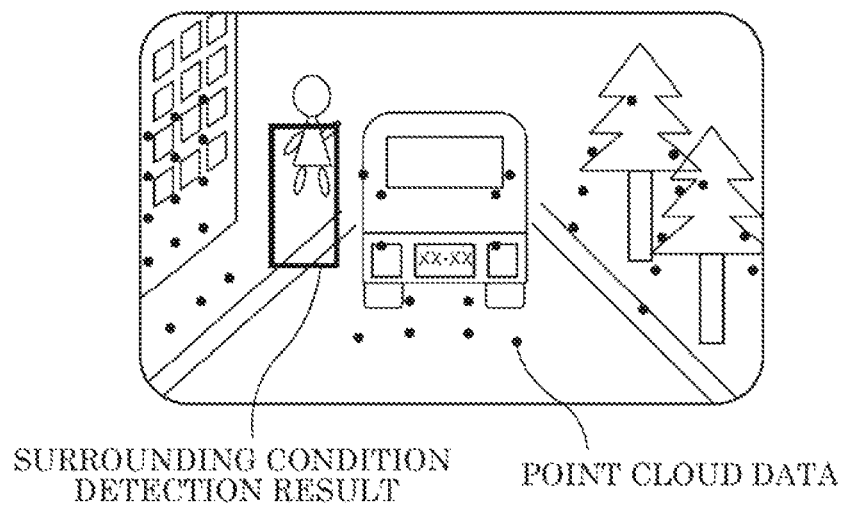
FIG. 43 is a diagram that illustrates an example of a display on a head-up display according to Embodiment 6.

When the surrounding condition detection result or the point cloud data is superimposed on the surrounding environment visible through the windshield, using a head-up display, as illustrated in FIG. 42, the position at which information is to be superimposed may become misaligned due to a difference in the posture, physique, or eye position of the user. FIG. 43 is a diagram illustrating an example of a display on a head-up display when the superimposition position is misaligned.

Figure 44:
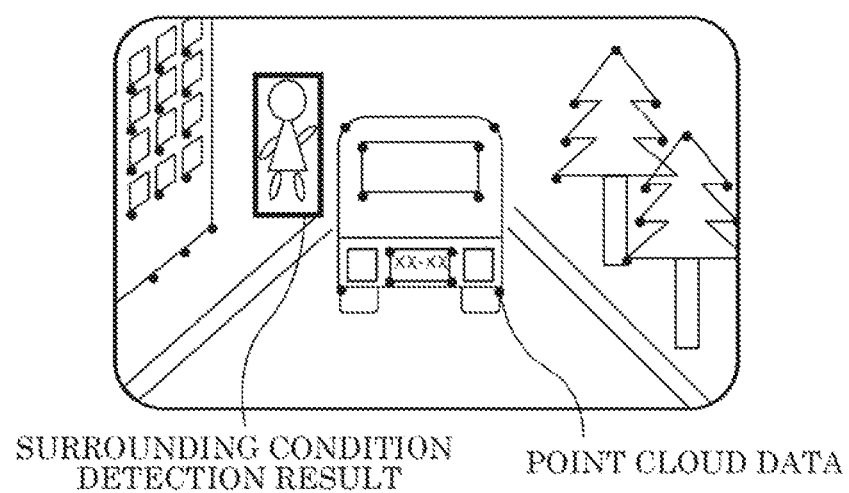
FIG. 44 is a diagram that illustrates an example of a display on a head-up display after adjustment according to Embodiment 6.

In order to correct such a misalignment, the display device detects the posture, physique, or eye position of the user using information from a vehicle interior camera or a sensor equipped in a vehicle seat. The display device adjusts the position at which information is to be superimposed according to the posture, physique, or eye position of the user detected. FIG. 44 is a diagram illustrating an example of the display on the head-up display after adjustment.

Note that such a superimposition position adjustment may be performed manually by the user using a control device equipped in the car.

Furthermore, during a disaster, the display device may indicate a safe place on the map, and present this to the user. Alternatively, the vehicle may convey, to the user, details of the disaster and that fact of going to a safe place, and perform self-driving up to the safe place.

For example, when an earthquake occurs, the vehicle may set an area with a high sea-level altitude as the destination to avoid getting caught up in a tsunami. At this time, the vehicle may obtain, through communication with a server, information on roads that have become difficult to pass through due to the earthquake, and perform processing according to the details of the disaster such as taking a route that avoids such roads.

Furthermore, the self-driving may include a plurality of modes such as travel mode, drive mode, etc.

In travel mode, the vehicle determines the route up to a destination with consideration being given to arrival time earliness, fee cheapness, travel distance shortness, energy consumption lowness, etc., and performs self-driving according to the determined route.

In drive mode, the vehicle automatically determines the route so as to arrive at the destination at the time specified by the user. For example, when the user sets the destination and arrival time, the vehicle determines a route that enables the user to go around a nearby tourist spot and arrive at the destination at the set time.

Embodiment 7

In embodiment 5, an example is described in which a client device of a vehicle or the like transmits three-dimensional data to another vehicle or a server such as a cloud-based traffic monitoring system. In the present embodiment, a client device transmits sensor information obtained through a sensor to a server or a client device.

Figure 45:
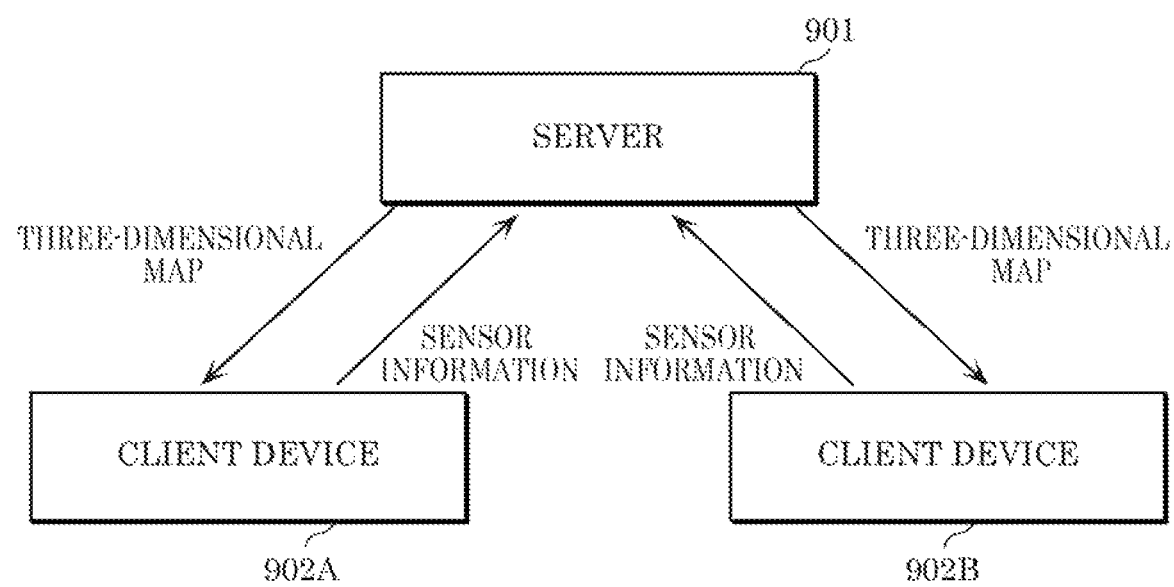
FIG. 45 is a diagram showing a structure of a system according to Embodiment 7.

A structure of a system according to the present embodiment will first be described. FIG. 45 is a diagram showing the structure of a transmission/reception system of a three-dimensional map and sensor information according to the present embodiment. This system includes server 901, and client devices 902A and 902B. Note that client devices 902A and 902B are also referred to as client device 902 when no particular distinction is made therebetween.

Client device 902 is, for example, a vehicle-mounted device equipped in a mobile object such as a vehicle. Server 901 is, for example, a cloud-based traffic monitoring system, and is capable of communicating with the plurality of client devices 902.

Server 901 transmits the three-dimensional map formed by a point cloud to client device 902. Note that a structure of the three-dimensional map is not limited to a point cloud, and may also be another structure expressing three-dimensional data such as a mesh structure.

Client device 902 transmits the sensor information obtained by client device 902 to server 901. The sensor information includes, for example, at least one of information obtained by LIDAR, a visible light image, an infrared image, a depth image, sensor position information, or sensor speed information.

The data to be transmitted and received between server 901 and client device 902 may be compressed in order to reduce data volume, and may also be transmitted uncompressed in order to maintain data precision. When compressing the data, it is possible to use a three-dimensional compression method on the point cloud based on, for example, an octree structure. It is possible to use a two-dimensional image compression method on the visible light image, the infrared image, and the depth image. The two-dimensional image compression method is, for example, MPEG-4 AVC or HEVC standardized by MPEG.

Server 901 transmits the three-dimensional map managed by server 901 to client device 902 in response to a transmission request for the three-dimensional map from client device 902. Note that server 901 may also transmit the three-dimensional map without waiting for the transmission request for the three-dimensional map from client device 902. For example, server 901 may broadcast the three-dimensional map to at least one client device 902 located in a predetermined space. Server 901 may also transmit the three-dimensional map suited to a position of client device 902 at fixed time intervals to client device 902 that has received the transmission request once. Server 901 may also transmit the three-dimensional map managed by server 901 to client device 902 every time the three-dimensional map is updated.

Client device 902 sends the transmission request for the three-dimensional map to server 901. For example, when client device 902 wants to perform the self-location estimation during traveling, client device 902 transmits the transmission request for the three-dimensional map to server 901.

Note that in the following cases, client device 902 may send the transmission request for the three-dimensional map to server 901. Client device 902 may send the transmission request for the three-dimensional map to server 901 when the three-dimensional map stored by client device 902 is old. For example, client device 902 may send the transmission request for the three-dimensional map to server 901 when a fixed period has passed since the three-dimensional map is obtained by client device 902.

Client device 902 may also send the transmission request for the three-dimensional map to server 901 before a fixed time when client device 902 exits a space shown in the three-dimensional map stored by client device 902. For example, client device 902 may send the transmission request for the three-dimensional map to server 901 when client device 902 is located within a predetermined distance from a boundary of the space shown in the three-dimensional map stored by client device 902. When a movement path and a movement speed of client device 902 are understood, a time when client device 902 exits the space shown in the three-dimensional map stored by client device 902 may be predicted based on the movement path and the movement speed of client device 902.

Client device 902 may also send the transmission request for the three-dimensional map to server 901 when an error during alignment of the three-dimensional data and the three-dimensional map created from the sensor information by client device 902 is at least at a fixed level.

Client device 902 transmits the sensor information to server 901 in response to a transmission request for the sensor information from server 901. Note that client device 902 may transmit the sensor information to server 901 without waiting for the transmission request for the sensor information from server 901. For example, client device 902 may periodically transmit the sensor information during a fixed period when client device 902 has received the transmission request for the sensor information from server 901 once. Client device 902 may determine that there is a possibility of a change in the three-dimensional map of a surrounding area of client device 902 having occurred, and transmit this information and the sensor information to server 901, when the error during alignment of the three-dimensional data created by client device 902 based on the sensor information and the three-dimensional map obtained from server 901 is at least at the fixed level.

Server 901 sends a transmission request for the sensor information to client device 902. For example, server 901 receives position information, such as GPS information, about client device 902 from client device 902. Server 901 sends the transmission request for the sensor information to client device 902 in order to generate a new three-dimensional map, when it is determined that client device 902 is approaching a space in which the three-dimensional map managed by server 901 contains little information, based on the position information about client device 902. Server 901 may also send the transmission request for the sensor information, when wanting to (i) update the three-dimensional map, (ii) check road conditions during snowfall, a disaster, or the like, or (iii) check traffic congestion conditions, accident/incident conditions, or the like.

Client device 902 may set an amount of data of the sensor information to be transmitted to server 901 in accordance with communication conditions or bandwidth during reception of the transmission request for the sensor information to be received from server 901. Setting the amount of data of the sensor information to be transmitted to server 901 is, for example, increasing/reducing the data itself or appropriately selecting a compression method.

Figure 46:
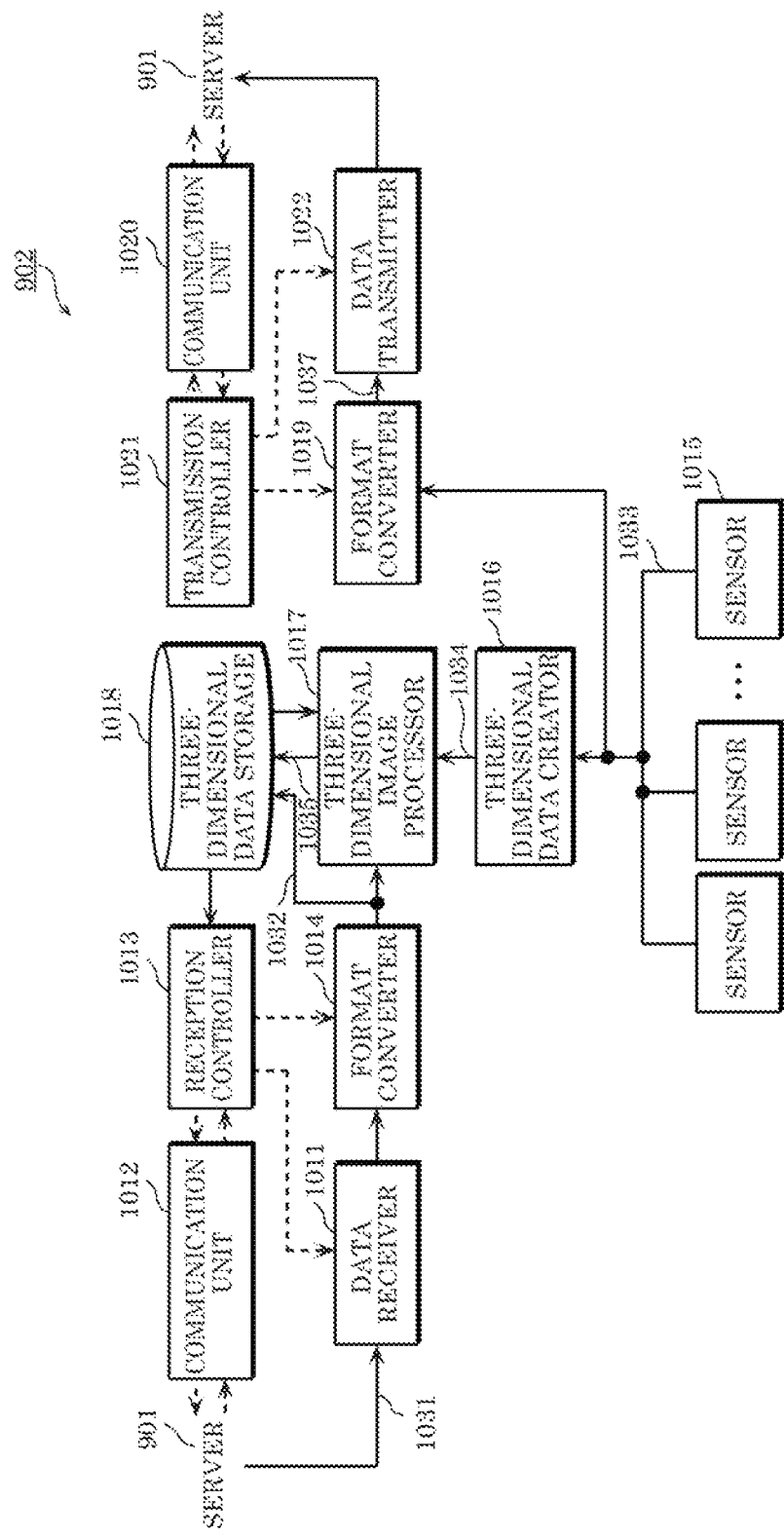
FIG. 46 is a block diagram of a client device according to Embodiment 7.

FIG. 46 is a block diagram showing an example structure of client device 902. Client device 902 receives the three-dimensional map formed by a point cloud and the like from server 901, and estimates a self-location of client device 902 using the three-dimensional map created based on the sensor information of client device 902. Client device 902 transmits the obtained sensor information to server 901.

Client device 902 includes data receiver 1011, communication unit 1012, reception controller 1013, format converter 1014, sensors 1015, three-dimensional data creator 1016, three-dimensional image processor 1017, three-dimensional data storage 1018, format converter 1019, communication unit 1020, transmission controller 1021, and data transmitter 1022.

Data receiver 1011 receives three-dimensional map 1031 from server 901. Three-dimensional map 1031 is data that includes a point cloud such as a WLD or a SWLD. Three-dimensional map 1031 may include compressed data or uncompressed data.

Communication unit 1012 communicates with server 901 and transmits a data transmission request (e.g. transmission request for three-dimensional map) to server 901.

Reception controller 1013 exchanges information, such as information on supported formats, with a communications partner via communication unit 1012 to establish communication with the communications partner.

Format converter 1014 performs a format conversion and the like on three-dimensional map 1031 received by data receiver 1011 to generate three-dimensional map 1032. Format converter 1014 also performs a decompression or decoding process when three-dimensional map 1031 is compressed or encoded. Note that format converter 1014 does not perform the decompression or decoding process when three-dimensional map 1031 is uncompressed data.

Sensors 815 are a group of sensors, such as LIDARs, visible light cameras, infrared cameras, or depth sensors that obtain information about the outside of a vehicle equipped with client device 902, and generate sensor information 1033. Sensor information 1033 is, for example, three-dimensional data such as a point cloud (point group data) when sensors 1015 are laser sensors such as LIDARs. Note that a single sensor may serve as sensors 1015.

Three-dimensional data creator 1016 generates three-dimensional data 1034 of a surrounding area of the own vehicle based on sensor information 1033. For example, three-dimensional data creator 1016 generates point cloud data with color information on the surrounding area of the own vehicle using information obtained by LIDAR and visible light video obtained by a visible light camera.

Three-dimensional image processor 1017 performs a self-location estimation process and the like of the own vehicle, using (i) the received three-dimensional map 1032 such as a point cloud, and (ii) three-dimensional data 1034 of the surrounding area of the own vehicle generated using sensor information 1033. Note that three-dimensional image processor 1017 may generate three-dimensional data 1035 about the surroundings of the own vehicle by merging three-dimensional map 1032 and three-dimensional data 1034, and may perform the self-location estimation process using the created three-dimensional data 1035.

Three-dimensional data storage 1018 stores three-dimensional map 1032, three-dimensional data 1034, three-dimensional data 1035, and the like.

Format converter 1019 generates sensor information 1037 by converting sensor information 1033 to a format supported by a receiver end. Note that format converter 1019 may reduce the amount of data by compressing or encoding sensor information 1037. Format converter 1019 may omit this process when format conversion is not necessary. Format converter 1019 may also control the amount of data to be transmitted in accordance with a specified transmission range.

Communication unit 1020 communicates with server 901 and receives a data transmission request (transmission request for sensor information) and the like from server 901.

Transmission controller 1021 exchanges information, such as information on supported formats, with a communications partner via communication unit 1020 to establish communication with the communications partner.

Data transmitter 1022 transmits sensor information 1037 to server 901. Sensor information 1037 includes, for example, information obtained through sensors 1015, such as information obtained by LIDAR, a luminance image obtained by a visible light camera, an infrared image obtained by an infrared camera, a depth image obtained by a depth sensor, sensor position information, and sensor speed information.

Figure 47:
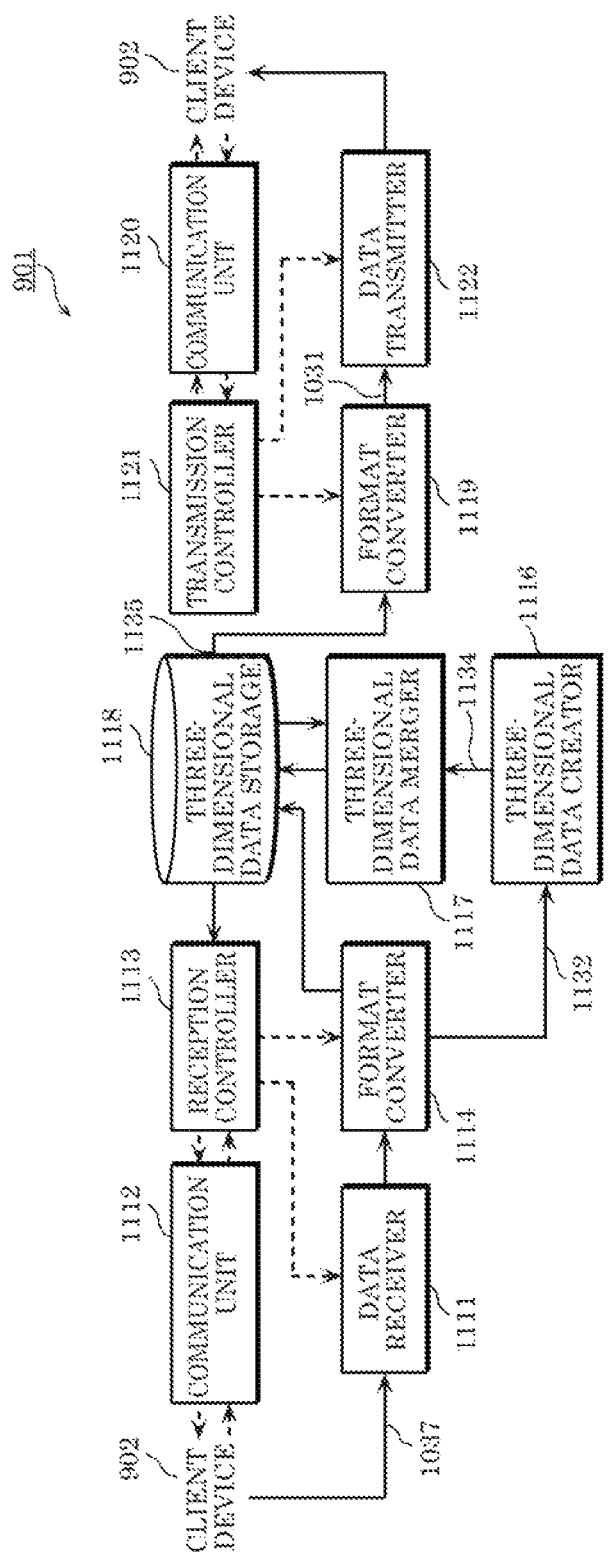
FIG. 47 is a block diagram of a server according to Embodiment 7.

A structure of server 901 will be described next. FIG. 47 is a block diagram showing an example structure of server 901. Server 901 transmits sensor information from client device 902 and creates three-dimensional data based on the received sensor information. Server 901 updates the three-dimensional map managed by server 901 using the created three-dimensional data. Server 901 transmits the updated three-dimensional map to client device 902 in response to a transmission request for the three-dimensional map from client device 902.

Server 901 includes data receiver 1111, communication unit 1112, reception controller 1113, format converter 1114, three-dimensional data creator 1116, three-dimensional data merger 1117, three-dimensional data storage 1118, format converter 1119, communication unit 1120, transmission controller 1121, and data transmitter 1122.

Data receiver 1111 receives sensor information 1037 from client device 902. Sensor information 1037 includes, for example, information obtained by LIDAR, a luminance image obtained by a visible light camera, an infrared image obtained by an infrared camera, a depth image obtained by a depth sensor, sensor position information, sensor speed information, and the like.

Communication unit 1112 communicates with client device 902 and transmits a data transmission request (e.g. transmission request for sensor information) and the like to client device 902.

Reception controller 1113 exchanges information, such as information on supported formats, with a communications partner via communication unit 1112 to establish communication with the communications partner.

Format converter 1114 generates sensor information 1132 by performing a decompression or decoding process when the received sensor information 1037 is compressed or encoded. Note that format converter 1114 does not perform the decompression or decoding process when sensor information 1037 is uncompressed data.

Three-dimensional data creator 1116 generates three-dimensional data 1134 of a surrounding area of client device 902 based on sensor information 1132. For example, three-dimensional data creator 1116 generates point cloud data with color information on the surrounding area of client device 902 using information obtained by LIDAR and visible light video obtained by a visible light camera.

Three-dimensional data merger 1117 updates three-dimensional map 1135 by merging three-dimensional data 1134 created based on sensor information 1132 with three-dimensional map 1135 managed by server 901.

Three-dimensional data storage 1118 stores three-dimensional map 1135 and the like.

Format converter 1119 generates three-dimensional map 1031 by converting three-dimensional map 1135 to a format supported by the receiver end. Note that format converter 1119 may reduce the amount of data by compressing or encoding three-dimensional map 1135. Format converter 1119 may omit this process when format conversion is not necessary. Format converter 1119 may also control the amount of data to be transmitted in accordance with a specified transmission range.

Communication unit 1120 communicates with client device 902 and receives a data transmission request (transmission request for three-dimensional map) and the like from client device 902.

Transmission controller 1121 exchanges information, such as information on supported formats, with a communications partner via communication unit 1120 to establish communication with the communications partner.

Data transmitter 1122 transmits three-dimensional map 1031 to client device 902. Three-dimensional map 1031 is data that includes a point cloud such as a WLD or a SWLD. Three-dimensional map 1031 may include one of compressed data and uncompressed data.

Figure 48:
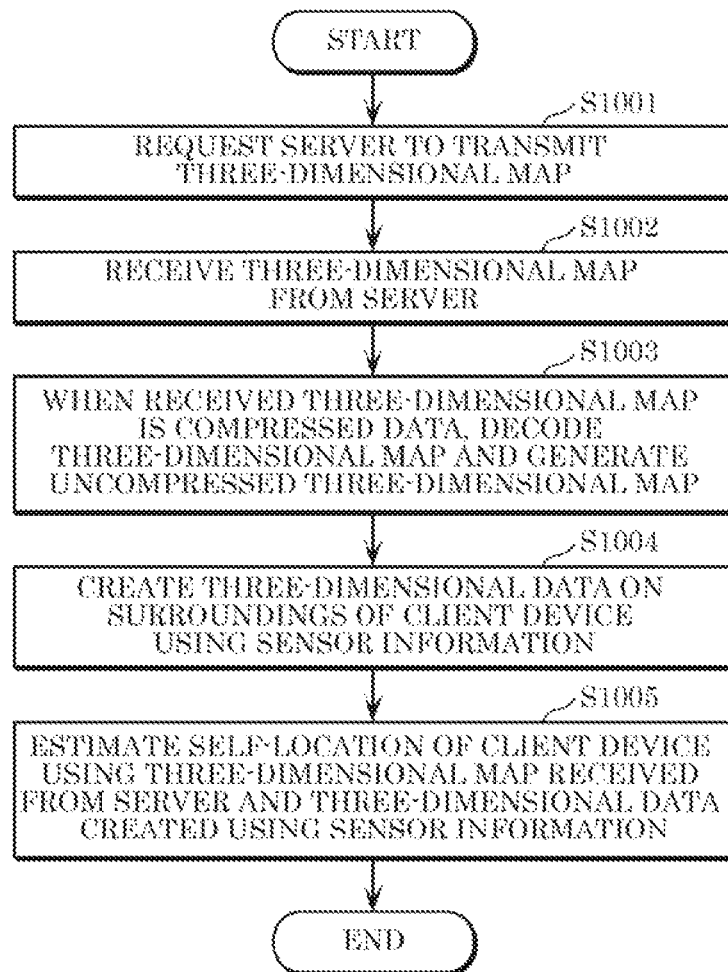
FIG. 48 is a flowchart of a three-dimensional data creation process performed by the client device according to Embodiment 7.

An operational flow of client device 902 will be described next. FIG. 48 is a flowchart of an operation when client device 902 obtains the three-dimensional map.

Client device 902 first requests server 901 to transmit the three-dimensional map (point cloud, etc.) (S1001). At this point, by also transmitting the position information about client device 902 obtained through GPS and the like, client device 902 may also request server 901 to transmit a three-dimensional map relating to this position information.

Client device 902 next receives the three-dimensional map from server 901 (S1002). When the received three-dimensional map is compressed data, client device 902 decodes the received three-dimensional map and generates an uncompressed three-dimensional map (S1003).

Client device 902 next creates three-dimensional data 1034 of the surrounding area of client device 902 using sensor information 1033 obtained by sensors 1015 (S1004). Client device 902 next estimates the self-location of client device 902 using three-dimensional map 1032 received from server 901 and three-dimensional data 1034 created using sensor information 1033 (S1005).

Figure 49:
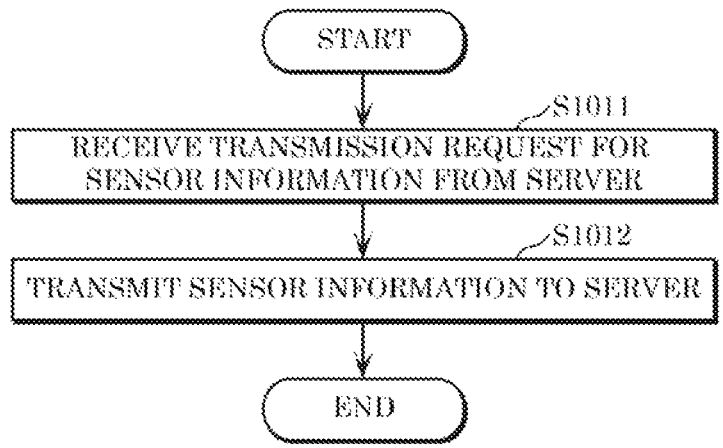
FIG. 49 is a flowchart of a sensor information transmission process performed by the client device according to Embodiment 7.

FIG. 49 is a flowchart of an operation when client device 902 transmits the sensor information. Client device 902 first receives a transmission request for the sensor information from server 901 (S1011). Client device 902 that has received the transmission request transmits sensor information 1037 to server 901 (S1012). Note that client device 902 may generate sensor information 1037 by compressing each piece of information using a compression method suited to each piece of information, when sensor information 1033 includes a plurality of pieces of information obtained by sensors 1015.

Figure 50:
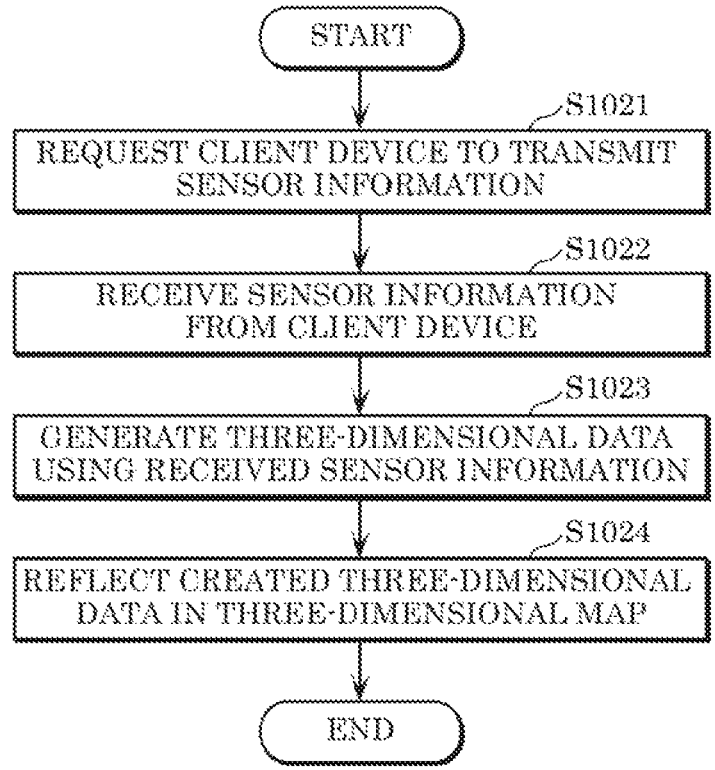
FIG. 50 is a flowchart of a three-dimensional data creation process performed by the server according to Embodiment 7.

An operational flow of server 901 will be described next. FIG. 50 is a flowchart of an operation when server 901 obtains the sensor information. Server 901 first requests client device 902 to transmit the sensor information (S1021). Server 901 next receives sensor information 1037 transmitted from client device 902 in accordance with the request (S1022). Server 901 next creates three-dimensional data 1134 using the received sensor information 1037 (S1023). Server 901 next reflects the created three-dimensional data 1134 in three-dimensional map 1135 (S1024).

Figure 51:
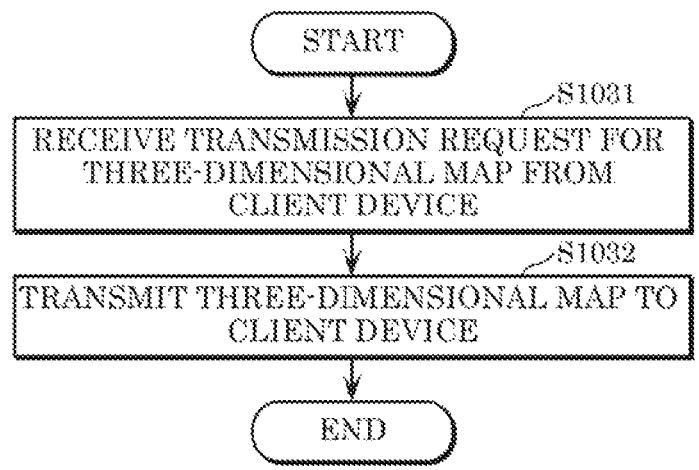
FIG. 51 is a flowchart of a three-dimensional map transmission process performed by the server according to Embodiment 7.

FIG. 51 is a flowchart of an operation when server 901 transmits the three-dimensional map. Server 901 first receives a transmission request for the three-dimensional map from client device 902 (S1031). Server 901 that has received the transmission request for the three-dimensional map transmits the three-dimensional map to client device 902 (S1032). At this point, server 901 may extract a three-dimensional map of a vicinity of client device 902 along with the position information about client device 902, and transmit the extracted three-dimensional map. Server 901 may compress the three-dimensional map formed by a point cloud using, for example, an octree structure compression method, and transmit the compressed three-dimensional map.

Hereinafter, variations of the present embodiment will be described.

Server 901 creates three-dimensional data 1134 of a vicinity of a position of client device 902 using sensor information 1037 received from client device 902. Server 901 next calculates a difference between three-dimensional data 1134 and three-dimensional map 1135, by matching the created three-dimensional data 1134 with three-dimensional map 1135 of the same area managed by server 901. Server 901 determines that a type of anomaly has occurred in the surrounding area of client device 902, when the difference is greater than or equal to a predetermined threshold. For example, it is conceivable that a large difference occurs between three-dimensional map 1135 managed by server 901 and three-dimensional data 1134 created based on sensor information 1037, when land subsidence and the like occurs due to a natural disaster such as an earthquake.

Sensor information 1037 may include information indicating at least one of a sensor type, a sensor performance, and a sensor model number. Sensor information 1037 may also be appended with a class ID and the like in accordance with the sensor performance. For example, when sensor information 1037 is obtained by LIDAR, it is conceivable to assign identifiers to the sensor performance. A sensor capable of obtaining information with precision in units of several millimeters is class 1, a sensor capable of obtaining information with precision in units of several centimeters is class 2, and a sensor capable of obtaining information with precision in units of several meters is class 3. Server 901 may estimate sensor performance information and the like from a model number of client device 902. For example, when client device 902 is equipped in a vehicle, server 901 may determine sensor specification information from a type of the vehicle. In this case, server 901 may obtain information on the type of the vehicle in advance, and the information may also be included in the sensor information. Server 901 may change a degree of correction with respect to three-dimensional data 1134 created using sensor information 1037, using the obtained sensor information 1037. For example, when the sensor performance is high in precision (class 1), server 901 does not correct three-dimensional data 1134. When the sensor performance is low in precision (class 3), server 901 corrects three-dimensional data 1134 in accordance with the precision of the sensor. For example, server 901 increases the degree (intensity) of correction with a decrease in the precision of the sensor.

Server 901 may simultaneously send the transmission request for the sensor information to the plurality of client devices 902 in a certain space. Server 901 does not need to use all of the sensor information for creating three-dimensional data 1134 and may, for example, select sensor information to be used in accordance with the sensor performance, when having received a plurality of pieces of sensor information from the plurality of client devices 902. For example, when updating three-dimensional map 1135, server 901 may select high-precision sensor information (class 1) from among the received plurality of pieces of sensor information, and create three-dimensional data 1134 using the selected sensor information.

Figure 52:
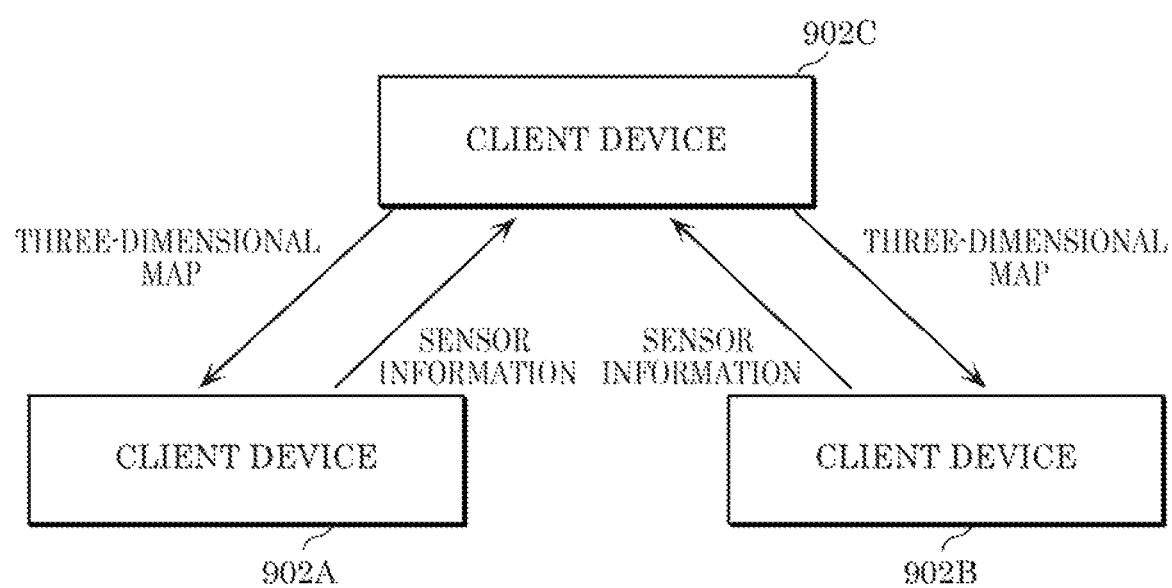
FIG. 52 is a diagram showing a structure of a variation of the system according to Embodiment 7.

Server 901 is not limited to only being a server such as a cloud-based traffic monitoring system, and may also be another (vehicle-mounted) client device. FIG. 52 is a diagram of a system structure in this case.

For example, client device 902C sends a transmission request for sensor information to client device 902A located nearby, and obtains the sensor information from client device 902A. Client device 902C then creates three-dimensional data using the obtained sensor information of client device 902A, and updates a three-dimensional map of client device 902C. This enables client device 902C to generate a three-dimensional map of a space that can be obtained from client device 902A, and fully utilize the performance of client device 902C. For example, such a case is conceivable when client device 902C has high performance.

In this case, client device 902A that has provided the sensor information is given rights to obtain the high-precision three-dimensional map generated by client device 902C. Client device 902A receives the high-precision three-dimensional map from client device 902C in accordance with these rights.

Server 901 may send the transmission request for the sensor information to the plurality of client devices 902 (client device 902A and client device 902B) located nearby client device 902C. When a sensor of client device 902A or client device 902B has high performance, client device 902C is capable of creating the three-dimensional data using the sensor information obtained by this high-performance sensor.

Figure 53:
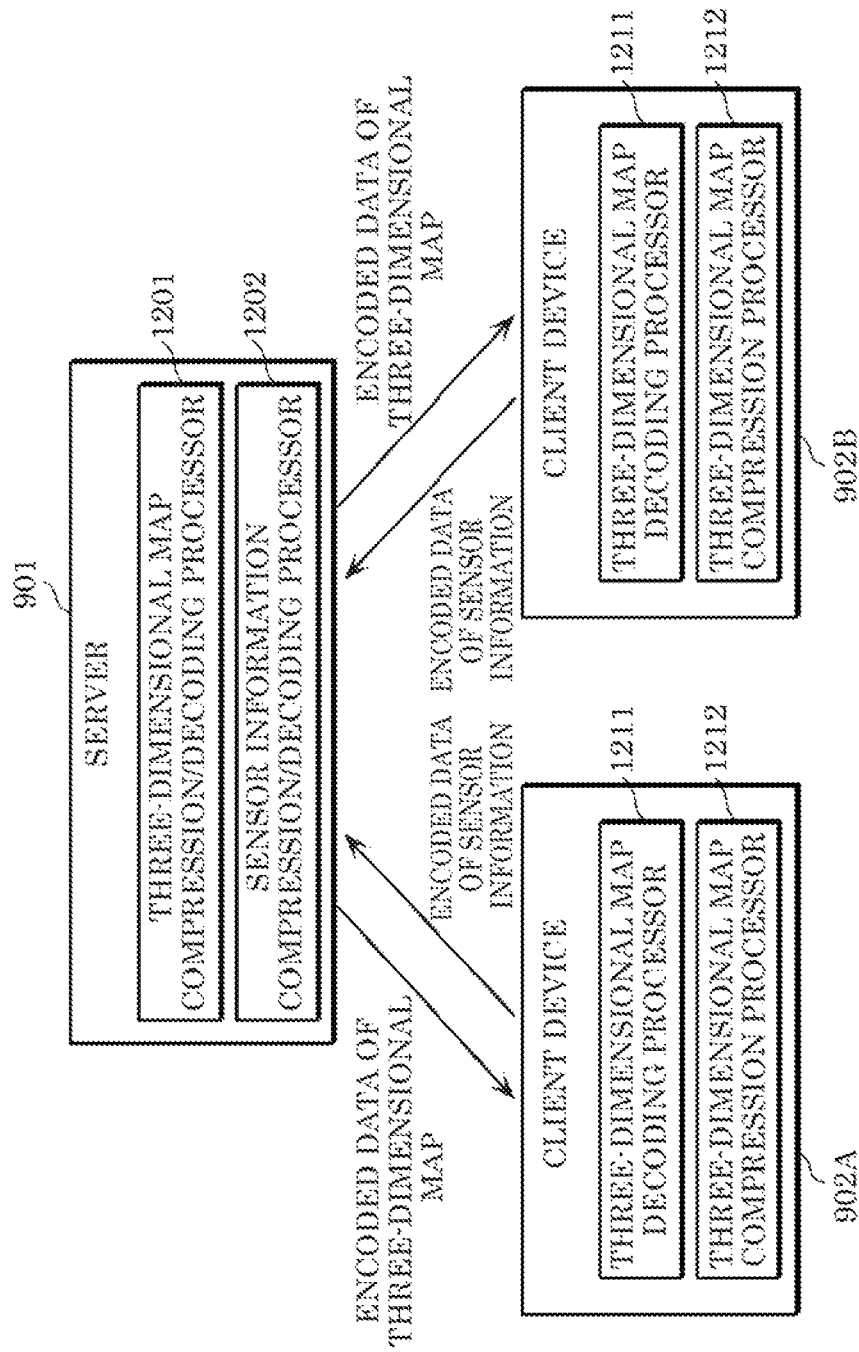
FIG. 53 is a diagram showing a structure of the server and client devices according to Embodiment 7.

FIG. 53 is a block diagram showing a functionality structure of server 901 and client device 902. Server 901 includes, for example, three-dimensional map compression/decoding processor 1201 that compresses and decodes the three-dimensional map and sensor information compression/decoding processor 1202 that compresses and decodes the sensor information.

Client device 902 includes three-dimensional map decoding processor 1211 and sensor information compression processor 1212. Three-dimensional map decoding processor 1211 receives encoded data of the compressed three-dimensional map, decodes the encoded data, and obtains the three-dimensional map. Sensor information compression processor 1212 compresses the sensor information itself instead of the three-dimensional data created using the obtained sensor information, and transmits the encoded data of the compressed sensor information to server 901. With this structure, client device 902 does not need to internally store a processor that performs a process for compressing the three-dimensional data of the three-dimensional map (point cloud, etc.), as long as client device 902 internally stores a processor that performs a process for decoding the three-dimensional map (point cloud, etc.). This makes it possible to limit costs, power consumption, and the like of client device 902.

As stated above, client device 902 according to the present embodiment is equipped in the mobile object, and creates three-dimensional data 1034 of a surrounding area of the mobile object using sensor information 1033 that is obtained through sensor 1015 equipped in the mobile object and indicates a surrounding condition of the mobile object. Client device 902 estimates a self-location of the mobile object using the created three-dimensional data 1034. Client device 902 transmits the obtained sensor information 1033 to server 901 or another mobile object.

This enables client device 902 to transmit sensor information 1033 to server 901 or the like. This makes it possible to further reduce the amount of transmission data compared to when transmitting the three-dimensional data. Since there is no need for client device 902 to perform processes such as compressing or encoding the three-dimensional data, it is possible to reduce the processing amount of client device 902. As such, client device 902 is capable of reducing the amount of data to be transmitted or simplifying the structure of the device.

Client device 902 further transmits the transmission request for the three-dimensional map to server 901 and receives three-dimensional map 1031 from server 901. In the estimating of the self-location, client device 902 estimates the self-location using three-dimensional data 1034 and three-dimensional map 1032.

Sensor information 1034 includes at least one of information obtained by a laser sensor, a luminance image, an infrared image, a depth image, sensor position information, or sensor speed information.

Sensor information 1033 includes information that indicates a performance of the sensor.

Client device 902 encodes or compresses sensor information 1033, and in the transmitting of the sensor information, transmits sensor information 1037 that has been encoded or compressed to server 901 or another mobile object 902. This enables client device 902 to reduce the amount of data to be transmitted.

For example, client device 902 includes a processor and memory. The processor performs the above processes using the memory.

Server 901 according to the present embodiment is capable of communicating with client device 902 equipped in the mobile object, and receives sensor information 1037 that is obtained through sensor 1015 equipped in the mobile object and indicates a surrounding condition of the mobile object. Server 901 creates three-dimensional data 1134 of a surrounding area of the mobile object using the received sensor information 1037.

With this, server 901 creates three-dimensional data 1134 using sensor information 1037 transmitted from client device 902. This makes it possible to further reduce the amount of transmission data compared to when client device 902 transmits the three-dimensional data. Since there is no need for client device 902 to perform processes such as compressing or encoding the three-dimensional data, it is possible to reduce the processing amount of client device 902. As such, server 901 is capable of reducing the amount of data to be transmitted or simplifying the structure of the device.

Server 901 further transmits a transmission request for the sensor information to client device 902.

Server 901 further updates three-dimensional map 1135 using the created three-dimensional data 1134, and transmits three-dimensional map 1135 to client device 902 in in response to the transmission request for three-dimensional map 1135 from client device 902.

Sensor information 1037 includes at least one of information obtained by a laser sensor, a luminance image, an infrared image, a depth image, sensor position information, or sensor speed information.

Sensor information 1037 includes information that indicates a performance of the sensor.

Server 901 further corrects the three-dimensional data in accordance with the performance of the sensor. This enables the three-dimensional data creation method to improve the quality of the three-dimensional data.

In the receiving of the sensor information, server 901 receives a plurality of pieces of sensor information 1037 received from a plurality of client devices 902, and selects sensor information 1037 to be used in the creating of three-dimensional data 1134, based on a plurality of pieces of information that each indicates the performance of the sensor included in the plurality of pieces of sensor information 1037. This enables server 901 to improve the quality of three-dimensional data 1134.

Server 901 decodes or decompresses the received sensor information 1037, and creates three-dimensional data 1134 using sensor information 1132 that has been decoded or decompressed. This enables server 901 to reduce the amount of data to be transmitted.

For example, server 901 includes a processor and memory. The processor performs the above processes using the memory.

Embodiment 8

In the present embodiment, three-dimensional data encoding and decoding methods using an inter prediction process will be described.

Figure 54:
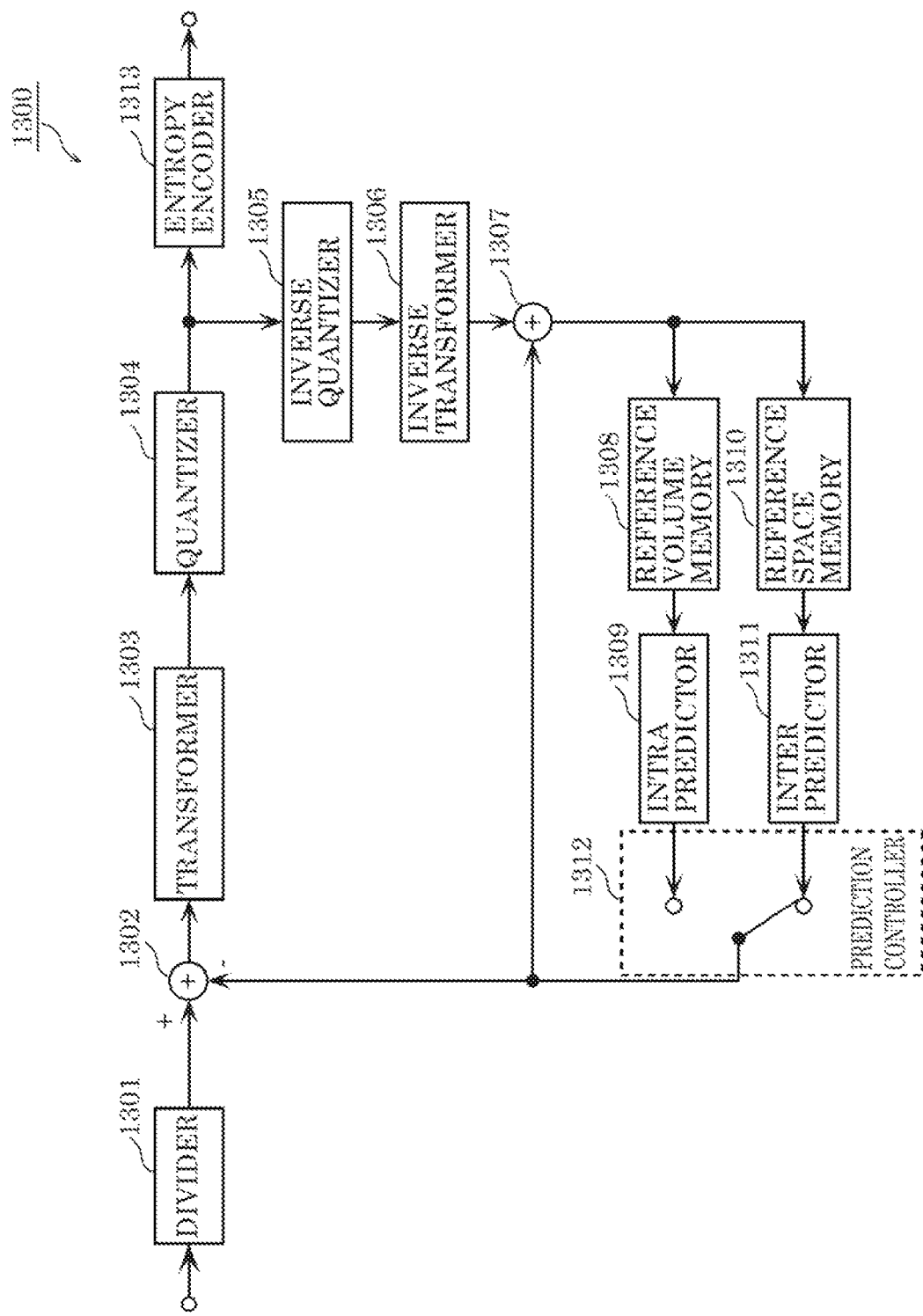
FIG. 54 is a block diagram of a three-dimensional data encoding device according to Embodiment 8.

FIG. 54 is a block diagram of three-dimensional data encoding device 1300 according to the present embodiment. This three-dimensional data encoding device 1300 generates an encoded bitstream (hereinafter, also simply referred to as bitstream) that is an encoded signal, by encoding three-dimensional data. As illustrated in FIG. 54, three-dimensional data encoding device 1300 includes divider 1301, subtractor 1302, transformer 1303, quantizer 1304, inverse quantizer 1305, inverse transformer 1306, adder 1307, reference volume memory 1308, intra predictor 1309, reference space memory 1310, inter predictor 1311, prediction controller 1312, and entropy encoder 1313.

Divider 1301 divides a plurality of volumes (VLMs) that are encoding units of each space (SPC) included in the three-dimensional data. Divider 1301 makes an octree representation (make into an octree) of voxels in each volume. Note that divider 1301 may make the spaces into an octree representation with the spaces having the same size as the volumes. Divider 1301 may also append information (depth information, etc.) necessary for making the octree representation to a header and the like of a bitstream.

Figure 55:
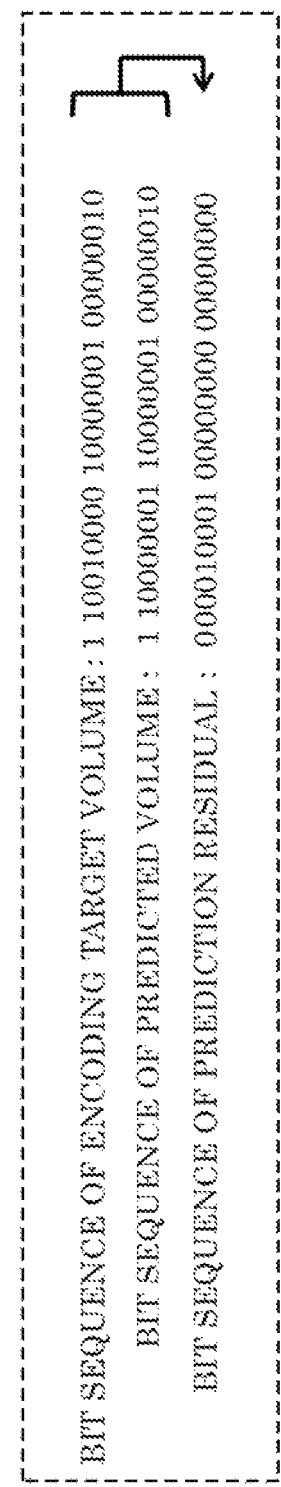
FIG. 55 is a diagram showing an example of a prediction residual according to Embodiment 8.

Subtractor 1302 calculates a difference between a volume (encoding target volume) outputted by divider 1301 and a predicted volume generated through intra prediction or inter prediction, which will be described later, and outputs the calculated difference to transformer 1303 as a prediction residual. FIG. 55 is a diagram showing an example calculation of the prediction residual. Note that bit sequences of the encoding target volume and the predicted volume shown here are, for example, position information indicating positions of three-dimensional points included in the volumes.

Figure 56:
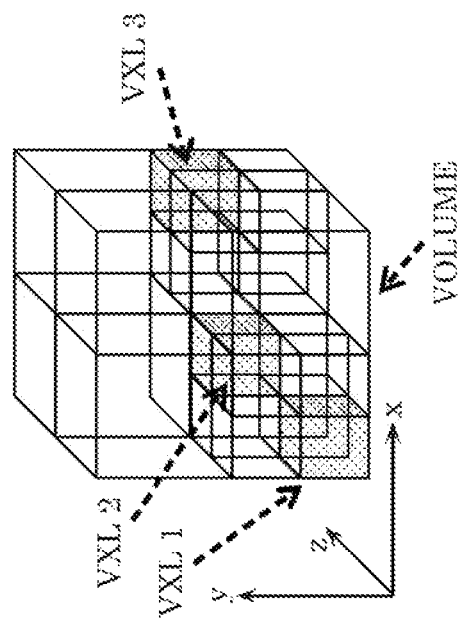
FIG. 56 is a diagram showing an example of a volume according to Embodiment 8.
Figure 57:
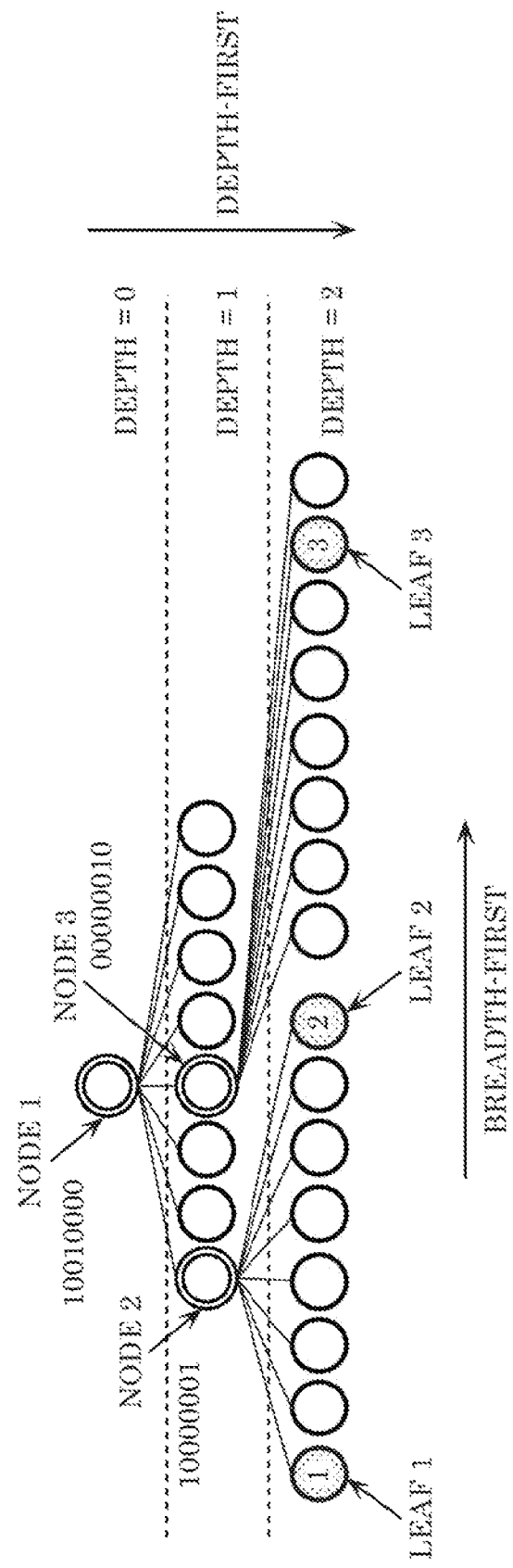
FIG. 57 is a diagram showing an example of an octree representation of the volume according to Embodiment 8.

Hereinafter, a scan order of an octree representation and voxels will be described. A volume is encoded after being converted into an octree structure (made into an octree). The octree structure includes nodes and leaves. Each node has eight nodes or leaves, and each leaf has voxel (VXL) information. FIG. 56 is a diagram showing an example structure of a volume including voxels. FIG. 57 is a diagram showing an example of the volume shown in FIG. 56 having been converted into the octree structure. Among the leaves shown in FIG. 57, leaves 1, 2, and 3 respectively represent VXL 1, VXL 2, and VXL 3, and represent VXLs including a point group (hereinafter, active VXLs).

An octree is represented by, for example, binary sequences of 1s and 0s. For example, when giving the nodes or the active VXLs a value of 1 and everything else a value of 0, each node and leaf is assigned with the binary sequence shown in FIG. 57. Thus, this binary sequence is scanned in accordance with a breadth-first or a depth-first scan order. For example, when scanning breadth-first, the binary sequence shown in A of FIG. 58 is obtained. When scanning depth-first, the binary sequence shown in B of FIG. 58 is obtained. The binary sequences obtained through this scanning are encoded through entropy encoding, which reduces an amount of information.

Depth information in the octree representation will be described next. Depth in the octree representation is used in order to control up to how fine a granularity point cloud information included in a volume is stored. Upon setting a great depth, it is possible to reproduce the point cloud information to a more precise level, but an amount of data for representing the nodes and leaves increases. Upon setting a small depth, however, the amount of data decreases, but some information that the point cloud information originally held is lost, since pieces of point cloud information including different positions and different colors are now considered as pieces of point cloud information including the same position and the same color.

Figure 59:
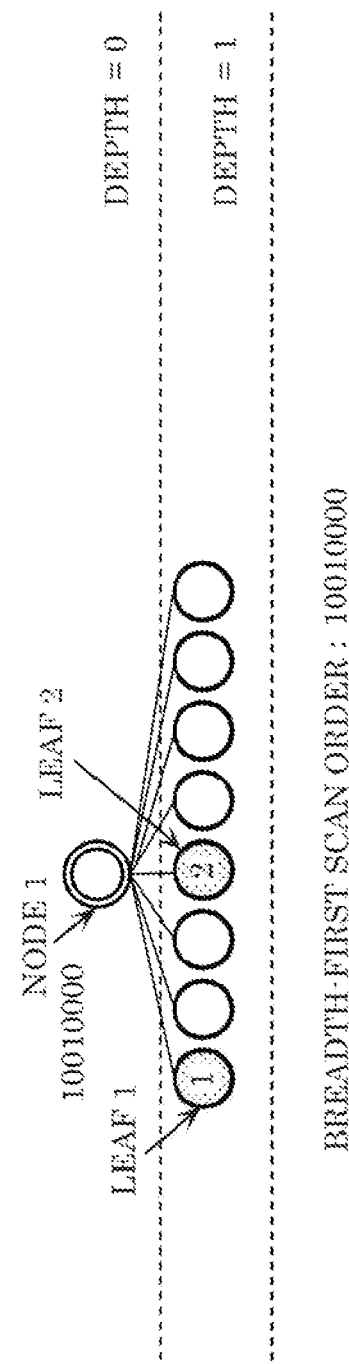
FIG. 59 is a diagram showing an example of an octree representation of a volume according to Embodiment 8.

For example, FIG. 59 is a diagram showing an example in which the octree with a depth of 2 shown in FIG. 57 is represented with a depth of 1. The octree shown in FIG. 59 has a lower amount of data than the octree shown in FIG. 57. In other words, the binarized octree shown in FIG. 59 has a lower bit count than the octree shown in FIG. 57. Leaf 1 and leaf 2 shown in FIG. 57 are represented by leaf 1 shown in FIG. 58. In other words, the information on leaf 1 and leaf 2 being in different positions is lost.

Figure 60:
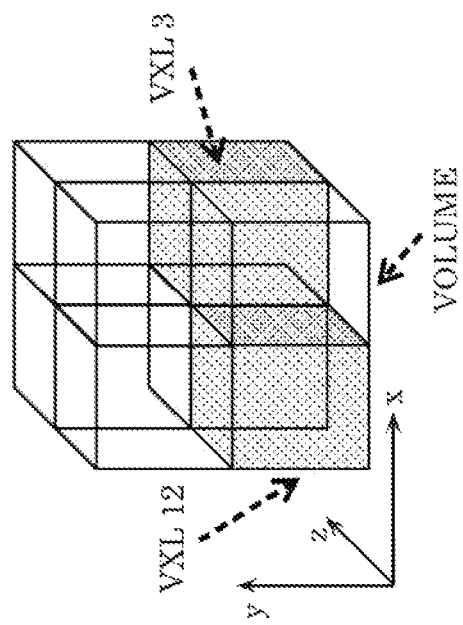
FIG. 60 is a diagram showing an example of the volume according to Embodiment 8.

FIG. 60 is a diagram showing a volume corresponding to the octree shown in FIG. 59. VXL 1 and VXL 2 shown in FIG. 56 correspond to VXL 12 shown in FIG. 60. In this case, three-dimensional data encoding device 1300 generates color information of VXL 12 shown in FIG. 60 using color information of VXL 1 and VXL 2 shown in FIG. 56. For example, three-dimensional data encoding device 1300 calculates an average value, a median, a weighted average value, or the like of the color information of VXL 1 and VXL 2 as the color information of VXL 12. In this manner, three-dimensional data encoding device 1300 may control a reduction of the amount of data by changing the depth of the octree.

Three-dimensional data encoding device 1300 may set the depth information of the octree to units of worlds, units of spaces, or units of volumes. In this case, three-dimensional data encoding device 1300 may append the depth information to header information of the world, header information of the space, or header information of the volume. In all worlds, spaces, and volumes associated with different times, the same value may be used as the depth information. In this case, three-dimensional data encoding device 1300 may append the depth information to header information managing the worlds associated with all times.

When the color information is included in the voxels, transformer 1303 applies frequency transformation, e.g. orthogonal transformation, to a prediction residual of the color information of the voxels in the volume. For example, transformer 1303 creates a one-dimensional array by scanning the prediction residual in a certain scan order. Subsequently, transformer 1303 transforms the one-dimensional array to a frequency domain by applying one-dimensional orthogonal transformation to the created one-dimensional array. With this, when a value of the prediction residual in the volume is similar, a value of a low-frequency component increases and a value of a high-frequency component decreases. As such, it is possible to more efficiently reduce an encoding amount in quantizer 1304.

Transformer 1303 does not need to use orthogonal transformation in one dimension, but may also use orthogonal transformation in two or more dimensions. For example, transformer 1303 maps the prediction residual to a two-dimensional array in a certain scan order, and applies two-dimensional orthogonal transformation to the obtained two-dimensional array. Transformer 1303 may select an orthogonal transformation method to be used from a plurality of orthogonal transformation methods. In this case, three-dimensional data encoding device 1300 appends, to the bitstream, information indicating which orthogonal transformation method is used. Transformer 1303 may select an orthogonal transformation method to be used from a plurality of orthogonal transformation methods in different dimensions. In this case, three-dimensional data encoding device 1300 appends, to the bitstream, in how many dimensions the orthogonal transformation method is used.

For example, transformer 1303 matches the scan order of the prediction residual to a scan order (breadth-first, depth-first, or the like) in the octree in the volume. This makes it possible to reduce overhead, since information indicating the scan order of the prediction residual does not need to be appended to the bitstream. Transformer 1303 may apply a scan order different from the scan order of the octree. In this case, three-dimensional data encoding device 1300 appends, to the bitstream, information indicating the scan order of the prediction residual. This enables three-dimensional data encoding device 1300 to efficiently encode the prediction residual. Three-dimensional data encoding device 1300 may append, to the bitstream, information (flag, etc.) indicating whether to apply the scan order of the octree, and may also append, to the bitstream, information indicating the scan order of the prediction residual when the scan order of the octree is not applied.

Transformer 1303 does not only transform the prediction residual of the color information, and may also transform other attribute information included in the voxels. For example, transformer 1303 may transform and encode information, such as reflectance information, obtained when obtaining a point cloud through LIDAR and the like.

Transformer 1303 may skip these processes when the spaces do not include attribute information such as color information. Three-dimensional data encoding device 1300 may append, to the bitstream, information (flag) indicating whether to skip the processes of transformer 1303.

Quantizer 1304 generates a quantized coefficient by performing quantization using a quantization control parameter on a frequency component of the prediction residual generated by transformer 1303. With this, the amount of information is further reduced. The generated quantized coefficient is outputted to entropy encoder 1313. Quantizer 1304 may control the quantization control parameter in units of worlds, units of spaces, or units of volumes. In this case, three-dimensional data encoding device 1300 appends the quantization control parameter to each header information and the like. Quantizer 1304 may perform quantization control by changing a weight per frequency component of the prediction residual. For example, quantizer 1304 may precisely quantize a low-frequency component and roughly quantize a high-frequency component. In this case, three-dimensional data encoding device 1300 may append, to a header, a parameter expressing a weight of each frequency component.

Quantizer 1304 may skip these processes when the spaces do not include attribute information such as color information. Three-dimensional data encoding device 1300 may append, to the bitstream, information (flag) indicating whether to skip the processes of quantizer 1304.

Inverse quantizer 1305 generates an inverse quantized coefficient of the prediction residual by performing inverse quantization on the quantized coefficient generated by quantizer 1304 using the quantization control parameter, and outputs the generated inverse quantized coefficient to inverse transformer 1306.

Inverse transformer 1306 generates an inverse transformation-applied prediction residual by applying inverse transformation on the inverse quantized coefficient generated by inverse quantizer 1305. This inverse transformation-applied prediction residual does not need to completely coincide with the prediction residual outputted by transformer 1303, since the inverse transformation-applied prediction residual is a prediction residual that is generated after the quantization.

Adder 1307 adds, to generate a reconstructed volume, (i) the inverse transformation-applied prediction residual generated by inverse transformer 1306 to (ii) a predicted volume that is generated through intra prediction or intra prediction, which will be described later, and is used to generate a pre-quantized prediction residual. This reconstructed volume is stored in reference volume memory 1308 or reference space memory 1310.

Intra predictor 1309 generates a predicted volume of an encoding target volume using attribute information of a neighboring volume stored in reference volume memory 1308. The attribute information includes color information or a reflectance of the voxels. Intra predictor 1309 generates a predicted value of color information or a reflectance of the encoding target volume.

Figure 61:
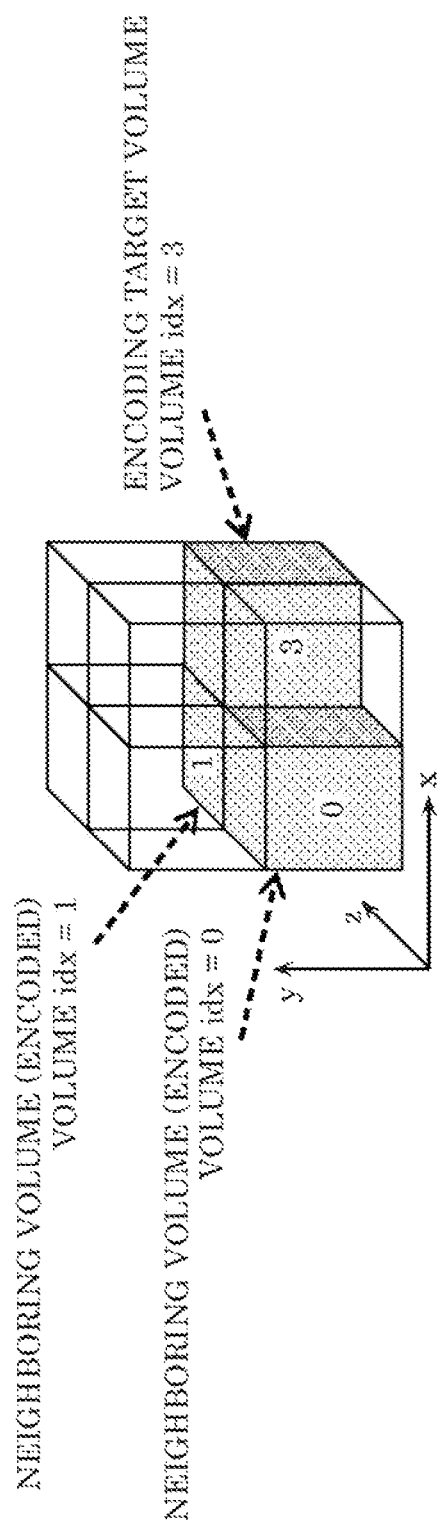
FIG. 61 is a diagram for describing an intra prediction process according to Embodiment 8.

FIG. 61 is a diagram for describing an operation of intra predictor 1309. For example, intra predictor 1309 generates the predicted volume of the encoding target volume (volume idx=3) shown in FIG. 61, using a neighboring volume (volume idx=0). Volume idx here is identifier information that is appended to a volume in a space, and a different value is assigned to each volume. An order of assigning volume idx may be the same as an encoding order, and may also be different from the encoding order. For example, intra predictor 1309 uses an average value of color information of voxels included in volume idx=0, which is a neighboring volume, as the predicted value of the color information of the encoding target volume shown in FIG. 61. In this case, a prediction residual is generated by deducting the predicted value of the color information from the color information of each voxel included in the encoding target volume. The following processes are performed by transformer 1303 and subsequent processors with respect to this prediction residual. In this case, three-dimensional data encoding device 1300 appends, to the bitstream, neighboring volume information and prediction mode information. The neighboring volume information here is information indicating a neighboring volume used in the prediction, and indicates, for example, volume idx of the neighboring volume used in the prediction. The prediction mode information here indicates a mode used to generate the predicted volume. The mode is, for example, an average value mode in which the predicted value is generated using an average value of the voxels in the neighboring volume, or a median mode in which the predicted value is generated using the median of the voxels in the neighboring volume.

Intra predictor 1309 may generate the predicted volume using a plurality of neighboring volumes. For example, in the structure shown in FIG. 61, intra predictor 1309 generates predicted volume 0 using a volume with volume idx=0, and generates predicted volume 1 using a volume with volume idx=1. Intra predictor 1309 then generates an average of predicted volume 0 and predicted volume 1 as a final predicted volume. In this case, three-dimensional data encoding device 1300 may append, to the bitstream, a plurality of volumes idx of a plurality of volumes used to generate the predicted volume.

Figure 62:
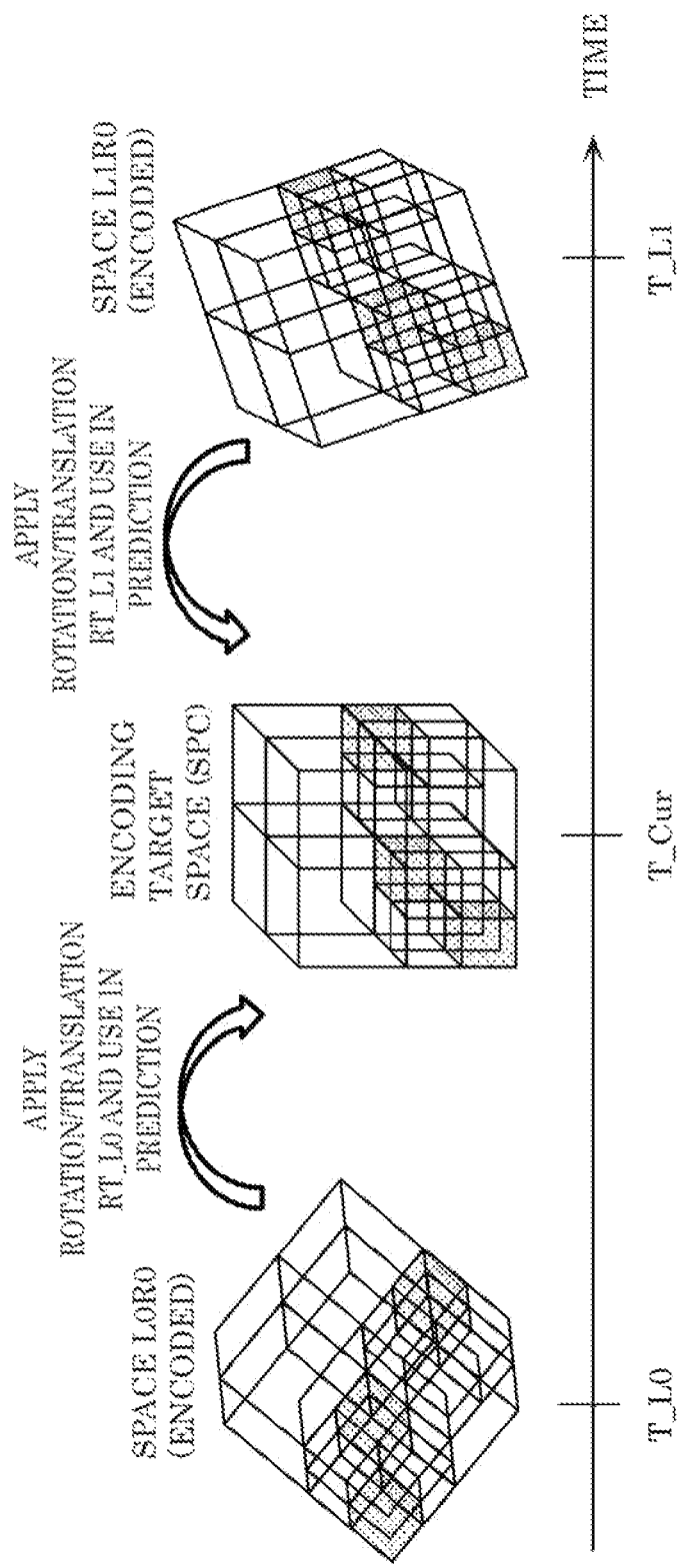
FIG. 62 is a diagram for describing a rotation and translation process according to Embodiment 8.

FIG. 62 is a diagram schematically showing the inter prediction process according to the present embodiment. Inter predictor 1311 encodes (inter predicts) a space (SPC) associated with certain time T_Cur using an encoded space associated with different time T_LX. In this case, inter predictor 1311 performs an encoding process by applying a rotation and translation process to the encoded space associated with different time T_LX.

Three-dimensional data encoding device 1300 appends, to the bitstream, RT information relating to a rotation and translation process suited to the space associated with different time T_LX. Different time T_LX is, for example, time T_L0 before certain time T_Cur. At this point, three-dimensional data encoding device 1300 may append, to the bitstream, RT information RT_L0 relating to a rotation and translation process suited to a space associated with time T_L0.

Alternatively, different time T_LX is, for example, time T_L1 after certain time T_Cur. At this point, three-dimensional data encoding device 1300 may append, to the bitstream, RT information RT L1 relating to a rotation and translation process suited to a space associated with time T_L1.

Alternatively, inter predictor 1311 encodes (bidirectional prediction) with reference to the spaces associated with time T_L0 and time T_L1 that differ from each other. In this case, three-dimensional data encoding device 1300 may append, to the bitstream, both RT information RT_L0 and RT information RT L1 relating to the rotation and translation process suited to the spaces thereof.

Note that T_L0 has been described as being before T_Cur and T_L1 as being after T_Cur, but are not necessarily limited thereto. For example, T_L0 and T_L1 may both be before T_Cur. T_L0 and T_L1 may also both be after T_Cur.

Three-dimensional data encoding device 1300 may append, to the bitstream, RT information relating to a rotation and translation process suited to spaces associated with different times, when encoding with reference to each of the spaces. For example, three-dimensional data encoding device 1300 manages a plurality of encoded spaces to be referred to, using two reference lists (list L0 and list L1). When a first reference space in list L0 is L0R0, a second reference space in list L0 is L0RI, a first reference space in list L1 is L1R0, and a second reference space in list L1 is L1R1, three-dimensional data encoding device 1300 appends, to the bitstream, RT information RT L0R0 of L0R0, RT information RT_L0R1 of L0R1, RT information RT_L1R0 of L1R0, and RT information RT_L1R1 of L1R1. For example, three-dimensional data encoding device 1300 appends these pieces of RT information to a header and the like of the bitstream.

Three-dimensional data encoding device 1300 determines whether to apply rotation and translation per reference space, when encoding with reference to reference spaces associated with different times. In this case, three-dimensional data encoding device 1300 may append, to header information and the like of the bitstream, information (RT flag, etc.) indicating whether rotation and translation are applied per reference space. For example, three-dimensional data encoding device 1300 calculates the RT information and an Iterative Closest Point (ICP) error value, using an ICP algorithm per reference space to be referred to from the encoding target space. Three-dimensional data encoding device 1300 determines that rotation and translation do not need to be performed and sets the RT flag to OFF, when the ICP error value is lower than or equal to a predetermined fixed value. In contrast, three-dimensional data encoding device 1300 sets the RT flag to ON and appends the RT information to the bitstream, when the ICP error value exceeds the above fixed value.

FIG. 63 is a diagram showing an example syntax to be appended to a header of the RT information and the RT flag. Note that a bit count assigned to each syntax may be decided based on a range of this syntax. For example, when eight reference spaces are included in reference list L0, 3 bits may be assigned to MaxRefSpc_l0. The bit count to be assigned may be variable in accordance with a value each syntax can be, and may also be fixed regardless of the value each syntax can be. When the bit count to be assigned is fixed, three-dimensional data encoding device 1300 may append this fixed bit count to other header information.

MaxRefSpc_l0 shown in FIG. 63 indicates a number of reference spaces included in reference list L0. RT_flag_l0[$i$] is an RT flag of reference space i in reference list L0. When RT_flag_l0[$i$] is 1, rotation and translation are applied to reference space i. When RT_flag_l0[$i$] is 0, rotation and translation are not applied to reference space i.

R_l0[$i$] and T_l0[$i$] are RT information of reference space i in reference list L0. R_l0[$i$] is rotation information of reference space i in reference list L0. The rotation information indicates contents of the applied rotation process, and is, for example, a rotation matrix or a quaternion. T_l0[$i$] is translation information of reference space i in reference list L0. The translation information indicates contents of the applied translation process, and is, for example, a translation vector.

MaxRefSpc_l1 indicates a number of reference spaces included in reference list L1. RT_flag_l1[$i$] is an RT flag of reference space i in reference list L1. When RT_flag_l1[$i$] is 1, rotation and translation are applied to reference space i. When RT_flag_l1[$i$] is 0, rotation and translation are not applied to reference space i.

R_l1[$i$] and T_l1[$i$] are RT information of reference space i in reference list L1. R_l1[$i$] is rotation information of reference space i in reference list L1. The rotation information indicates contents of the applied rotation process, and is, for example, a rotation matrix or a quaternion. T_l1[$i$] is translation information of reference space i in reference list L1. The translation information indicates contents of the applied translation process, and is, for example, a translation vector.

Inter predictor 1311 generates the predicted volume of the encoding target volume using information on an encoded reference space stored in reference space memory 1310. As stated above, before generating the predicted volume of the encoding target volume, inter predictor 1311 calculates RT information at an encoding target space and a reference space using an ICP algorithm, in order to approach an overall positional relationship between the encoding target space and the reference space. Inter predictor 1311 then obtains reference space B by applying a rotation and translation process to the reference space using the calculated RT information. Subsequently, inter predictor 1311 generates the predicted volume of the encoding target volume in the encoding target space using information in reference space B. Three-dimensional data encoding device 1300 appends, to header information and the like of the encoding target space, the RT information used to obtain reference space B.

In this manner, inter predictor 1311 is capable of improving precision of the predicted volume by generating the predicted volume using the information of the reference space, after approaching the overall positional relationship between the encoding target space and the reference space, by applying a rotation and translation process to the reference space. It is possible to reduce the encoding amount since it is possible to limit the prediction residual. Note that an example has been described in which ICP is performed using the encoding target space and the reference space, but is not necessarily limited thereto. For example, inter predictor 1311 may calculate the RT information by performing ICP using at least one of (i) an encoding target space in which a voxel or point cloud count is pruned, or (ii) a reference space in which a voxel or point cloud count is pruned, in order to reduce the processing amount.

When the ICP error value obtained as a result of the ICP is smaller than a predetermined first threshold, i.e., when for example the positional relationship between the encoding target space and the reference space is similar, inter predictor 1311 determines that a rotation and translation process is not necessary, and the rotation and translation process does not need to be performed. In this case, three-dimensional data encoding device 1300 may control the overhead by not appending the RT information to the bitstream.

When the ICP error value is greater than a predetermined second threshold, inter predictor 1311 determines that a shape change between the spaces is large, and intra prediction may be applied on all volumes of the encoding target space. Hereinafter, spaces to which intra prediction is applied will be referred to as intra spaces. The second threshold is greater than the above first threshold. The present embodiment is not limited to ICP, and any type of method may be used as long as the method calculates the RT information using two voxel sets or two point cloud sets.

Figure 64:
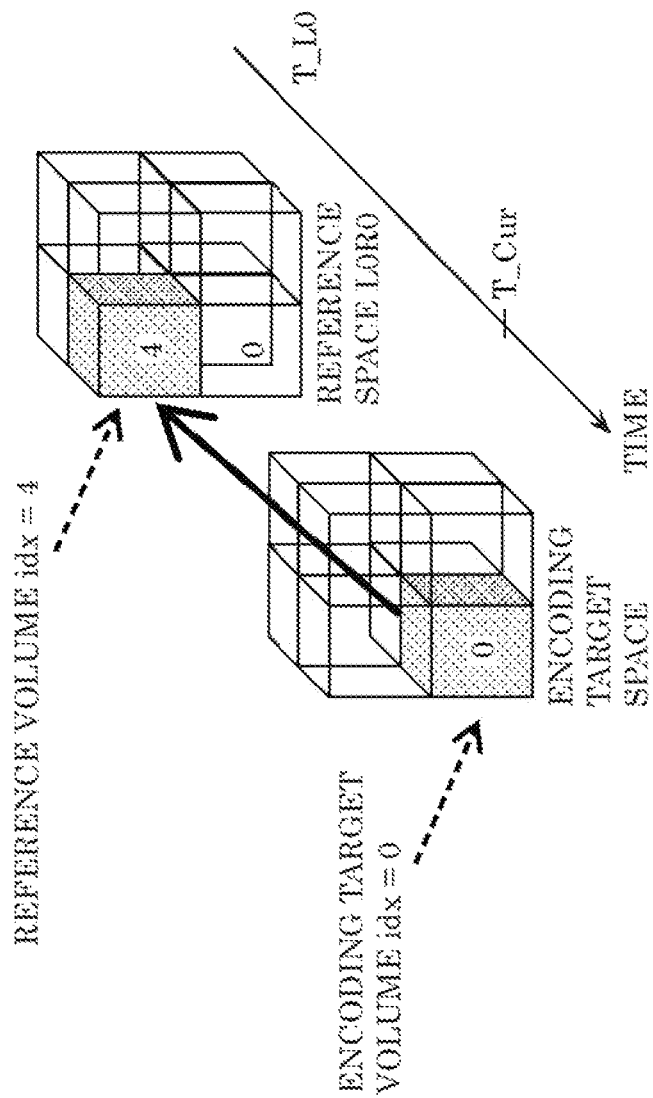
FIG. 64 is a diagram for describing an inter prediction process according to Embodiment 8.

When attribute information, e.g. shape or color information, is included in the three-dimensional data, inter predictor 1311 searches, for example, a volume whose attribute information, e.g. shape or color information, is the most similar to the encoding target volume in the reference space, as the predicted volume of the encoding target volume in the encoding target space. This reference space is, for example, a reference space on which the above rotation and translation process has been performed. Inter predictor 1311 generates the predicted volume using the volume (reference volume) obtained through the search. FIG. 64 is a diagram for describing a generating operation of the predicted volume. When encoding the encoding target volume (volume idx=0) shown in FIG. 64 using inter prediction, inter predictor 1311 searches a volume with a smallest prediction residual, which is the difference between the encoding target volume and the reference volume, while sequentially scanning the reference volume in the reference space. Inter predictor 1311 selects the volume with the smallest prediction residual as the predicted volume. The prediction residuals of the encoding target volume and the predicted volume are encoded through the processes performed by transformer 1303 and subsequent processors. The prediction residual here is a difference between the attribute information of the encoding target volume and the attribute information of the predicted volume. Three-dimensional data encoding device 1300 appends, to the header and the like of the bitstream, volume idx of the reference volume in the reference space, as the predicted volume.

In the example shown in FIG. 64, the reference volume with volume idx=4 of reference space L0R0 is selected as the predicted volume of the encoding target volume. The prediction residuals of the encoding target volume and the reference volume, and reference volume idx=4 are then encoded and appended to the bitstream.

Note that an example has been described in which the predicted volume of the attribute information is generated, but the same process may be applied to the predicted volume of the position information.

Prediction controller 1312 controls whether to encode the encoding target volume using intra prediction or inter prediction. A mode including intra prediction and inter prediction is referred to here as a prediction mode. For example, prediction controller 1312 calculates the prediction residual when the encoding target volume is predicted using intra prediction and the prediction residual when the encoding target volume is predicted using inter prediction as evaluation values, and selects the prediction mode whose evaluation value is smaller. Note that prediction controller 1312 may calculate an actual encoding amount by applying orthogonal transformation, quantization, and entropy encoding to the prediction residual of the intra prediction and the prediction residual of the inter prediction, and select a prediction mode using the calculated encoding amount as the evaluation value. Overhead information (reference volume idx information, etc.) aside from the prediction residual may be added to the evaluation value. Prediction controller 1312 may continuously select intra prediction when it has been decided in advance to encode the encoding target space using intra space.

Entropy encoder 1313 generates an encoded signal (encoded bitstream) by variable-length encoding the quantized coefficient, which is an input from quantizer 1304. To be specific, entropy encoder 1313, for example, binarizes the quantized coefficient and arithmetically encodes the obtained binary signal.

Figure 65:
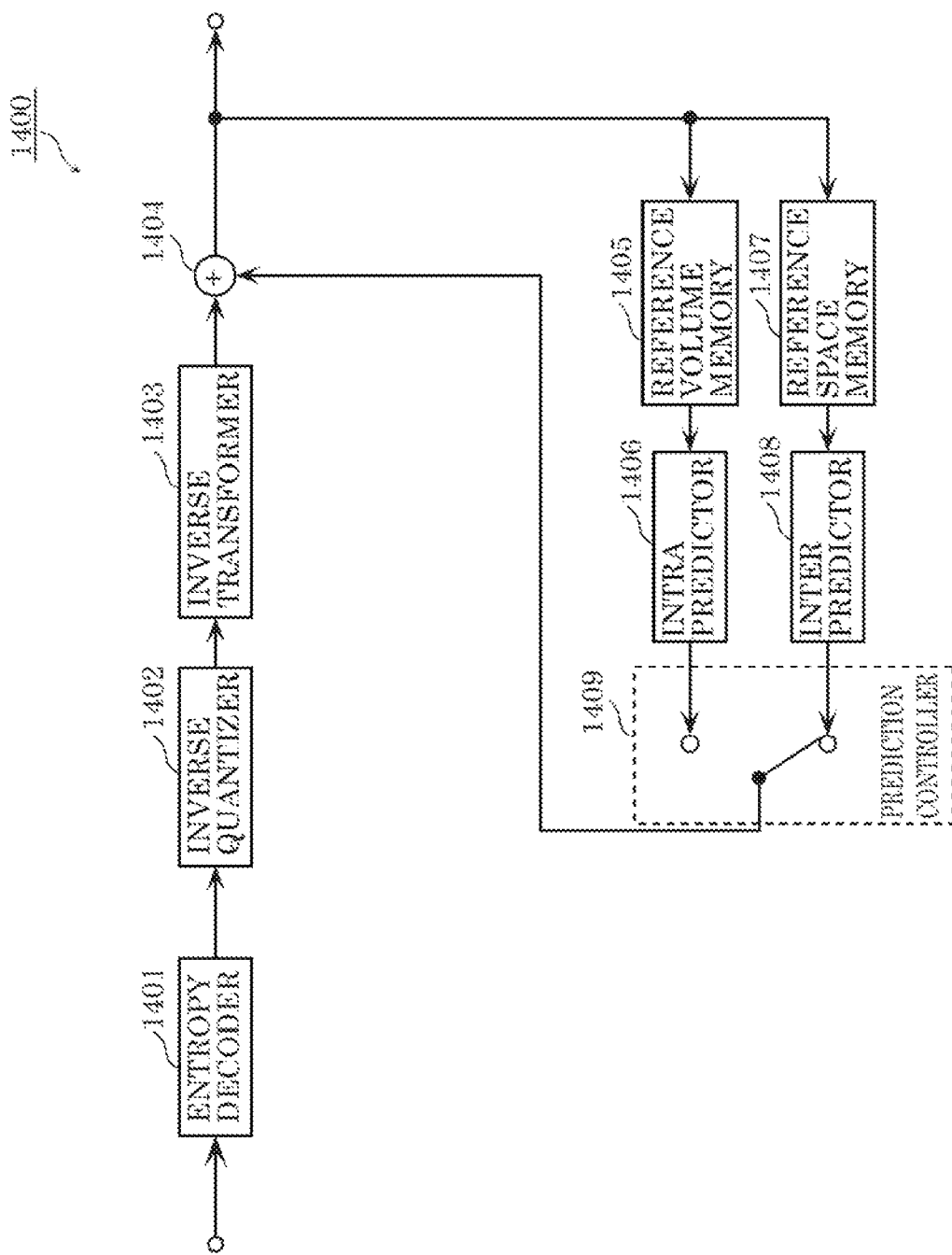
FIG. 65 is a block diagram of a three-dimensional data decoding device according to Embodiment 8.

A three-dimensional data decoding device that decodes the encoded signal generated by three-dimensional data encoding device 1300 will be described next. FIG. 65 is a block diagram of three-dimensional data decoding device 1400 according to the present embodiment. This three-dimensional data decoding device 1400 includes entropy decoder 1401, inverse quantizer 1402, inverse transformer 1403, adder 1404, reference volume memory 1405, intra predictor 1406, reference space memory 1407, inter predictor 1408, and prediction controller 1409.

Entropy decoder 1401 variable-length decodes the encoded signal (encoded bitstream). For example, entropy decoder 1401 generates a binary signal by arithmetically decoding the encoded signal, and generates a quantized coefficient using the generated binary signal.

Inverse quantizer 1402 generates an inverse quantized coefficient by inverse quantizing the quantized coefficient inputted from entropy decoder 1401, using a quantization parameter appended to the bitstream and the like.

Inverse transformer 1403 generates a prediction residual by inverse transforming the inverse quantized coefficient inputted from inverse quantizer 1402. For example, inverse transformer 1403 generates the prediction residual by inverse orthogonally transforming the inverse quantized coefficient, based on information appended to the bitstream.

Adder 1404 adds, to generate a reconstructed volume, (i) the prediction residual generated by inverse transformer 1403 to (ii) a predicted volume generated through intra prediction or intra prediction. This reconstructed volume is outputted as decoded three-dimensional data and is stored in reference volume memory 1405 or reference space memory 1407.

Intra predictor 1406 generates a predicted volume through intra prediction using a reference volume in reference volume memory 1405 and information appended to the bitstream. To be specific, intra predictor 1406 obtains neighboring volume information (e.g. volume idx) appended to the bitstream and prediction mode information, and generates the predicted volume through a mode indicated by the prediction mode information, using a neighboring volume indicated in the neighboring volume information. Note that the specifics of these processes are the same as the above-mentioned processes performed by intra predictor 1309, except for which information appended to the bitstream is used.

Inter predictor 1408 generates a predicted volume through inter prediction using a reference space in reference space memory 1407 and information appended to the bitstream. To be specific, inter predictor 1408 applies a rotation and translation process to the reference space using the RT information per reference space appended to the bitstream, and generates the predicted volume using the rotated and translated reference space. Note that when an RT flag is present in the bitstream per reference space, inter predictor 1408 applies a rotation and translation process to the reference space in accordance with the RT flag. Note that the specifics of these processes are the same as the above-mentioned processes performed by inter predictor 1311, except for which information appended to the bitstream is used.

Prediction controller 1409 controls whether to decode a decoding target volume using intra prediction or inter prediction. For example, prediction controller 1409 selects intra prediction or inter prediction in accordance with information that is appended to the bitstream and indicates the prediction mode to be used. Note that prediction controller 1409 may continuously select intra prediction when it has been decided in advance to decode the decoding target space using intra space.

Hereinafter, variations of the present embodiment will be described. In the present embodiment, an example has been described in which rotation and translation is applied in units of spaces, but rotation and translation may also be applied in smaller units. For example, three-dimensional data encoding device 1300 may divide a space into subspaces, and apply rotation and translation in units of subspaces. In this case, three-dimensional data encoding device 1300 generates RT information per subspace, and appends the generated RT information to a header and the like of the bitstream. Three-dimensional data encoding device 1300 may apply rotation and translation in units of volumes, which is an encoding unit. In this case, three-dimensional data encoding device 1300 generates RT information in units of encoded volumes, and appends the generated RT information to a header and the like of the bitstream. The above may also be combined. In other words, three-dimensional data encoding device 1300 may apply rotation and translation in large units and subsequently apply rotation and translation in small units. For example, three-dimensional data encoding device 1300 may apply rotation and translation in units of spaces, and may also apply different rotations and translations to each of a plurality of volumes included in the obtained spaces.

In the present embodiment, an example has been described in which rotation and translation is applied to the reference space, but is not necessarily limited thereto. For example, three-dimensional data encoding device 1300 may apply a scaling process and change a size of the three-dimensional data. Three-dimensional data encoding device 1300 may also apply one or two of the rotation, translation, and scaling. When applying the processes in multiple stages and different units as stated above, a type of the processes applied in each unit may differ. For example, rotation and translation may be applied in units of spaces, and translation may be applied in units of volumes.

Note that these variations are also applicable to three-dimensional data decoding device 1400.

As stated above, three-dimensional data encoding device 1300 according to the present embodiment performs the following processes. FIG. 65 is a flowchart of the inter prediction process performed by three-dimensional data encoding device 1300.

Three-dimensional data encoding device 1300 generates predicted position information (e.g. predicted volume) using position information on three-dimensional points included in three-dimensional reference data (e.g. reference space) associated with a time different from a time associated with current three-dimensional data (e.g. encoding target space) (S1301). To be specific, three-dimensional data encoding device 1300 generates the predicted position information by applying a rotation and translation process to the position information on the three-dimensional points included in the three-dimensional reference data.

Note that three-dimensional data encoding device 1300 may perform a rotation and translation process using a first unit (e.g. spaces), and may perform the generating of the predicted position information using a second unit (e.g. volumes) that is smaller than the first unit. For example, three-dimensional data encoding device 1300 searches a volume among a plurality of volumes included in the rotated and translated reference space, whose position information differs the least from the position information of the encoding target volume included in the encoding target space. Note that three-dimensional data encoding device 1300 may perform the rotation and translation process, and the generating of the predicted position information in the same unit.

Three-dimensional data encoding device 1300 may generate the predicted position information by applying (i) a first rotation and translation process to the position information on the three-dimensional points included in the three-dimensional reference data, and (ii) a second rotation and translation process to the position information on the three-dimensional points obtained through the first rotation and translation process, the first rotation and translation process using a first unit (e.g. spaces) and the second rotation and translation process using a second unit (e.g. volumes) that is smaller than the first unit.

For example, as illustrated in FIG. 58, the position information on the three-dimensional points and the predicted position information is represented using an octree structure. For example, the position information on the three-dimensional points and the predicted position information is expressed in a scan order that prioritizes a breadth over a depth in the octree structure. For example, the position information on the three-dimensional points and the predicted position information is expressed in a scan order that prioritizes a depth over a breadth in the octree structure.

As illustrated in FIG. 63, three-dimensional data encoding device 1300 encodes an RT flag that indicates whether to apply the rotation and translation process to the position information on the three-dimensional points included in the three-dimensional reference data. In other words, three-dimensional data encoding device 1300 generates the encoded signal (encoded bitstream) including the RT flag. Three-dimensional data encoding device 1300 encodes RT information that indicates contents of the rotation and translation process. In other words, three-dimensional data encoding device 1300 generates the encoded signal (encoded bitstream) including the RT information. Note that three-dimensional data encoding device 1300 may encode the RT information when the RT flag indicates to apply the rotation and translation process, and does not need to encode the RT information when the RT flag indicates not to apply the rotation and translation process.

The three-dimensional data includes, for example, the position information on the three-dimensional points and the attribute information (color information, etc.) of each three-dimensional point. Three-dimensional data encoding device 1300 generates predicted attribute information using the attribute information of the three-dimensional points included in the three-dimensional reference data (S1302).

Three-dimensional data encoding device 1300 next encodes the position information on the three-dimensional points included in the current three-dimensional data, using the predicted position information. For example, as illustrated in FIG. 55, three-dimensional data encoding device 1300 calculates differential position information, the differential position information being a difference between the predicted position information and the position information on the three-dimensional points included in the current three-dimensional data (S1303).

Three-dimensional data encoding device 1300 encodes the attribute information of the three-dimensional points included in the current three-dimensional data, using the predicted attribute information. For example, three-dimensional data encoding device 1300 calculates differential attribute information, the differential attribute information being a difference between the predicted attribute information and the attribute information on the three-dimensional points included in the current three-dimensional data (S1304). Three-dimensional data encoding device 1300 next performs transformation and quantization on the calculated differential attribute information (S1305).

Lastly, three-dimensional data encoding device 1300 encodes (e.g. entropy encodes) the differential position information and the quantized differential attribute information (S1036). In other words, three-dimensional data encoding device 1300 generates the encoded signal (encoded bitstream) including the differential position information and the differential attribute information.

Note that when the attribute information is not included in the three-dimensional data, three-dimensional data encoding device 1300 does not need to perform steps S1302, S1304, and S1305. Three-dimensional data encoding device 1300 may also perform only one of the encoding of the position information on the three-dimensional points and the encoding of the attribute information of the three-dimensional points.

Figure 66:
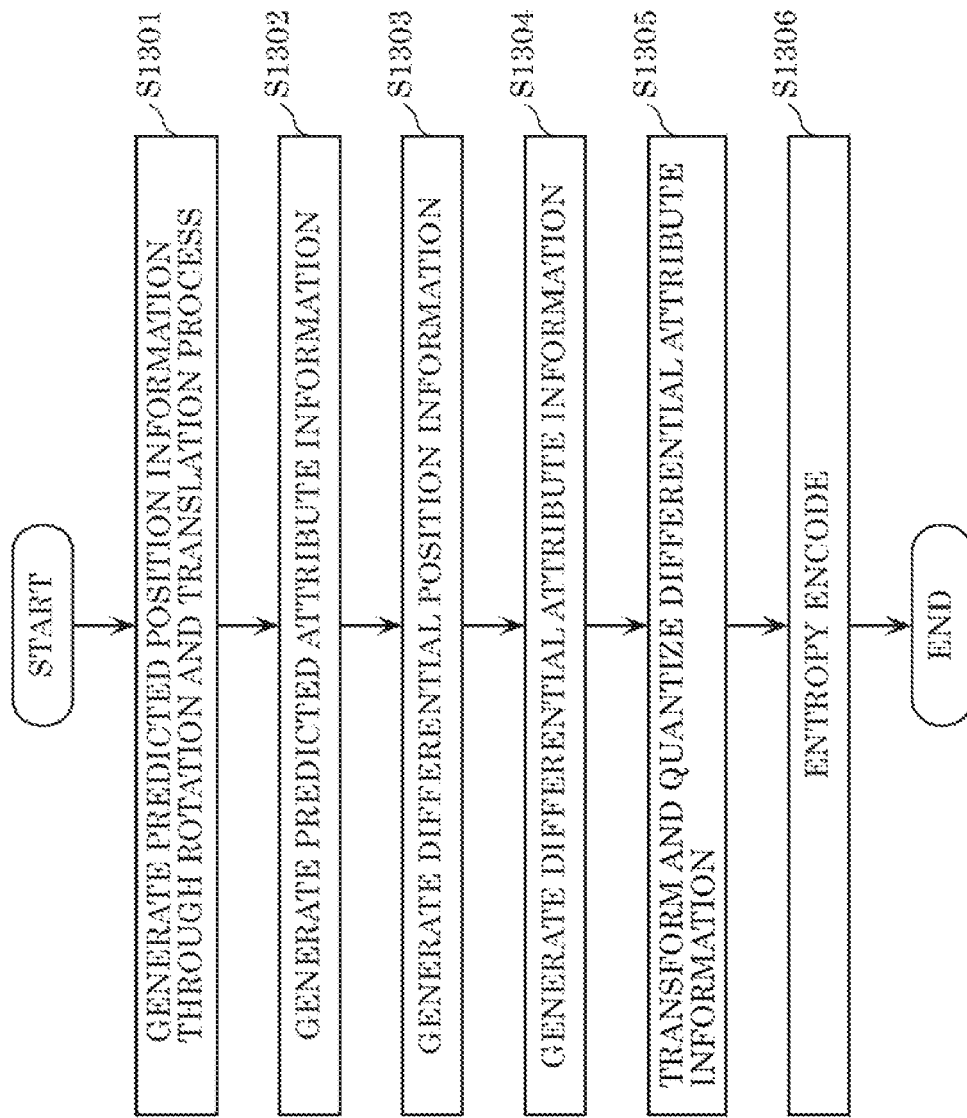
FIG. 66 is a flowchart of a three-dimensional data encoding process performed by the three-dimensional data encoding device according to Embodiment 8.

An order of the processes shown in FIG. 66 is merely an example and is not limited thereto. For example, since the processes with respect to the position information (S1301 and S1303) and the processes with respect to the attribute information (S1302, S1304, and S1305) are separate from one another, they may be performed in an order of choice, and a portion thereof may also be performed in parallel.

With the above, three-dimensional data encoding device 1300 according to the present embodiment generates predicted position information using position information on three-dimensional points included in three-dimensional reference data associated with a time different from a time associated with current three-dimensional data; and encodes differential position information, which is a difference between the predicted position information and the position information on the three-dimensional points included in the current three-dimensional data. This makes it possible to improve encoding efficiency since it is possible to reduce the amount of data of the encoded signal.

Three-dimensional data encoding device 1300 according to the present embodiment generates predicted attribute information using attribute information on three-dimensional points included in three-dimensional reference data; and encodes differential attribute information, which is a difference between the predicted attribute information and the attribute information on the three-dimensional points included in the current three-dimensional data. This makes it possible to improve encoding efficiency since it is possible to reduce the amount of data of the encoded signal.

For example, three-dimensional data encoding device 1300 includes a processor and memory. The processor uses the memory to perform the above processes.

FIG. 65 is a flowchart of the inter prediction process performed by three-dimensional data decoding device 1400.

Three-dimensional data decoding device 1400 decodes (e.g. entropy decodes) the differential position information and the differential attribute information from the encoded signal (encoded bitstream) (S1401).

Three-dimensional data decoding device 1400 decodes, from the encoded signal, an RT flag that indicates whether to apply the rotation and translation process to the position information on the three-dimensional points included in the three-dimensional reference data. Three-dimensional data decoding device 1400 encodes RT information that indicates contents of the rotation and translation process. Note that three-dimensional data decoding device 1400 may decode the RT information when the RT flag indicates to apply the rotation and translation process, and does not need to decode the RT information when the RT flag indicates not to apply the rotation and translation process.

Three-dimensional data decoding device 1400 next performs inverse transformation and inverse quantization on the decoded differential attribute information (S1402).

Three-dimensional data decoding device 1400 next generates predicted position information (e.g. predicted volume) using the position information on the three-dimensional points included in the three-dimensional reference data (e.g. reference space) associated with a time different from a time associated with the current three-dimensional data (e.g. decoding target space) (S1403). To be specific, three-dimensional data decoding device 1400 generates the predicted position information by applying a rotation and translation process to the position information on the three-dimensional points included in the three-dimensional reference data.

More specifically, when the RT flag indicates to apply the rotation and translation process, three-dimensional data decoding device 1400 applies the rotation and translation process on the position information on the three-dimensional points included in the three-dimensional reference data indicated in the RT information. In contrast, when the RT flag indicates not to apply the rotation and translation process, three-dimensional data decoding device 1400 does not apply the rotation and translation process on the position information on the three-dimensional points included in the three-dimensional reference data.

Note that three-dimensional data decoding device 1400 may perform the rotation and translation process using a first unit (e.g. spaces), and may perform the generating of the predicted position information using a second unit (e.g. volumes) that is smaller than the first unit. Note that three-dimensional data decoding device 1400 may perform the rotation and translation process, and the generating of the predicted position information in the same unit.

Three-dimensional data decoding device 1400 may generate the predicted position information by applying (i) a first rotation and translation process to the position information on the three-dimensional points included in the three-dimensional reference data, and (ii) a second rotation and translation process to the position information on the three-dimensional points obtained through the first rotation and translation process, the first rotation and translation process using a first unit (e.g. spaces) and the second rotation and translation process using a second unit (e.g. volumes) that is smaller than the first unit.

For example, as illustrated in FIG. 58, the position information on the three-dimensional points and the predicted position information is represented using an octree structure. For example, the position information on the three-dimensional points and the predicted position information is expressed in a scan order that prioritizes a breadth over a depth in the octree structure. For example, the position information on the three-dimensional points and the predicted position information is expressed in a scan order that prioritizes a depth over a breadth in the octree structure.

Three-dimensional data decoding device 1400 generates predicted attribute information using the attribute information of the three-dimensional points included in the three-dimensional reference data (S1404).

Three-dimensional data decoding device 1400 next restores the position information on the three-dimensional points included in the current three-dimensional data, by decoding encoded position information included in an encoded signal, using the predicted position information. The encoded position information here is the differential position information. Three-dimensional data decoding device 1400 restores the position information on the three-dimensional points included in the current three-dimensional data, by adding the differential position information to the predicted position information (S1405).

Three-dimensional data decoding device 1400 restores the attribute information of the three-dimensional points included in the current three-dimensional data, by decoding encoded attribute information included in an encoded signal, using the predicted attribute information. The encoded attribute information here is the differential position information. Three-dimensional data decoding device 1400 restores the attribute information on the three-dimensional points included in the current three-dimensional data, by adding the differential attribute information to the predicted attribute information (S1406).

Note that when the attribute information is not included in the three-dimensional data, three-dimensional data decoding device 1400 does not need to perform steps S1402, S1404, and S1406. Three-dimensional data decoding device 1400 may also perform only one of the decoding of the position information on the three-dimensional points and the decoding of the attribute information of the three-dimensional points.

Figure 67:
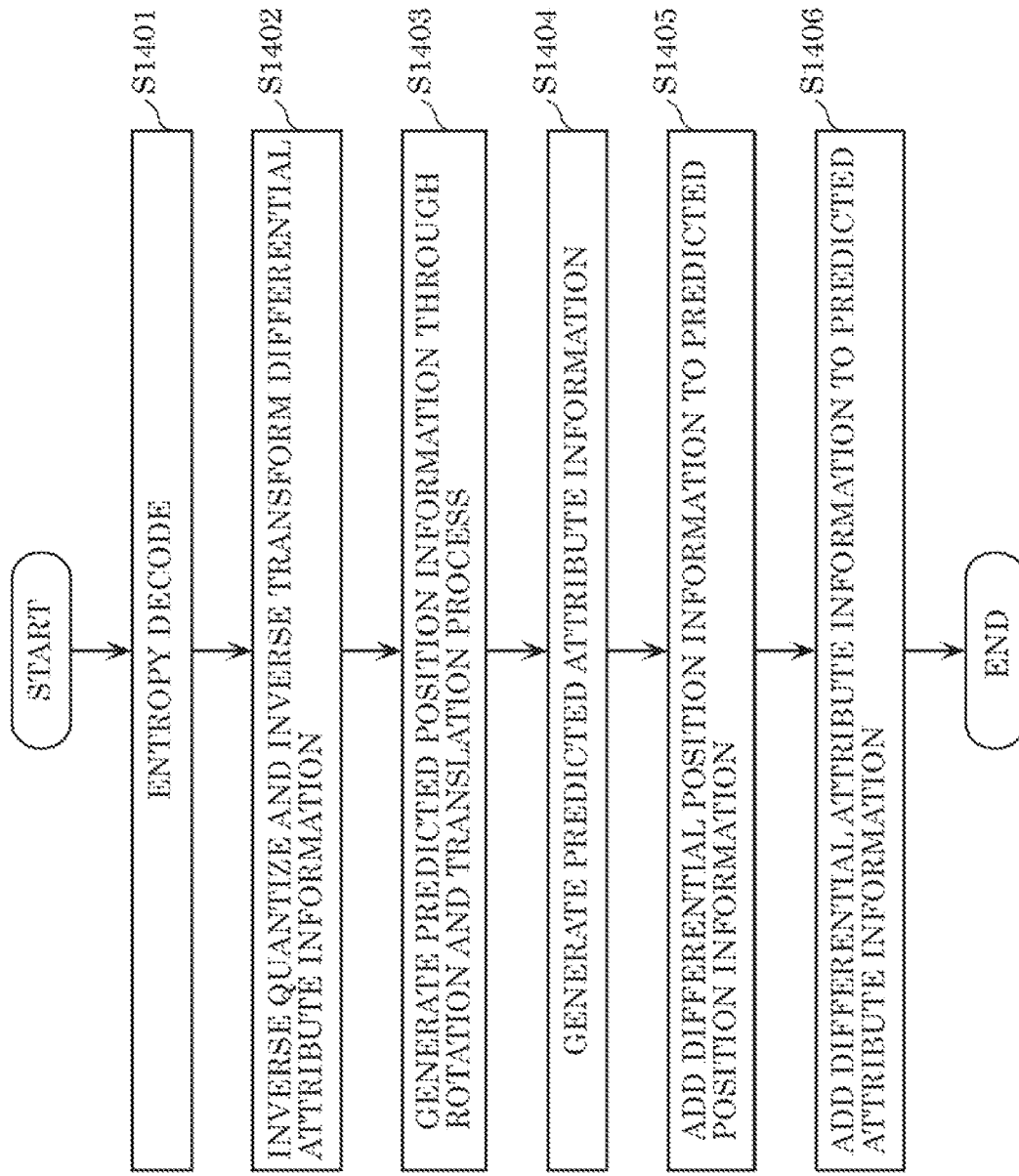
FIG. 67 is a flowchart of a three-dimensional data decoding process performed by the three-dimensional data decoding device according to Embodiment 8.

An order of the processes shown in FIG. 67 is merely an example and is not limited thereto. For example, since the processes with respect to the position information (S1403 and S1405) and the processes with respect to the attribute information (S1402, S1404, and S1406) are separate from one another, they may be performed in an order of choice, and a portion thereof may also be performed in parallel.

Embodiment 9

In the present embodiment, adaptive entropy encoding (arithmetic encoding) performed on occupancy codes of an octree will be described.

Figure 68:
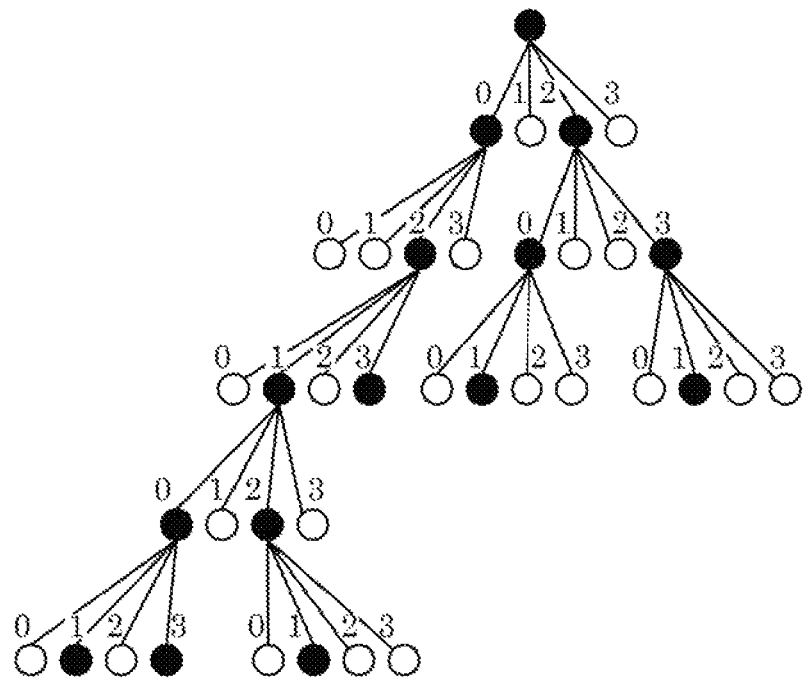
FIG. 68 is a diagram illustrating an example of a tree structure according to Embodiment 9.
Figure 69:
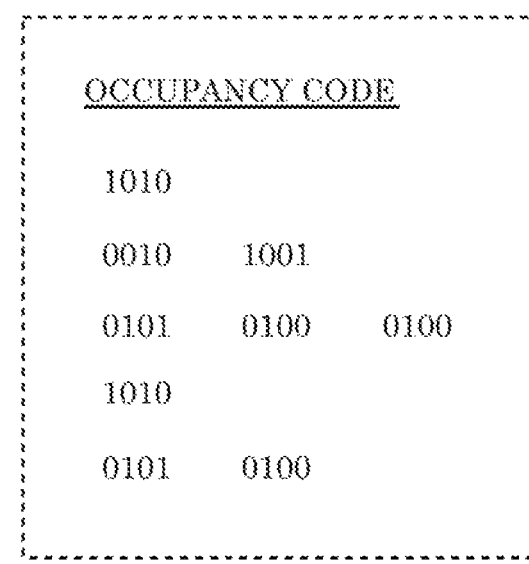
FIG. 69 is a diagram illustrating an example of occupancy codes according to Embodiment 9.
Figure 70:
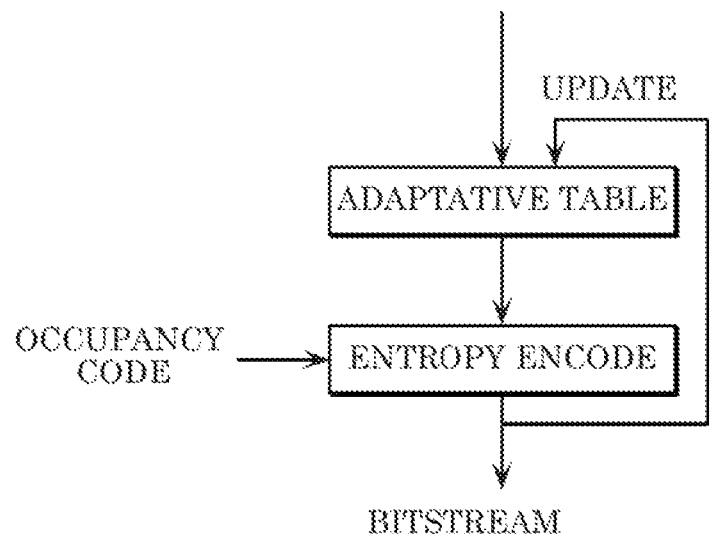
FIG. 70 is a diagram schematically illustrating an operation performed by a three-dimensional data encoding device according to Embodiment 9.

FIG. 68 is a diagram illustrating an example of a quadtree structure. FIG. 69 is a diagram illustrating occupancy codes of the tree structure illustrated in FIG. 68. FIG. 70 is a diagram schematically illustrating an operation performed by a three-dimensional data encoding device according to the present embodiment.

The three-dimensional data encoding device according to the present embodiment entropy encodes an 8-bit occupancy code in an octree. The three-dimensional data encoding device also updates a coding table in an entropy encoding process for occupancy code. Additionally, the three-dimensional data encoding device does not use a single coding table but uses an adaptive coding table in order to use similarity information of three-dimensional points. In other words, the three-dimensional data encoding device uses coding tables. Similarity information is, for example, geometry information of a three-dimensional point, structure information of an octree, or attribute information of a three-dimensional point.

It should be noted that although the quadtree is shown as the example in FIG. 68 to FIG. 70, the same method may be applied to an N-ary tree such as a binary tree, an octree, and a hexadecatree. For example, the three-dimensional data encoding device entropy encodes an 8-bit occupancy code in the case of an octree, a 4-bit occupancy code in the case of a quadtree, and a 16-bit occupancy code in the case of a hexadecatree, using an adaptive table (also referred to as a coding table).

The following describes an adaptive entropy encoding process using geometry information of a three-dimensional point.

When local geometries of two nodes in a tree structure are similar to each other, there is a chance that occupancy states (i.e., states each indicating whether a three-dimensional point is included) of child nodes are similar to each other. As a result, the three-dimensional data encoding device performs grouping using a local geometry of a parent node. This enables the three-dimensional data encoding device to group together the occupancy states of the child nodes, and use a different coding table for each group. Accordingly, it is possible to improve the entropy encoding efficiency.

Figure 71:
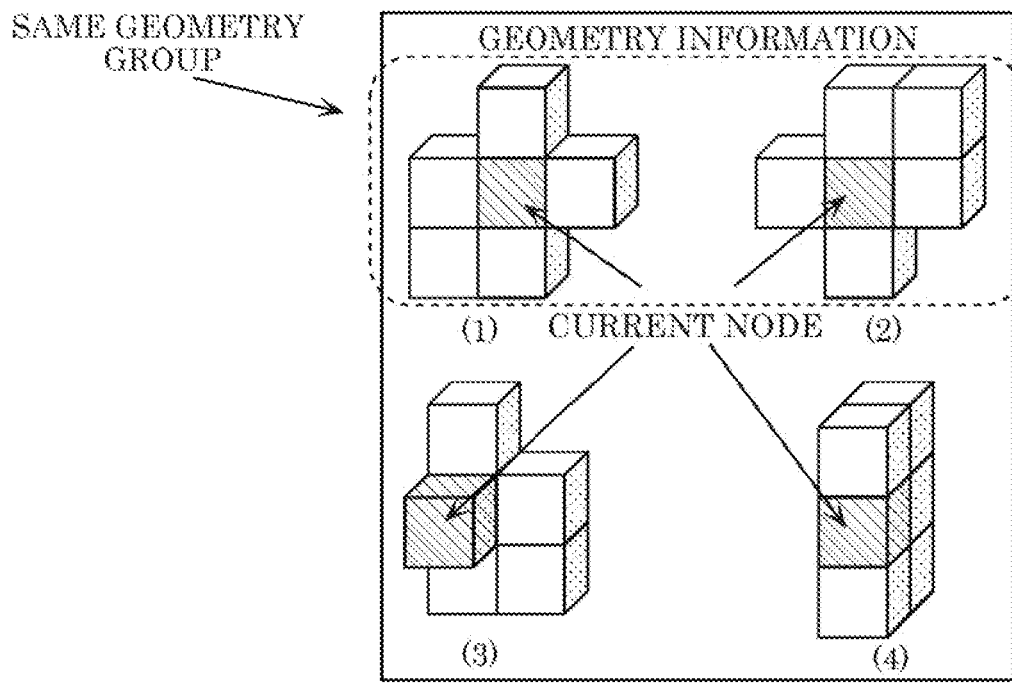
FIG. 71 is a diagram illustrating an example of geometry information according to Embodiment 9.

FIG. 71 is a diagram illustrating an example of geometry information. Geometry information includes information indicating whether each of neighboring nodes of a current node is occupied (i.e., includes a three-dimensional point). For example, the three-dimensional data encoding device calculates a local geometry of the current node using information indicating whether a neighboring node includes a three-dimensional point (is occupied or non-occupied). A neighboring node is, for example, a node spatially located around a current node, or a node located in the same position in a different time as the current node or spatially located around the position.

In FIG. 71, a hatched cube indicates a current node. A white cube is a neighboring node, and indicates a node including a three-dimensional point. In FIG. 71, the geometry pattern indicated in (2) is obtained by rotating the geometry pattern indicated in (1). Accordingly, the three-dimensional data encoding device determines that these geometry patterns have a high geometry similarity, and entropy encodes the geometry patterns using the same coding table. In addition, the three-dimensional data encoding device determines that the geometry patterns indicated in (3) and (4) have a low geometry similarity, and entropy encodes the geometry patterns using other coding tables.

Figure 72:
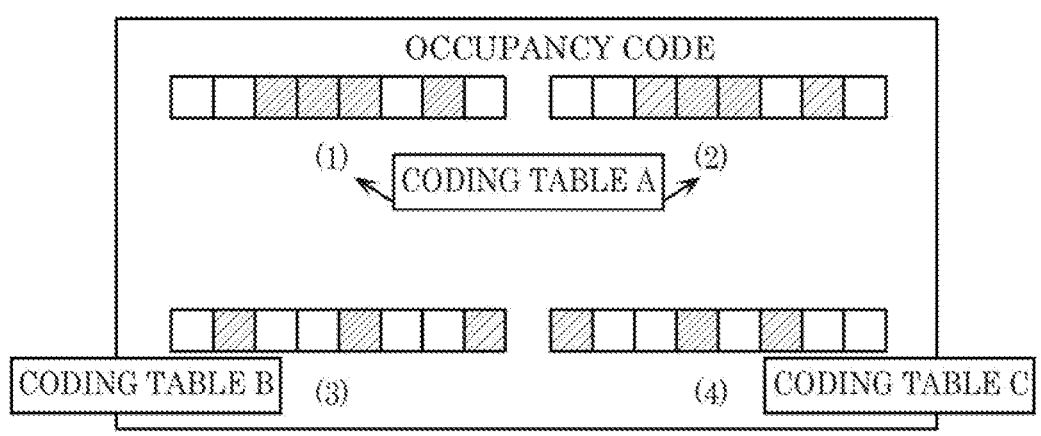
FIG. 72 is a diagram illustrating an example of selecting a coding table using geometry information according to Embodiment 9.

FIG. 72 is a diagram illustrating an example of occupancy codes of current nodes in the geometry patterns of (1) to (4) illustrated in FIG. 71, and coding tables used for entropy encoding. As illustrated above, the three-dimensional data encoding device determines that the geometry patterns of (1) and (2) are included in the same geometry group, and uses same coding table A for the geometry patterns of (1) and (2). The three-dimensional data encoding device uses coding table B and coding table C for the geometry patterns of (3) and (4), respectively.

As illustrated in FIG. 72, there is a case in which the occupancy codes of the current nodes in the geometry patterns of (1) and (2) included in the same geometry group are identical to each other.

Next, the following describes an adaptive entropy encoding process using structure information of a tree structure. For example, structure information includes information indicating a layer to which a current node belongs.

Figure 73:
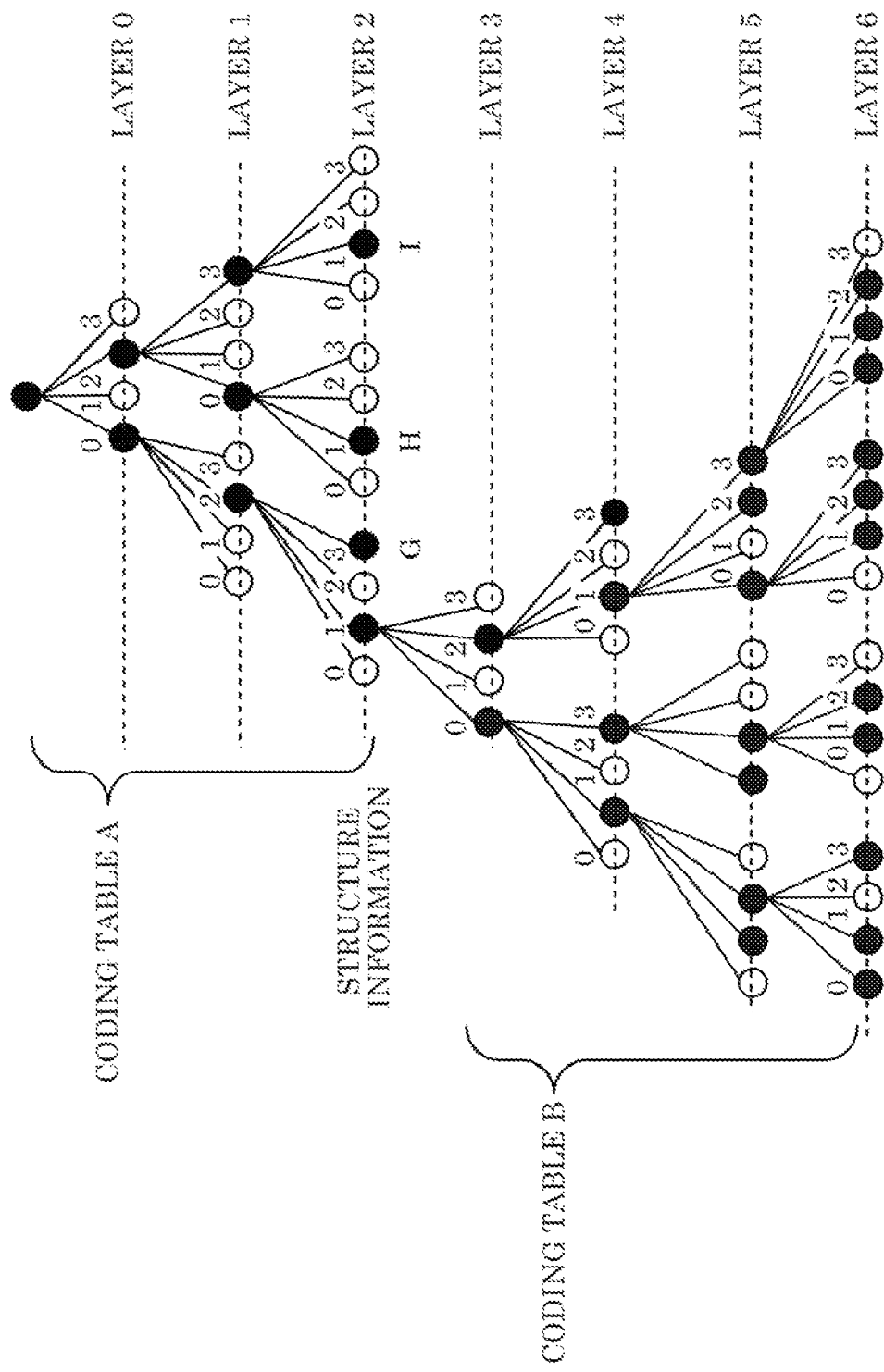
FIG. 73 is a diagram illustrating an example of selecting a coding table using structure information according to Embodiment 9.

FIG. 73 is a diagram illustrating an example of a tree structure. Generally speaking, a local shape of an object depends on a search criterion. For example, a tree structure tends to be sparser in a lower layer than in an upper layer. Accordingly, the three-dimensional data encoding device uses different coding tables for upper layers and lower layers as illustrated in FIG. 73, which makes it possible to improve the entropy encoding efficiency.

In other words, when the three-dimensional data encoding device encodes an occupancy code of each layer, the three-dimensional data encoding device may use a different coding table for each layer. For example, when the three-dimensional data encoding device encodes an occupancy code of layer N (N=0 to 6), the three-dimensional data encoding device may perform entropy encoding on the tree structure illustrated in FIG. 73 using a coding table for layer N. Since this enables the three-dimensional data encoding device to select a coding table in accordance with an appearance pattern of an occupancy code of each layer, the three-dimensional data encoding device can improve the coding efficiency.

Moreover, as illustrated in FIG. 73, the three-dimensional data encoding device may use coding table A for the occupancy codes of layer 0 to layer 2, and may use coding table B for the occupancy codes of layer 3 to layer 6. Since this enables the three-dimensional data encoding device to select a coding table in accordance with an appearance pattern of the occupancy code for each group of layers, the three-dimensional data encoding device can improve the coding efficiency. The three-dimensional data encoding device may append information of the coding table used for each layer, to a header of a bitstream. Alternatively, the coding table used for each layer may be predefined by standards etc.

Next, the following describes an adaptive entropy encoding process using attribute information (property information) of a three-dimensional point. For example, attribute information includes information about an object including a current node, or information about a normal vector of the current node.

It is possible to group together three-dimensional points having a similar geometry, using pieces of attribute information of the three-dimensional points. For example, a normal vector indicating a direction of each of the three-dimensional points may be used as common attribute information of the three-dimensional points. It is possible to find a geometry relating to a similar occupancy code in a tree structure by using the normal vector.

Moreover, a color or a degree of reflection (reflectance) may be used as attribute information. For example, the three-dimensional data encoding device groups together three-dimensional points having a similar geometry, using the colors or reflectances of the three-dimensional points, and performs a process such as switching between coding tables for each of the groups.

Figure 74:
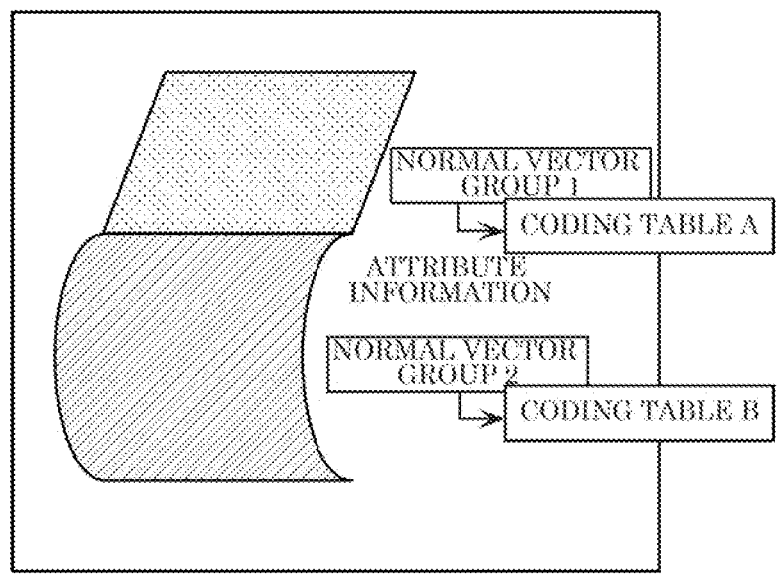
FIG. 74 is a diagram illustrating an example of selecting a coding table using attribute information according to Embodiment 9.

FIG. 74 is a diagram for describing switching between coding tables based on a normal vector. As illustrated in FIG. 74, when normal vector groups to which normal vectors of current nodes belong are different, different coding tables are used. For example, a normal vector included in a predetermined range is categorized into one normal vector group.

Figure 75:
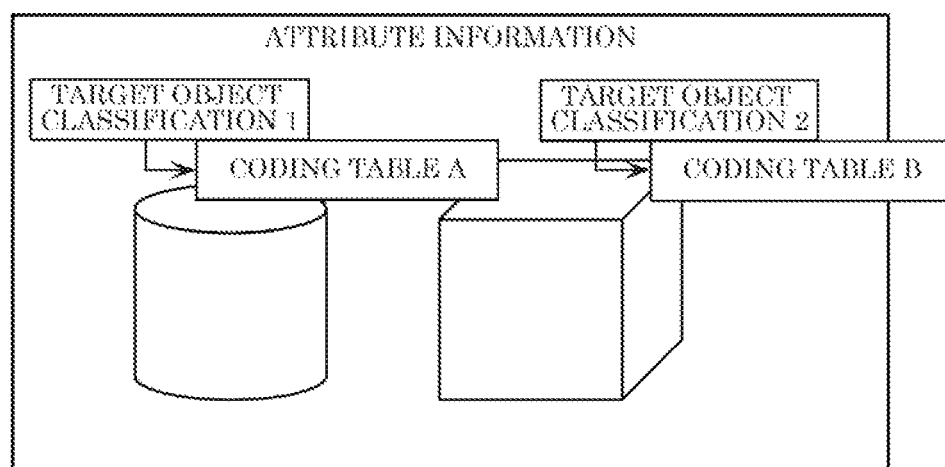
FIG. 75 is a diagram illustrating an example of selecting a coding table using attribute information according to Embodiment 9.

When objects belong in different categories, there is a high possibility that occupancy codes are different. Accordingly, the three-dimensional data encoding device may select a coding table in accordance with a category of an object to which a current node belongs. FIG. 75 is a diagram for describing switching between coding tables based on a category of an object. As illustrated in FIG. 75, when objects belong in different categories, different coding tables are used.

Figure 76:
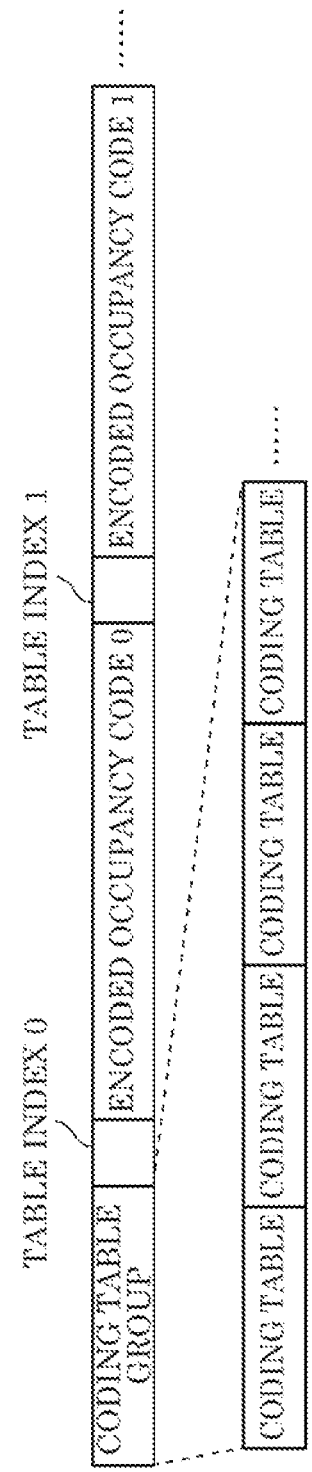
FIG. 76 is a diagram illustrating an example of a structure of a bitstream according to Embodiment 9.

The following describes an example of a structure of a bitstream according to the present embodiment. FIG. 76 is a diagram illustrating an example of a structure of a bitstream generated by the three-dimensional data encoding device according to the present embodiment. As illustrated in FIG. 76, the bitstream includes a coding table group, table indexes, and encoded occupancy codes. The coding table group includes coding tables.

A table index indicates a coding table used for entropy encoding of a subsequent encoded occupancy code. An encoded occupancy code is an occupancy code that has been entropy encoded. As illustrated in FIG. 76, the bitstream also includes combinations of a table index and an encoded occupancy code.

For example, in the example illustrated in FIG. 76, encoded occupancy code 0 is data that has been entropy encoded using a context model (also referred to as a context) indicated by table index 0. Encoded occupancy code 1 is data that has been entropy encoded using a context indicated by table index 1. A context for encoding encoded occupancy code 0 may be predefined by standards etc., and a three-dimensional data decoding device may use this context when decoding encoded occupancy code 0. Since this eliminates the need for appending the table index to the bitstream, it is possible to reduce overhead.

Moreover, the three-dimensional data encoding device may append, in the header, information for resetting each context.

The three-dimensional data encoding device determines a coding table using geometry information, structure information, or attribute information of a current node, and encodes an occupancy code using the determined coding table. The three-dimensional data encoding device appends a result of the encoding and information (e.g., a table index) of the coding table used for the encoding to a bitstream, and transmits the bitstream to the three-dimensional data decoding device. This enables the three-dimensional data decoding device to decode the occupancy code using the information of the coding table appended to the header.

Moreover, the three-dimensional data encoding device need not append information of a coding table used for encoding to a bitstream, and the three-dimensional data decoding device may determine a coding table using geometry information, structure information, or attribute information of a current node that has been decoded, using the same method as the three-dimensional data encoding device, and decode an occupancy code using the determined coding table. Since this eliminates the need for appending the information of the coding table to the bitstream, it is possible to reduce overhead.

FIG. 77 and FIG. 78 each are a diagram illustrating an example of a coding table. As illustrated in FIG. 77 and FIG. 78, one coding table shows, for each value of an 8-bit occupancy code, a context model and a context model type associated with the value.

As with the coding table illustrated in FIG. 77, the same context model (context) may be applied to occupancy codes. In addition, a different context model may be assigned to each occupancy code. Since this enables assignment of a context model in accordance with a probability of appearance of an occupancy code, it is possible to improve the coding efficiency.

A context model type indicates, for example, whether a context model is a context model that updates a probability table in accordance with an appearance frequency of an occupancy code, or is a context model having a fixed probability table.

Figure 79:
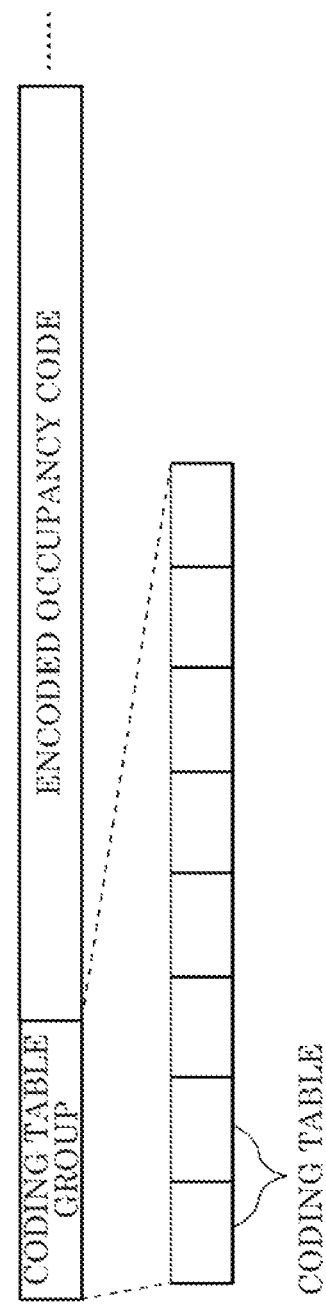
FIG. 79 is a diagram illustrating an example of a structure of a bitstream according to Embodiment 9.

Next, the following gives another example of a bitstream and a coding table. FIG. 79 is a diagram illustrating a variation of a structure of a bitstream. As illustrated in FIG. 79, the bitstream includes a coding table group and an encoded occupancy code. The coding table group includes coding tables.

Figures 80, 81, 82:
FIG. 80 is a diagram illustrating an example of a coding table according to Embodiment 9.
FIG. 81 is a diagram illustrating an example of a coding table according to Embodiment 9.
FIG. 82 is a diagram illustrating an example of bit numbers of an occupancy code according to Embodiment 9.

FIG. 80 and FIG. 81 each are a diagram illustrating an example of a coding table. As illustrated in FIG. 80 and FIG. 81, one coding table shows, for each 1 bit included in an occupancy code, a context model and a context model type associated with the 1 bit.

FIG. 82 is a diagram illustrating an example of a relationship between an occupancy code and bit numbers of the occupancy code.

As stated above, the three-dimensional data encoding device may handle an occupancy code as binary data, assign a different context model for each bit, and entropy encode the occupancy code. Since this enables assignment of a context model in accordance with a probability of appearance of each bit of the occupancy code, it is possible to improve the coding efficiency.

Specifically, each bit of the occupancy code corresponds to a sub-block obtained by dividing a spatial block corresponding to a current node. Accordingly, when sub-blocks in the same spatial position in a block have the same tendency, it is possible to improve the coding efficiency. For example, when a ground surface or a road surface crosses through a block, in an octree, four lower blocks include three-dimensional points, and four upper blocks include no three-dimensional point. Additionally, the same pattern appears in blocks horizontally arranged. Accordingly, it is possible to improve the coding efficiency by switching between contexts for each bit as described above.

A context model that updates a probability table in accordance with an appearance frequency of each bit of an occupancy code may also be used. In addition, a context model having a fixed probability table may be used.

Next, the following describes procedures for a three-dimensional data encoding process and a three-dimensional data decoding process according to the present embodiment.

Figure 83:
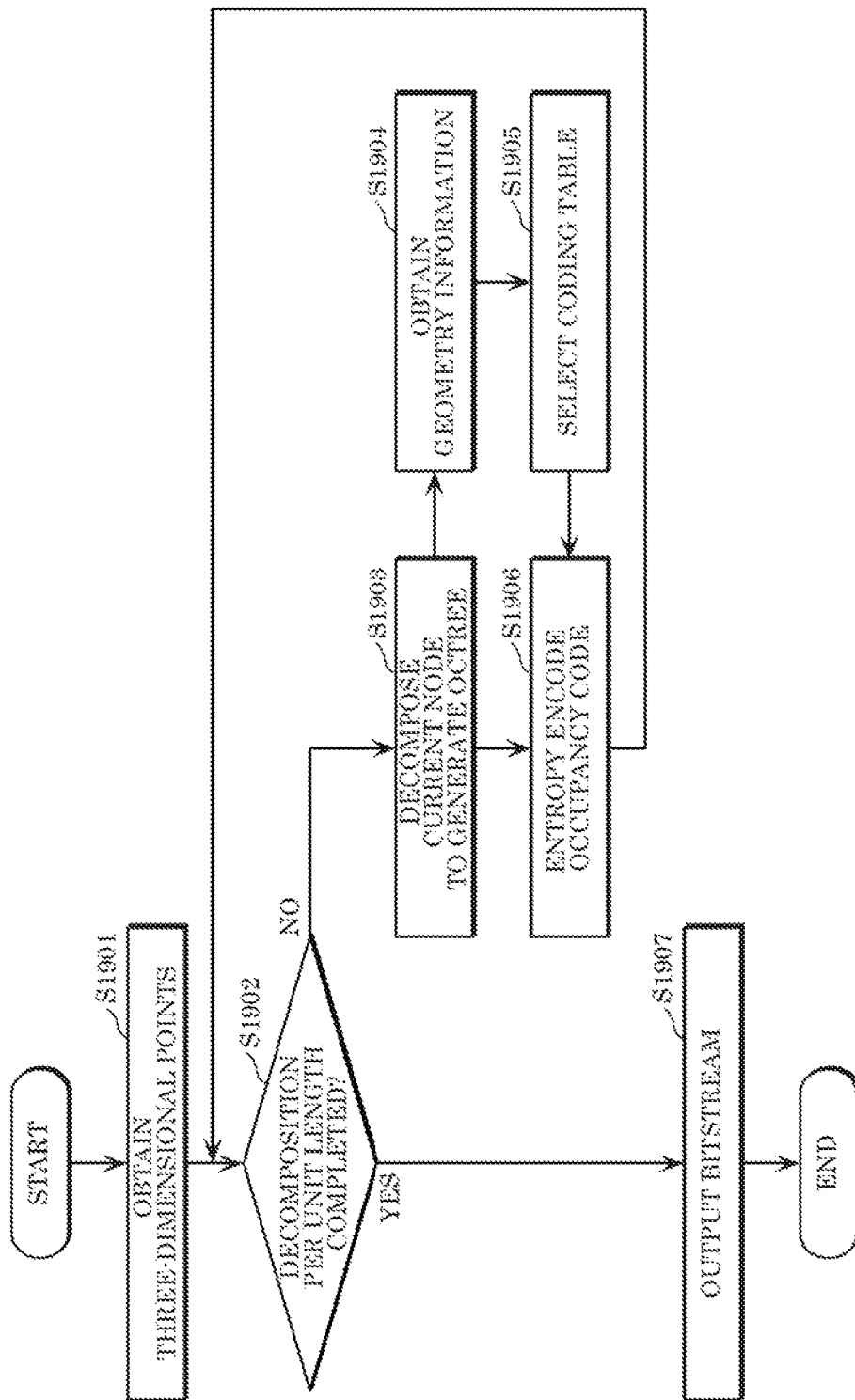
FIG. 83 is a flowchart of an encoding process using geometry information according to Embodiment 9.

FIG. 83 is a flowchart of a three-dimensional data encoding process including an adaptive entropy encoding process using geometry information.

In a decomposition process, an octree is generated from an initial bounding box of three-dimensional points. A bounding box is divided in accordance with the position of a three-dimensional point in the bounding box. Specifically, a non-empty sub-space is further divided. Next, information indicating whether a sub-space includes a three-dimensional point is encoded into an occupancy code. It should be noted that the same process is performed in the processes illustrated in FIG. 83 and FIG. 87.

First, the three-dimensional data encoding device obtains inputted three-dimensional points (S1901). Next, the three-dimensional data encoding device determines whether a decomposition process per unit length is completed (S1902).

When the decomposition process per unit length is not completed (NO in S1902), the three-dimensional data encoding device generates an octree by performing the decomposition process on a current node (S1903).

Then, the three-dimensional data encoding device obtains geometry information (S1904), and selects a coding table based on the obtained geometry information (S1905). Here, as stated above, the geometry information is information indicating, for example, a geometry of occupancy states of neighboring blocks of a current node.

After that, the three-dimensional data encoding device entropy encodes an occupancy code of the current node using the selected coding table (S1906).

Steps S1903 to S1906 are repeated until the decomposition process per unit length is completed. When the decomposition process per unit length is completed (YES in S1902), the three-dimensional data encoding device outputs a bitstream including generated information (S1907).

The three-dimensional data encoding device determines a coding table using geometry information, structure information, or attribute information of a current node, and encodes a bit sequence of an occupancy code using the determined coding table. The three-dimensional data encoding device appends a result of the encoding and information (e.g., a table index) of the coding table used for the encoding to a bitstream, and transmits the bitstream to the three-dimensional data decoding device. This enables the three-dimensional data decoding device to decode the occupancy code using the information of the coding table appended to the header.

Moreover, the three-dimensional data encoding device need not append information of a coding table used for encoding to a bitstream, and the three-dimensional data decoding device may determine a coding table using geometry information, structure information, or attribute information of a current node that has been decoded, using the same method as the three-dimensional data encoding device, and decode an occupancy code using the determined coding table. Since this eliminates the need for appending the information of the coding table to the bitstream, it is possible to reduce overhead.

Figure 84:
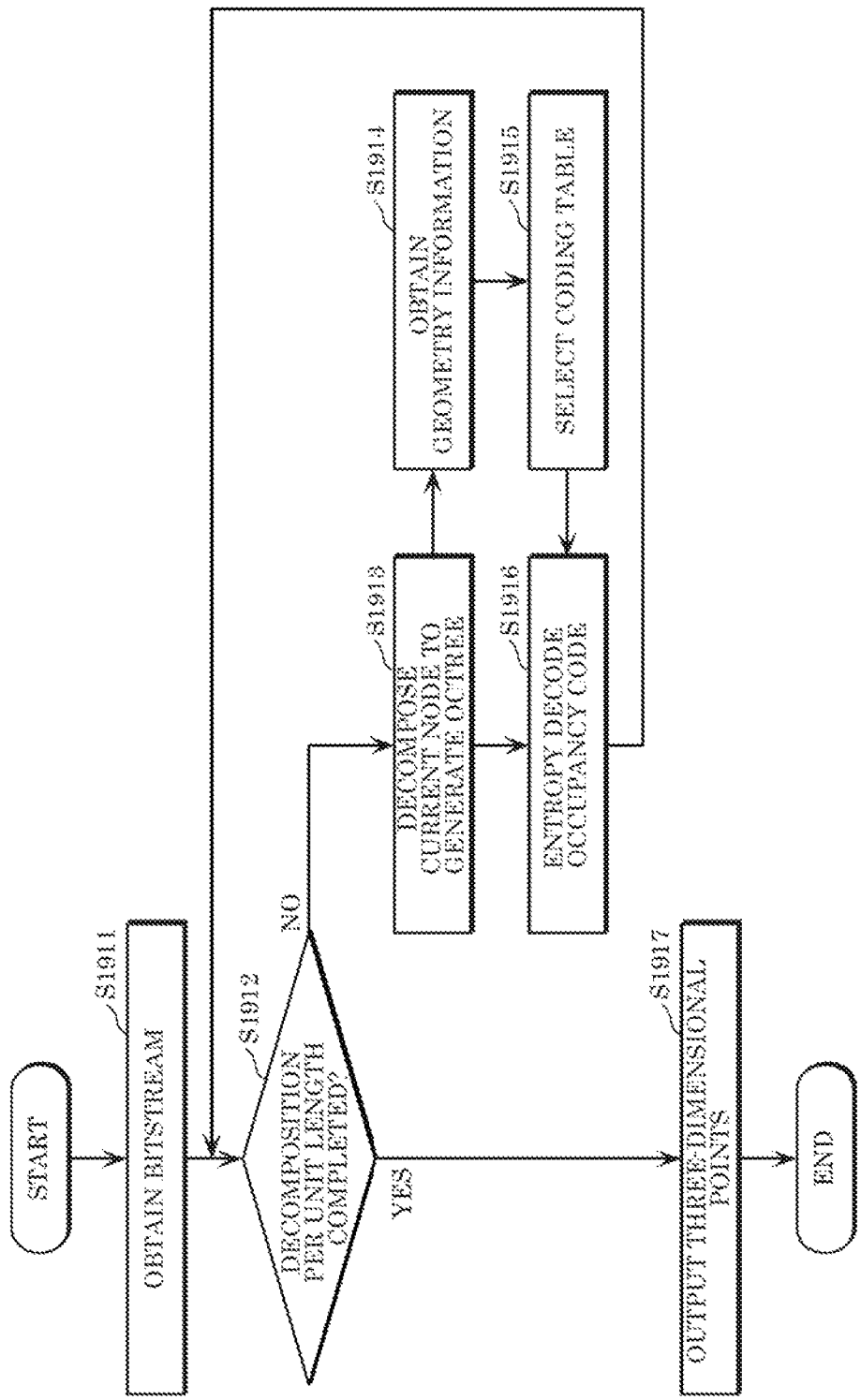
FIG. 84 is a flowchart of a decoding process using geometry information according to Embodiment 9.

FIG. 84 is a flowchart of a three-dimensional data decoding process including an adaptive entropy decoding process using geometry information.

A decomposition process included in the decoding process is similar to the decomposition process included in the above-described encoding process, they differ in the following point. The three-dimensional data decoding device divides an initial bounding box using a decoded occupancy code. When the three-dimensional data decoding device completes a process per unit length, the three-dimensional data decoding device stores the position of a bounding box as the position of a three-dimensional point. It should be noted that the same process is performed in the processes illustrated in FIG. 86 and FIG. 88.

First, the three-dimensional data decoding device obtains an inputted bitstream (S1911). Next, the three-dimensional data decoding device determines whether a decomposition process per unit length is completed (S1912).

When the decomposition process per unit length is not completed (NO in S1912), the three-dimensional data decoding device generates an octree by performing the decomposition process on a current node (S1913).

Then, the three-dimensional data decoding device obtains geometry information (S1914), and selects a coding table based on the obtained geometry information (S1915). Here, as stated above, the geometry information is information indicating, for example, a geometry of occupancy states of neighboring blocks of a current node.

After that, the three-dimensional data decoding device entropy decodes an occupancy code of the current node using the selected coding table (S1916).

Steps S1913 to S1916 are repeated until the decomposition process per unit length is completed. When the decomposition process per unit length is completed (YES in S1912), the three-dimensional data decoding device outputs three-dimensional points (S1917).

Figure 85:
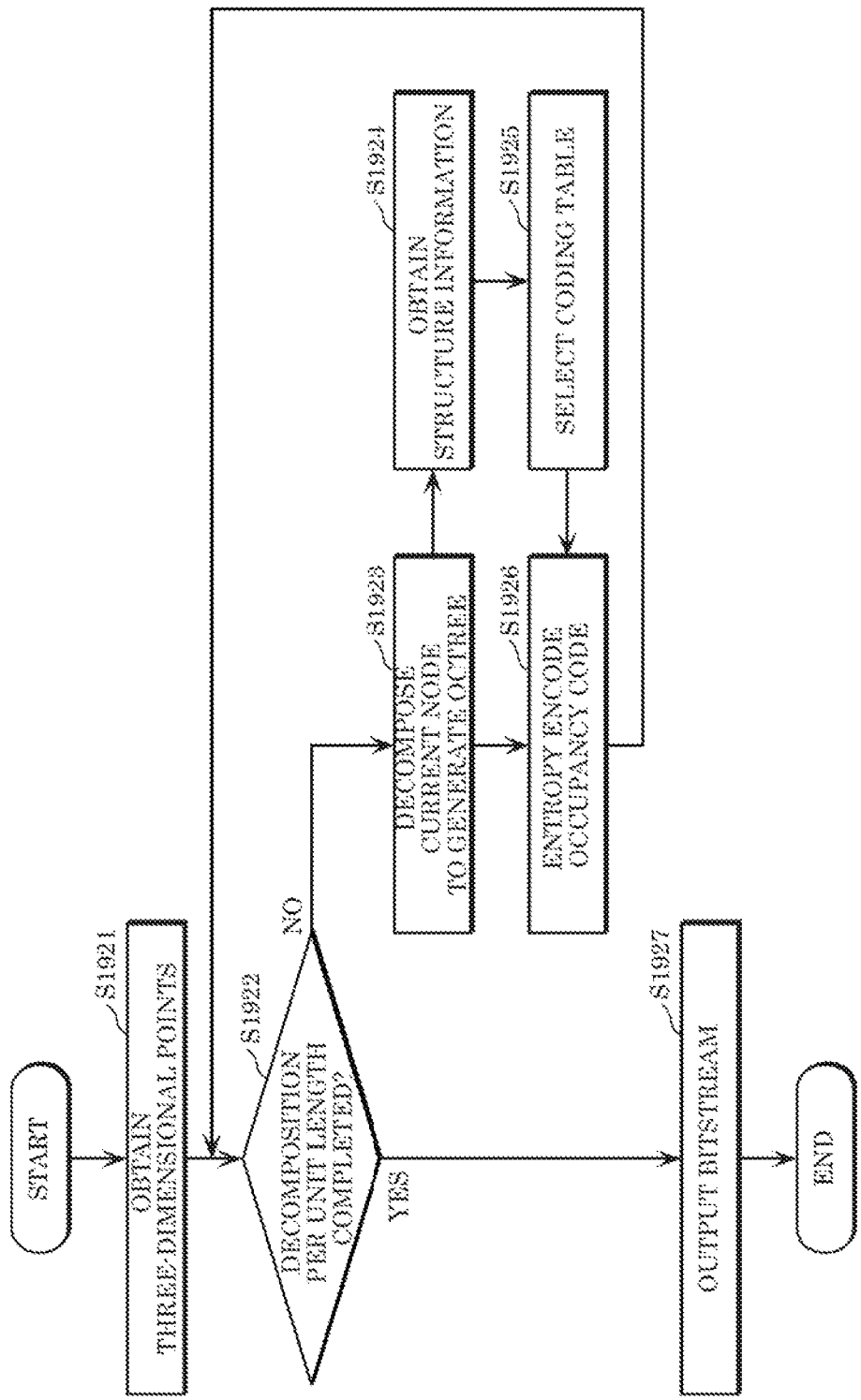
FIG. 85 is a flowchart of an encoding process using structure information according to Embodiment 9.

FIG. 85 is a flowchart of a three-dimensional data encoding process including an adaptive entropy encoding process using structure information. First, the three-dimensional data encoding device obtains inputted three-dimensional points (S1921). Next, the three-dimensional data encoding device determines whether a decomposition process per unit length is completed (S1922).

When the decomposition process per unit length is not completed (NO in S1922), the three-dimensional data encoding device generates an octree by performing the decomposition process on a current node (S1923).

Then, the three-dimensional data encoding device obtains structure information (S1924), and selects a coding table based on the obtained structure information (S1925). Here, as stated above, the structure information is information indicating, for example, a layer to which a current node belongs.

After that, the three-dimensional data encoding device entropy encodes an occupancy code of the current node using the selected coding table (S1926).

Steps S1923 to S1926 are repeated until the decomposition process per unit length is completed. When the decomposition process per unit length is completed (YES in S1922), the three-dimensional data encoding device outputs a bitstream including generated information (S1927).

Figure 86:
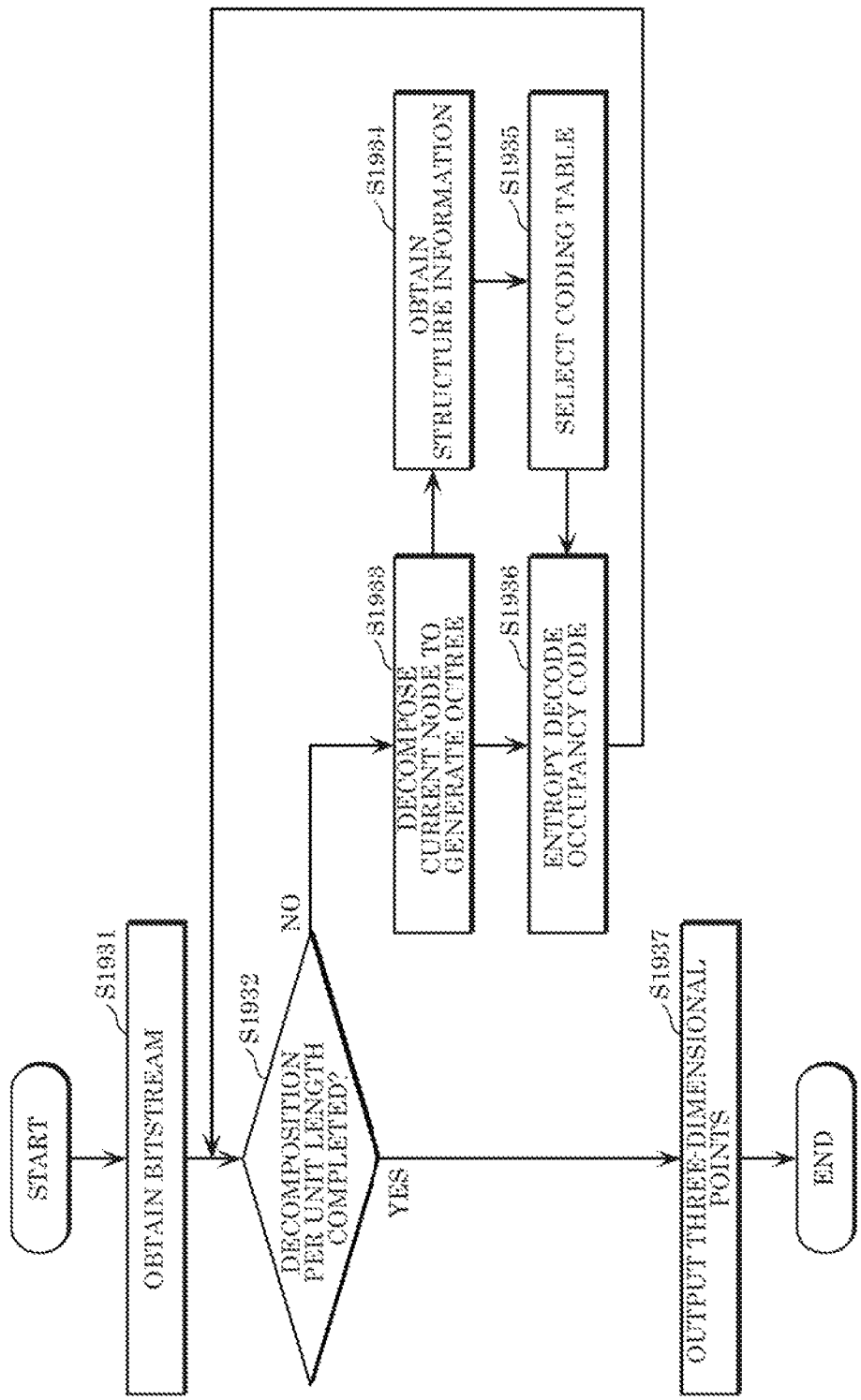
FIG. 86 is a flowchart of a decoding process using structure information according to Embodiment 9.

FIG. 86 is a flowchart of a three-dimensional data decoding process including an adaptive entropy decoding process using structure information.

First, the three-dimensional data decoding device obtains an inputted bitstream (S1931). Next, the three-dimensional data decoding device determines whether a decomposition process per unit length is completed (S1932).

When the decomposition process per unit length is not completed (NO in S1932), the three-dimensional data decoding device generates an octree by performing the decomposition process on a current node (S1933).

Then, the three-dimensional data decoding device obtains structure information (S1934), and selects a coding table based on the obtained structure information (S1935). Here, as stated above, the structure information is information indicating, for example, a layer to which a current node belongs.

After that, the three-dimensional data decoding device entropy decodes an occupancy code of the current node using the selected coding table (S1936). Steps S1933 to S1936 are repeated until the decomposition process per unit length is completed. When the decomposition process per unit length is completed (YES in S1932), the three-dimensional data decoding device outputs three-dimensional points (S1937).

Figure 87:
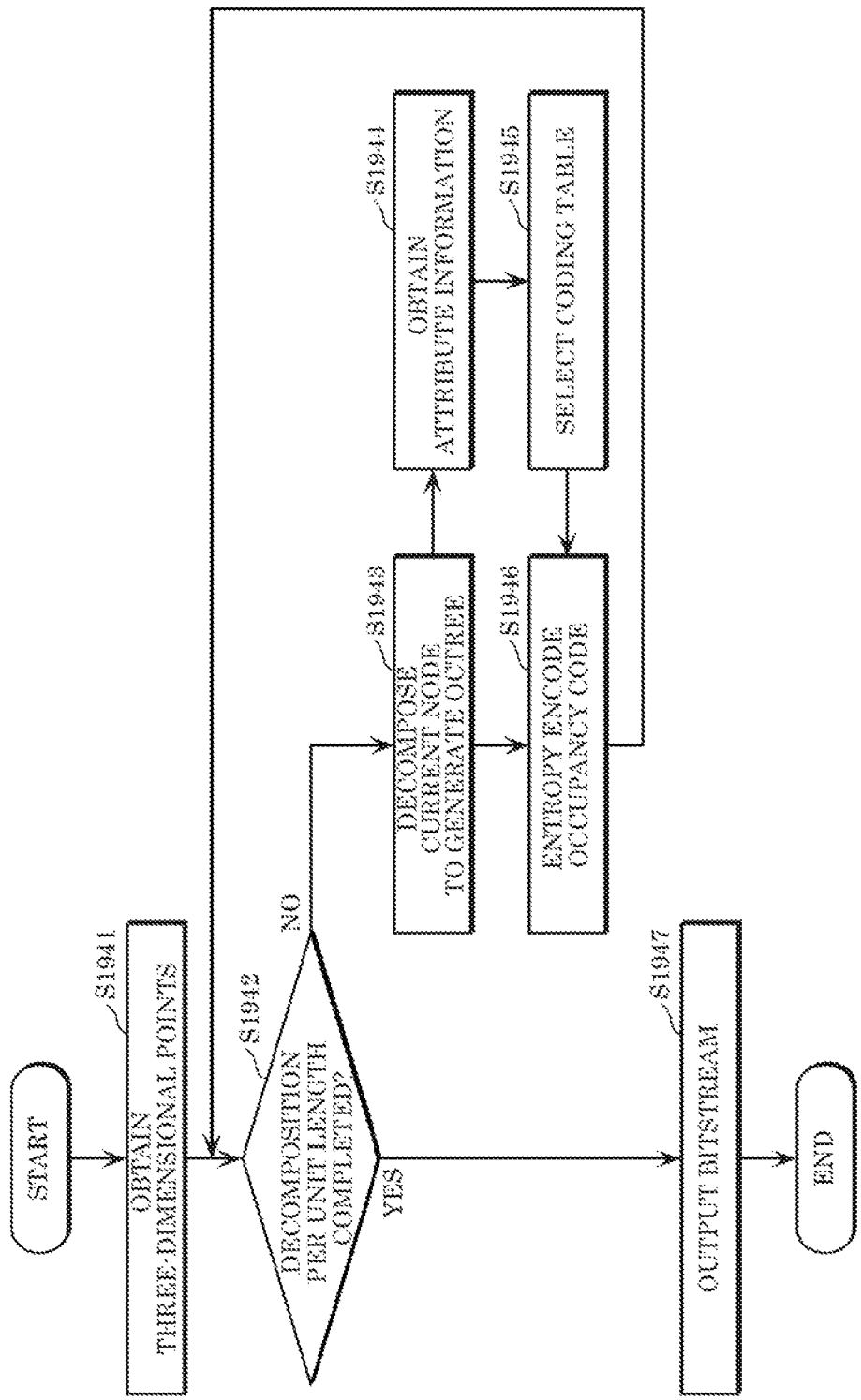
FIG. 87 is a flowchart of an encoding process using attribute information according to Embodiment 9.

FIG. 87 is a flowchart of a three-dimensional data encoding process including an adaptive entropy encoding process using attribute information.

First, the three-dimensional data encoding device obtains inputted three-dimensional points (S1941). Next, the three-dimensional data encoding device determines whether a decomposition process per unit length is completed (S1942).

When the decomposition process per unit length is not completed (NO in S1942), the three-dimensional data encoding device generates an octree by performing the decomposition process on a current node (S1943).

Then, the three-dimensional data encoding device obtains attribute information (S1944), and selects a coding table based on the obtained attribute information (S1945). Here, as stated above, the attribute information is information indicating, for example, a normal vector of a current node.

After that, the three-dimensional data encoding device entropy encodes an occupancy code of the current node using the selected coding table (S1946).

Steps S1943 to S1946 are repeated until the decomposition process per unit length is completed. When the decomposition process per unit length is completed (YES in S1942), the three-dimensional data encoding device outputs a bitstream including generated information (S1947).

Figure 88:
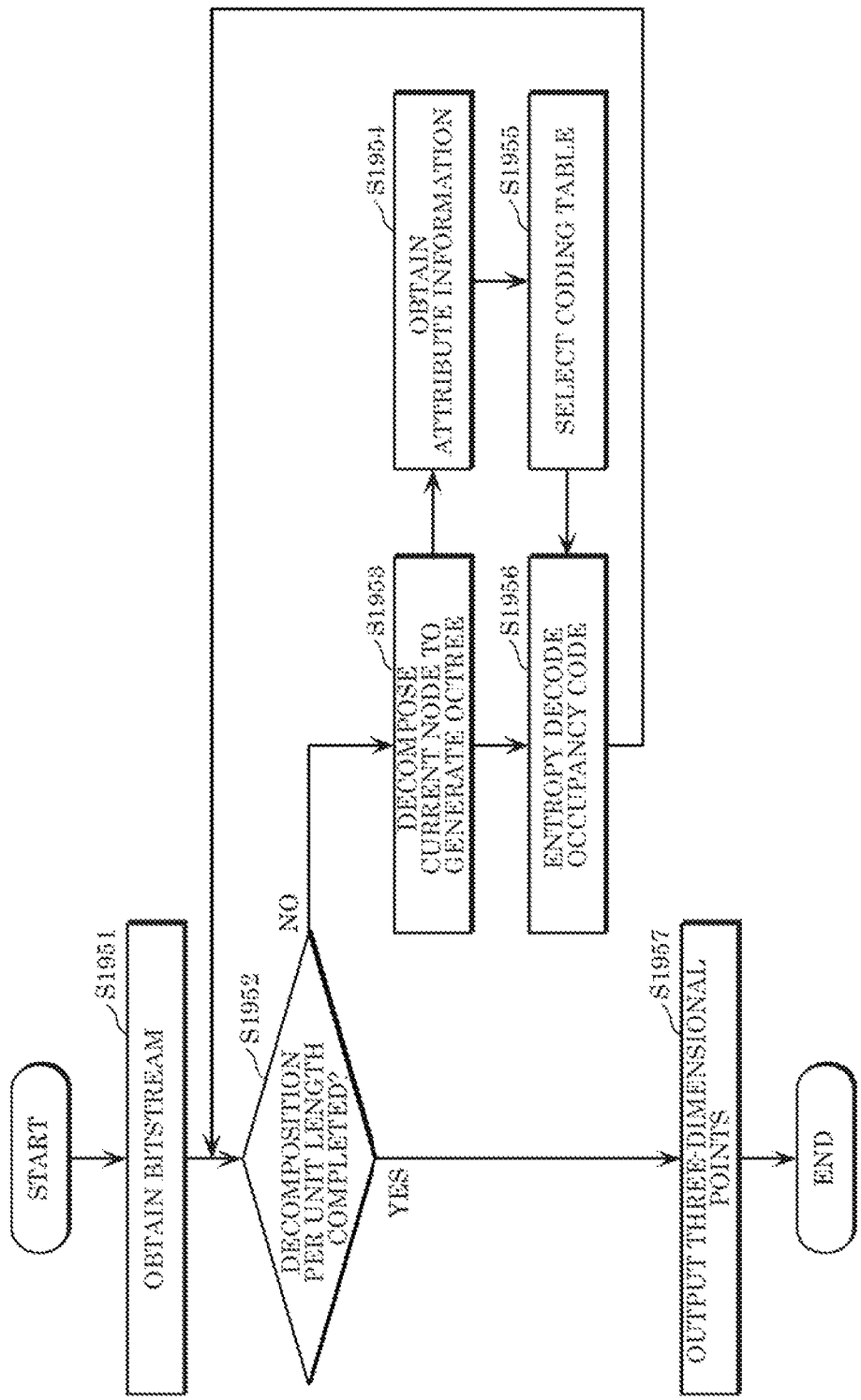
FIG. 88 is a flowchart of a decoding process using attribute information according to Embodiment 9.

FIG. 88 is a flowchart of a three-dimensional data decoding process including an adaptive entropy decoding process using attribute information.

First, the three-dimensional data decoding device obtains an inputted bitstream (S1951). Next, the three-dimensional data decoding device determines whether a decomposition process per unit length is completed (S1952).

When the decomposition process per unit length is not completed (NO in S1952), the three-dimensional data decoding device generates an octree by performing the decomposition process on a current node (S1953).

Then, the three-dimensional data encoding device obtains attribute information (S1954), and selects a coding table based on the obtained attribute information (S1955). Here, as stated above, the attribute information is information indicating, for example, a normal vector of a current node.

After that, the three-dimensional data decoding device entropy decodes an occupancy code of the current node using the selected coding table (S1956).

Steps S1953 to S1956 are repeated until the decomposition process per unit length is completed. When the decomposition process per unit length is completed (YES in S1952), the three-dimensional data decoding device outputs three-dimensional points (S1957).

Figure 89:
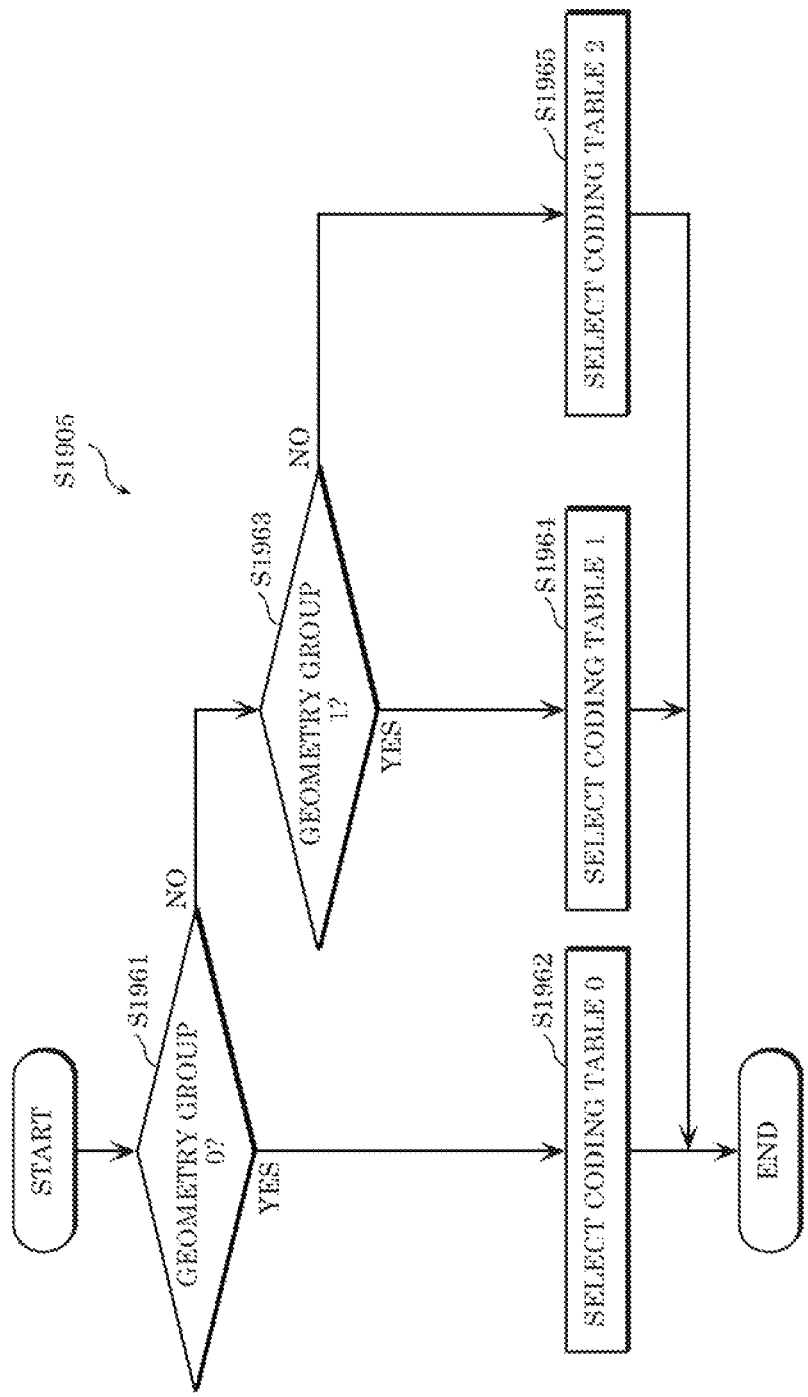
FIG. 89 is a flowchart of a process of selecting a coding table using geometry information according to Embodiment 9.

FIG. 89 is a flowchart of the process of selecting a coding table using geometry information (S1905).

The three-dimensional data encoding device may select a coding table to be used for entropy encoding of an occupancy code, using, as geometry information, information of a geometry group of a tree structure, for example. Here, information of a geometry group is information indicating a geometry group including a geometry pattern of a current node.

As illustrated in FIG. 89, when a geometry group indicated by geometry information is geometry group 0 (YES in S1961), the three-dimensional data encoding device selects coding table 0 (S1962). When the geometry group indicated by the geometry information is geometry group 1 (YES in S1963), the three-dimensional data encoding device selects coding table 1 (S1964). In any other case (NO in S1963), the three-dimensional data encoding device selects coding table 2 (S1965).

It should be noted that a method of selecting a coding table is not limited to the above. For example, when a geometry group indicated by geometry information is geometry group 2, the three-dimensional data encoding device may further select a coding table according to a value of the geometry group, such as using coding table 2.

For example, a geometry group is determined using occupancy information indicating whether a node neighboring a current node includes a point cloud. Geometry patterns that become the same shape by transform such as rotation being applied to may be included in the same geometry group. The three-dimensional data encoding device may select a geometry group using occupancy information of a node that neighbors a current node or is located around the current node, and belongs to the same layer as the current node. In addition, the three-dimensional data encoding device may select a geometry group using occupancy information of a node that belongs to a layer different from that of a current node. For example, the three-dimensional data encoding device may select a geometry group using occupancy information of a parent node, a node neighboring the parent node, or a node located around the parent node.

It should be noted that the same applies to the process of selecting a coding table using geometry information (S1915) in the three-dimensional data decoding device.

Figure 90:
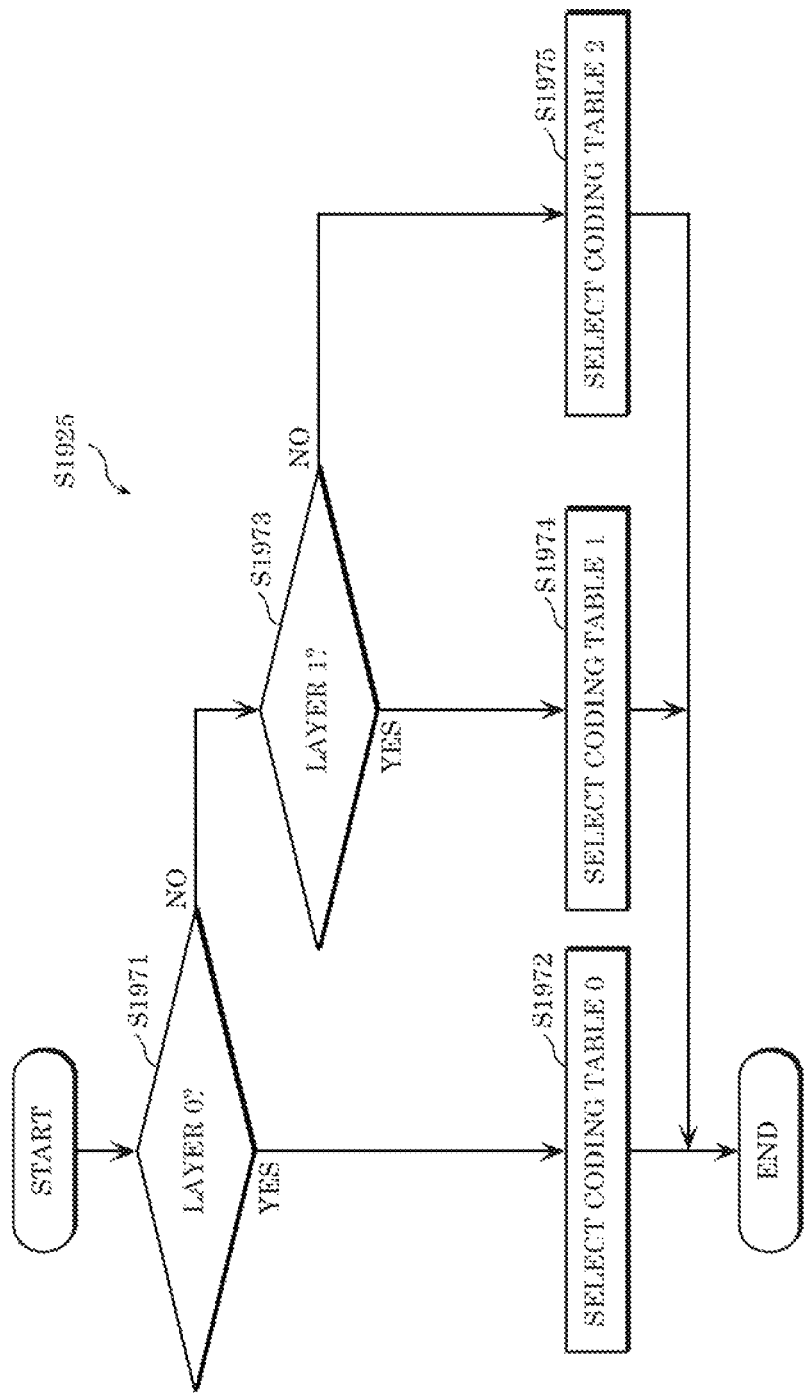
FIG. 90 is a flowchart of a process of selecting a coding table using structure information according to Embodiment 9.

FIG. 90 is a flowchart of the process of selecting a coding table using structure information (S1925).

The three-dimensional data encoding device may select a coding table to be used for entropy encoding of an occupancy code, using, as structure information, layer information of a tree structure, for example. Here, the layer information indicates, for example, a layer to which a current node belongs.

As illustrated in FIG. 90, when a current node belongs to layer 0 (YES in S1971), the three-dimensional data encoding device selects coding table 0 (S1972). When the current node belongs to layer 1 (YES in S1973), the three-dimensional data encoding device selects coding table 1 (S1974). In any other case (NO in S1973), the three-dimensional data encoding device selects coding table 2 (S1975).

It should be noted that a method of selecting a coding table is not limited to the above. For example, when a current node belongs to layer 2, the three-dimensional data encoding device may further select a coding table in accordance with the layer to which the current node belongs, such as using coding table 2.

The same applies to the process of selecting a coding table using structure information (S1935) in the three-dimensional data decoding device.

Figure 91:
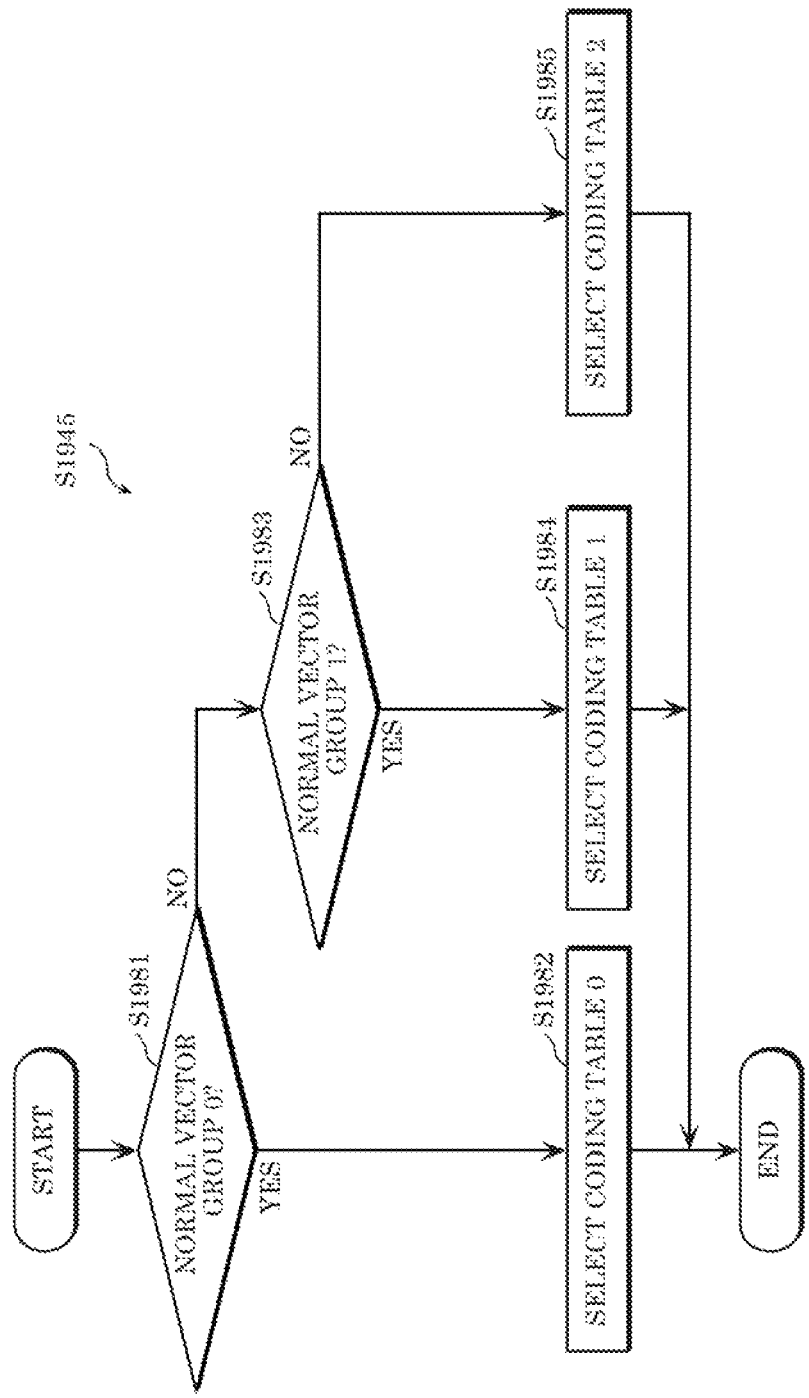
FIG. 91 is a flowchart of a process of selecting a coding table using attribute information according to Embodiment 9.

FIG. 91 is a flowchart of the process of selecting a coding table using attribute information (S1945).

The three-dimensional data encoding device may select a coding table to be used for entropy encoding of an occupancy code, using, as attribute information, information about an object to which a current node belongs or information about a normal vector of the current node.

As illustrated in FIG. 91, when a normal vector of a current node belongs to normal vector group 0 (YES in S1981), the three-dimensional data encoding device selects coding table 0 (S1982). When the normal vector of the current node belongs to normal vector group 1 (YES in S1983), the three-dimensional data encoding device selects coding table 1 (S1984). In any other case (NO in S1983), the three-dimensional data encoding device selects coding table 2 (S1985).

It should be noted that a method of selecting a coding table is not limited to the above. For example, when a normal vector of a current node belongs to normal vector group 2, the three-dimensional data encoding device may further select a coding table in accordance with a normal vector group to which the normal vector of the current belongs, such as using coding table 2.

For example, the three-dimensional data encoding device selects a normal vector group using information about a normal vector of a current node. For example, the three-dimensional data encoding device determines, as the same normal vector group, normal vectors having a distance between normal vectors that is less than or equal to a predetermined threshold value.

The information about the object to which the current node belongs may be information about, for example, a person, a vehicle, or a building.

Figure 92:
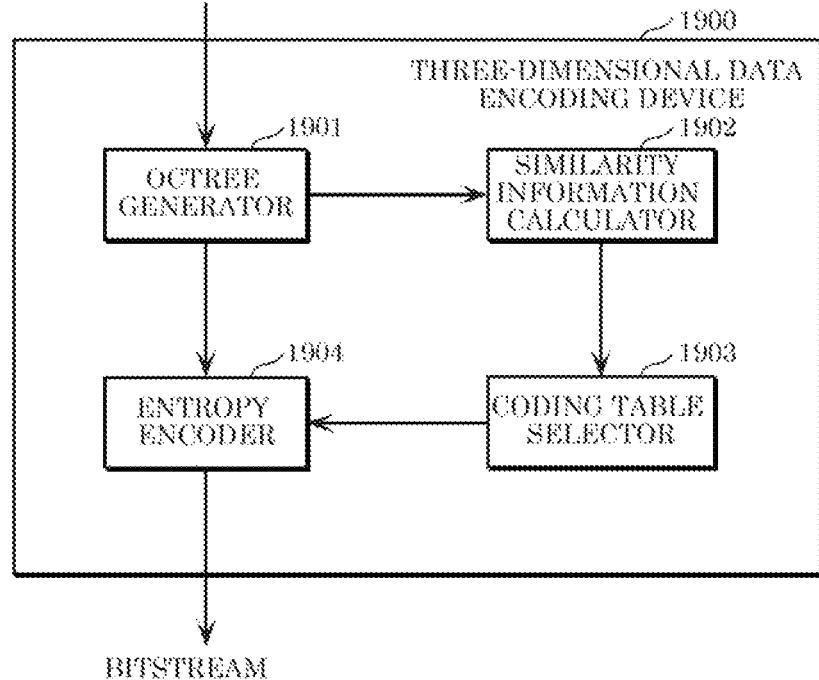
FIG. 92 is a block diagram of a three-dimensional data encoding device according to Embodiment 9.

The following describes configurations of three-dimensional data encoding device 1900 and three-dimensional data decoding device 1910 according to the present embodiment. FIG. 92 is a block diagram of three-dimensional data encoding device 1900 according to the present embodiment. Three-dimensional data encoding device 1900 illustrated in FIG. 92 includes octree generator 1901, similarity information calculator 1902, coding table selector 1903, and entropy encoder 1904.

Octree generator 1901 generates, for example, an octree from inputted three-dimensional points, and generates an occupancy code for each node included in the octree. Similarity information calculator 1902 obtains, for example, similarity information that is geometry information, structure information, or attribute information of a current node. Coding table selector 1903 selects a context to be used for entropy encoding of an occupancy code, according to the similarity information of the current node. Entropy encoder 1904 generates a bitstream by entropy encoding the occupancy code using the selected context. It should be noted that entropy encoder 1904 may append, to the bitstream, information indicating the selected context.

Figure 93:
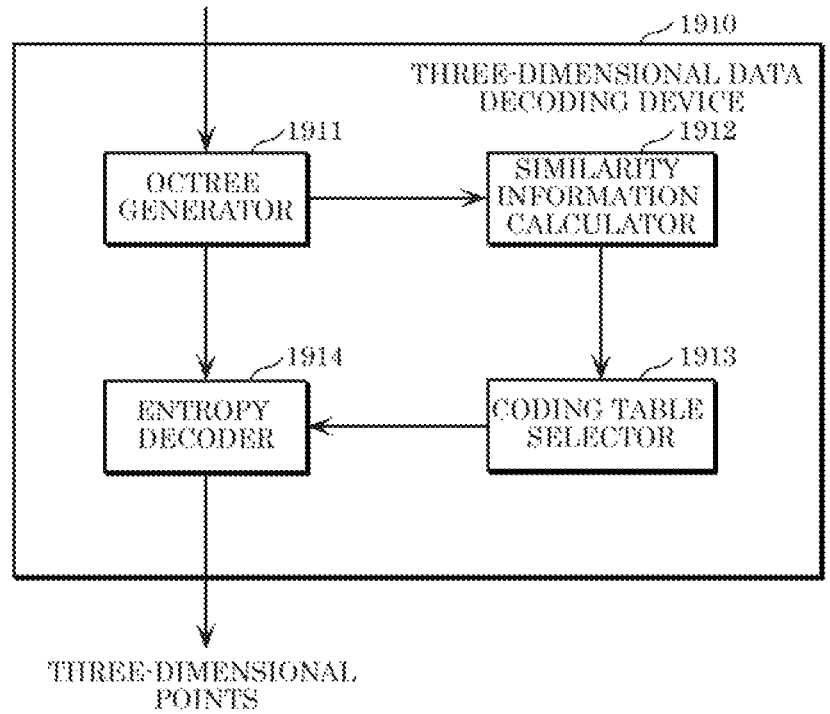
FIG. 93 is a block diagram of a three-dimensional data decoding device according to Embodiment 9.

FIG. 93 is a block diagram of three-dimensional data decoding device 1910 according to the present embodiment. Three-dimensional data decoding device 1910 illustrated in FIG. 93 includes octree generator 1911, similarity information calculator 1912, coding table selector 1913, and entropy decoder 1914.

Octree generator 1911 generates an octree in order from, for example, a lower layer to an upper layer using information obtained from entropy decoder 1914. Similarity information calculator 1912 obtains similarity information that is geometry information, structure information, or attribute information of a current node. Coding table selector 1913 selects a context to be used for entropy encoding of an occupancy code, according to the similarity information of the current node. Entropy decoder 1914 generates three-dimensional points by entropy decoding the occupancy code using the selected context. It should be noted that entropy decoder 1914 may obtain, by performing decoding, information of the selected context appended to a bitstream, and use the context indicated by the information.

As illustrated in FIG. 80 to FIG. 82 above, the contexts are provided to the respective bits of the occupancy code. In other words, the three-dimensional data encoding device entropy encodes a bit sequence representing an N-ary (N is an integer greater than or equal to 2) tree structure of three-dimensional points included in three-dimensional data, using a coding table selected from coding tables. The bit sequence includes N-bit information for each node in the N-ary tree structure. The N-bit information includes N pieces of 1-bit information each indicating whether a three-dimensional point is present in a corresponding one of N child nodes of a corresponding node. In each of the coding tables, a context is provided to each bit of the N-bit information. The three-dimensional data encoding device entropy encodes each bit of the N-bit information using the context provided to the bit in the selected coding table.

This enables the three-dimensional data encoding device to improve the coding efficiency by selecting a context for each bit.

For example, in the entropy encoding, the three-dimensional data encoding device selects a coding table to be used from coding tables, based on whether a three-dimensional point is present in each of neighboring nodes of a current node. This enables the three-dimensional data encoding device to improve the coding efficiency by selecting a coding table based on whether the three-dimensional point is present in the neighboring node.

For example, in the entropy encoding, the three-dimensional data encoding device (i) selects a coding table based on an arrangement pattern indicating an arranged position of a neighboring node in which a three-dimensional point is present, among neighboring nodes, and (ii) selects the same coding table for arrangement patterns that become identical by rotation, among arrangement patterns. This enables the three-dimensional data encoding device to reduce an increase in the number of coding tables.

For example, in the entropy encoding, the three-dimensional data encoding device selects a coding table to be used from coding tables, based on a layer to which a current node belongs. This enables the three-dimensional data encoding device to improve the coding efficiency by selecting a coding table based on the layer to which the current node belongs.

For example, in the entropy encoding, the three-dimensional data encoding device selects a coding table to be used from coding tables, based on a normal vector of a current node. This enables the three-dimensional data encoding device to improve the coding efficiency by selecting a coding table based on the normal vector.

For example, the three-dimensional data encoding device includes a processor and memory, and the processor performs the above process using the memory.

The three-dimensional data decoding device entropy decodes a bit sequence representing an N-ary (N is an integer greater than or equal to 2) tree structure of three-dimensional points included in three-dimensional data, using a coding table selected from coding tables. The bit sequence includes N-bit information for each node in the N-ary tree structure. The N-bit information includes N pieces of 1-bit information each indicating whether a three-dimensional point is present in a corresponding one of N child nodes of a corresponding node. In each of the coding tables, a context is provided to each bit of the N-bit information. The three-dimensional data decoding device entropy decodes each bit of the N-bit information using the context provided to the bit in the selected coding table.

This enables the three-dimensional data decoding device to improve the coding efficiency by selecting a context for each bit.

For example, in the entropy decoding, the three-dimensional data decoding device selects a coding table to be used from coding tables, based on whether a three-dimensional point is present in each of neighboring nodes of a current node. This enables the three-dimensional data decoding device to improve the coding efficiency by selecting a coding table based on whether the three-dimensional point is present in the neighboring node.

For example, in the entropy decoding, the three-dimensional data decoding device (i) selects a coding table based on an arrangement pattern indicating an arranged position of a neighboring node in which a three-dimensional point is present, among neighboring nodes, and (ii) selects the same coding table for arrangement patterns that become identical by rotation, among arrangement patterns. This enables the three-dimensional data decoding device to reduce an increase in the number of coding tables.

For example, in the entropy decoding, the three-dimensional data decoding device selects a coding table to be used from coding tables, based on a layer to which a current node belongs. This enables the three-dimensional data decoding device to improve the coding efficiency by selecting a coding table based on the layer to which the current node belongs.

For example, in the entropy decoding, the three-dimensional data decoding device selects a coding table to be used from coding tables, based on a normal vector of a current node. This enables the three-dimensional data decoding device to improve the coding efficiency by selecting a coding table based on the normal vector.

For example, the three-dimensional data decoding device includes a processor and memory, and the processor performs the above process using the memory.

Embodiment 10

In the present embodiment, a method of controlling reference when an occupancy code is encoded will be described. It should be noted that although the following mainly describes an operation of a three-dimensional data encoding device, a three-dimensional data decoding device may perform the same process.

Figure 94:
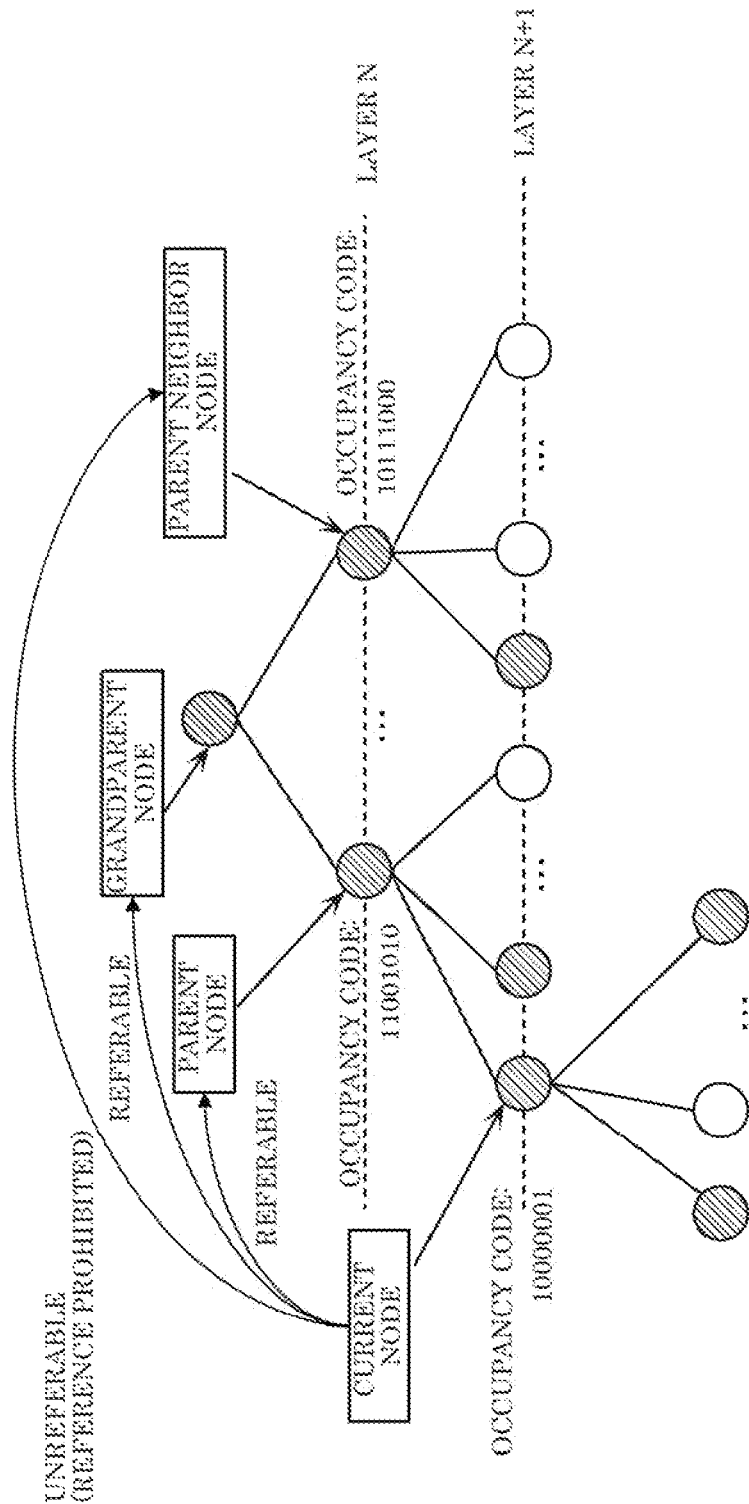
FIG. 94 is a diagram illustrating a reference relationship in an octree structure according to Embodiment 10.
Figure 95:
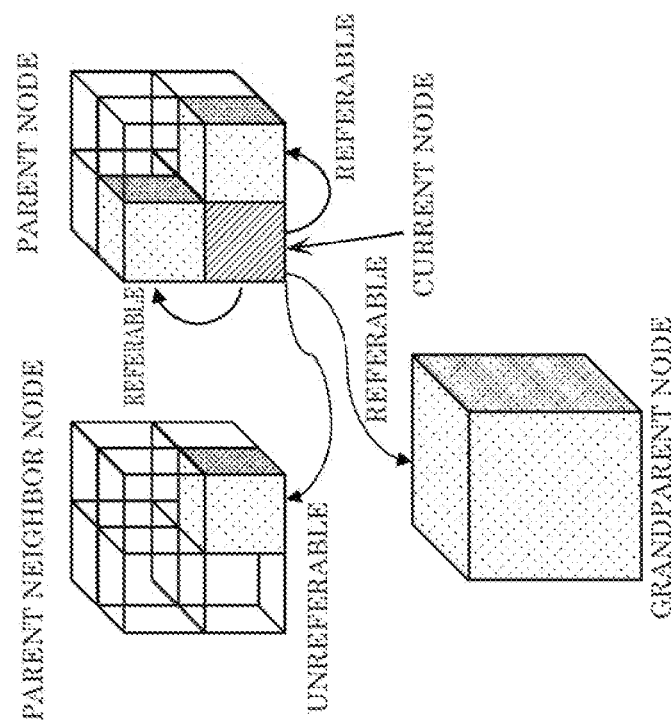
FIG. 95 is a diagram illustrating a reference relationship in a spatial region according to Embodiment 10.

FIG. 94 and FIG. 95 each are a diagram illustrating a reference relationship according to the present embodiment. Specifically, FIG. 94 is a diagram illustrating a reference relationship in an octree structure, and FIG. 95 is a diagram illustrating a reference relationship in a spatial region.

In the present embodiment, when the three-dimensional data encoding device encodes encoding information of a current node to be encoded (hereinafter referred to as a current node), the three-dimensional data encoding device refers to encoding information of each node in a parent node to which the current node belongs. In this regard, however, the three-dimensional encoding device does not refer to encoding information of each node in another node (hereinafter referred to as a parent neighbor node) that is in the same layer as the parent node. In other words, the three-dimensional data encoding device disables or prohibits reference to a parent neighbor node.

It should be noted that the three-dimensional data encoding device may permit reference to encoding information of a parent node (hereinafter also referred to as a grandparent node) of the parent node. In other words, the three-dimensional data encoding device may encode the encoding information of the current node by reference to the encoding information of each of the grandparent node and the parent node to which the current node belongs.

Here, encoding information is, for example, an occupancy code. When the three-dimensional data encoding device encodes the occupancy code of the current node, the three-dimensional data encoding device refers to information (hereinafter referred to as occupancy information) indicating whether a point cloud is included in each node in the parent node to which the current node belongs. To put it in another way, when the three-dimensional data encoding device encodes the occupancy code of the current node, the three-dimensional data encoding device refers to an occupancy code of the parent node. On the other hand, the three-dimensional data encoding device does not refer to occupancy information of each node in a parent neighbor node. In other words, the three-dimensional data encoding device does not refer to an occupancy code of the parent neighbor node. Moreover, the three-dimensional data encoding device may refer to occupancy information of each node in the grandparent node. In other words, the three-dimensional data encoding device may refer to the occupancy information of each of the parent node and the parent neighbor node.

For example, when the three-dimensional data encoding device encodes the occupancy code of the current node, the three-dimensional data encoding device selects a coding table to be used for entropy encoding of the occupancy code of the current node, using the occupancy code of the grandparent node or the parent node to which the current node belongs. It should be noted that the details will be described later. At this time, the three-dimensional data encoding device need not refer to the occupancy code of the parent neighbor node. Since this enables the three-dimensional data encoding device to, when encoding the occupancy code of the current node, appropriately select a coding table according to information of the occupancy code of the parent node or the grandparent node, the three-dimensional data encoding device can improve the coding efficiency. Moreover, by not referring to the parent neighbor node, the three-dimensional data encoding device can suppress a process of checking the information of the parent neighbor node and reduce a memory capacity for storing the information. Furthermore, scanning the occupancy code of each node of the octree in a depth-first order makes encoding easy.

Figure 96:
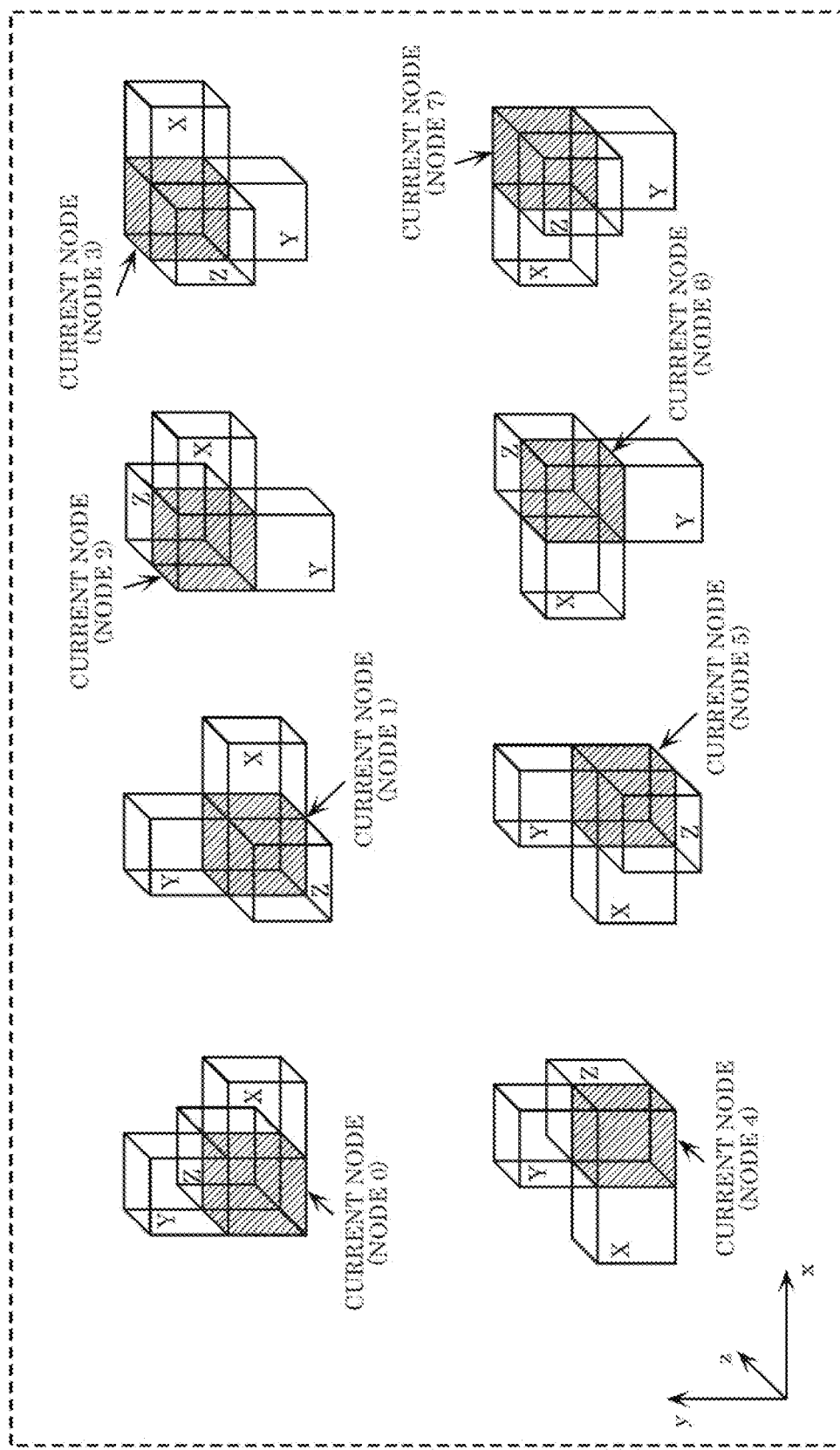
FIG. 96 is a diagram illustrating an example of neighboring reference nodes according to Embodiment 10.

The following describes an example of selecting a coding table using an occupancy code of a parent node. FIG. 96 is a diagram illustrating an example of a current node and neighboring reference nodes. FIG. 97 is a diagram illustrating a relationship between a parent node and nodes. FIG. 98 is a diagram illustrating an example of an occupancy code of the parent node. Here, a neighboring reference node is a node referred to when a current node is encoded, among nodes spatially neighboring the current node. In the example shown in FIG. 96, the neighboring nodes belong to the same layer as the current node. Moreover, node X neighboring the current node in the x direction, node Y neighboring the current block in the y direction, and node Z neighboring the current block in the z direction are used as the reference neighboring nodes. In other words, one neighboring node is set as a reference neighboring node in each of the x, y, and z directions.

It should be noted that the node numbers shown in FIG. 97 are one example, and a relationship between node numbers and node positions is not limited to the relationship shown in FIG. 97. Although node 0 is assigned to the lowest-order bit and node 7 is assigned to the highest-order bit in FIG. 98, assignments may be made in reverse order. In addition, each node may be assigned to any bit.

The three-dimensional data encoding device determines a coding table to be used when the three-dimensional data encoding device entropy encodes an occupancy code of a current node, using the following equation, for example.

CodingTable=(FlagX<<2)+(FlagY<<1)+(FlagZ)

Here, CodingTable indicates a coding table for an occupancy code of a current node, and indicates one of values ranging from 0 to 7. FlagX is occupancy information of neighboring node X. FlagX indicates 1 when neighboring node X includes a point cloud (is occupied), and indicates 0 when it does not. FlagY is occupancy information of neighboring node Y. FlagY indicates 1 when neighboring node Y includes a point cloud (is occupied), and indicates 0 when it does not. FlagZ is occupancy information of neighboring node Z. FlagZ indicates 1 when neighboring node Z includes a point cloud (is occupied), and indicates 0 when it does not.

It should be noted that since information indicating whether a neighboring node is occupied is included in an occupancy code of a parent node, the three-dimensional data encoding device may select a coding table using a value indicated by the occupancy code of the parent node.

From the foregoing, the three-dimensional data encoding device can improve the coding efficiency by selecting a coding table using the information indicating whether the neighboring node of the current node includes a point cloud.

Moreover, as illustrated in FIG. 96, the three-dimensional data encoding device may select a neighboring reference node according to a spatial position of the current node in the parent node. In other words, the three-dimensional data encoding device may select a neighboring node to be referred to from the neighboring nodes, according to the spatial position of the current node in the parent node.

Next, the following describes examples of configurations of the three-dimensional data encoding device and the three-dimensional data decoding device. FIG. 99 is a block diagram of three-dimensional encoding device 2100 according to the present embodiment. Three-dimensional data encoding device 2100 illustrated in FIG. 99 includes octree generator 2101, geometry information calculator 2102, coding table selector 2103, and entropy encoder 2104.

Octree generator 2101 generates, for example, an octree from inputted three-dimensional points (a point cloud), and generates an occupancy code for each node included in the octree. Geometry information calculator 2102 obtains occupancy information indicating whether a neighboring reference node of a current node is occupied. For example, geometry information calculator 2102 obtains the occupancy information of the neighboring reference node from an occupancy code of a parent node to which the current node belongs. It should be noted that, as illustrated in FIG. 96, geometry information calculator 2102 may select a neighboring reference node according to a position of the current node in the parent node. In addition, geometry information calculator 2102 does not refer to occupancy information of each node in a parent neighbor node.

Coding table selector 2103 selects a coding table to be used for entropy encoding of an occupancy code of the current node, using the occupancy information of the neighboring reference node calculated by geometry information calculator 2102. Entropy encoder 2104 generates a bitstream by entropy encoding the occupancy code using the selected coding table. It should be noted that entropy encoder 2104 may append, to the bitstream, information indicating the selected coding table.

Figure 100:
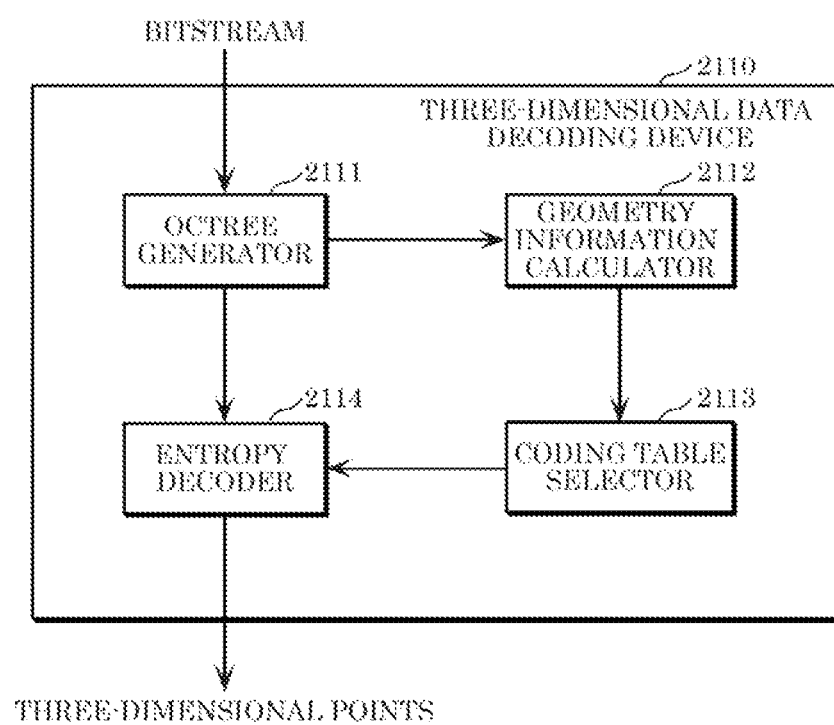
FIG. 100 is a block diagram of a three-dimensional data decoding device according to Embodiment 10.

FIG. 100 is a block diagram of three-dimensional decoding device 2110 according to the present embodiment. Three-dimensional data decoding device 2110 illustrated in FIG. 100 includes octree generator 2111, geometry information calculator 2112, coding table selector 2113, and entropy decoder 2114.

Octree generator 2111 generates an octree of a space (nodes) using header information of a bitstream etc. Octree generator 2111 generates an octree by, for example, generating a large space (a root node) using the size of a space along the x-axis, y-axis, and z-axis directions appended to the header information, and generating eight small spaces A (nodes A0 to A7) by dividing the space into two along each of the x-axis, y-axis, and z-axis directions. Nodes A0 to A7 are set as a current node in sequence.

Geometry information calculator 2112 obtains occupancy information indicating whether a neighboring reference node of a current node is occupied. For example, geometry information calculator 2112 obtains the occupancy information of the neighboring reference node from an occupancy code of a parent node to which the current node belongs. It should be noted that, as illustrated in FIG. 96, geometry information calculator 2112 may select a neighboring reference node according to a position of the current node in the parent node. In addition, geometry information calculator 2112 does not refer to occupancy information of each node in a parent neighboring node.

Coding table selector 2113 selects a coding table (a decoding table) to be used for entropy decoding of the occupancy code of the current node, using the occupancy information of the neighboring reference node calculated by geometry information calculator 2112. Entropy decoder 2114 generates three-dimensional points by entropy decoding the occupancy code using the selected coding table. It should be noted that coding table selector 2113 may obtain, by performing decoding, information of the selected coding table appended to the bitstream, and entropy decoder 2114 may use a coding table indicated by the obtained information.

Each bit of the occupancy code (8 bits) included in the bitstream indicates whether a corresponding one of eight small spaces A (nodes A0 to A7) includes a point cloud. Furthermore, the three-dimensional data decoding device generates an octree by dividing small space node A0 into eight small spaces B (nodes B0 to B7), and obtains information indicating whether each node of small space B includes a point cloud, by decoding the occupancy code. In this manner, the three-dimensional data decoding device decodes the occupancy code of each node while generating an octree by dividing a large space into small spaces.

Figure 101:
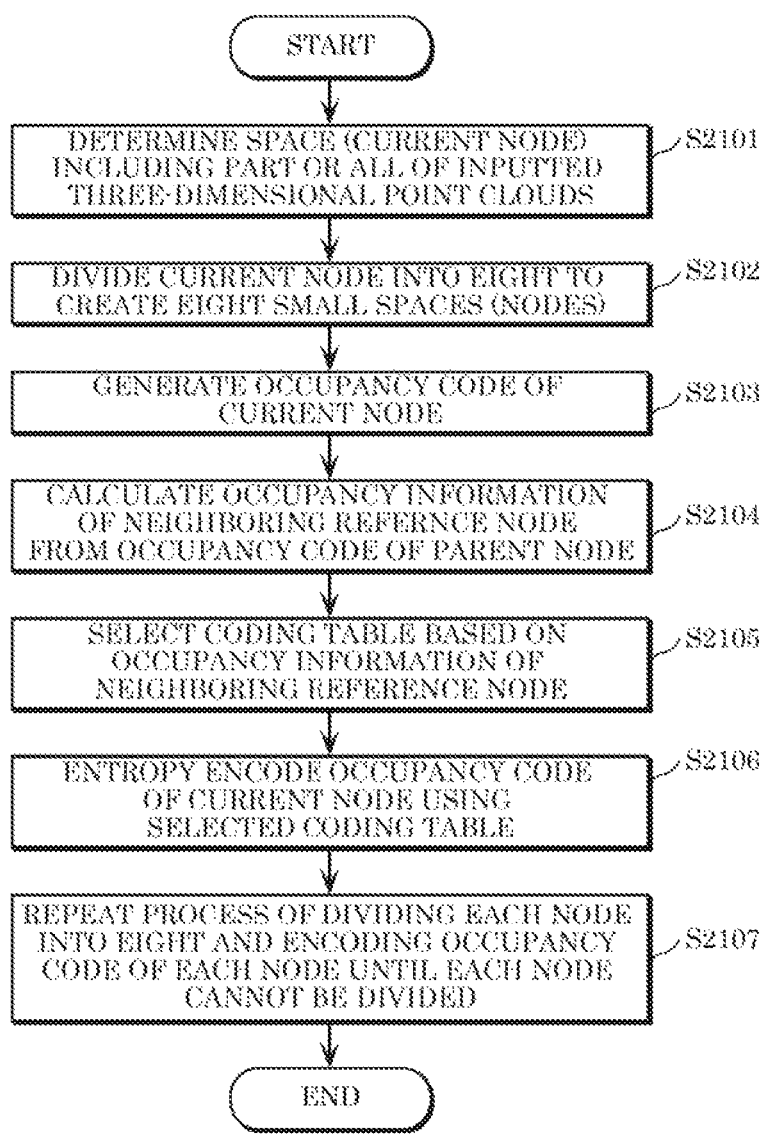
FIG. 101 is a flowchart of a three-dimensional data encoding process according to Embodiment 10.

The following describes procedures for processes performed by the three-dimensional data encoding device and the three-dimensional data decoding device. FIG. 101 is a flowchart of a three-dimensional data encoding process in the three-dimensional data encoding device. First, the three-dimensional data encoding device determines (defines) a space (a current node) including part or whole of an inputted three-dimensional point cloud (S2101). Next, the three-dimensional data encoding device generates eight small spaces (nodes) by dividing the current node into eight (S2102). Then, the three-dimensional data encoding device generates an occupancy code for the current node according to whether each node includes a point cloud (S2103).

After that, the three-dimensional data encoding device calculates (obtains) occupancy information of a neighboring reference node of the current node from an occupancy code of a parent node of the current node (S2104). Next, the three-dimensional data encoding device selects a coding table to be used for entropy encoding, based on the calculated occupancy information of the neighboring reference node of the current node (S2105). Then, the three-dimensional data encoding device entropy encodes the occupancy code of the current node using the selected coding table (S2106).

Finally, the three-dimensional data encoding device repeats a process of dividing each node into eight and encoding an occupancy code of the node, until the node cannot be divided (S2107). In other words, steps S2102 to S2106 are recursively repeated.

Figure 102:
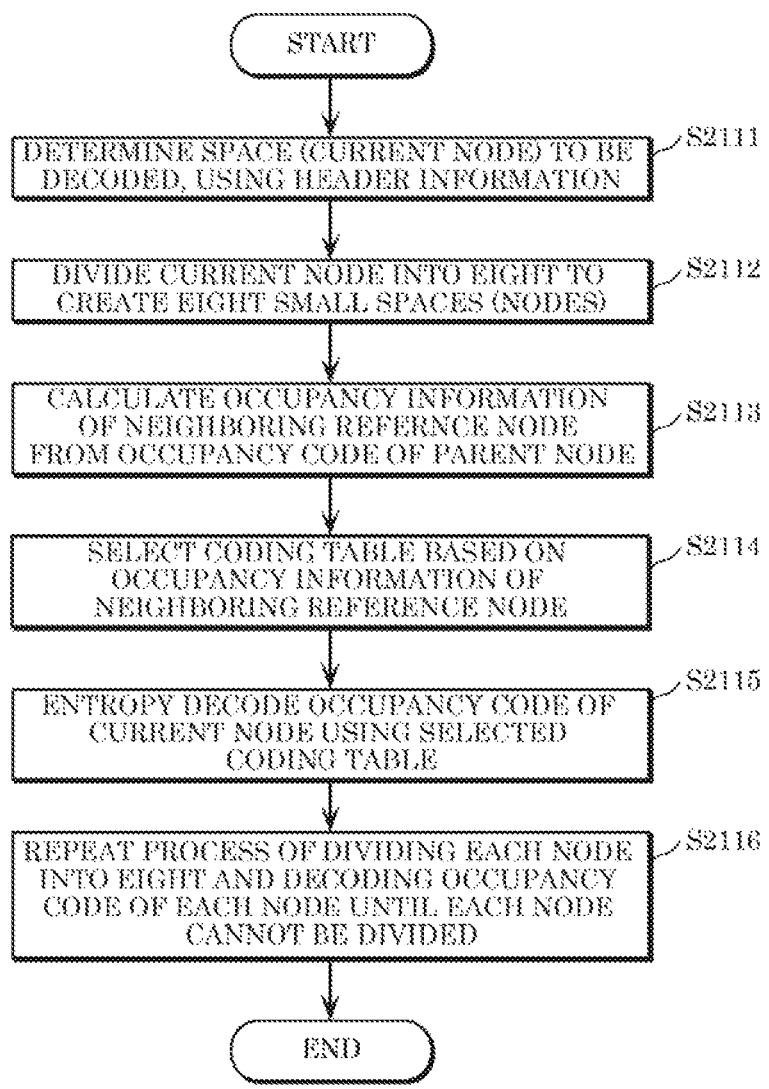
FIG. 102 is a flowchart of a three-dimensional data decoding process according to Embodiment 10.

FIG. 102 is a flowchart of a three-dimensional data decoding process in the three-dimensional data decoding device. First, the three-dimensional data decoding device determines (defines) a space (a current node) to be decoded, using header information of a bitstream (S2111). Next, the three-dimensional data decoding device generates eight small spaces (nodes) by dividing the current node into eight (S2112). Then, the three-dimensional data decoding device calculates (obtains) occupancy information of a neighboring reference node of the current node from an occupancy code of a parent node of the current node (S2113).

After that, the three-dimensional data decoding device selects a coding table to be used for entropy decoding, based on the occupancy information of the neighboring reference node (S2114). Next, the three-dimensional data decoding device entropy decodes the occupancy code of the current node using the selected coding table (S2115).

Finally, the three-dimensional data decoding device repeats a process of dividing each node into eight and decoding an occupancy code of the node, until the node cannot be divided (S2116). In other words, steps S2112 to S2115 are recursively repeated.

Figure 103:
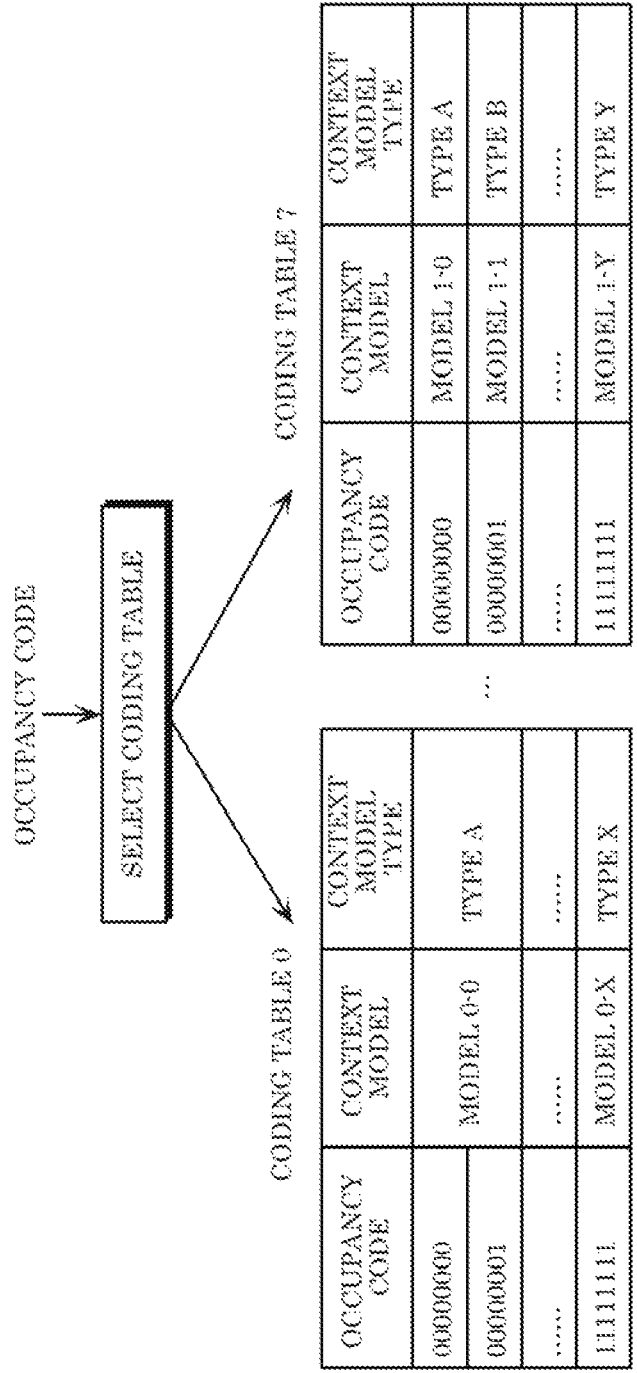
FIG. 103 is a diagram illustrating an example of selecting a coding table according to Embodiment 10.

Next, the following describes an example of selecting a coding table. FIG. 103 is a diagram illustrating an example of selecting a coding table. For example, as in coding table 0 shown in FIG. 103, the same context mode may be applied to occupancy codes. Moreover, a different context model may be assigned to each occupancy code. Since this enables assignment of a context model in accordance with a probability of appearance of an occupancy code, it is possible to improve the coding efficiency. Furthermore, a context mode that updates a probability table in accordance with an appearance frequency of an occupancy code may be used. Alternatively, a context model having a fixed probability table may be used.

It should be noted that although the coding tables illustrated in FIG. 77 and FIG. 78 are used in the example shown in FIG. 103, the coding tables illustrated in FIG. 80 and FIG. 81 may be used instead.

Figures 104, 105, 106:
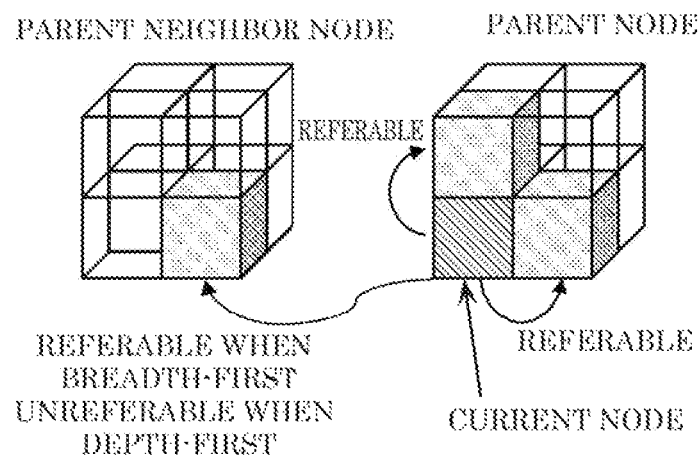
FIG. 104 is a diagram illustrating a reference relationship in a spatial region according to Variation 1 of Embodiment 10.
FIG. 105 is a diagram illustrating an example of a syntax of header information according to Variation 1 of Embodiment 10.
FIG. 106 is a diagram illustrating an example of a syntax of header information according to Variation 1 of Embodiment 10.

Hereinafter, Variation 1 of the present embodiment will be described. FIG. 104 is a diagram illustrating a reference relationship in the present variation. Although the three-dimensional data encoding device does not refer to the occupancy code of the parent neighbor node in the above-described embodiment, the three-dimensional data encoding device may switch whether to refer to an occupancy code of a parent neighbor node, according to a specific condition.

For example, when the three-dimensional data encoding device encodes an octree while scanning the octree breadth-first, the three-dimensional data encoding device encodes an occupancy code of a current node by reference to occupancy information of a node in a parent neighbor node. In contrast, when the three-dimensional data encoding device encodes the octree while scanning the octree depth-first, the three-dimensional data encoding device prohibits reference to the occupancy information of the node in the parent neighbor node. By appropriately selecting a referable node according to the scan order (encoding order) of nodes of the octree in the above manner, it is possible to improve the coding efficiency and reduce the processing load.

It should be noted that the three-dimensional data encoding device may append, to a header of a bitstream, information indicating, for example, whether an octree is encoded breadth-first or depth-first. FIG. 105 is a diagram illustrating an example of a syntax of the header information in this case. octree_scan_order shown in FIG. 105 is encoding order information (an encoding order flag) indicating an encoding order for an octree. For example, when octree_scan_order is 0, breadth-first is indicated, and when octree_scan_order is 1, depth-first is indicated. Since this enables the three-dimensional data decoding device to determine whether a bitstream has been encoded breadth-first or depth-first by reference to octree_scan_order, the three-dimensional data decoding device can appropriately decode the bitstream Moreover, the three-dimensional data encoding device may append, to header information of a bitstream, information indicating whether to prohibit reference to a parent neighbor node. FIG. 106 is a diagram illustrating an example of a syntax of the header information in this case. limit_refer_flag is prohibition switch information (a prohibition switch flag) indicating whether to prohibit reference to a parent neighbor node. For example, when limit_refer_flag is 1, prohibition of reference to the parent neighbor node is indicated, and when limit_refer_flag is 0, no reference limitation (permission of reference to the parent neighbor node) is indicated.

In other words, the three-dimensional data encoding device determines whether to prohibit the reference to the parent neighbor node, and selects whether to prohibit or permit the reference to the parent neighbor node, based on a result of the above determination. In addition, the three-dimensional data encoding device generates a bitstream including prohibition switch information that indicates the result of the determination and indicates whether to prohibit the reference to the parent neighbor node.

The three-dimensional data decoding device obtains, from a bitstream, prohibition switch information indicating whether to prohibit reference to a parent neighbor node, and selects whether to prohibit or permit the reference to the parent neighbor node, based on the prohibition switch information.

This enables the three-dimensional data encoding device to control the reference to the parent neighbor node and generate the bitstream. That also enables the three-dimensional data decoding device to obtain, from the header of the bitstream, the information indicating whether to prohibit the reference to the parent neighbor node.

Although the process of encoding an occupancy code has been described as an example of an encoding process in which reference to a parent neighbor node is prohibited in the present embodiment, the present disclosure is not necessarily limited to this. For example, the same method can be applied when other information of a node of an octree is encoded. For example, the method of the present embodiment may be applied when other attribute information, such as a color, a normal vector, or a degree of reflection, added to a node is encoded. Additionally, the same method can be applied when a coding table or a predicted value is encoded.

Figure 107:
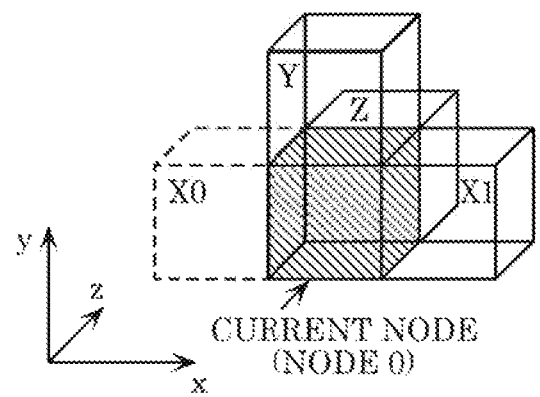
FIG. 107 is a diagram illustrating an example of neighboring reference nodes according to Variation 2 of Embodiment 10.

Hereinafter, Variation 2 of the present embodiment will be described. In the above description, as illustrated in FIG. 96, the example in which the three reference neighboring nodes are used is given, but four or more reference neighboring nodes may be used. FIG. 107 is a diagram illustrating an example of a current node and neighboring reference nodes.

For example, the three-dimensional data encoding device calculates a coding table to be used when the three-dimensional data encoding device entropy encodes an occupancy code of the current node shown in FIG. 107, using the following equation.

$$\text{CodingTable} = (\text{Flag}X0 << 3) + (\text{Flag}X1 << 2) + (\text{Flag}Y << 1) + (\text{Flag}Z)$$

Here, CodingTable indicates a coding table for an occupancy code of a current node, and indicates one of values ranging from 0 to 15. FlagXN is occupancy information of neighboring node XN (N=0 . . . 1). FlaxXN indicates 1 when neighboring node XN includes a point cloud (is occupied), and indicates 0 when it does not. FlagY is occupancy information of neighboring node Y. FlagY indicates 1 when neighboring node Y includes a point cloud (is occupied), and indicates 0 when it does not. FlagZ is occupancy information of neighboring node Z. FlagZ indicates 1 when neighboring node Z includes a point cloud (is occupied), and indicates 0 when it does not.

At this time, when a neighboring node, for example, neighboring node X0 in FIG. 107, is unreferable (prohibited from being referred to), the three-dimensional data encoding device may use, as a substitute value, a fixed value such as 1 (occupied) or 0 (unoccupied).

Figure 108:
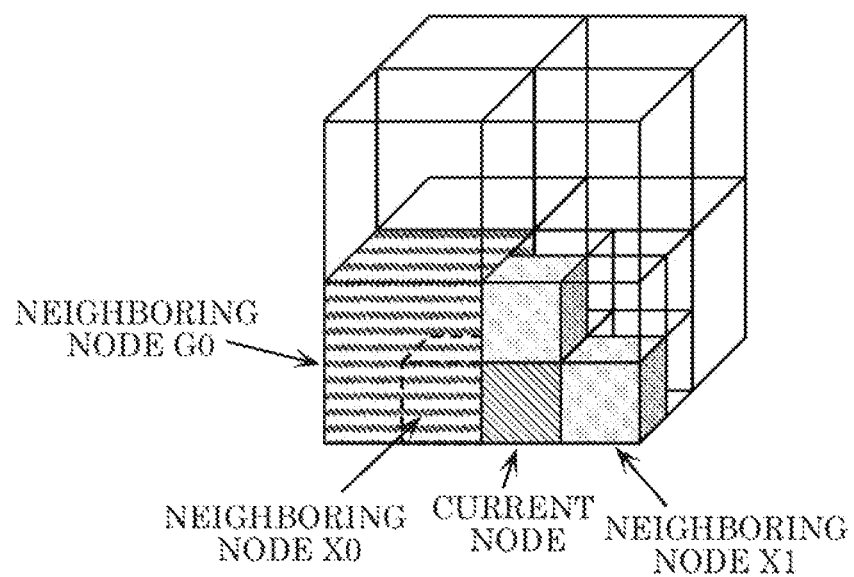
FIG. 108 is a diagram illustrating an example of a current node and neighboring nodes according to Variation 2 of Embodiment 10.

FIG. 108 is a diagram illustrating an example of a current node and neighboring reference nodes. As illustrated in FIG. 108, when a neighboring node is unreferable (prohibited from being referred to), occupancy information of the neighboring node may be calculated by reference to an occupancy code of a grandparent node of the current node. For example, the three-dimensional data encoding device may calculate FlagX0 in the above equation using occupancy information of neighboring node G0 instead of neighboring node X0 illustrated in FIG. 108, and may determine a value of a coding table using calculated FlagX0. It should be noted that neighboring node G0 illustrated in FIG. 108 is a neighboring node occupancy or unoccupancy of which can be determined using the occupancy code of the grandparent node. Neighboring node X1 is a neighboring node occupancy or unoccupancy of which can be determined using an occupancy code of a parent node.

Figure 109:
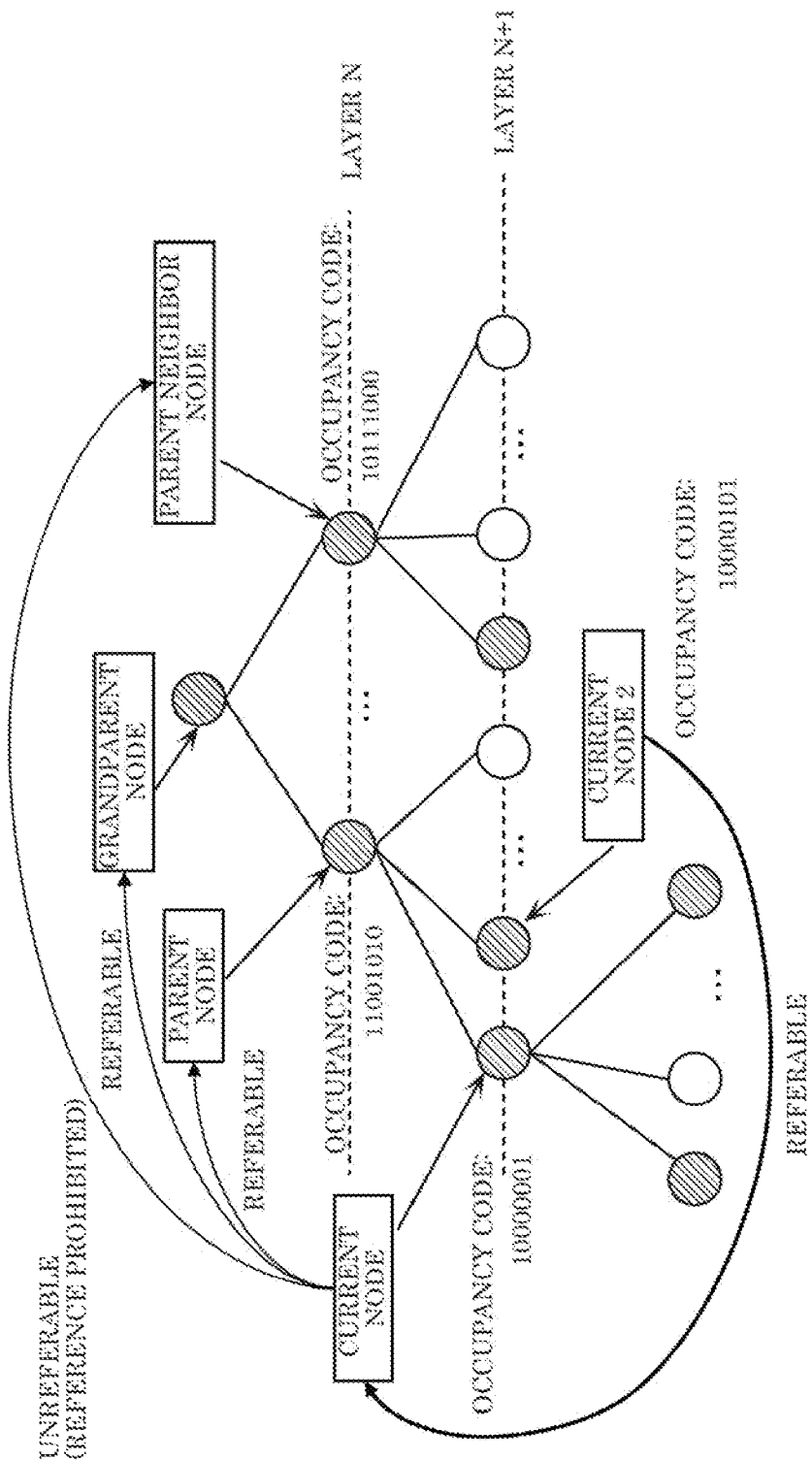
FIG. 109 is a diagram illustrating a reference relationship in an octree structure according to Variation 3 of Embodiment 10.
Figure 110:
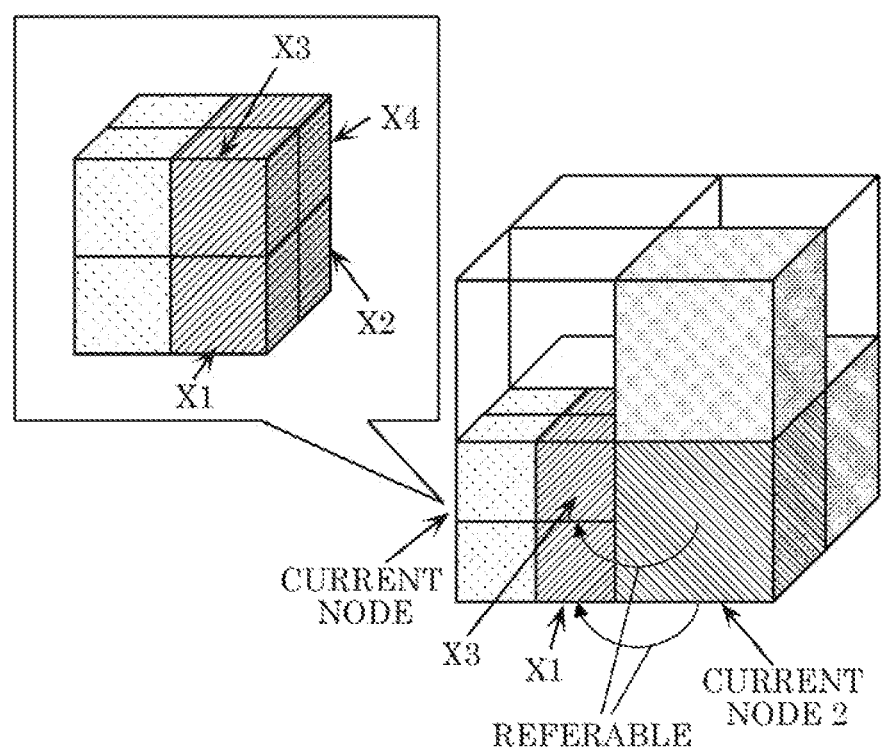
FIG. 110 is a diagram illustrating a reference relationship in a spatial region according to Variation 3 of Embodiment 10.

Hereinafter, Variation 3 of the present embodiment will be described. FIG. 109 and FIG. 110 each are a diagram illustrating a reference relationship according to the present variation. Specifically, FIG. 109 is a diagram illustrating a reference relationship in an octree structure, and FIG. 110 is a diagram illustrating a reference relationship in a spatial region.

In the present variation, when the three-dimensional data encoding device encodes encoding information of a current node to be encoded (hereinafter referred to as current node 2), the three-dimensional data encoding device refers to encoding information of each node in a parent node to which current node 2 belongs. In other words, the three-dimensional data encoding device permits reference to information (e.g., occupancy information) of a child node of a first node, among neighboring nodes, that has the same parent node as a current node. For example, when the three-dimensional data encoding device encodes an occupancy code of current node 2 illustrated in FIG. 109, the three-dimensional data encoding device refers to an occupancy code of a node in the parent node to which current node 2 belongs, for example, the current node illustrated in FIG. 109. As illustrated in FIG. 110, the occupancy code of the current node illustrated in FIG. 109 indicates, for example, whether each node in the current node neighboring current node 2 is occupied. Accordingly, since the three-dimensional data encoding device can select a coding table for the occupancy code of current node 2 in accordance with a more particular shape of the current node, the three-dimensional data encoding device can improve the coding efficiency.

The three-dimensional data encoding device may calculate a coding table to be used when the three-dimensional data encoding device entropy encodes the occupancy code of current node 2, using the following equation, for example.

$$\text{CodingTable} = (\text{Flag}X1 << 5) + (\text{Flag}X2 << 4) + (\text{Flag}X3 << 3) + (\text{Flag}X4 << 2) + (\text{Flag}Y << 1) + (\text{Flag}Z)$$

Here, CodingTable indicates a coding table for an occupancy code of current node 2, and indicates one of values ranging from 0 to 63. FlagXN is occupancy information of neighboring node XN (N=1 . . . 4). FlagXN indicates 1 when neighboring node XN includes a point cloud (is occupied), and indicates 0 when it does not. FlagY is occupancy information of neighboring node Y. FlagY indicates 1 when neighboring node Y includes a point cloud (is occupied), and indicates 0 when it does not. FlagZ is occupancy information of neighboring node Z. FlagZ indicates 1 when neighboring node Z includes a point cloud (is occupied), and indicates 0 when it does not.

It should be noted that the three-dimensional data encoding device may change a method of calculating a coding table, according to a node position of current node 2 in the parent node.

When reference to a parent neighbor node is not prohibited, the three-dimensional data encoding device may refer to encoding information of each node in the parent neighbor node. For example, when the reference to the parent neighbor node is not prohibited, reference to information (e.g., occupancy information) of a child node of a third node having a different parent node from that of a current node. In the example illustrated in FIG. 108, for example, the three-dimensional data encoding device obtains occupancy information of a child node of neighboring node X0 by reference to an occupancy code of neighboring node X0 having a different parent node from that of the current node. The three-dimensional data encoding device selects a coding table to be used for entropy encoding of an occupancy code of the current node, based on the obtained occupancy information of the child node of neighboring node X0.

As stated above, the three-dimensional data encoding device according to the present embodiment encodes information (e.g., an occupancy code) of a current node included in an N-ary tree structure of three-dimensional points included in three-dimensional data, where N is an integer greater than or equal to 2. As illustrated in FIG. 94 and FIG. 95, in the encoding, the three-dimensional data encoding device permits reference to information (e.g., occupancy information) of a first node included in neighboring nodes spatially neighboring the current node, and prohibits reference to information of a second node included in the neighboring nodes, the first node having a same parent node as the current node, the second node having a different parent node from the parent node of the current node. To put it another way, in the encoding, the three-dimensional data encoding device permits reference to information (e.g., an occupancy code) of the parent node, and prohibits reference to information (e.g., an occupancy code) of another node (a parent neighbor node) in the same layer as the parent node.

With this, the three-dimensional data encoding device can improve coding efficiency by reference to the information of the first node included in the neighboring nodes spatially neighboring the current node, the first node having the same parent node as the current node. Besides, the three-dimensional data encoding device can reduce a processing amount by not reference to the information of the second node included in the neighboring nodes, the second node having a different parent node from the parent node of the current node. In this manner, the three-dimensional data encoding device can not only improve the coding efficiency but also reduce the processing amount.

For example, the three-dimensional data encoding device further determines whether to prohibit the reference to the information of the second node. In the encoding, the three-dimensional data encoding device selects whether to prohibit or permit the reference to the information of the second node, based on a result of the determining. Moreover, the three-dimensional data encoding device generates a bit stream including prohibition switch information (e.g., limit_refer_flag shown in FIG. 106) that indicates the result of the determining and indicates whether to prohibit the reference to the information of the second node.

With this, the three-dimensional data encoding device can select whether to prohibit the reference to the information of the second node. In addition, a three-dimensional data decoding device can appropriately perform a decoding process using the prohibition switch information.

For example, the information of the current node is information (e.g., an occupancy code) that indicates whether a three-dimensional point is present in each of child nodes belonging to the current node. The information of the first node is information (the occupancy information of the first node) that indicates whether a three-dimensional point is present in the first node. The information of the second node is information (the occupancy information of the second node) that indicates whether a three-dimensional point is present in the second node.

For example, in the encoding, the three-dimensional data encoding device selects a coding table based on whether the three-dimensional point is present in the first node, and entropy encodes the information (e.g., the occupancy code) of the current node using the coding table selected.

For example, as illustrated in FIG. 109 and FIG. 110, in the encoding, the three-dimensional data encoding device permits reference to information (e.g., occupancy information) of a child node of the first node, the child node being included in the neighboring nodes.

With this, since the three-dimensional data encoding device enables reference to more detailed information of a neighboring node, the three-dimensional data encoding device can improve the coding efficiency.

For example, as illustrated in FIG. 96, in the encoding, the three-dimensional data encoding device selects a neighboring node to be referred to from the neighboring nodes according to a spatial position of the current node in the parent node.

With this, the three-dimensional data encoding device can refer to an appropriate neighboring node according to the spatial position of the current node in the parent node.

For example, the three-dimensional data encoding device includes a processor and memory, and the processor performs the above process using the memory.

The three-dimensional data decoding device according to the present embodiment decodes information (e.g., an occupancy code) of a current node included in an N-ary tree structure of three-dimensional points included in three-dimensional data, where N is an integer greater than or equal to 2. As illustrated in FIG. 94 and FIG. 95, in the decoding, the three-dimensional data decoding device permits reference to information (e.g., occupancy information) of a first node included in neighboring nodes spatially neighboring the current node, and prohibits reference to information of a second node included in the neighboring nodes, the first node having a same parent node as the current node, the second node having a different parent node from the parent node of the current node. To put it another way, in the decoding, the three-dimensional data decoding device permits reference to information (e.g., an occupancy code) of the parent node, and prohibits reference to information (e.g., an occupancy code) of another node (a parent neighbor node) in the same layer as the parent node.

With this, the three-dimensional data decoding device can improve coding efficiency by reference to the information of the first node included in the neighboring nodes spatially neighboring the current node, the first node having the same parent node as the current node. Besides, the three-dimensional data decoding device can reduce a processing amount by not reference to the information of the second node included in the neighboring nodes, the second node having a different parent node from the parent node of the current node. In this manner, the three-dimensional data decoding device can not only improve the coding efficiency but also reduce the processing amount.

For example, the three-dimensional data decoding device further obtains, from a bitstream, prohibition switch information (e.g., limit_refer_flag shown in FIG. 106) indicating whether to prohibit the reference to the information of the second node. In the decoding, the three-dimensional data decoding device selects whether to prohibit or permit the reference to the information of the second node, based on the prohibition switch information.

With this, the three-dimensional data decoding device can appropriately perform a decoding process using the prohibition switch information.

For example, the information of the current node is information (e.g., an occupancy code) that indicates whether a three-dimensional point is present in each of child nodes belonging to the current node. The information of the first node is information (the occupancy information of the first node) that indicates whether a three-dimensional point is present in the first node. The information of the second node is information (the occupancy information of the second node) that indicates whether a three-dimensional point is present in the second node.

For example, in the decoding, the three-dimensional data encoding device selects a coding table based on whether the three-dimensional point is present in the first node, and entropy decodes the information (e.g., the occupancy code) of the current node using the coding table selected.

For example, as illustrated in FIG. 109 and FIG. 110, in the decoding, the three-dimensional data decoding device permits reference to information (e.g., occupancy information) of a child node of the first node, the child node being included in the neighboring nodes.

With this, since the three-dimensional data decoding device enables reference to more detailed information of a neighboring node, the three-dimensional data decoding device can improve the coding efficiency.

For example, as illustrated in FIG. 96, in the decoding, the three-dimensional data decoding device selects a neighboring node to be referred to from the neighboring nodes according to a spatial position of the current node in the parent node.

With this, the three-dimensional data decoding device can refer to an appropriate neighboring node according to the spatial position of the current node in the parent node.

For example, the three-dimensional data decoding device includes a processor and memory, and the processor performs the above process using the memory.

Embodiment 11

Figure 111:
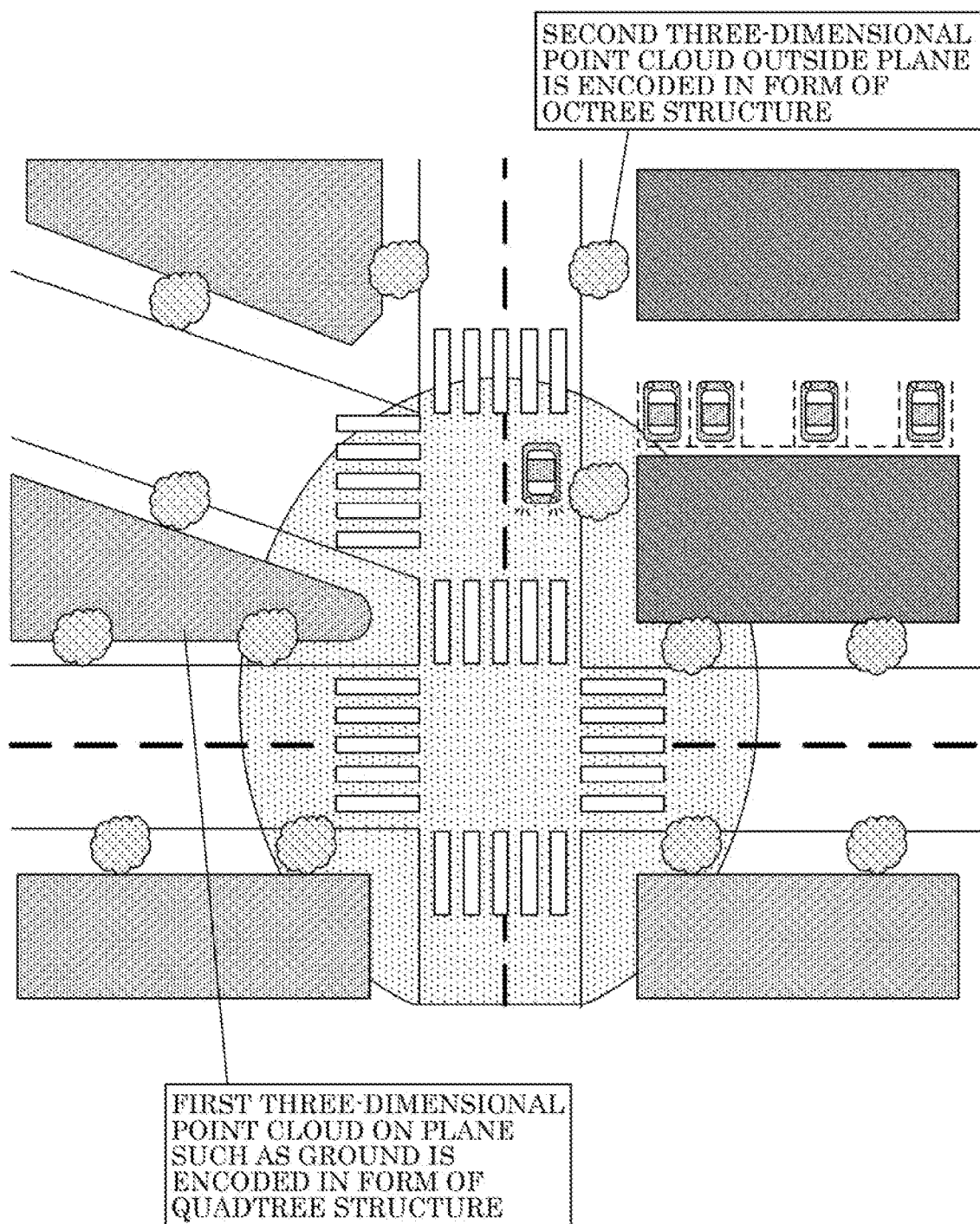
FIG. 111 is a diagram for illustrating an overview of a three-dimensional data encoding method according to Embodiment 11.

FIG. 111 is a diagram for illustrating an overview of a three-dimensional data encoding method according to Embodiment 11.

A first three-dimensional point cloud, which is a part of a three-dimensional point cloud, is located on one or more planes, and a second three-dimensional point cloud, which is another part of the three-dimensional point cloud, is located in the periphery of the one or more planes. In Embodiment 11, when encoding such a three-dimensional point cloud, the first three-dimensional point cloud located on one or more planes is represented as a quadtree, and the first three-dimensional point cloud of the quadtree structure represented as a quadtree is encoded. With point cloud data obtained by LiDAR, for example, a half or more of the three-dimensional points are located in the periphery of a plane, such as the ground.

According to this method, first, the first three-dimensional point cloud on the ground is separated from the three-dimensional point cloud of the point cloud data.

The first three-dimensional point cloud on the ground is then represented as a quadtree, and the first three-dimensional point cloud of the quadtree structure represented as a quadtree is encoded.

The second three-dimensional point cloud, which is the three-dimensional point cloud excluding the first three-dimensional point cloud, is represented as an octree, and the second three-dimensional point cloud represented as an octree is encoded.

As described above, the three-dimensional data encoding device may represent the first three-dimensional point cloud of the three-dimensional point cloud obtained by LiDAR or the like, which is located on a plane such as the ground or near the ground (at a level equal to or lower than a threshold), as a quadtree and encode the first three-dimensional point cloud of the quadtree structure, and represent the second three-dimensional point cloud, which is the three-dimensional point cloud excluding the first three-dimensional point cloud, as an octree and encode the second three-dimensional point cloud of the octree structure.

Figure 112:
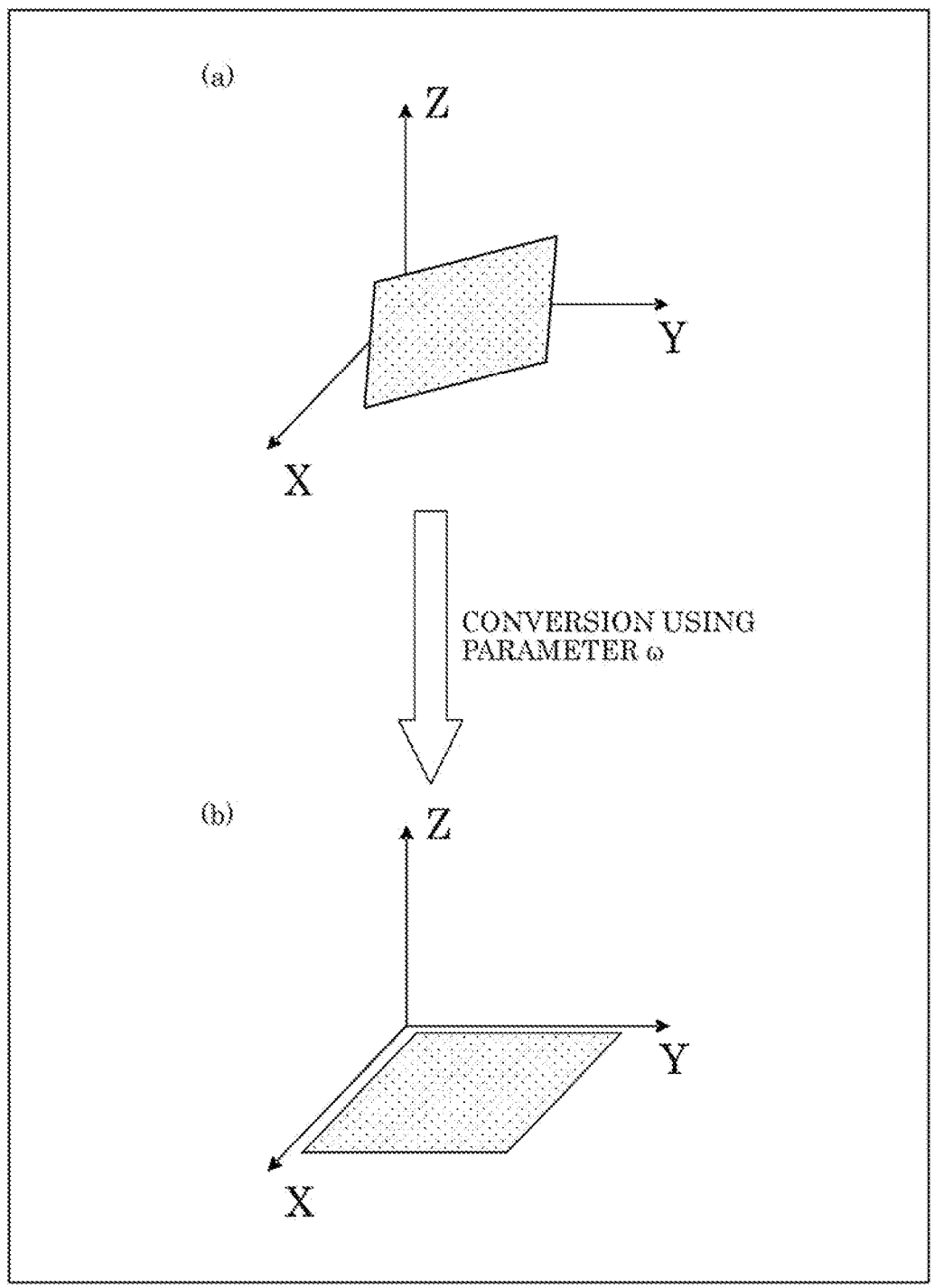
FIG. 112 is a diagram for illustrating a conversion method of converting a plane detected to be inclined into an X-Y plane according to Embodiment 11.

FIG. 112 is a diagram for illustrating a conversion method of converting a plane detected to be inclined into an X-Y plane. Note that, in FIG. 112, the X-axis direction corresponds to the front-rear direction of the vehicle provided with LiDAR, the Y-axis direction corresponds to the left-right direction of the vehicle, and the Z-axis direction corresponds to the up-down direction of the vehicle, for example. The X-axis direction, the Y-axis direction, and the Z-axis direction are perpendicular to each other.

As shown in part (a) of FIG. 112, the plane detected with point cloud data obtained by LiDAR may be inclined with respect to the three axis directions of the vehicle provided with LiDAR. In that case, each of a plurality of first three-dimensional points included in the first three-dimensional point cloud corresponding to the plane has a value in the Z-axis direction that is not 0.

As shown in part (b) of FIG. 112, the three-dimensional data encoding device performs a conversion that rotates the first three-dimensional point cloud on the plane detected to be inclined to coincide with the X-Y plane using a plane parameter $\omega$. As a result, each of the plurality of first three-dimensional points included in the converted first three-dimensional point cloud has a value of 0 in the Z-axis direction. In this way, the three-dimensional data encoding device can reduce the processing load involved with the encoding of the first three-dimensional point cloud. In this case, the three-dimensional data encoding device also encodes the plane parameter $\omega$.

In the header, the plane parameter $\omega$ (=[a, b, c, d]) can be defined by the following plane equation.

$$ax+by+cz=d$$

The header includes the plane parameter [a, b, c, d], for example.

The three-dimensional data encoding device detects a plane from geometry information on a three-dimensional point cloud in a random sample consensus (RANSAC) method, for example, and detects a first three-dimensional point cloud, which is a three-dimensional point cloud on the plane. The three-dimensional data encoding device may estimate the plane from the three-dimensional point cloud based on other sensor data or temporal consistency.

There are two possible methods for encoding a first three-dimensional point cloud on a plane. Note that it is supposed that the detected plane is substantially parallel with the XOY plane.

A first method involves selecting a point close to the plane. In this method, of the geometry information on a three-dimensional point, the X coordinate, the Y coordinate, and the distance to the plane are encoded.

A second method involves selecting a three-dimensional point on the plane. In this method, the X coordinate and the Y coordinate are encoded, but the distance to the plane is not encoded.

Figure 113:
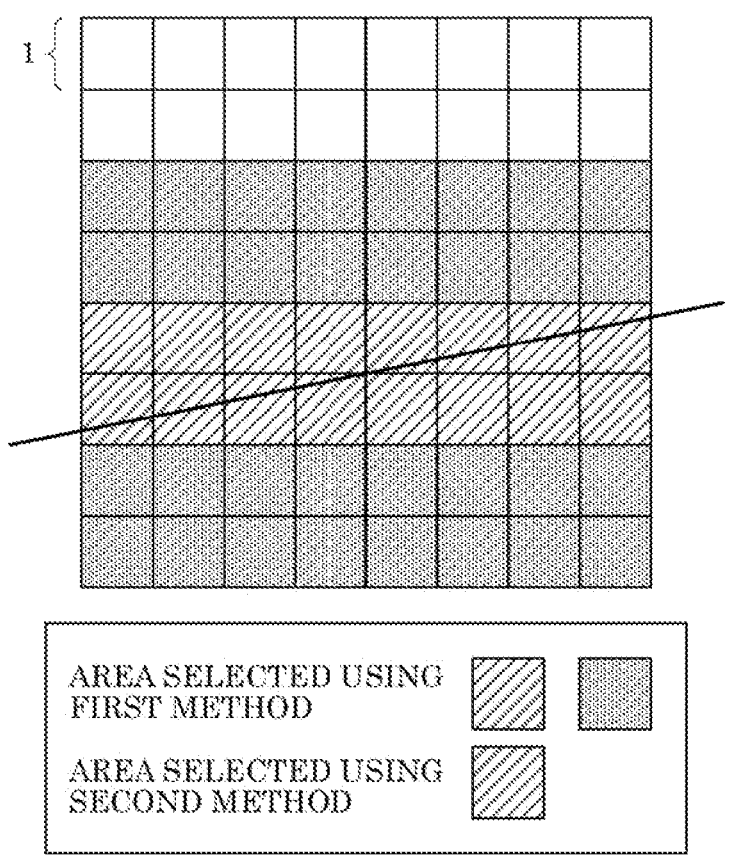
FIG. 113 is a diagram showing a relationship between a plane and a point cloud selected in each method according to Embodiment 11.

FIG. 113 is a diagram showing a relationship between the plane and the point cloud selected in each method.

For example, when the three-dimensional points are quantized, a three-dimensional point whose distance to the plane is less than 1 is determined to be located on the plane.

Figure 114:
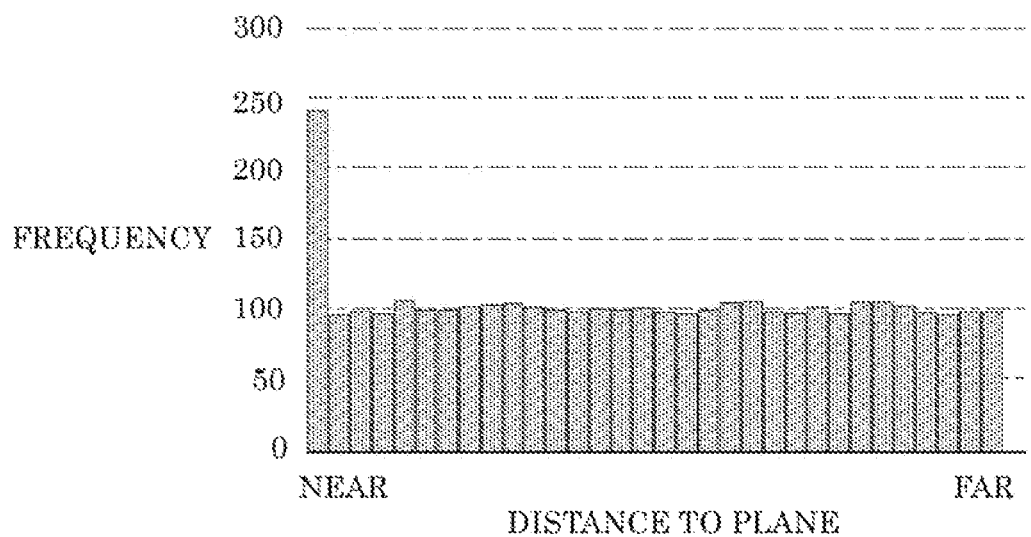
FIG. 114 is a diagram showing a frequency distribution of quantized distances between a plane detected from a three-dimensional point cloud and a point cloud (candidate plane point cloud) in the periphery of the plane according to a first method according to Embodiment 11.

FIG. 114 is a diagram showing a frequency distribution of the quantized distances between the plane detected from the three-dimensional point cloud and the point cloud (candidate plane point cloud) in the periphery of the plane according to the first method. As shown in FIG. 114, according to the first method, the distances are substantially uniformly distributed.

Figure 115:
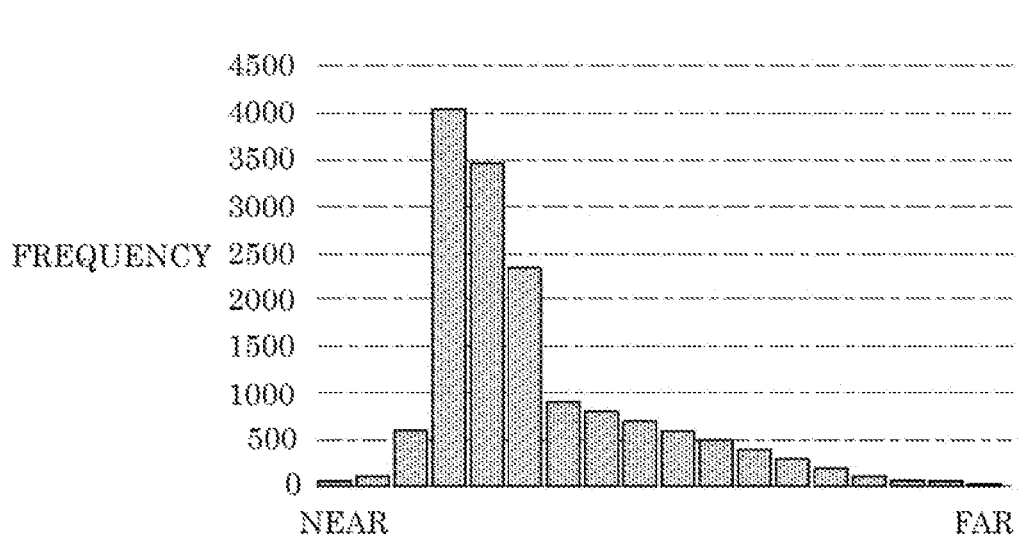
FIG. 115 is a diagram showing a frequency distribution of quantized distances between a plane detected from a three-dimensional point cloud and a point cloud in the periphery of the plane according to a second method according to Embodiment 11.

FIG. 115 is a diagram showing a frequency distribution of the quantized distances between the plane detected from the three-dimensional point cloud and the point cloud in the periphery of the plane according to the second method. In the second method, the distance that most frequently occurs between the three-dimensional points and the plane is 0, and the distances closer to the plane than the distance assume a negative value.

Note that when the distribution obtained from the three-dimensional point cloud is such a distribution as shown in FIG. 114, the first method that involves encoding the X coordinate, the Y coordinate, and the distance to the plane can be applied. When the distribution obtained from the three-dimensional point cloud is such a distribution as shown in FIG. 115, the second method that involves encoding the X coordinate and the Y coordinate can be applied.

The first three-dimensional point cloud of the quadtree structure may be encoded or decoded in an existing method for encoding a three-dimensional point cloud represented as an octree structure, rather than in a dedicated method for encoding a three-dimensional point cloud represented as a quadtree structure.

In the encoding of a three-dimensional point cloud of the octree structure, the three-dimensional data encoding device divides a three-dimensional space including the three-dimensional point cloud into eight subspaces, and encodes an occupancy code that indicates whether each subspace contains a three-dimensional point or not. This processing is repeatedly performed until a desired precision is reached or the number of the points contained in the subspace reaches a minimum number, such as one. The three-dimensional data decoding device decodes the encoded data to obtain the occupancy code, and recursively reconstruct the subspace corresponding to the obtained occupancy code. In this way, the three-dimensional data decoding device can decode the three-dimensional point cloud encoded by the three-dimensional data encoding device.

Figure 116:
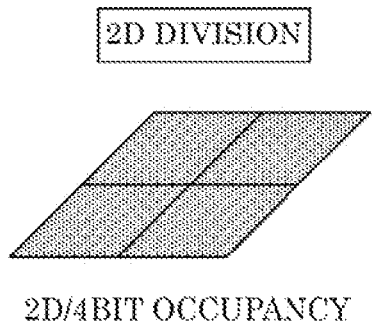
FIG. 116 is a diagram showing an example of the division of a two-dimensional space into four subspaces according to Embodiment 11.
Figure 117:
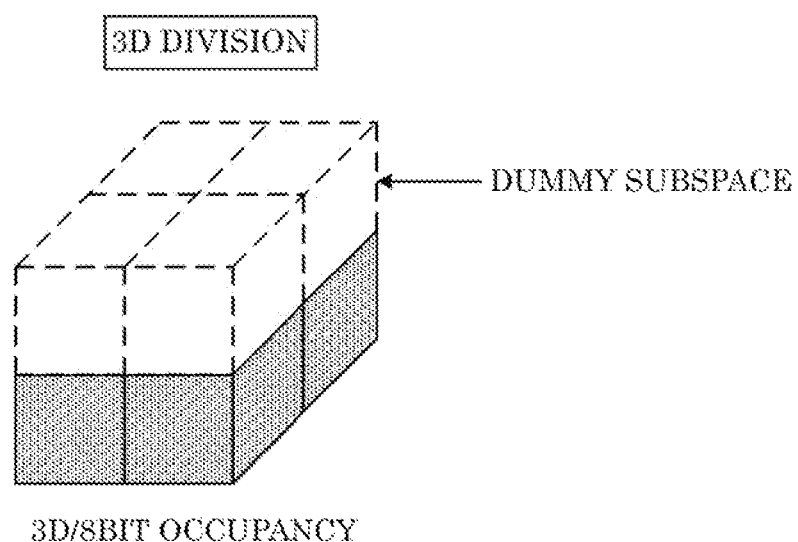
FIG. 117 is a diagram showing an example of an application of four subspaces of a two-dimensional space to eight subspaces of a three-dimensional space according to Embodiment 11.

FIG. 116 is a diagram showing an example of the division of a two-dimensional space into four subspaces. FIG. 117 is a diagram showing an example of the application of four subspaces of a two-dimensional space to eight subspaces of a three-dimensional space.

In the encoding of a three-dimensional point cloud of the quadtree structure, the result of the division of a two-dimensional space is represented using the result of the division of a three-dimensional space. Specifically, in order not to use the result of the division in the third dimension (Z-axis direction) of the result of the division of a three-dimensional space, the three-dimensional data encoding device assigns a dummy subspace to an upper space in the division of the three-dimensional space. By representing the result of the division of a two-dimensional space by using the result of the division of a three-dimensional space in this way, the three-dimensional data encoding device converts a 4-bit occupancy code that indicates the occupancy of the two-dimensional space such as that shown in FIG. 116 into an 8-bit occupancy code that indicates the occupancy of the three-dimensional space such as that shown in FIG. 117. Note that, with the 8-bit occupancy code, any bit indicating the dummy subspace is a 0 bit.

Figure 118:
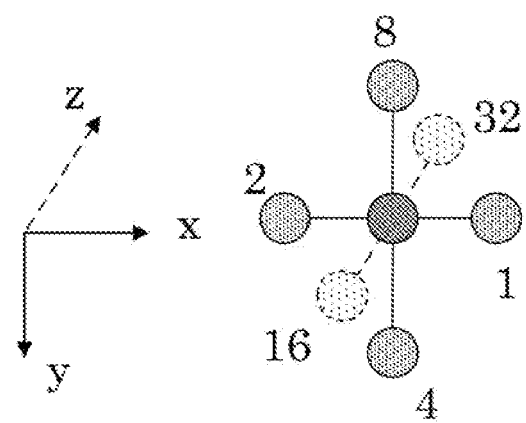
FIG. 118 is a diagram showing a relationship between neighboring three-dimensional points of the first three-dimensional point cloud located on the plane according to Embodiment 11.
Figure 119:
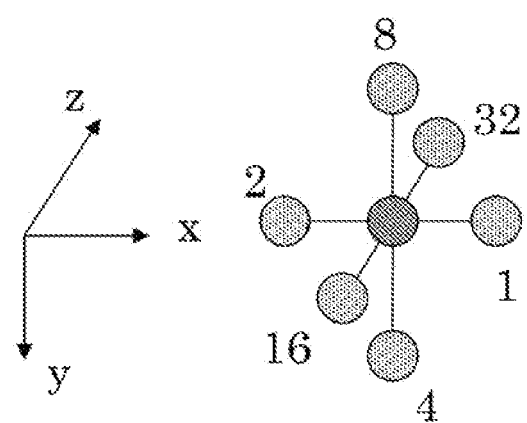

FIG. 118 is a diagram showing an example of an encoding/decoding pattern. FIG. 119 is a diagram showing another example of the encoding/decoding pattern.

When a three-dimensional point cloud of the octree structure is encoded by using a dependency on a neighboring subspace, a first three-dimensional point cloud is converted from the quadtree representation for a two-dimensional space to the octree representation for a three-dimensional space, and the first three-dimensional point cloud of the octree structure resulting from the conversion is also encoded by using a dependency on a neighboring subspace, as with a three-dimensional point cloud of the octree structure in the three-dimensional space that is not subjected to the conversion. If a three-dimensional point cloud of the quadtree structure is converted into the octree representation, one axis or, more specifically, the Z-axis is invalid for the resulting three-dimensional point cloud of the octree structure, and part of the neighboring relationship in the three-dimensional space is not used. Specifically, the Z-axis is invalid in FIG. 118, and the relationships with three-dimensional points 16 and 32, which are adjacent to the relevant three-dimensional point in the Z-axis direction, are not used. Therefore, in the encoding of a three-dimensional point cloud of the octree structure converted from the quadtree structure, the three-dimensional data encoding device selects an encoding table on the supposition that any neighboring node that is adjacent to the node to be encoded in the Z-axis direction is invalid, or the neighboring node includes no point cloud.

Next, a configuration of a three-dimensional data encoding device will be described.

Figure 120:
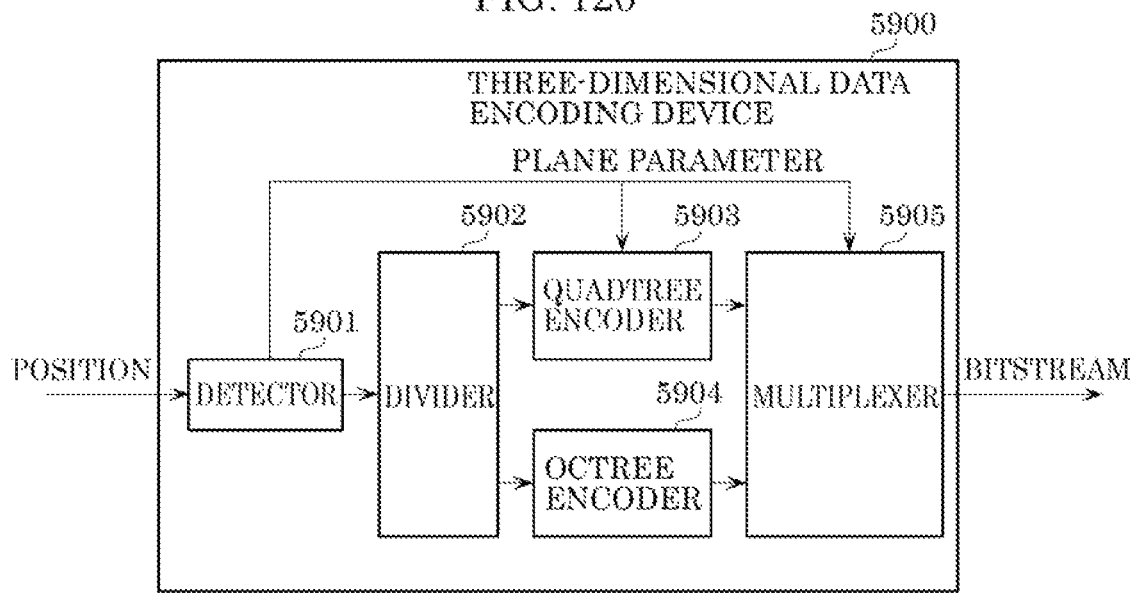

FIG. 120 is a block diagram showing a configuration of a three-dimensional data encoding device.

Three-dimensional data encoding device 5900 includes detector 5901, divider 5902, quadtree encoder 5903, octree encoder 5904, and multiplexer 5905.

Detector 5901 detects a plane from geometry information on a three-dimensional point cloud in the random sample consensus (RANSAC) method or the like, and detects a first three-dimensional point cloud on the plane. If the detected first three-dimensional point cloud is located on a plane detected to be inclined with respect to the X-Y plane, detector 5901 also performs a conversion that rotates the first three-dimensional point cloud to coincide with the X-Y plane using a plane parameter co.

Note that, when a plurality of planes is detected from geometry information on a three-dimensional point cloud, detector 5901 detects a first three-dimensional point cloud on each of the detected planes. For each of the plurality of planes, detector 5901 then performs the conversion that rotates the first three-dimensional point cloud on the plane to coincide with the X-Y plane using the plane parameter ω.

Divider 5902 divides the three-dimensional point cloud into the first three-dimensional point cloud and a second three-dimensional point cloud.

Quadtree encoder 5903 represents the first three-dimensional point cloud on the plane as a quadtree to generate a first three-dimensional point cloud of the quadtree structure represented as a quadtree, and encodes the first three-dimensional point cloud of the octree structure including the generated quadtree structure as a part thereof. In this way, quadtree encoder 5903 generates a first bitstream. Note that the octree structure including the quadtree structure as a part thereof means an encoded structure including a mixture of an octree structure and a quadtree structure.

As described above, quadtree encoder 5903 encodes first information on a first current node included in the quadtree structure. Here, quadtree encoder 5903 encodes the first information using a first encoding pattern that includes a pattern common to a second encoding pattern used for encoding an octree structure. The first encoding pattern and the second encoding pattern include a common structure. The first encoding pattern is an encoding pattern for selecting an encoding table used for encoding of the first information, and the second encoding pattern is an encoding pattern for selecting an encoding table used for encoding of second information. Note that quadtree encoder 5903 generates the first encoding pattern from first neighbor information on a plurality of first neighboring nodes spatially adjacent to the first current node in a plurality of directions. The first neighbor information is information that indicates whether or not each of the plurality of first neighboring nodes includes a point cloud.

In the generation of the first encoding pattern, quadtree encoder 5903 generates a first encoding pattern that includes a third bit pattern of six bits, the third bit pattern being formed by a first bit pattern and a second bit pattern, the first bit pattern including one or more bits that indicate one or more first neighboring nodes spatially adjacent to the first current node in a predetermined direction of a plurality of directions and indicate that each node is not occupied by a point cloud, and the second bit pattern including a plurality of bits that indicates a plurality of second neighboring nodes spatially adjacent to the first current node in the other directions than the predetermined direction of the plurality of directions. In this way, quadtree encoder 5903 achieves a commonality between the method of calculating the first encoding pattern used for encoding of the first information and the method of calculating the second encoding pattern used for encoding of a three-dimensional point cloud of the octree structure described later. That is, the first encoding pattern is generated using the second encoding pattern so as to indicate that each of one or more bits indicating one or more neighboring nodes spatially adjacent to the current node in a predetermined direction of the second encoding pattern is not occupied by a point cloud.

Quadtree encoder 5903 encodes the first three-dimensional point cloud and the plane parameter ω.

Octree encoder 5904 represents the second three-dimensional point cloud as an octree, and encodes the second three-dimensional point cloud of the octree structure represented as an octree. In this way, octree encoder 5904 generates a second bitstream. Specifically, octree encoder 5904 encodes second information on a second current node included in the octree structure. Octree encoder 5904 generates a second encoding pattern from second neighbor information on a plurality of second neighboring nodes spatially adjacent to a second current node in a plurality of directions. Note that the second neighbor information is information that indicates whether or not each of the plurality of second neighboring nodes includes a point cloud. In the generation of the second encoding pattern, octree encoder 5904 generates a second encoding pattern that includes a fourth bit pattern of six bits, which includes a plurality of bits that indicates a plurality of third neighboring nodes spatially adjacent to the second current node in a plurality of directions.

Note that the plurality of directions are six directions, that is, the X-axis positive direction, the X-axis negative direction, the Y-axis positive direction, the Y-axis negative direction, the Z-axis positive direction, and the Z-axis negative direction, for example. The Z-axis positive direction and the Z-axis negative direction are the predetermined directions.

Multiplexer 5905 generates an encoded stream by multiplexing the first bitstream generated by quadtree encoder 5903 encoding the first three-dimensional point cloud of the octree structure and the second bitstream generated by octree encoder 5904 encoding the second three-dimensional point cloud of the octree structure.

Note that three-dimensional data encoding device 5900 may encode the first three-dimensional point cloud by using octree encoder 5904, instead of quadtree encoder 5903. Octree encoder 5904 may encode a virtual quadtree obtained by performing the octree division down to the leaves by regarding four of eight sub-nodes of each resulting octree as invalid nodes (nodes that are not occupied). In that case, octree encoder 5904 may encode the occupancy code as a 4-bit code excluding the invalid nodes. For example, octree encoder 5904 generates a bitstream including a third bit sequence of eight bits including a first bit sequence of four bits corresponding to the first information and an invalid, second bit sequence of four bits by encoding the first information that indicates whether or not each of four first subspaces obtained by division of the first current node includes a first three-dimensional point. Each bit of the invalid second bit sequence is represented as 0, for example. As a result, separate encoders do not need to be provided for a quadtree and an octree, and the circuit size or the source code amount can be reduced.

Figure 121:
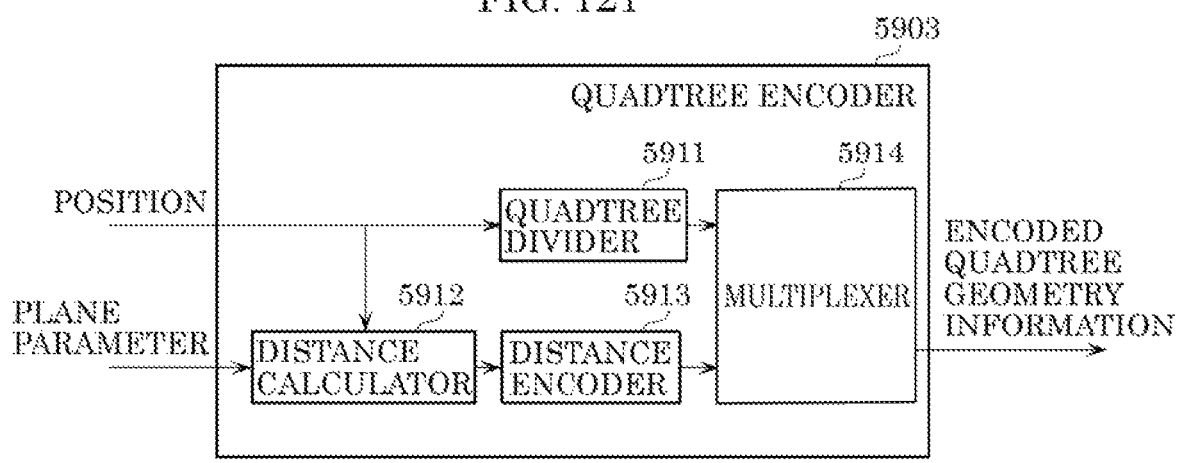

FIG. 121 is a block diagram showing a detailed configuration of a quadtree encoder that uses the first method.

Quadtree encoder 5903 includes quadtree divider 5911, distance calculator 5912, distance encoder 5913, and multiplexer 5914.

Quadtree divider 5911 divides a two-dimensional space including a first three-dimensional point cloud into four subspaces, and encodes the occupancy code for each subspace. Quadtree divider 5911 performs the processing of dividing each subspace into four parts and encoding the occupancy code for each part until the subspaces become unable to be further divided.

Distance calculator 5912 calculates the distance of each first three-dimensional point in the first three-dimensional point cloud to a plane.

Distance encoder 5913 encodes distance information indicating the calculated distance of each first three-dimensional point to the plane. Distance encoder 5913 may binarize the distance information and arithmetically encode the result of the binarization. Alternatively, distance encoder 5913 may predict distance information on a target first three-dimensional point from distance information on a first three-dimensional point adjacent to the target first three-dimensional point, and arithmetically encode a difference value between a prediction value, which is the result of the prediction, and the distance information on the target first three-dimensional point.

Multiplexer 5914 generates encoded quadtree geometry information by multiplexing the encoded occupancy code and the encoded distance information.

Instead of quadtree encoder 5903 for the first method, quadtree encoder 5903A for the second method described below may be used.

Figure 122:
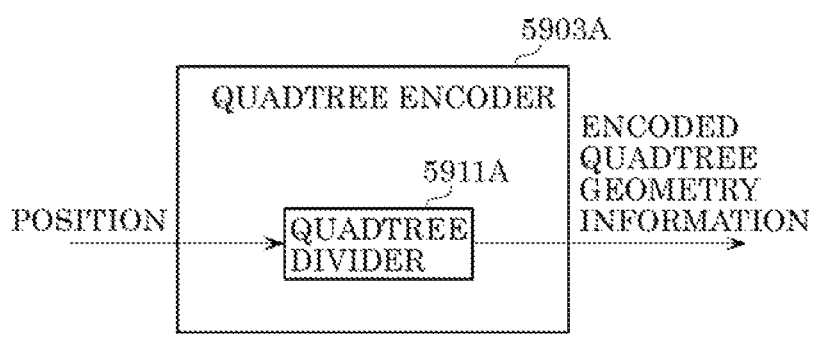

FIG. 122 is a block diagram showing a detailed configuration of a quadtree encoder that uses the second method.

Quadtree encoder 5903A includes quadtree divider 5911A.

Quadtree divider 5911A divides a two-dimensional space including a first three-dimensional point cloud into four subspaces, encodes the occupancy code for each subspace, and outputs the encoded occupancy code as encoded quadtree geometry information. Quadtree divider 5911A performs the processing of dividing each subspace into four parts and encoding the occupancy code for each part until the subspaces become unable to be further divided.

Next, a configuration of a three-dimensional data decoding device will be described.

Figure 123:
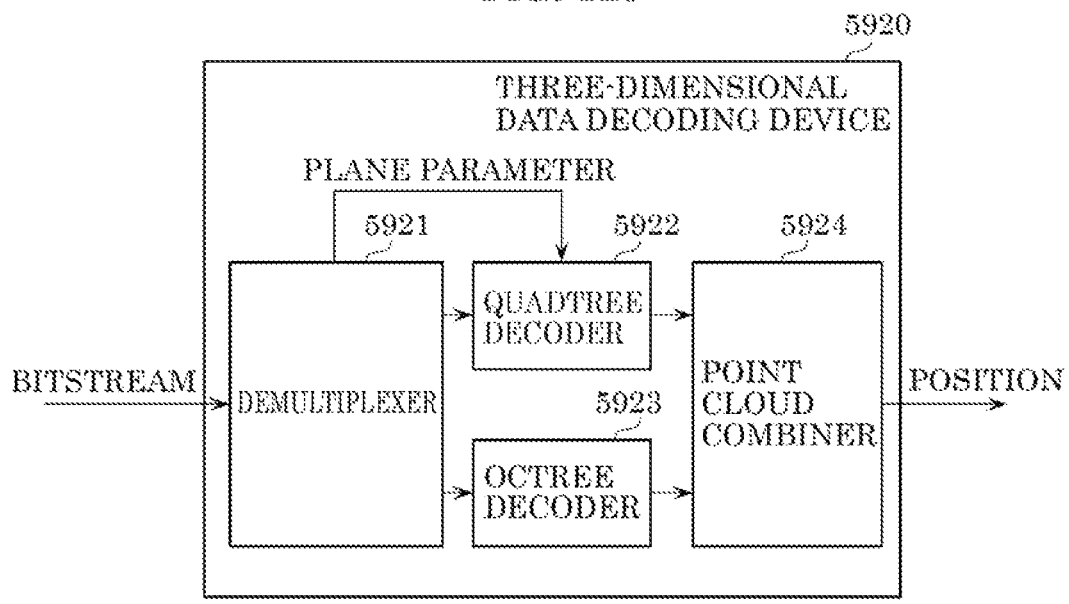

FIG. 123 is a block diagram showing a configuration of a three-dimensional data decoding device.

Three-dimensional data decoding device 5920 includes demultiplexer 5921, quadtree decoder 5922, octree decoder 5923, and point cloud combiner 5924.

Demultiplexer 5921 demultiplexes the encoded stream into the encoded first three-dimensional point cloud of the octree structure, the encoded second three-dimensional point cloud of the octree structure, and the plane parameter. Note that, when the first three-dimensional point cloud is encoded in the quadtree structure, demultiplexer 5921 demultiplexes the encoded stream into the encoded first three-dimensional point cloud of the quadtree structure, rather than the encoded first three-dimensional point cloud of the octree structure.

Quadtree decoder 5922 decodes the encoded first three-dimensional point cloud of the octree structure to obtain the first three-dimensional point cloud of the quadtree structure included in the first three-dimensional point cloud, and inversely rotates the obtained first three-dimensional point cloud using the plane parameter ω to obtain the first three-dimensional point cloud. Note that quadtree decoder 5922 may obtain by decoding the first three-dimensional point cloud of the quadtree structure, rather than the first three-dimensional point cloud of the quadtree structure included in the first three-dimensional point cloud of the octree structure.

A first decoding pattern is a decoding pattern for selecting a decoding table used for decoding of the first information, and a second decoding pattern is a decoding pattern for selecting a decoding table used for decoding of the second information. Note that quadtree decoder 5922 generates the first decoding pattern from the first neighbor information on a plurality of first neighboring nodes spatially adjacent to the first current node in a plurality of directions.

In the generation of the first decoding pattern, quadtree decoder 5922 generates a first decoding pattern that includes a third bit pattern of six bits, the third bit pattern being formed by a first bit pattern and a second bit pattern, the first bit pattern including one or more bits that indicate one or more first neighboring nodes spatially adjacent to the first current node in a predetermined direction of a plurality of directions and indicate that each node is not occupied by a point cloud, and the second bit pattern including a plurality of bits that indicates a plurality of second neighboring nodes spatially adjacent to the first current node in the other directions than the predetermined direction of the plurality of directions. In this way, quadtree decoder 5922 achieves a commonality between the method of calculating the first decoding pattern used for encoding of the first information and the method of calculating the second decoding pattern used for decoding of a three-dimensional point cloud of the octree structure described later.

Octree decoder 5923 decodes the second three-dimensional point cloud of the octree structure to obtain the second three-dimensional point cloud. Octree decoder 5923 decodes the second information on the second current node included in the octree structure. Octree decoder 5923 generates the second decoding pattern from second neighbor information on a plurality of second neighboring nodes spatially adjacent to the second current node in a plurality of directions. In the generation of the second decoding pattern, octree decoder 5923 generates a second decoding pattern that includes a fourth bit pattern of six bits, which includes a plurality of bits that indicates a plurality of third neighboring nodes spatially adjacent to the second current node in a plurality of directions.

Point cloud combiner 5924 combines the first three-dimensional point cloud and the second three-dimensional point cloud to generate a three-dimensional point cloud indicating geometry information.

Note that three-dimensional data decoding device 5920 may decode the first three-dimensional point cloud by using octree decoder 5923, instead of quadtree decoder 5922. Octree decoder 5923 may decode a virtual quadtree obtained by performing the octree division down to the leaves by regarding four of eight sub-nodes of each resulting octree as invalid nodes (nodes that are not occupied). In that case, octree decoder 5923 may decode the occupancy code as a 4-bit code excluding the invalid nodes. For example, octree decoder 5923 decodes a first bit sequence, which is a bitstream including a third bit sequence of eight bits including a first bit sequence of four bits and an invalid second bit sequence of (8−N) bits, to obtain first information (occupancy code) that indicates whether or not each of four subspaces obtained by division of the first current node includes a first three-dimensional point. As a result, separate decoders for a quadtree and an octree do not need to be provided, and the circuit size or the source code amount can be reduced.

Figure 124:
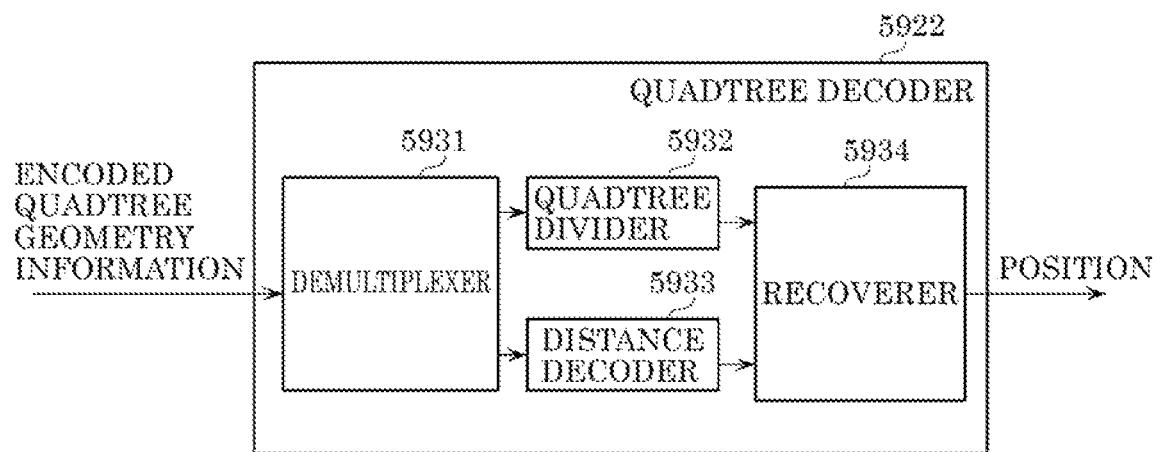

FIG. 124 is a block diagram showing a detailed configuration of a quadtree decoder that uses the first method.

Quadtree decoder 5922 includes demultiplexer 5931, quadtree divider 5932, distance decoder 5933, and recoverer 5934.

Demultiplexer 5931 demultiplexes the encoded quadtree geometry information into the encoded occupancy code and the encoded distance information.

Quadtree divider 5932 divides the two-dimensional space including the first three-dimensional point cloud into four subspaces, and decodes the encoded occupancy code to obtain an occupancy code for each subspace. Quadtree divider 5932 performs the processing of dividing the two-dimensional space into four subspaces and decoding the occupancy code for each subspace until the subspaces become unable to be further divided.

Distance decoder 5933 decodes the encoded distance information to obtain distance information. Distance decoder 5933 may arithmetically decode the distance information indicating the distance of each three-dimensional point of the three-dimensional point cloud to the plane. Distance decoder 5933 may predict distance information on the target first three-dimensional point from distance information on a first three-dimensional point adjacent to the target first three-dimensional point, and obtain the distance information by adding an arithmetically decoded difference value to the prediction value.

Recoverer 5934 recovers the position of each three-dimensional point by calculating the value in the Z-axis direction from the occupancy code and the distance information.

Figure 125:
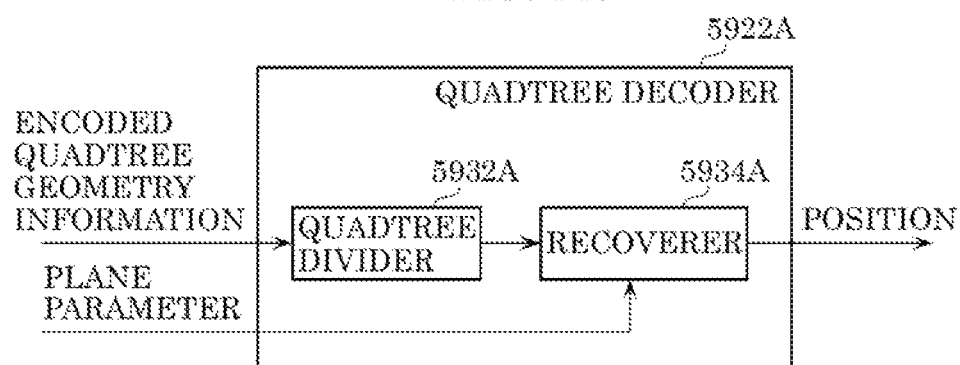

FIG. 125 is a block diagram showing a detailed configuration of a quadtree decoder that uses the second method.

Quadtree decoder 5922A includes quadtree divider 5932A and recoverer 5934A.

Quadtree divider 5932A divides the two-dimensional space including the first three-dimensional point cloud into four subspaces, and decodes the occupancy code for each subspace. Quadtree divider 5932A performs the processing of dividing each subspace into four parts and decoding the occupancy code for each resulting part until the subspaces become unable to be further divided.

Recoverer 5934A recovers the position of each three-dimensional point by calculating the value in the Z-axis direction from the occupancy code and the plane parameter ω.

Figure 126:
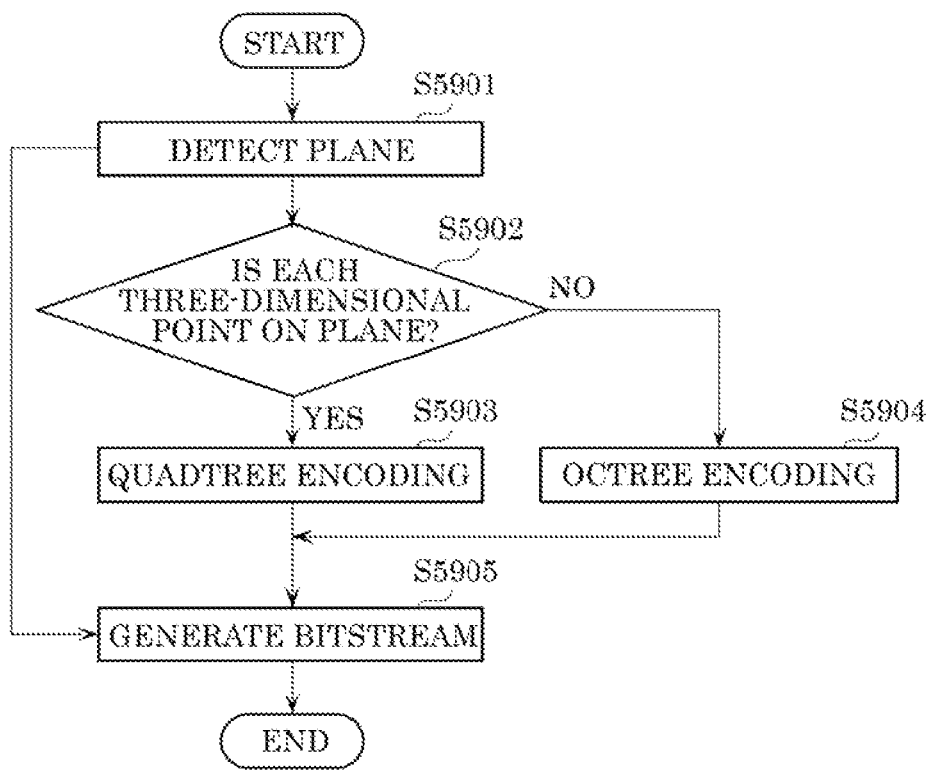

FIG. 126 is a flowchart of a three-dimensional data encoding method.

The three-dimensional data encoding device detects a plane from geometry information on a three-dimensional point cloud (S5901).

The three-dimensional data encoding device then determines whether each three-dimensional point of the three-dimensional point cloud is a point on a plane or not (S5902). In other words, the three-dimensional data encoding device determines whether each three-dimensional point of the three-dimensional point cloud belongs to a first three-dimensional point cloud on a plane or a second three-dimensional point cloud, which is the remainder of the three-dimensional point cloud.

The three-dimensional data encoding device generates a first three-dimensional point cloud of the quadtree structure represented as a quadtree from the first three-dimensional point cloud that is determined to be points on a plane, and encodes the generated first three-dimensional point cloud of the quadtree structure (S5903).

The three-dimensional data encoding device generates a second three-dimensional point cloud of the octree structure represented as an octree from the second three-dimensional point cloud that is not determined to be points on a plane, and encodes the generated second three-dimensional point cloud of the octree structure (S5904).

The three-dimensional encoding device generates a bitstream by multiplexing the encoded first three-dimensional point cloud, the encoded second three-dimensional point cloud, and a plane parameter ω (S5905).

Figure 127:
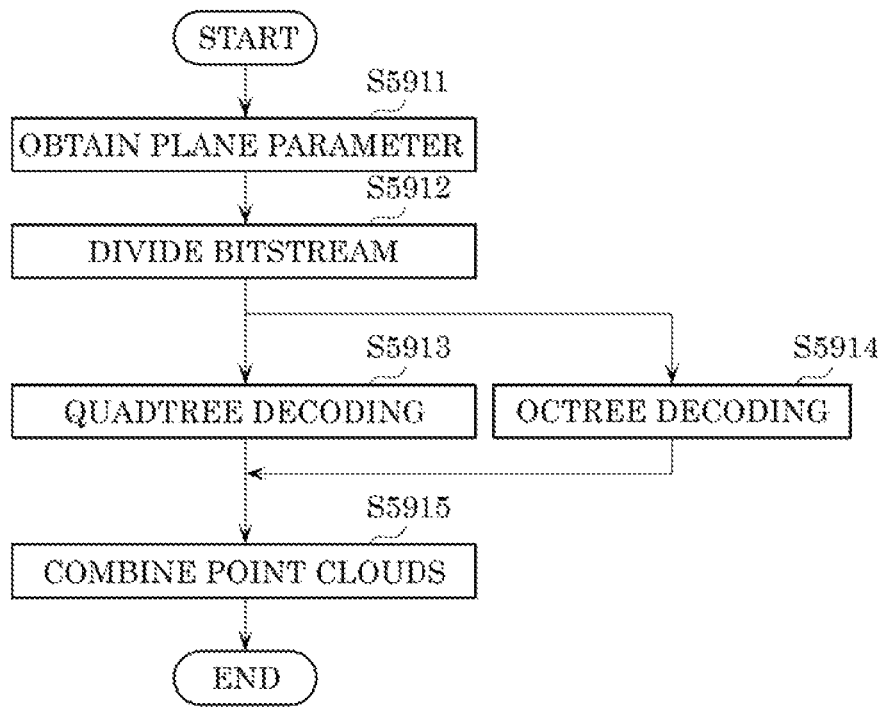

FIG. 127 is a flowchart of a three-dimensional data decoding method.

The three-dimensional data decoding device obtains the plane parameter ω from the metadata of the bitstream (S5911).

The three-dimensional data decoding device divides the bitstream into the encoded first three-dimensional point cloud, which is data on the plane, and the encoded second three-dimensional point cloud, which is not data on the plane (S5912).

The three-dimensional data decoding device decodes the encoded first three-dimensional point cloud to obtain the first three-dimensional point cloud (S5913).

The three-dimensional data decoding device decodes the encoded second three-dimensional point cloud to obtain the second three-dimensional point cloud (S5914).

The three-dimensional data decoding device combines the decoded first three-dimensional point cloud and the decoded second three-dimensional point cloud to generate the three-dimensional point cloud indicating geometry information (S5915).

Note that the three-dimensional data encoding device may add, to the header, identification information that indicates whether the three-dimensional point cloud in the bitstream is a three-dimensional point cloud encoded in the form of an octree or a three-dimensional point cloud encoded in the form of a quadtree. In other words, the three-dimensional data encoding device may generate a bitstream including identification information that indicates whether the target to be encoded is the first information or the second information. In that case, the three-dimensional data decoding device can determine whether to decode the bitstream as an octree or a quadtree based on the identification information added to the header, and can properly decode the bitstream.

The three-dimensional data encoding device or the three-dimensional data decoding device may perform the encoding or the decoding by regarding the plane as one slice or one tile. In that case, the three-dimensional data encoding device or the three-dimensional data decoding device may add, to the header of the slice or the tile, identification information that indicates the plane parameter or whether the bitstream is encoded in the form of a quadtree.

The three-dimensional data encoding device or the three-dimensional data decoding device divides the obtained three-dimensional point cloud into a first three-dimensional point cloud located on a plurality of planes and a second three-dimensional point cloud located outside the planes. The three-dimensional data encoding device or the three-dimensional data decoding device may encode/decode the first three-dimensional point cloud in the form of a quadtree and encode/decode the second three-dimensional point cloud in the form of an octree.

The three-dimensional data encoding device or the three-dimensional data decoding device can use any method for plane detection. For example, three-dimensional points having a z coordinate of α (z=α) may be extracted from the three-dimensional point cloud and encoded as a plane in the form of a quadtree.

The three-dimensional data encoding device or the three-dimensional data decoding device may encode or decode the first three-dimensional point cloud and the second three-dimensional point cloud in the quadtree representation and the octree representation, respectively, in parallel.

Figure 128:
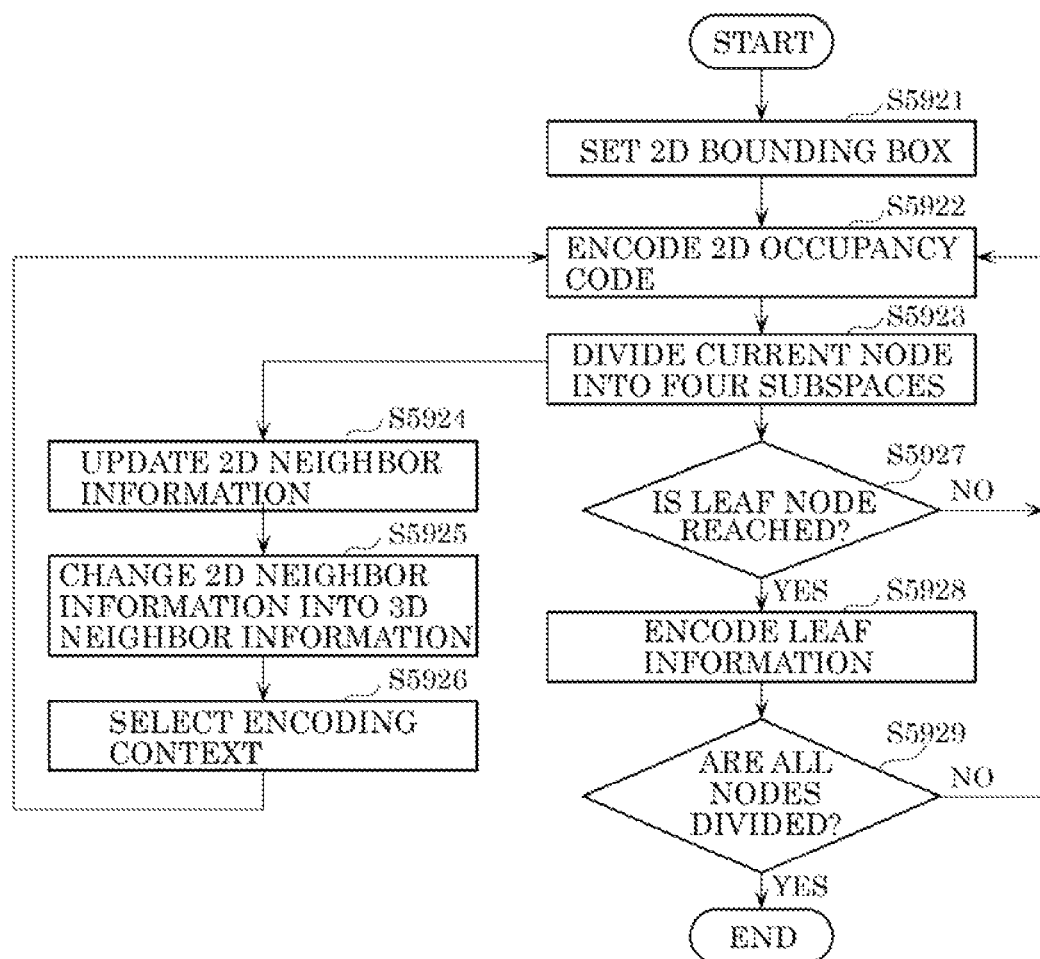

FIG. 128 is a flowchart of a quadtree encoding process.

The three-dimensional data encoding device sets a bounding box for a two-dimensional space including an identified first three-dimensional point cloud (S5921). The three-dimensional data encoding device may set a bounding box for a three-dimensional space including the first three-dimensional point cloud. In that case, the three-dimensional data encoding device ignores the Z-axis direction of the bounding box for the three-dimensional space.

The three-dimensional data encoding device encodes an occupancy code of the two-dimensional space using a selected encoding table (S5922).

The three-dimensional data encoding device divides a current node into four subspaces (S5923).

The three-dimensional data encoding device updates two-dimensional neighbor information that indicates a neighboring node adjacent to the current node in the two-dimensional space (S5924). Here, the two-dimensional neighbor information updated by the three-dimensional data encoding device may be information that indicates a neighboring node adjacent to each of the four subspaces of the current node.

The three-dimensional data encoding device changes the two-dimensional neighbor information into three-dimensional neighbor information (S5925). Specifically, the three-dimensional data encoding device converts 4-bit two-dimensional neighbor information such as that shown in FIG. 118 into 6-bit three-dimensional neighbor information such as that shown in FIG. 119. The resulting three-dimensional neighbor information is 6-bit information including a 0 bit that indicates a dummy neighboring node adjacent to the current node in the Z-axis direction. In the quadtree encoding, in this way, the three-dimensional data encoding device generates three-dimensional neighbor information that indicates a neighboring pattern with a neighboring node in the Z-axis direction regarded as non-occupied. The three-dimensional neighbor information indicates a first neighboring node spatially adjacent to the current node in the Z-axis direction as 0, for example.

Note that the two-dimensional neighbor information is not limited to the 4-bit information such as that shown in FIG. 118, but can be 6-bit information that indicates two first neighboring nodes spatially adjacent to the current node in the Z-axis direction as 0, such as that shown in FIG. 119. In that case, in Step S5924, the three-dimensional data encoding device updates the 4-bit information indicated by the neighboring nodes excluding the two first neighboring nodes of the 6-bit two-dimensional neighbor information. In addition, in that case, Step S5925 is omitted.

The three-dimensional data encoding device selects an encoding table based on the three-dimensional neighbor information (S5926).

Therefore, the three-dimensional data encoding device may generate a virtual 6-neighbor first encoding pattern such as that shown in FIG. 119 from a 4-neighbor encoding pattern such as that shown in FIG. 118 by regarding the neighboring nodes adjacent to the current node in the Z-axis direction as non-occupied, and encode the occupancy codes by changing the encoding table for the entropy encoding using the first encoding pattern. Furthermore, in the quadtree encoding, the three-dimensional data encoding device may use the 4-neighbor encoding pattern to perform the encoding using an encoding table available for the 4-neighbor encoding pattern, or may use the virtual 6-neighbor first encoding pattern generated from the 4-neighbor encoding pattern to perform the encoding using an encoding table available for the 6-neighbor second encoding pattern. Note that the encoding table available for the 4-neighbor encoding pattern is an encoding table having $2^4$, or 16, patterns. The encoding table available for the virtual 6-neighbor first encoding pattern, the 6-neighbor first encoding pattern, or the second encoding pattern is an encoding table having $2^6$, or 64, patterns. The number of patterns of each encoding table may be smaller than the value described above.

In this way, the three-dimensional data encoding device selects the first encoding table based on the first encoding pattern, and entropy-encodes the first information using the selected first encoding table. The three-dimensional data encoding device selects the second encoding table based on the second encoding pattern, and entropy-encodes the second information using the selected second encoding table. Here, the first encoding table corresponds to an encoding table available for the virtual 6-neighbor first encoding pattern, and the second encoding table corresponds to an encoding table available for the 6-neighbor second encoding pattern. In this way, the three-dimensional data encoding device can achieve a partial commonality between the first encoding pattern and the second encoding pattern and therefore can reduce the processing load of the encoding process.

After Step S5926, the three-dimensional data encoding device returns to Step S5922, where the occupancy code of the two-dimensional space of each current node, which is one of the four subspaces obtained by the division in Step S5923, is encoded using the encoding table selected in Step S5926. In the subsequent Step S5923, the three-dimensional data encoding device further divides each current node into four subspaces.

The three-dimensional data encoding device determines whether a leaf node is reached or not (S5927).

If a leaf node is reached (if Yes in S5927), the three-dimensional data encoding device encodes leaf information (S5928).

The three-dimensional data encoding device determines whether all the nodes are divided or not (S5929).

If all the nodes are divided (if Yes in S5929), the three-dimensional data encoding device ends the process.

If no leaf node is reached (if No in S5927), or if all the nodes are not divided (if No in S5929), the three-dimensional data encoding device returns to the processing of Step S5922.

Figure 129:
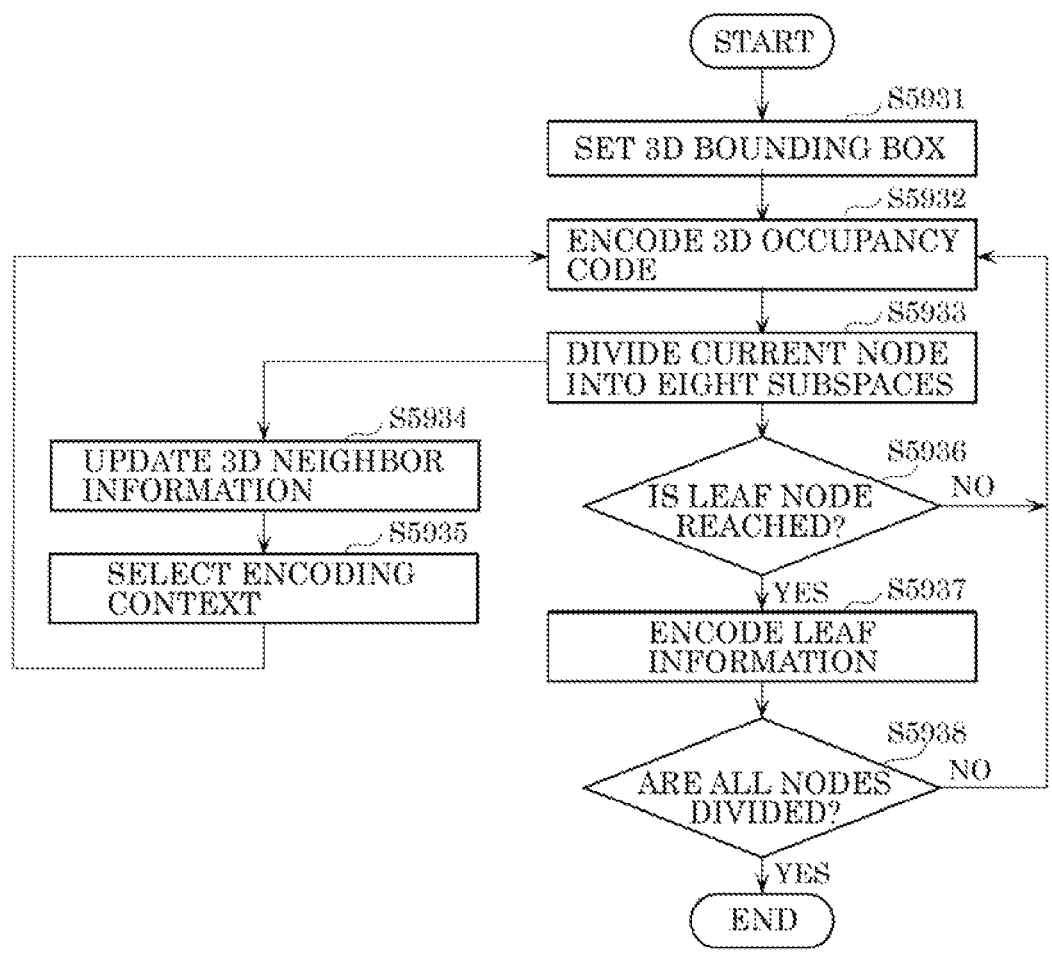

FIG. 129 is a flowchart of an octree encoding process.

The three-dimensional data encoding device sets a bounding box for a three-dimensional space including an identified second three-dimensional point cloud (S5931).

The three-dimensional data encoding device encodes an occupancy code of the three-dimensional space using a selected encoding table (S5932).

The three-dimensional data encoding device divides a current node into eight subspaces (S5933).

The three-dimensional data encoding device updates three-dimensional neighbor information that indicates a neighboring node adjacent to the current node in the three-dimensional space (S5934). Here, the three-dimensional neighbor information updated by the three-dimensional data encoding device may be information that indicates a neighboring node adjacent to each of the eight subspaces of the current node.

The three-dimensional data encoding device selects an encoding table based on the three-dimensional neighbor information (S5935).

Therefore, the three-dimensional data encoding device generates a 6-neighbor neighbor information, and encodes the occupancy codes by changing the encoding table for the entropy-encoding.

After Step S5935, the three-dimensional data encoding device returns to Step S5932, where the occupancy code of the three-dimensional space of each current node, which is one of the eight subspaces obtained by the division in Step S5933, is encoded using the encoding table selected in Step S5935. In the subsequent Step S5933, the three-dimensional data encoding device further divides each current node into eight subspaces.

The three-dimensional data encoding device determines whether a leaf node is reached or not (S5936).

If a leaf node is reached (if Yes in S5936), the three-dimensional data encoding device encodes leaf information (S5937).

The three-dimensional data encoding device determines whether all the nodes are divided or not (S5938).

If all the nodes are divided (if Yes in S5938), the three-dimensional data encoding device ends the process.

If no leaf node is reached (if No in S5936), or if all the nodes are not divided (if No in S5938), the three-dimensional data encoding device returns to the processing of Step S5932.

Note that the three-dimensional data encoding device may perform the encoding with eight child nodes in the octree encoding and with four child nodes in the quadtree encoding.

Figure 130:
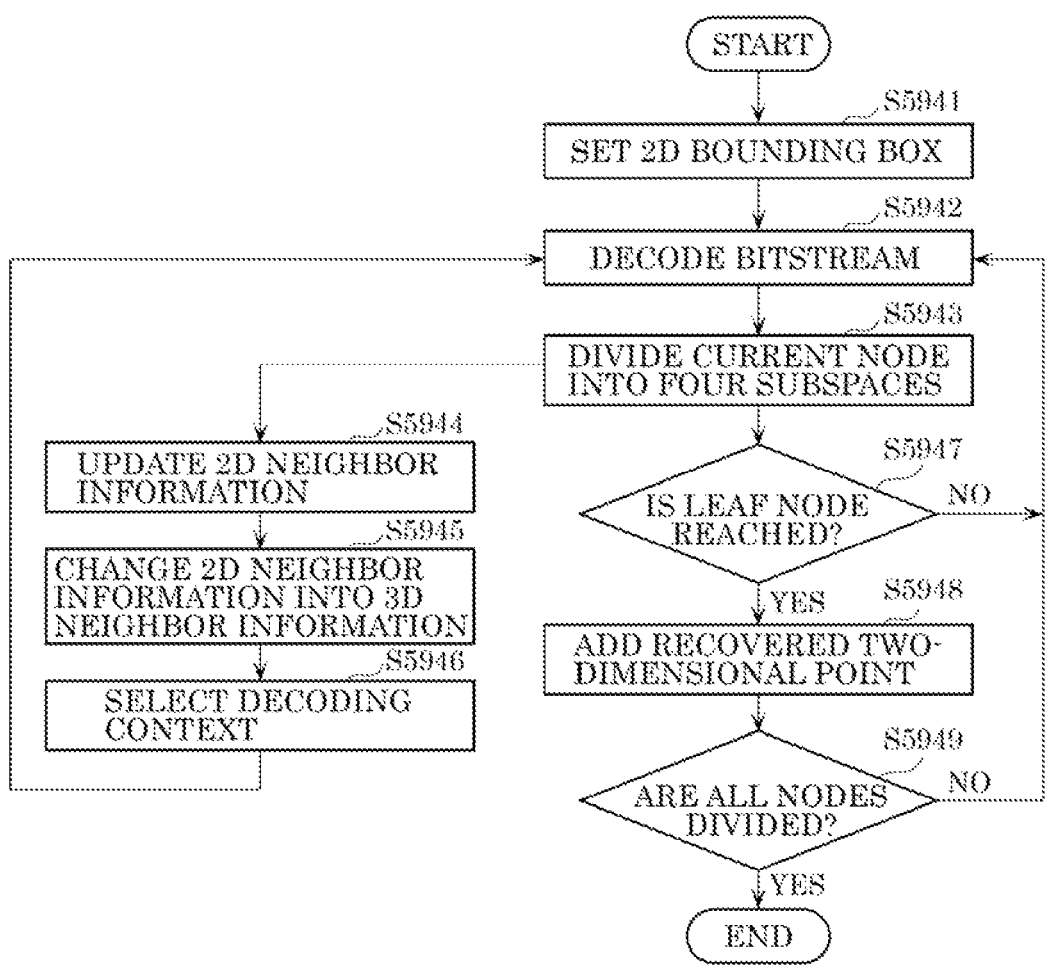

FIG. 130 is a flowchart of a quadtree decoding process.

The three-dimensional data decoding device sets a bounding box for a two-dimensional space including an identified first three-dimensional point cloud (S5941). The three-dimensional data decoding device may set a bounding box for a three-dimensional space including the first three-dimensional point cloud. In that case, the three-dimensional data decoding device ignores the Z-axis direction of the bounding box for the three-dimensional space.

The three-dimensional data decoding device decodes the bitstream using a selected decoding table to obtain an occupancy code of the two-dimensional space (S5942).

The three-dimensional data decoding device divides a current node into four subspaces (S5943).

The three-dimensional data decoding device updates two-dimensional neighbor information that indicates a neighboring node adjacent to the current node in the two-dimensional space (S5944). Here, the two-dimensional neighbor information updated by the three-dimensional data decoding device may be information that indicates a neighboring node adjacent to each of the four subspaces of the current node.

The three-dimensional data decoding device changes the two-dimensional neighbor information into three-dimensional neighbor information (S5945). Specifically, the three-dimensional data decoding device converts 4-bit two-dimensional neighbor information such as that shown in FIG. 118 into 6-bit three-dimensional neighbor information such as that shown in FIG. 119. The resulting three-dimensional neighbor information is 6-bit information including a 0 bit that indicates a dummy neighboring node adjacent to the current node in the Z-axis direction. In the quadtree decoding, in this way, the three-dimensional data decoding device generates three-dimensional neighbor information that indicates a neighboring pattern with a neighboring node in the Z-axis direction regarded as non-occupied. The three-dimensional neighbor information indicates a first neighboring node spatially adjacent to the current node in the Z-axis direction as 0, for example.

Note that the two-dimensional neighbor information is not limited to the 4-bit information such as that shown in FIG. 118, but can be 6-bit information that indicates two first neighboring nodes spatially adjacent to the current node in the Z-axis direction as 0, such as that shown in FIG. 119. In that case, in Step S5944, the three-dimensional data decoding device updates the 4-bit information indicated by the neighboring nodes excluding the two first neighboring nodes of the 6-bit two-dimensional neighbor information. In addition, in that case, Step S5945 is omitted.

The three-dimensional data decoding device selects a decoding table based on the three-dimensional neighbor information (S5946).

Therefore, the three-dimensional data decoding device may generate a virtual 6-neighbor first decoding pattern such as that shown in FIG. 119 from a 4-neighbor decoding pattern such as that shown in FIG. 118 by regarding the neighboring nodes adjacent to the current node in the Z-axis direction as non-occupied, and decode the occupancy codes by changing the decoding table for the entropy decoding using the first decoding pattern. Furthermore, in the quadtree decoding, the three-dimensional data decoding device may use the 4-neighbor decoding pattern to perform the decoding using a decoding table available for the 4-neighbor decoding pattern, or may use the virtual 6-neighbor first decoding pattern generated from the 4-neighbor decoding pattern to perform the decoding using a decoding table available for the 6-neighbor second decoding pattern. Note that the decoding table available for the 4-neighbor decoding pattern is a decoding table having 16 patterns. The decoding table available for the virtual 6-neighbor first decoding pattern, the 6-neighbor first decoding pattern, or the second decoding pattern is a decoding table having 64 patterns. The number of patterns of each decoding table may be smaller than the value described above.

In this way, the three-dimensional data decoding device selects the first decoding table based on the first decoding pattern, and entropy-decodes the first information using the selected first decoding table. The three-dimensional data decoding device also selects the second decoding table based on the second decoding pattern, and entropy-decodes the second information using the selected second decoding table. Here, the first decoding table corresponds to a decoding table available for the virtual 6-neighbor first decoding pattern, and the second decoding table corresponds to a decoding table available for the 6-neighbor second decoding pattern. In this way, the three-dimensional data decoding device can achieve a partial commonality between the first decoding pattern and the second decoding pattern and therefore can reduce the processing load of the decoding process.

After Step S5946, the three-dimensional data decoding device returns to Step S5942, where the occupancy code of the two-dimensional space of each current node, which is one of the four subspaces obtained by the division in Step S5943, is decoded using the decoding table selected in Step S5946. In the subsequent Step S5943, the three-dimensional data decoding device further divides each current node into four subspaces.

The three-dimensional data decoding device determines whether a leaf node is reached or not (S5947).

If a leaf node is reached (if Yes in S5947), the three-dimensional data decoding device adds the recovered first three-dimensional point to the three-dimensional point cloud (S5948).

The three-dimensional data decoding device determines whether all the nodes are divided or not (S5949).

If all the nodes are divided (if Yes in S5949), the three-dimensional data decoding device ends the process.

If no leaf node is reached (if No in S5947), or if all the nodes are not divided (if No in S5949), the three-dimensional data decoding device returns to the processing of Step S5942.

Figure 131:
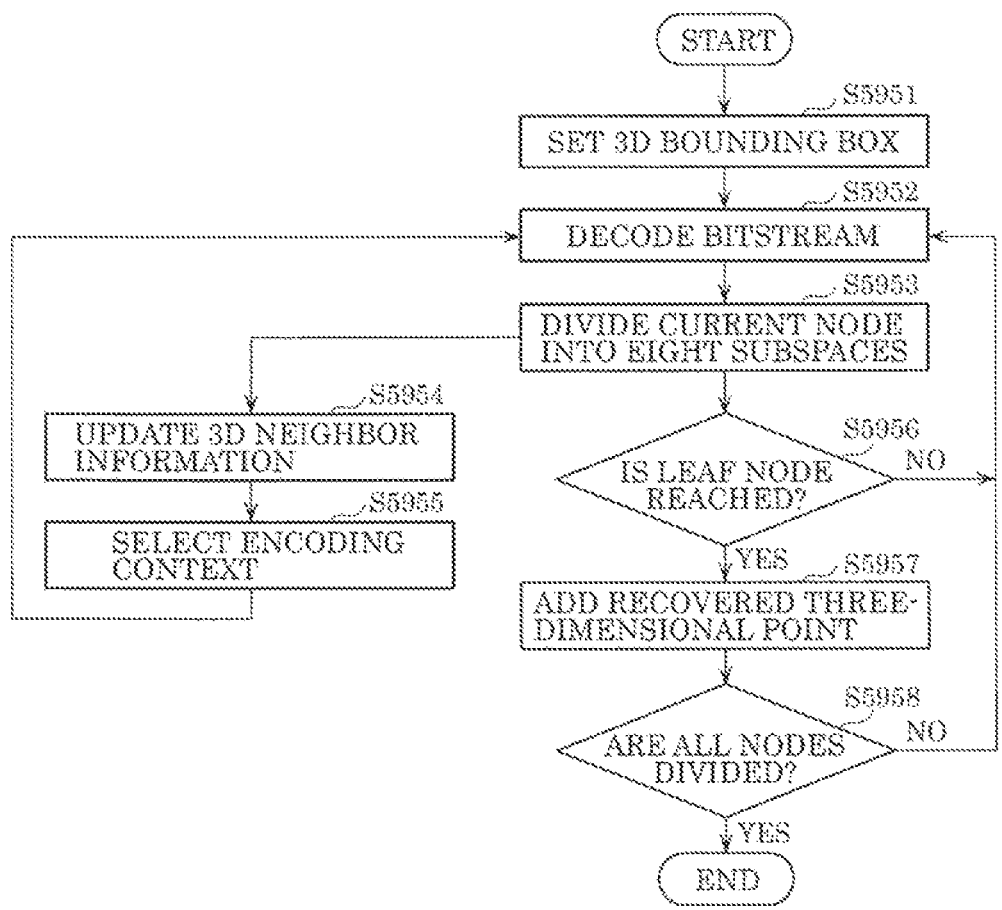

FIG. 131 is a flowchart of an octree decoding process.

The three-dimensional data decoding device sets a bounding box for a three-dimensional space including an identified second three-dimensional point cloud (S5951).

The three-dimensional data decoding device decodes the bitstream using a selected decoding table to obtain an occupancy code of the three-dimensional space (S5952).

The three-dimensional data decoding device divides a current node into eight subspaces (S5953).

The three-dimensional data decoding device updates three-dimensional neighbor information that indicates a neighboring node adjacent to the current node in the three-dimensional space (S5954). Here, the three-dimensional neighbor information updated by the three-dimensional data decoding device may be information that indicates a neighboring node adjacent to each of the four subspaces of the current node.

The three-dimensional data decoding device selects a decoding table based on the three-dimensional neighbor information (S5955).

Therefore, the three-dimensional data decoding device generates a 6-neighbor neighbor information, and decodes the occupancy codes by changing the decoding table for the entropy-decoding.

After Step S5955, the three-dimensional data decoding device returns to Step S5952, where the occupancy code of the three-dimensional space of each current node, which is one of the eight subspaces obtained by the division in Step S5953, is decoded using the decoding table selected in Step S5955. In the subsequent Step S5953, the three-dimensional data decoding device further divides each current node into eight subspaces.

The three-dimensional data decoding device determines whether a leaf node is reached or not (S5956).

If a leaf node is reached (if Yes in S5936), the three-dimensional data decoding device adds the recovered second three-dimensional point to the three-dimensional point cloud (S5957).

The three-dimensional data decoding device determines whether all the nodes are divided or not (S5958).

If all the nodes are divided (if Yes in S5958), the three-dimensional data decoding device ends the process.

If no leaf node is reached (if No in S5956), or if all the nodes are not divided (if No in S5958), the three-dimensional data decoding device returns to the processing of Step S5952.

Note that, although the first three-dimensional point cloud is represented as a quadtree structure in the present embodiment, the representation is not limited thereto, and the first three-dimensional point cloud may be represented as a binary tree structure.

As stated above, the three-dimensional data encoding device according to the present embodiment performs the following process. Specifically, the three-dimensional data encoding device encodes first information of a first current node or second information of a second current node, the first current node being included in an N-ary tree structure of first three-dimensional points included in a first three-dimensional point cloud, N being 2 or 4, the second current node being included in an octree structure of second three-dimensional points included in a second three-dimensional point cloud. In the encoding of the first information or the second information, the first information is encoded using a first encoding pattern including a pattern common to a second encoding pattern used in encoding the second information.

With this configuration, the three-dimensional data encoding device can reduce the processing load by encoding information on an N-ary tree structure using an encoding pattern including a pattern common to the encoding pattern used in the encoding of information on an octree structure.

For example, the three-dimensional data encoding device includes a processor and memory, and the processor performs the above-described process using the memory.

The three-dimensional data decoding device performs the following process. Specifically, the three-dimensional data decoding device decodes first information of a first current node or second information of a second current node, the first current node being included in an N-ary tree structure of first three-dimensional points included in a first three-dimensional point cloud, N being 2 or 4, the second current node being included in an octree structure of second three-dimensional points included in a second three-dimensional point cloud. In the decoding of the first information or the second information, the first information is decoded using a first decoding pattern including a pattern common to a second decoding pattern used in decoding the second information.

With this configuration, the three-dimensional data decoding device can reduce the processing load by decoding information on an N-ary tree structure using a decoding pattern including a pattern common to the decoding pattern used in the decoding of information on an octree structure.

For example, the three-dimensional data decoding device includes a processor and memory, and the processor performs the above-described process using the memory.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a three-dimensional data encoding device and a three-dimensional data decoding device.

What is claimed is:

1. A three-dimensional data encoding method, comprising:
    encoding a parameter; and
    encoding information of a current node included in an N-ary tree structure of three-dimensional points, where N is an integer greater than or equal to 2,
    wherein in the encoding of the information of the current node, when the parameter indicates first information, setting invalid bits from eight bits corresponding to the current node.

2. The three-dimensional data encoding method according to claim 1,
    wherein the number of the set invalid bits is less than eight.

3. The three-dimensional data encoding method according to claim 1,
wherein the number of the set invalid bits is (8−N).

4. The three-dimensional data encoding method according to claim 1,
wherein when the parameter indicates first information, N is 2 or 4.

5. The three-dimensional data encoding method according to claim 1,
wherein the eight bits respectively correspond to each of eight child nodes of the current node.

6. The three-dimensional data encoding method according to claim 1,
wherein in the encoding of the information of the current node, when the parameter indicates second information, not setting invalid bits from eight bits corresponding to the current node.

7. The three-dimensional data encoding method according to claim 6,
wherein when the parameter indicates second information, N is 8.

8. A three-dimensional data decoding method, comprising:
decoding a parameter; and
decoding information of a current node included in an N-ary tree structure of three-dimensional points, where N is an integer greater than or equal to 2,
wherein in the decoding of the information of the current node, when the parameter indicates first information, setting invalid bits from eight bits corresponding to the current node.

9. The three-dimensional data decoding method according to claim 8,
wherein the number of the set invalid bits is less than eight.

10. The three-dimensional data decoding method according to claim 8,
wherein the number of the set invalid bits is (8−N).

11. The three-dimensional data decoding method according to claim 8,
wherein when the parameter indicates first information, N is 2 or 4.

12. The three-dimensional data decoding method according to claim 8,
wherein the eight bits respectively correspond to each of eight child nodes of the current node.

13. The three-dimensional data decoding method according to claim 8,
wherein in the decoding of the information of the current node, when the parameter indicates second information, not setting invalid bits from eight bits corresponding to the current node.

14. The three-dimensional data decoding method according to claim 13,
wherein when the parameter indicates second information, N is 8.

15. A three-dimensional data encoding device, comprising:
a processor; and
memory,
wherein using the memory, the processor:
encodes a parameter; and
encodes information of a current node included in an N-ary tree structure of three-dimensional points, where N is an integer greater than or equal to 2,
wherein in the encoding of the information of the current node, when the parameter indicates first information, the processor sets invalid bits from eight bits corresponding to the current node.

16. A three-dimensional data decoding device, comprising:
a processor; and
memory,
wherein using the memory, the processor:
decodes a parameter; and
decodes information of a current node included in an N-ary tree structure of three-dimensional points, where N is an integer greater than or equal to 2,
wherein in the decoding of the information of the current node, when the parameter indicates first information, the processor sets invalid bits from eight bits corresponding to the current node.

* * * * *